United States Patent [19]
Kaihara et al.

[11] Patent Number: 6,140,906
[45] Date of Patent: Oct. 31, 2000

[54] RESISTIVE TEMPERATURE SENSOR AND MANUFACTURING METHOD THEREFOR

[75] Inventors: Nobuo Kaihara; Minoru Ogasawara, both of Akita; Masatada Yodogawa, Tokyo, all of Japan

[73] Assignee: TDK Corporation, Tokyo, Japan

[21] Appl. No.: 08/967,110

[22] Filed: Nov. 10, 1997

[30] Foreign Application Priority Data

| Nov. 8, 1996 | [JP] | Japan | 8-312822 |
|---|---|---|---|
| Nov. 8, 1996 | [JP] | Japan | 8-312823 |
| Nov. 8, 1996 | [JP] | Japan | 8-312824 |
| May 8, 1997 | [JP] | Japan | 9-118278 |

[51] Int. Cl.$^7$ ................................................ H01C 7/10
[52] U.S. Cl. ........................ 338/22 R; 338/225 D; 338/25; 338/314; 338/308; 29/610.1
[58] Field of Search ................ 338/22 R, 225 D, 338/25, 314, 319, 320, 308

[56] References Cited

U.S. PATENT DOCUMENTS

| 4,333,067 | 6/1982 | Kugimiya et al. | 338/34 |
|---|---|---|---|
| 4,609,903 | 9/1986 | Toyokura et al. | 338/22 SD |
| 4,732,798 | 3/1988 | Ishida et al. | 428/137 |
| 5,197,804 | 3/1993 | Tani et al. | 374/185 |
| 5,202,665 | 4/1993 | Hafele | 338/25 |
| 5,242,225 | 9/1993 | Kasanami et al. | 374/185 |
| 5,332,991 | 7/1994 | Kojima et al. | 338/25 |

FOREIGN PATENT DOCUMENTS

| 2-45603 | 3/1990 | Japan . |
|---|---|---|
| 7-190863 | 7/1995 | Japan . |

*Primary Examiner*—Michael L. Gellner
*Assistant Examiner*—Richard K. Lee
*Attorney, Agent, or Firm*—Oblon, Spivak, McClelland, Maier & Neustadt, P.C.

[57] ABSTRACT

A resistive temperature sensor is constituted by an insulating body mainly composed of alumina; and a temperature sensing resistor mainly composed of a conductive material containing a metal silicide. The insulating body and the temperature sensing resistor are laminated and sintered to form a lamination sintered body in which a resistance circuit is formed.

25 Claims, 54 Drawing Sheets

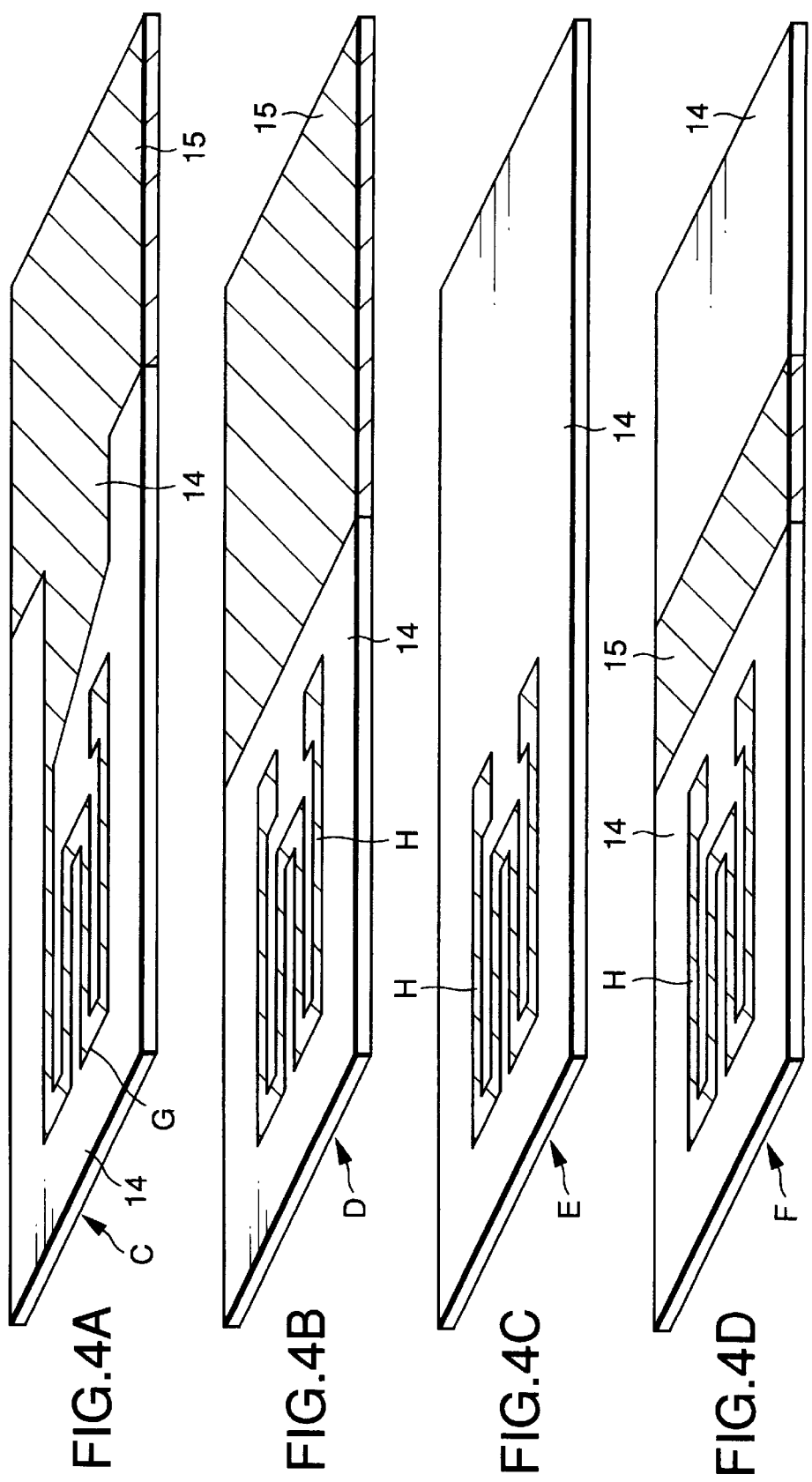

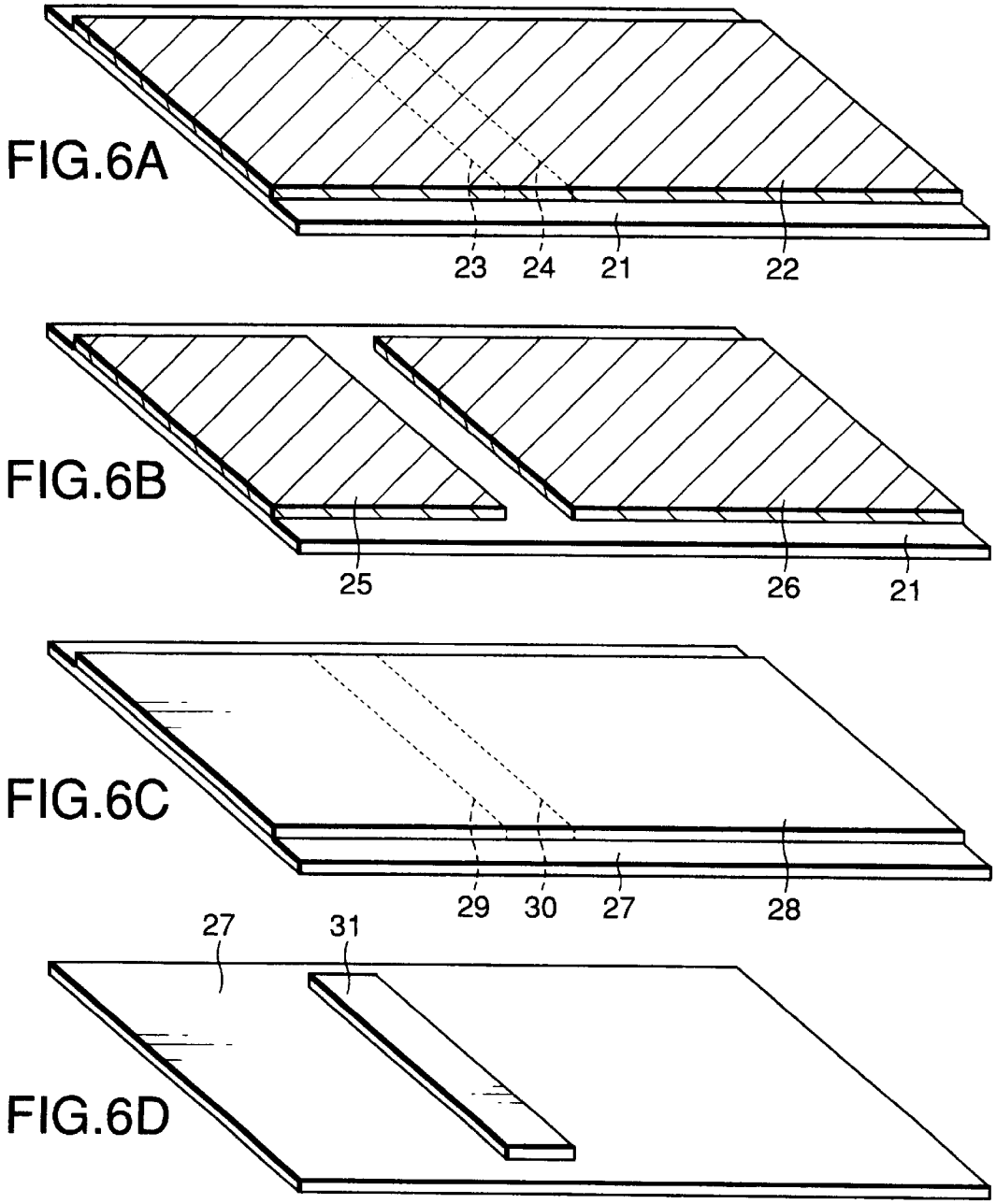

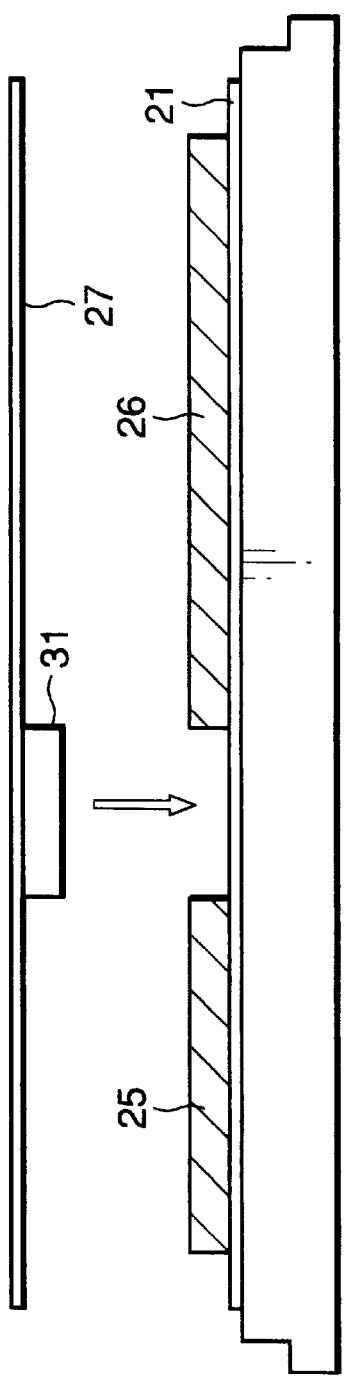
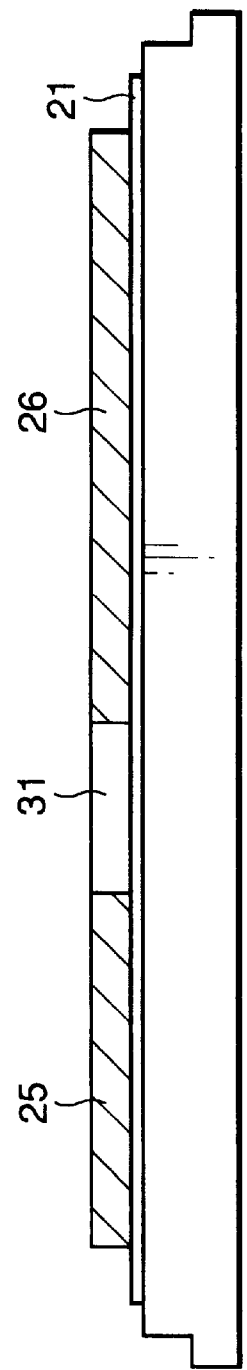
FIG.7A
FIG.7B

TEMPERATURE CHANGE OF RESISTANCE (CHANGE RATE [%])

RESPONSE CHARACTERISTIC (CHANGE RATE [%])

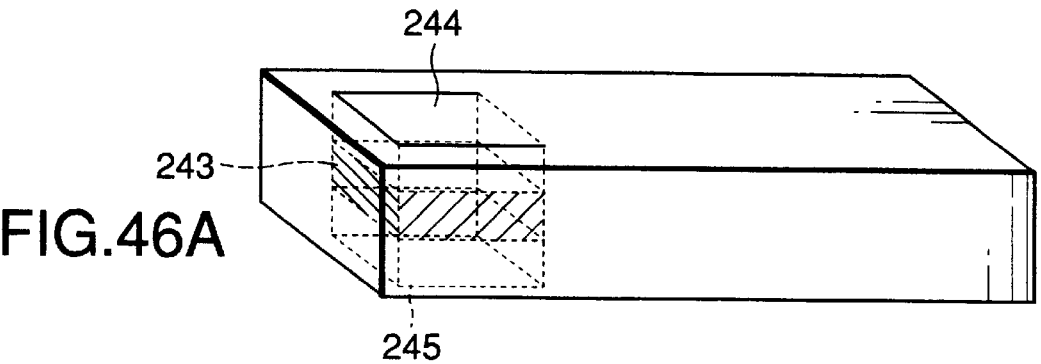
FIG.46A
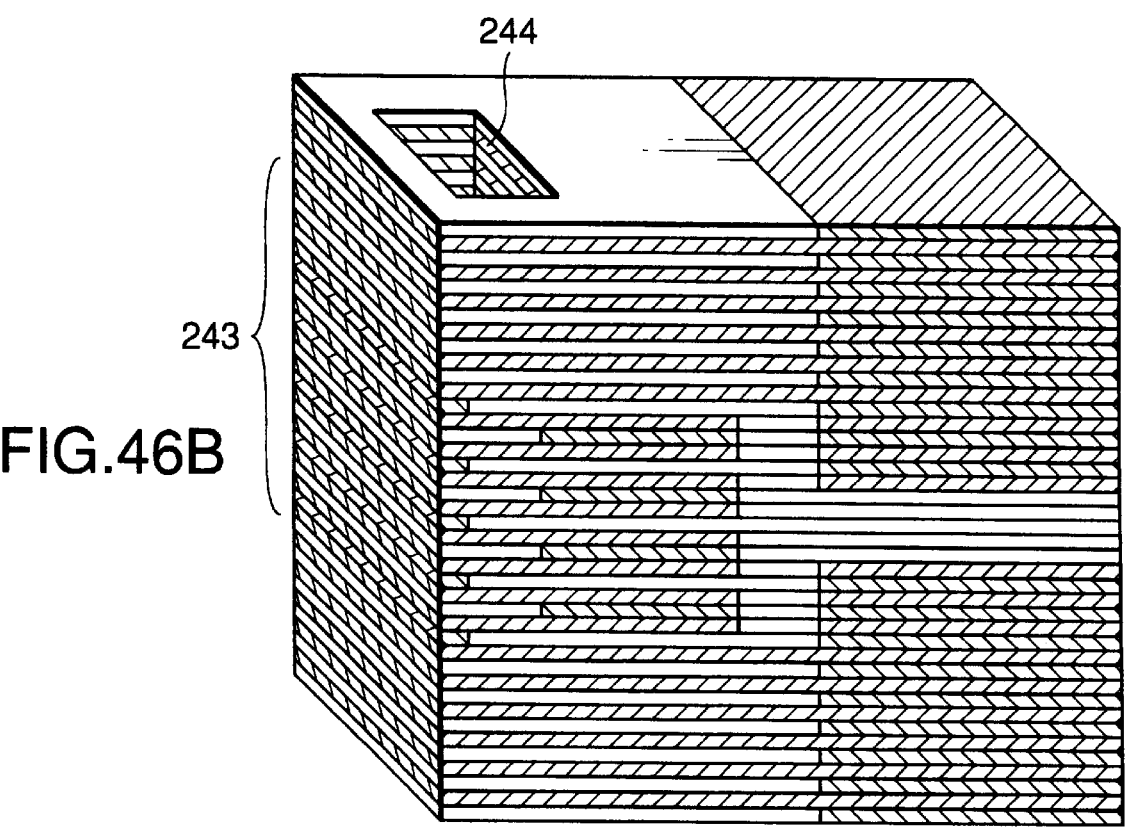
FIG.46B
FIG.46C
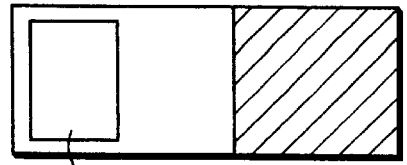 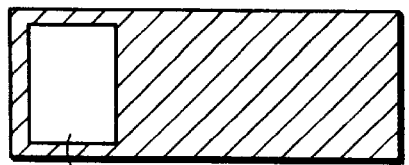

FIG.54
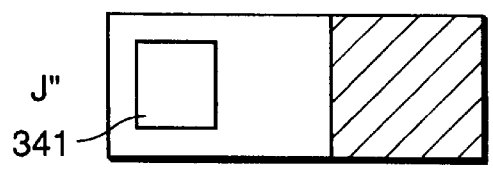
J"
341
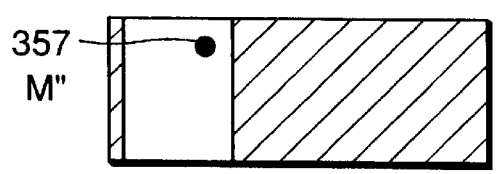
357
M"
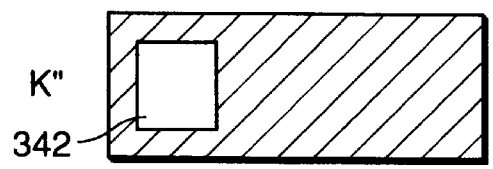
K"
342
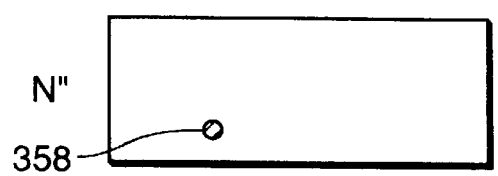
N"
358
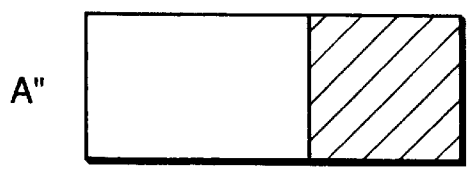
A"
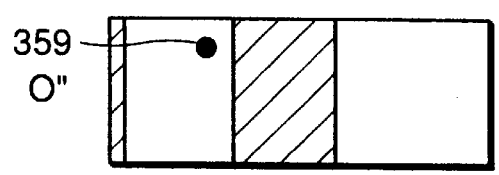
359
O"
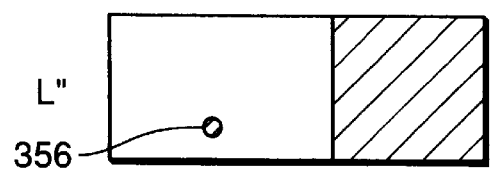
L"
356

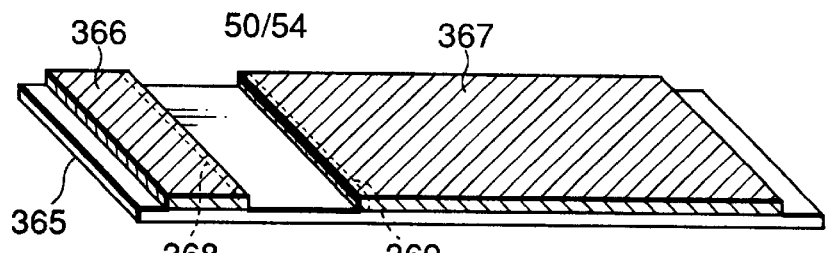
FIG.57A
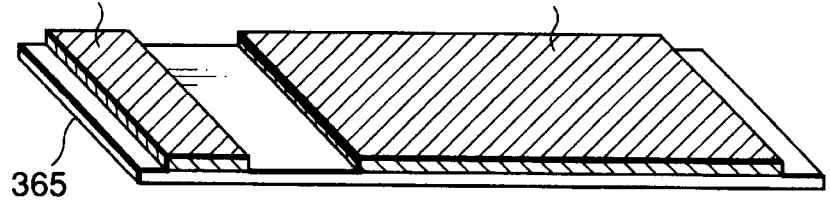
FIG.57B
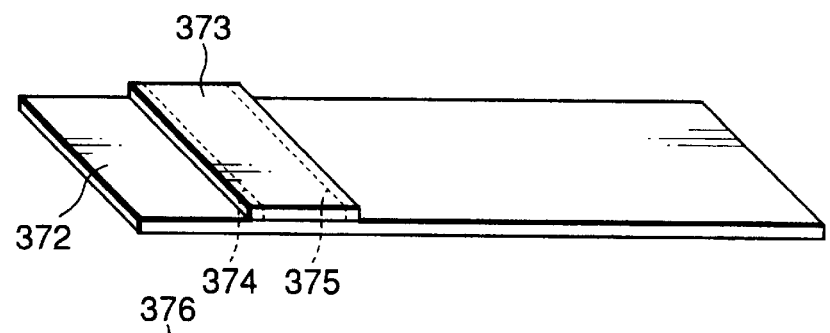
FIG.57C
FIG.57D
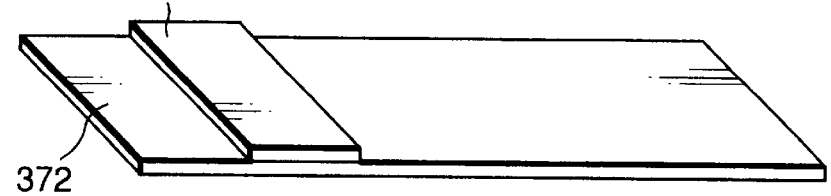
FIG.57E
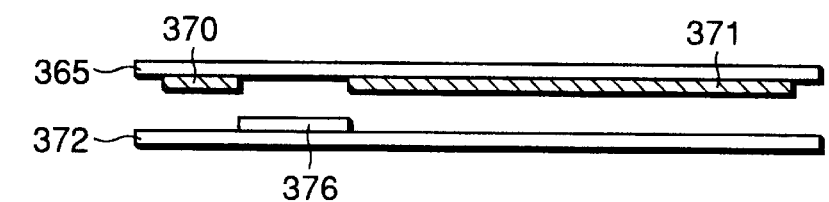
FIG.57F
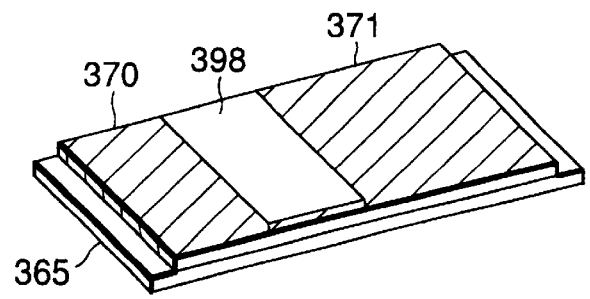
FIG.57G

RESISTIVE TEMPERATURE SENSOR AND MANUFACTURING METHOD THEREFOR

BACKGROUND OF THE INVENTION

1. Field of the Invention

This invention relates to a resistive temperature sensor for detecting a temperature in high-temperature atmospheres of automobile exhaust gases, kerosine stoves, hot plates, etc.

2. Description of the Related Art

For example, a temperature sensor for detecting high temperatures of 1000° C. or more in a short time is required to be excellent in heat resistance, environmental resistance, and impact resistance and have small heat capacity. In other words, if the temperature sensor is exposed to a high-temperature environment for hours, it needs to be hard to undergo chemical change and have sufficient resistance to corrosion of corrosive gases of sulfur compounds, etc., in automobile exhaust gases and fuel combustion gases.

Hitherto, for example, a metal compound or metal having heat resistance, such as tungsten or platinum, has been used sometimes as a temperature sensing material of a temperature sensor for detecting high temperatures. A resistive temperature sensor using a thermistor made of a metal oxide in place of metal as the temperature sensing material and comprising a thermistor layer formed on a ceramic substrate is described in Unexamined Japanese Model Utility Publication No. Hei 2-45603. A resistive temperature sensor using a thermistor made of a metal and ceramic mixture and comprising a cermet layer formed on a ceramic substrate is described in Unexamined Japanese Patent Publication (kokai) No. Hei 7-190863.

To improve responsivity of the measurement result of a temperature sensor to temperatures, temperature following property need to be provided by lessening the heat capacity. The heat capacity can be lessened by reducing the shape dimensions of the temperature sensing section. However, for example, to use the temperature sensor in harsh environments of installation in an automobile, etc., the mechanical strength capable of enduring vibration and impact during the equipment operation. In addition, since the temperature sensor needs to be assembled firmly, a mechanical strength with no hitch in work is required in the assembling step.

Therefore, the temperature sensing section is formed on the ceramic substrate where it requires a reasonable size in the temperature sensor comprising the thermistor or cermet layer formed on the ceramic substrate as described above in the publication, so that there are inevitable limitations to miniaturization of the shape dimensions of the temperature sensing section and there are also limitations to reduction in the heat capacity.

As described above, in the temperature sensor using a heat-resistant metal compound or metal of tungsten or platinum, the heat-resistant metal and metal compound do not have sufficient heat resistance or environmental resistance and the surfaces are coated with heat-resistant and environmental-resistant materials; there are inevitable limitations to miniaturization of the shape dimensions of the temperature sensing section and there are also limitations to reduction in the heat capacity.

Thus, the conventional temperature sensors are hard to detect a temperature in a short time over a long term in the range of room temperatures to high temperatures of 1000° C. or more.

SUMMARY OF THE INVENTION

It is an object of the invention to provide a resistive temperature sensor capable of detecting temperatures in a range of room temperature to about 1000° C.–1300° C. in a short time, is excellent in heat resistance and environmental resistance, and can endure long-term use, and to provide a manufacturing method thereof.

In the first aspect of the present invention, a resistive temperature sensor comprises: an insulating body comprising alumina; and a temperature sensing resistor comprising a conductive material containing a metal silicide; wherein the insulating body and the temperature sensing resistor are laminated and sintered to form a lamination sintered body in which a resistance circuit is formed.

In the second aspect of the present invention, in a resistive temperature sensor according the first aspect of the invention, the resistance circuit comprises a temperature sensing resistor, a connection electrode section to an outside, and a connection section between the electrode section and the temperature sensing resistor, the resistance circuit is formed of the conductive material containing the metal silicide.

In the third aspect of the present invention, in a resistive temperature sensor according to the second aspect of the present invention, the lamination sintered body contains the insulating body and the resistance circuit.

In the fourth aspect of the present invention, in a resistive temperature sensor according to the third aspect of the present invention, the lamination sintered body has a plurality of layered the temperature sensing resistors therein; and the temperature sensing resistors having a through-hole adjoining each other in a lamination direction are connected by a conductive body filled in the through-hole, the conductive body being the same material as at least one of the temperature sensing resistor, the electrode section and the connection section.

In the fifth aspect of the present invention, in a resistive temperature sensor according to the second aspect of the present invention, a conductive layer forming the electrode section and an insulating body layer comprising alumina are formed side by side in the same layer by thick film lamination; and the electrode section substantially comprises a plurality of conductive layers laminated, sintered, and formed in one piece without intervention of insulating bodies.

In the sixth aspect of the present invention, in a resistive temperature sensor according to the second aspect of the present invention, a conductive layer made of the same material as the electrode section, the connection section, or the temperature sensing section is placed between the temperature sensing resistors of the layers of the temperature sensing section containing the temperature sensing resistors through an insulating body layer.

In the seventh aspect of the present invention, in a resistive temperature sensor according to the sixth aspect of the present invention, the temperature sensing section containing the temperature sensing resistors is made thinner than laminated temperature sensor element body.

In the eighth aspect of the present invention, in a resistive temperature sensor according to the seventh aspect of the present invention, a lamination section made of the same conductive material and insulating body material as the temperature sensing section, the connection section, or the electrode section is formed surrounding the temperature sensing section at at least one of both ends of the temperature sensor element body in a lamination direction thereof to make the temperature sensing section thinner than the temperature sensor element body.

In the ninth aspect of the present invention, in a resistive temperature sensor according to the sixth aspect of the present invention, at least the temperature sensing section is covered with a protective film comprising at least one of alumina and silica.

In the tenth aspect of the present invention, in a resistive temperature sensor according to the second aspect of the present invention, the temperature sensing resistor comprises a main component (A) comprising 30 to 100% by volume of metal silicide, 70% by volume or less of alumina and 15% by volume or less of mullite each based on the total volume of the main component (A), wherein magnesia is added in an amount of 5% by weight or less and silica is added in an amount of 0.5% by weight or less each based on the total weight of the temperature sensing resistor; a conductive material of the electrode section or the connection section comprises a main component (B) comprising 50 to 100% by volume of metal silicide, 50% by volume or less of alumina, and 15% by volume or less of mullite each based on the total volume of the main component (B), wherein magnesia is added in an amount of 5% by weight or less based on the total weight of the conductive material of the electrode section or the connection section; and the insulating body comprises a main component (C) comprising 85% to 100% by volume of alumina and 15% by volume or less of mullite each based on the total volume of the main component (C), wherein magnesia is added in an amount of 0.5% by weight or less and silica is added in an amount of 0.5% by weight or less each based on the total weight of the insulating body.

In the eleventh aspect of the present invention, in a resistive temperature sensor according to the second aspect of the present invention, the temperature sensing resistor comprises a main component (D) comprising 30 to 100% by volume of metal silicide, 70% by volume or less of alumina, and 15% by volume or less of mullite each based on the total volume of the main component (D), wherein magnesia is added in an amount of 5% by weight or less and silica is added in an amount of 0.5% by weight or less each based on the total weight of the temperature sensing resistor; a conductive material of the electrode section or the connection section comprising a main component (E) comprising 50 to 100% by volume of metal silicide, 50% by volume or less of alumina, and 15% by volume or less of mullite each based on the total volume of the main component (E), wherein magnesia is added in an amount of 5% by weight or less based on the total weight of the conductive material of the electrode section or the connection section; at least one of the temperature sensing resistor, the electrode section and the connection section containing at least one of titanium boride and titanium carbide in an amount of 0.1 to 0.5% by weight based on the total weight of at least one of the material of the temperature sensing resistor, the electrode section and the connection section; and the insulating body comprising a main component (F) comprising 85 to 100% by volume of alumina and 15% by volume or less of mullite each based on the total volume of the main component (F), wherein magnesia is added in an amount of 5% by weight or less and silica is added in an amount of 0.5% by weight or less each based on the total weight of the insulating body.

In the twelfth aspect of the present invention, in a resistive temperature sensor according to the first aspect of the present invention, a conductive material comprising $MoSi_2$ and an insulating body comprising alumina are laminated alternatively to form a lamination structure, and at least a part of the lamination structure forms a resistance circuit.

In the thirteenth aspect of the present invention, a resistive temperature sensor according to the first aspect of the present invention has a temperature sensing section and a lead portion; wherein the temperature sensing section comprises 30% to 100% by volume of $MoSi_2$ based on the total volume of the temperature sensing section, and the balance being an insulating component (A) comprising alumina, 15% by weight or less of mullite and 5% by weight or less of MgO each based on the total weight of the insulating component (A); the lead portion comprises 50% to 100% by volume of $MoSi_2$ based on the total volume of the lead portion and the balance being an insulating component (B) comprising alumina, 15% by weight or less of mullite and 5% by weight or less of MgO each based on the total weight of the insulating component (B); and the insulating body comprising alimina, 15% by volume or less of mullite based on the total volume of the insulating body, 5% by weight or less of MgO and 0.5% by weight of $SiO_2$ each based on the total weight of the insulating body.

In the fourteenth aspect of the present invention, in a resistive temperature sensor according to the twelfth aspect of the present invention, a portion in the neighborhood of the temperature sensing section of at least one of outer top and bottom portions of a lamination structure containing the temperature sensing section is cut out so that a portion surrounding the temperature sensing section is thinner than a temperature sensor element body.

In the fifteenth aspect of the present invention, in a resistive temperature sensor according to the twelfth aspect of the present invention, at least one of outer top and bottom portions of a lamination structure containing the temperature sensing section is a lamination structure of the insulating body material and at least one layer of the same material as the lead section material or the temperature sensing section material.

In the sixteenth aspect of the present invention, in a resistive temperature sensor according to the twelfth aspect of the present invention, an outside of an element body of the resistive temperature sensor containing at least the temperature sensing section except for an electric connection portion to an outside of the lead portion is coated with at least one layer film comprising at least one of alumina and $SiO_2$.

In the seventeenth aspect of the present invention, in a resistive temperature sensor according to the first aspect of the present invention, the resistance circuit comprising the conductive material containing $MoSi_2$ is formed on the insulating body in a lamination structure of at least one layer, the resistance circuit has a temperature sensing section and a lead section, and if the resistance circuit has a lamination structure of a plurality of layers, the resistance circuit is connected by through-holes between the layers; and a portion surrounding the temperature sensing section is thinner than a temperature sensor element body, namely, at least one of outer top and bottom portions of a lamination structure containing the temperature sensing section is a lamination structure of at least one layer of the insulating body material and the same material as the lead section material or the temperature sensing section material or a portion in a neighborhood of the temperature sensing section of at least one of an outer top and bottom portions of the lamination structure containing the temperature sensing section is cut out so that a portion surrounding the temperature sensing section is thinner than a temperature sensing section.

In the eighteenth aspect of the present invention, a resistive temperature sensor according to the seventeen aspect of the present invention has a lamination structure: wherein the temperature sensing section comprising a main component (G) comprising 30% to 100% by volume of $MoSi_2$ based on the total volume of the main component (G) and the balance being an insulating component (C) comprising alumina, 15% by volume or less of mullite based on the total volume of the insulating component (C) and 5% by weight or less of MgO based on the total weight of the insulating component (C); the lead section comprising a main component (H) comprising 50% to 100% by volume of $MoSi_2$ based on the total volume of the main component (H) and the balance being an insulating component (D) comprising alumina, 15% by volume or less of mullite based on the total volume of the insulating component (D) and 5% by weight or less of MgO based on the total weight of the insulating component (D), and the insulating body comprising alumina, 15% by weight or less of mullite, 5% by weight or less of MgO and 0.5% by weight or less each based on the total weight of the insulating body.

In the nineteenth aspect of the present invention, a resistive temperature sensor according to the seventeen aspect of the present invention, at least one of outer top and bottom portions of a lamination structure containing the temperature sensing section is a lamination structure of the insulating body material and at least one layer of the same material as the lead section material and the temperature sensing section material.

In the twentieth aspect of the present invention, in a resistive temperature sensor according to the seventeenth aspect of the present invention, an outer periphery of a lamination structure containing the temperature sensing section is a lamination structure of the insulating body material and at least one layer of the same material as the lead section material or the temperature sensing section material.

In the twenty-first aspect of the present invention, in a resistive temperature sensor according to the seventeenth aspect of the present invention, an outside of an element body containing at least the temperature sensing section except for an electric connection portion to an outside of the lead portion is coated with at least one layer film comprising at least one of alumina and $SiO_2$.

In the twenty-second aspect of the present invention, a resistive temperature sensor according to the twelfth aspect of the present invention, the resistance circuit has a temperature sensing section and a lead section, and if the resistance circuit has a lamination structure of a plurality of layers, the resistance circuit is connected by through-holes between the layers; and wherein a portion surrounding the temperature sensing section is thinner than a temperature sensor element body, namely, at least one of outer top and bottom portions of a lamination structure containing the temperature sensing section is a lamination structure of at least one layer of the insulating body material and the same material as the lead section material or the temperature sensing section material or a portion in a neighborhood of the temperature sensing section of at least one of an outer top and bottom portions of the lamination structure containing the temperature sensing section is cut out so that a portion surrounding the temperature sensing section is thinner than a temperature sensing section.

In the twenty-third aspect of the present invention, a resistive temperature sensor according to the twenty-second aspect of the present invention has a lamination structure: wherein the temperature sensing section comprising a main component (G) comprising 30% to 100% by volume of $MoSi_2$ based on the total volume of the main component (G) and the balance being an insulating component (C) comprising alumina, 15% by volume or less of mullite based on the total volume of the insulating component (C) and 5% by weight or less of MgO based on the total weight of the insulating component (C); the lead section comprising a main component (H) comprising 50% to 100% by volume of $MoSi_2$ based on the total volume of the main component (H) and the balance being an insulating component (D) comprising alumina, 15% by volume or less of mullite based on the total volume of the insulating component (D) and 5% by weight or less of MgO based on the total weight of the insulating component (D); and the insulating body comprising alumina, 15% by weight or less of mullite, 5% by weight or less of MgO and 0.5% by weight or less each based on the total weight of the insulating body.

In the twenty-fourth aspect of the present invention, in a resistive temperature sensor according to the twenty-second aspect of the present invention, at least one of outer top and bottom portions of a lamination structure containing the temperature sensing section is a lamination structure of the insulating body material and at least one layer of the same material as the lead section material and the temperature sensing section material.

In the twenty-fifth aspect of the present invention, in a resistive temperature sensor according to the twenty-second aspect of the present invention, an outer periphery of a lamination structure containing the temperature sensing section is a lamination structure of the insulating body material and at least one layer of the same material as the lead section material or the temperature sensing section material.

In the twenty-sixth aspect of the present invention, in a resistive temperature sensor according to the twenty-second aspect of the present invention, an outside of an element body containing at least the temperature sensing section except for an electric connection portion to an outside of the lead portion is coated with at least one layer film comprising at least one of alumina and $SiO_2$.

In the twenty-seventh aspect of the present invention, a manufacturing method of a resistive temperature sensor, comprises the steps of: laminating an insulation body comprising alumina and a conductive material containing metal silicide having a resistance body to form a lamination; and burning the lamination to form a burned lamination having at least one layer to form a resistance circuit therein.

In the twenty-eighth aspect of the present invention, a manufacturing method according to the twenty-seventh aspect of the present invention, the conductive material and the insulation body are laminated alternatively, and a resistant circuit is formed in at least a part of the lamination.

In the twenty-ninth aspect of the present invention, a manufacturing method according to the twenty-seventh aspect of the present invention, a resistance circuit is formed on the insulation body.

In the thirtieth aspect of the present invention, a manufacturing method according to the twenty-seventh aspect of the present invention, further comprises the steps of: dispersing a material together with a solvent by a dispersion device so that particle diameter of the material is 1 $\mu$m or less after the dispersion; if a binder is not mixed at the dispersing step, mixing a larger amount of a solvent than final paint composition at the dispersion time; after the dispersing step or the mixing step, removing an excessive solvent to provide a paint having predetermined paint composition; preparing sheets which are coated with the paint and dried; and laminating thus prepared sheets in sequence to form the lamination.

In the thirty-first aspect of the present invention, a manufacturing method according to the twenty-seventh aspect of the present invention, further comprises the steps of: in order to form a layer formed of at least two materials of layers in the laminate, coating each sheet with a single material and drying; making cuts in the sheet to peel an unnecessary portion to prepare the sheet for each material; and laminating thus prepared sheets to form the laminate.

In the thirty-second aspect of the present invention, in a manufacturing method according to the thirty-first aspect of the present invention, wherein, in each layer, the remaining portion of another sheet made of a different material making up a part of the same layer is embedded in the peeled portion of the sheet to form each layer so that thus prepared layers are laminated in sequence to form the lamination.

In the thirty-third aspect of the present invention, a manufacturing method according to the twenty-seventh aspect of the present invention, further comprises: in order to form a layer formed of at least two materials of layers in the laminate, coating the sheet with one material and drying; making cuts in the sheet to peel an unnecessary portion; coating the unnecessary portion of the sheet with the other material and drying to form the sheet formed of at least two materials; and laminating thus prepared sheets to form the laminate.

In the thirty-fourth aspect of the present invention, in a manufacturing method according to the twenty-seventh aspect of the present invention, sheets each formed with the resistance circuit on the insulating body by printing or transferring are laminated in order to form the laminate.

In the thirty-fifth aspect of the present invention, in a manufacturing method according to the twenty-seventh aspect of the present invention, an element body of the resistive temperature sensor including the laminate is burned in one of the following conditions: 1) burning at a temperature in the range of 1200° C. to 1800° C.; 2) burning at a temperature in the range of 1200° C. to 1800° C. and under a pressure of 0.5 Ton/cm$^2$ or more; and 3) burning at a temperature in the range of 1200° C. to 1800° C., and thereafter, burning at a temperature in the range of 1200° C. to 1800° C. under a pressure of 1000 atm. or more.

In the thirty-sixth aspect of the present invention, in a manufacturing method according to the thirty-fifth aspect of the present invention, the burning process is performed in one of the following conditions: 1) in an argon gas atmosphere; and 2) in an atmosphere under a vacuum degree of 50 Torr in at least one of a part of temperature raising process and stabilization and in an argon atmosphere in the remaining burning process.

In the thirty-seventh aspect of the present invention, in a manufacturing method according to the twenty-seventh aspect of the present invention, after burning the lamination, the laminate is subjected to surface oxidation treatment at a temperature of 500° C. or more to form an element body to form an oxide film on a surface thereof.

In the thirty-eighth aspect of the present invention, in a manufacturing method according to the twenty-seventh aspect of the present invention, at least one layer film comprising alumina having a particle diameter of 20 μm or less or comprising $SiO_2$ is formed on a surface of the lamination by a CVD method or by depositing slurry, and thereafter, the at least one layer film is dried and heat-treated to form an element body.

In the thirty-ninth aspect of the present invention, in a manufacturing method according to the thirty-eighth aspect of the present invention, after forming the at least one film layer on the surface of the lamination, the surface of the lamination is subjected to surface oxidation treatment at a temperature of 500° C. or more to form the element body.

In the fortieth aspect of the present invention, in a manufacturing method according to the twenty-seventh aspect of the present invention, after forming a nickel plating film layer on a joint part to a lead section, the lead section is joined to the joint part by sliver brazing.

In the forty-first aspect of the present invention, in a manufacturing method according to the twenty-seventh aspect of the present invention, wherein a join part to a lead section is joined to the lead section by welding.

In the forty-second aspect of the present invention, in a manufacturing method according to the fortieth aspect of the present invention, a lead section has a conductor pattern burned on a ceramic substrate.

In the forty-third aspect of the present invention, in a manufacturing method according to the forty-first aspect of the present invention, a lead section has a conductor pattern burned on a ceramic substrate.

In the forty-fourth aspect of the present invention, in a manufacturing method according to the twenty seventh aspect of the present invention, an element body of the resistive temperature sensor element including the lamination is joined to a lead section, the element body is installed in a heat-resistant ceramic tube or a ceramic base, and after a gap is filled with ceramic cement, then drying and heat treatment are executed to harden the ceramic cement.

In the forty-fifth aspect of the present invention, in a manufacturing method according the twenty-seventh aspect of the present invention, the metal silicide is $MoSi_2$.

According to the present invention, metal silicide having the same degree of small heat expansion coefficient as alumina of an insulator is used as a temperature sensing resistor and a temperature sensor is formed of a laminate provided by laminating them alternately, thereby providing an element body having an excellent thermal shock characteristic with little loss of the thermal shock characteristic of conductor material consisting essentially of metal silicide such as molybdenum silicide having a thermal shock characteristic superior to that of insulating ceramic material consisting essentially of alumina.

Since a lamination structure consisting essentially of closely packed ceramic excellent in thermal shock characteristic is adopted, a sufficient mechanical strength is provided if the heat capacity of the temperature sensing section is small. Therefore, the heat capacity of the temperature sensing section can be lessened and a temperature sensor responding at high speed can be provided.

The insulating ceramic material consisting essentially of alumina has sufficient heat resistance and environmental resistance. The conductor material consisting essentially of metal silicide such as molybdenum silicide undergoes heat treatment in air, whereby a silica film is formed on the surface. The conductor material consisting essentially of metal silicide such as molybdenum silicide formed with the silica film has sufficient heat resistance and environmental resistance.

Thus, the temperature sensing section of the temperature sensor element body according to the invention need not be coated on a surface with material to provide heat resistance and environmental resistance. This contributes to further miniaturization and response speed enhancement.

Molybdenum silicide ($MoSi_2$) having the same degree of heat expansion coefficient as an insulator consisting essentially of alumina is the most suitable for metal silicide used as the temperature sensing resistor material. An insulator of alumina, mullite, etc., is mixed with the temperature sensing resistor, whereby a resistance value can be adjusted.

In the invention, metal silicides are used for various materials; electrical, physical, and chemical characteristics vary with the metal forming the metal silicide. In application of temperature detection in a high-temperature atmosphere, metal suicides excellent in heat resistance and environmental resistance are preferred. When the highest operating temperature is near 1300° C. as in the invention, metal suicides such as molybdenum silicide, tungsten silicide ($WSi_2$), titanium silicide ($TiSi_2$), and tantalum silicide ($TaSi_2$) are appropriate, among which molybdenum silicide is preferred from total determination of material cost, the degree of difficulty in manufacturing, etc. However, if any other metal silicide such as tungsten silicide is used, a resistive temperature sensor sufficiently enduring high-temperature use can be provided.

In application in a comparatively low temperature range in which the highest operating temperature is near 1000° C., most metal silicides in addition to the above-mentioned metal silicides can be used. Particularly, metal silicides of group IVA, VA, VIA, and VIII elements in the periodic law are available. Above all, metal silicides such as chromium silicide ($CrSi_2$), iron silicide ($FeSi_2$), and cobalt silicide ($CoSi_2$) are desirable materials from total determination of material cost and the degree of difficulty in manufacturing.

The metal silicides such as chromium silicide, iron silicide, and cobalt silicide are inferior to metal silicides such as molybdenum silicide and tungsten silicide in heat resistance and oxidation resistance. In the application in a comparatively low temperature range in which the highest operating temperature is near 1000° C., however, if more inexpensive metal silicides such as chromium silicide, iron silicide, and cobalt silicide are used in place of expensive metal suicides such as molybdenum silicide and tungsten silicide, resistive temperature sensors that can sufficiently endure use can be provided.

The insulating resistance value required for the material having an insulating function is preferably 100 MΩ or more, at least 1 MΩ or more on practical use. The insulating material consisting essentially of alumina in the invention has resistivity of about 10 MΩcm at high temperatures. Thus, the temperature sensing section dimensions of a representative layer in the invention (1 mm wide×6 mm long×20 μm thick), the interlayer insulating resistance becomes $3\times10^{12}\Omega$; the required insulating function can be demonstrated sufficiently.

If the resistance value ratio between the temperature sensing section and the insulator is approximately 1000, the leakage current value becomes 1/1000 and temperatures can be measured with practical accuracy. If the resistance value of the temperature sensing section is several ten KΩ or more, measurement current is minute at practical measurement voltage and measurement accuracy is hard to maintain. Thus, preferably the resistance value of the temperature sensing section is several KΩ or less.

To present a resistance value of 1 KΩ in the temperature sensing section dimensions of another representative layer that can be adopted in the invention (0.7 mm wide×12 mm long×20 μm thick), the resistor becomes resistivity of about 0.1 Ωcm. This resistivity is provided by setting composition of molybdenum silicide, etc., of the resistor material to approximately 30% or more by volume. Therefore, if the composition of molybdenum silicide, etc., is approximately 30% or more by volume, a resistance circuit having a resistance value of several ten KΩ or less can be formed and a resistor satisfying the required resistance value can be provided. To provide a predetermined resistance value, an insulator of alumina, mullite, etc., can be mixed with resistance material for adjusting the resistance value.

As with the insulating section, if the resistance value ratio between the electrode section and the connection section and the temperature sensing section is approximately 1000, a voltage drop becomes 1/1000, thus a circuit having a resistance value that can be measured with practical accuracy, for example, several Ω or less, is formed, whereby the electrode section and the connection section of the required resistance value can be formed. To present a resistance value of 1Ω in the temperature sensing section dimensions of the representative layer that can be adopted in the invention (1 mm wide×6 mm long×20 μm thick), the resistivity of the conductor of the connection section or the electrode section becomes about $3\times10^{-4}$ Ωcm. This resistivity is provided by setting composition of molybdenum silicide to approximately 50% of more by volume. Therefore, if the composition of molybdenum silicide is approximately 50% or more by volume, a circuit having a resistance value of several Ω or less can be formed and the electrode section and the connection section satisfying the required resistance value in the invention can be provided.

The electrode section and the connection section may be made of the same material as or different material from the resistor of the temperature sensing section; preferably, the electrode section and the connection section have a resistance value lower than the temperature sensing section. To use the same material as the temperature sensing section for the electrode section and the connection section, preferably the electrode section and the connection section have a cross-sectional area made larger than the temperature sensing section for providing a low resistance value.

The temperature sensor element body of the invention consists essentially of metal silicide of molybdenum silicide, etc., and alumina. It is necessary to control sintering reaction at the sintering time to form a closely packed sintered body in a desirable state. For example, in behavior when molybdenum silicide is sintered, molybdenum is evaporated because of decomposition, another chemical component, silica, remains, and the resistivity value of the resistor material or conductor Material varies depending on the molybdenum evaporation amount. Therefore, strict management is required for controlling the resistance value.

To control the resistivity value of the resistor material or the connection section or electrode section conductor material, an insulator consisting essentially of alumina is mixed. The remaining silica reacts with alumina to produce a mullite-family compound. If the conductor material does not contain mullite, no problem arises if process conditions are strictly managed to form the temperature sensor of the invention. However, if mullite is contained, decomposition of molybdenum silicide is suppressed and the resistivity value of the conductor material can be controlled more easily. The resistor material or the conductor material may be a material containing 100% metal silicide by volume as the main constituent; preferably, it contains 2% or more alumina by volume in the main constituent to enhance the sinter strength. The reason why 0.5% or less silica by weight is added to the conductor material is that adhesion to the insulator material is provided as described later.

If magnesia is contained, a cordulight-family compound is produced and as with mullite; decomposition of molybdenum silicide is suppressed and the resistivity value of the resistor material or the conductor material can be controlled more easily. However, if mullite exceeds about 15% by weight and magnesia exceeds about 5% by weight, sintering of the resistor material or the conductor material is hindered and it becomes difficult to provide a closely packed sintered body. Thus, it is necessary to suppress the mullite and magnesia contents to about 15% or less by volume and about 5% or less by volume respectively. In this case, mullite and magnesia may coexist or may exist separately. If mullite or magnesia need not be added for resistance value adjustment, it need not be added. However, to produce the effect of suppressing decomposition of molybdenum silicide, preferably 3.0% or more mullite by weight and 0.1% or more magnesia by weight are added where the whole constituents are 100% by weight.

A requirement when the insulator material and conductor material are sintered is strong adhesion. Therefore, preferably a similar material to the insulator material contained in the conductor material is contained. Then, the insulator material consists essentially of 85%–100% alumina by volume and 15% or less mullite by volume to which 0.5% or less magnesia by weight and 0.5% or less silica by weight are added so that the total reaches 100% by weight containing the main components. A preferred element body can be formed by adding 0.05% or more silica by weight to the conductor material and the insulator material. However, if silica is added to the conductor material or the insulator material exceeding about 0.5% by weight, sintering is hindered and close packing becomes difficult to accomplish. Preferably, 3.0% or more mullite by weight and 0.1% or more magnesia by weight are added to the insulator material wherein all constituents are 100% by weight for providing strong adhesion to the conductor material.

Metal suicides of molybdenum silicide, etc., are material hard to sinter and are sintered by means of hot press sintering or HIP sintering as a sintering condition, as described later. Both or either of the methods is used for sintering, whereby sintering can be promoted and a more closely packed sintered body can be formed.

Preferably, for the total of the metal silicide of resistor material or conductor material and the insulator consisting essentially of alumina, at least one of titanium carbide and titanium boride is contained and the content total of titanium carbide and titanium boride is in the range of 0.1%–5.5% by weight. As described later, if the content total of titanium carbide and titanium boride is less than 0.1% by weight, the effect of promoting sintering is poor; if the content total exceeds 5.5% by weight, the resistance value change rate of the resistor material or the conductor material in response to temperature lowers in a high-temperature area, the resistivity falls below 5, and the thermal expansion coefficient difference from the insulator becomes large, degrading the thermal shock characteristic.

BRIEF DESCRIPTION OF THE DRAWINGS

In the accompanying drawings:

FIGS. 4A to 4D are perspective views to show the relationship between thin film and resistor patterns used with the first example of the invention;

FIGS. 6A to 6D are perspective views to show a part of an assembling process of pattern B in FIG. 3;

FIGS. 7A and 7B are side views to show the remaining part of the assembling process of pattern B in FIG. 3;

FIGS. 46A to 46C are schematic structure diagrams, a lamination structure diagram, and new thick film patterns of a resistive temperature sensor element body of a ninth example of the invention;

FIG. 54 is patterns of thick films used with the resistive temperature sensor element of the twelfth example of the invention;

FIGS. 57A to 57G are illustrations to show a thick film layer formation method;

DETAILED DESCRIPTION OF THE INVENTION

Figure 1:
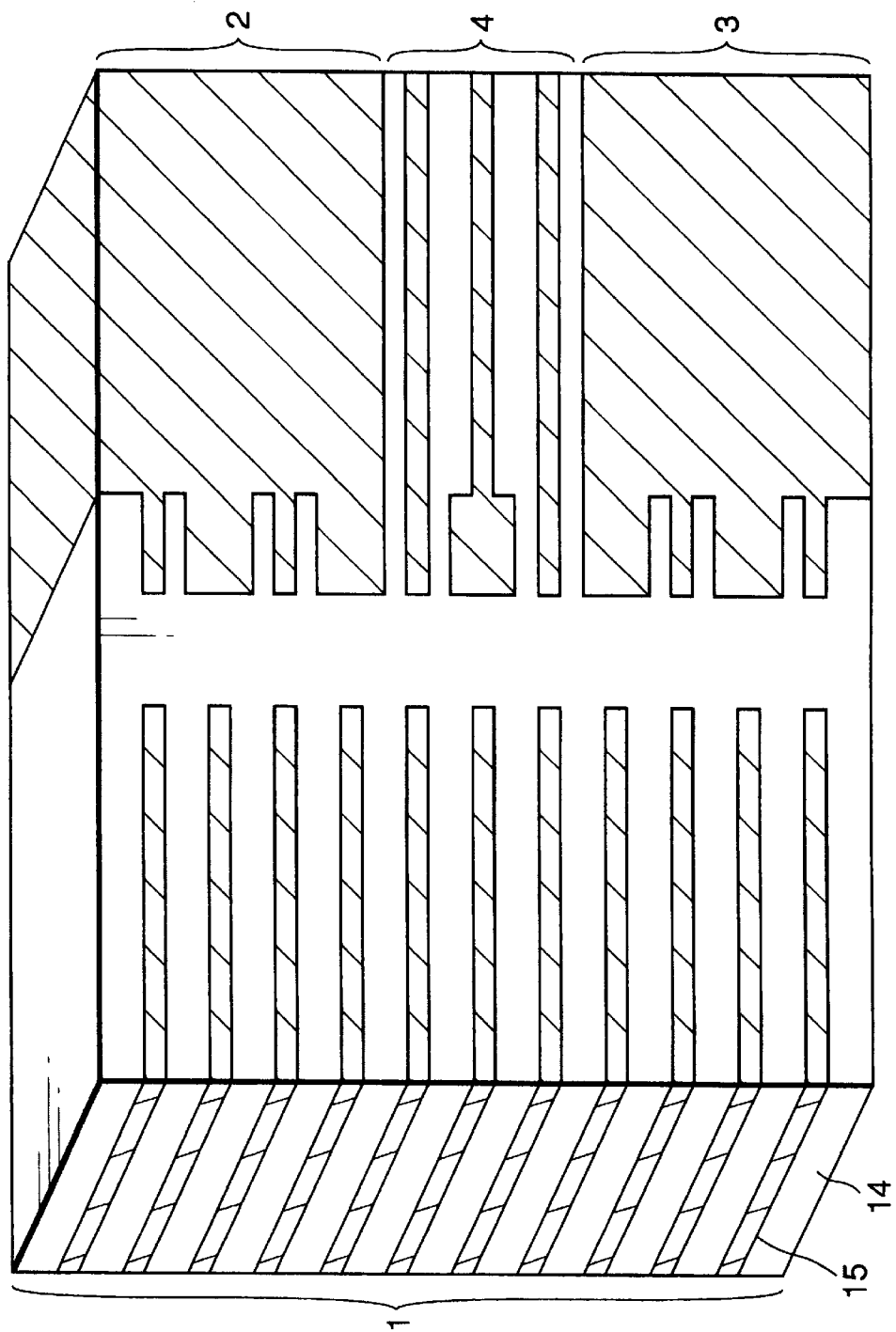
FIG. 1 is a perspective view to show the lamination structure of a first example of a resistive temperature sensor according to the invention.

Detailed description of the present invention will be described as follows.

Manufacturing Method

A manufacturing method of the temperature sensor of the invention will be discussed.

(a) Manufacturing of Material

The material properties required when an element body of a lamination structure is manufactured are adequate dry property, proper viscosity, and no cracks or uneven drying, and smooth surface of thick film at the thick film formation time. To realize the desirable material properties, the paint concentration and the binder type and addition amount are selected appropriately in response to the material powder characteristics.

If an element body needs to be formed by sintering reaction in a sintering process after a laminate is formed, preferably an optimum particle size distribution and dispersion degree are realized at the material paint manufacturing time.

Generally, to manufacture material hard to sinter like the metal silicide used in the invention, the material is crushed sufficiently finely and the activity is raised at the sintering time, thereby enabling sintering at lower sintering temperature. However, the material manufacturing conditions for realizing the optimum particle size distribution and dispersion degree vary in many cases, and pretreatment needs to be executed for material having a proper powder characteristic before paint is manufactured.

If material like the metal silicide used in the invention is crushed finely to raise the activity, it is easily oxidized in air. In many cases, generally, the solvent concentration in pretreatment manufacturing conditions is higher than that in paint manufacturing conditions, namely, the slurry concentration is low. Therefore, in the pretreatment process, raw materials making up paint need to be blended so as to become predetermined paint composition after dry after crush.

For material like the metal silicide used in the invention, care must be taken for handling the material after the pretreatment to ensure that the material is handled in a non-oxidation atmosphere such as vacuum or nitrogen gas to prevent oxidation or that when a solvent remains, the material is handled so as to prevent heat generation of oxidation from causing a fire. In the following manufacturing method, the problems can be solved and the process can be shortened:

After material is crushed under the optimum crush condition, a part of solvent is removed by a concentrator such as a vacuum degassing device or a filter press, then insufficient paint components such as a binder and a plasticizer are blended and optimum paint is manufactured. According to the method, finely crushed material powder having a high activity coefficient is handled as solvent slurry and oxidation in air, a fire caused by oxidation, or the like can be prevented easily.

A drying step and an oxidation prevention storage step can be omitted. Slurry viscosity in the crushing step can be made lower than paint viscosity. Thus, when the material is taken out from a dispersion device such as a bowl mill or a media mill and is separated from media, it can be collected in good yield.

(b) Manufacturing of Laminate

The laminate of the element of the invention has a structure wherein two or more material thick films are laminated in the same layer. The thick film layers making up the laminate partially different in characteristic are formed as the same thick film layer. Preferably, the main layers of the layers making up the laminate of the element of the invention use thick films formed by a sheet method, because variations in the thickness dimensions of the whole film are scarce.

Each of the thick film layers making up the laminate can be formed by applying material paint having a predetermined conductive or insulative characteristic onto a film such as a polyethylene film and drying, removing, for example, an unnecessary portion of one conductor (insulator) thick film, and embedding another insulator (conductor) material thick film layer in the removed portion.

Thus, as the method of forming the conductor and insulator in the same layer, the sheet of size of a lamination board may be cut after the unnecessary portion may be removed or after the sheet is cut, the unnecessary portion may be removed. The conductor and insulator can also be formed in the same layer by applying material paint having a predetermined characteristic onto a polyethylene film, etc., and drying and cutting the sheet to a proper size, then embedding.

Thick film layer may be formed by again setting the polyethylene film sheet on a coater after the unnecessary portion is removed before cut and applying another material to the removed portion and drying.

Further, when thickness dimension accuracy is not required, thick film layer can also be formed of another material in the removed portion by screen print, but the screen print is inferior to the sheet method in the thickness dimension accuracy.

Alternatively, material paint having a predetermined characteristic is applied onto a polyethylene film extending off the removed portion and dried, whereby a thick film layer is formed and the unnecessary paint portion extended off the removed portion may be removed for forming a thick film layer of predetermined dimensions.

To form the resistance circuit of the temperature sensing section by screen print, print may be executed at any stage of printed sheet, namely, before or after removal or after embedding. However, in the element structure of the invention, a part of the conductor laminate is made to function as the connection section of the resistance circuit. Thus, a print pattern needs to be printed on conductor thick film for connection to the conductor thick film; it is desirable to print after embedding.

If the print step is built in the lamination process, the system becomes complicated and the print face height position must be adjusted for each layer, thus it is desirable to laminate after printing on embedded sheet for each layer.

Since print is executed on each layer before lamination in the print step for each layer, the lamination and print systems can be separated and the print system structure is simplified.

(c) Sintering Conditions

Since the laminate of the element of the invention contains metal silicide hard to sinter as a component, it needs to be sintered preferably at temperature of 1400° C. or more, at least at temperature of 1200° C. or more. Since me silicide is easily oxidized in air in a low temperature range of about 200° C., it needs to be sintered in a non-oxidation atmosphere. Preferably, the non-oxidation atmosphere is an argon atmosphere. A nitrogen atmosphere tends to nitrify metal silicide and changes the temperature characteristic of resistance as a result; it is not preferred.

Metal silicide is easily oxidized in air. Oxidation of metal silicide lowers stability of performance of the temperature sensor element of the invention under actual use conditions thereof, and needs to be suppressed. Thus, it is desirable to raise the density of the sintered element body as much as possible. The density of the sintered element body can be raised by setting a part of the temperature raising process or a part of the temperature raising process and a part of the stabilization section to the degree of vacuum 50 Torr or less, preferably 10 Torr or less. The effect of producing a vacuum in a part of the sintering process is as follows: When sintering develops and openings of the crystalline structure become closed holes associated with close packing, when the sintering atmosphere is a high degree of vacuum, the atmosphere in the closed holes is also a high degree of vacuum. Then, as the close packing furthermore develops, the closed holes disappear and high density is accomplished.

If all the sintering process is executed in a high degree of vacuum condition, silica is evaporated remarkably; it is not preferred. Preferably, the sintering process is executed under pressure because close packing is promoted. The sintering under pressure may be so-called hot press sintering or HIP sintering. However, since the sintering under pressure is at higher cost than normal-pressure sintering, the normal-pressure sintering is executed if the intended close packing can be accomplished by the normal-pressure sintering.

Sintering at temperatures exceeding 1800° C. is near to the melting point of the ceramic substrate consisting essentially of alumina. Specifically, a part of the ceramic substrate is melted or evaporated and disappears or reacts with metal silicide, making it difficult to form an intended structure; it is not preferred.

EXAMPLES

First Example

Figure 2:
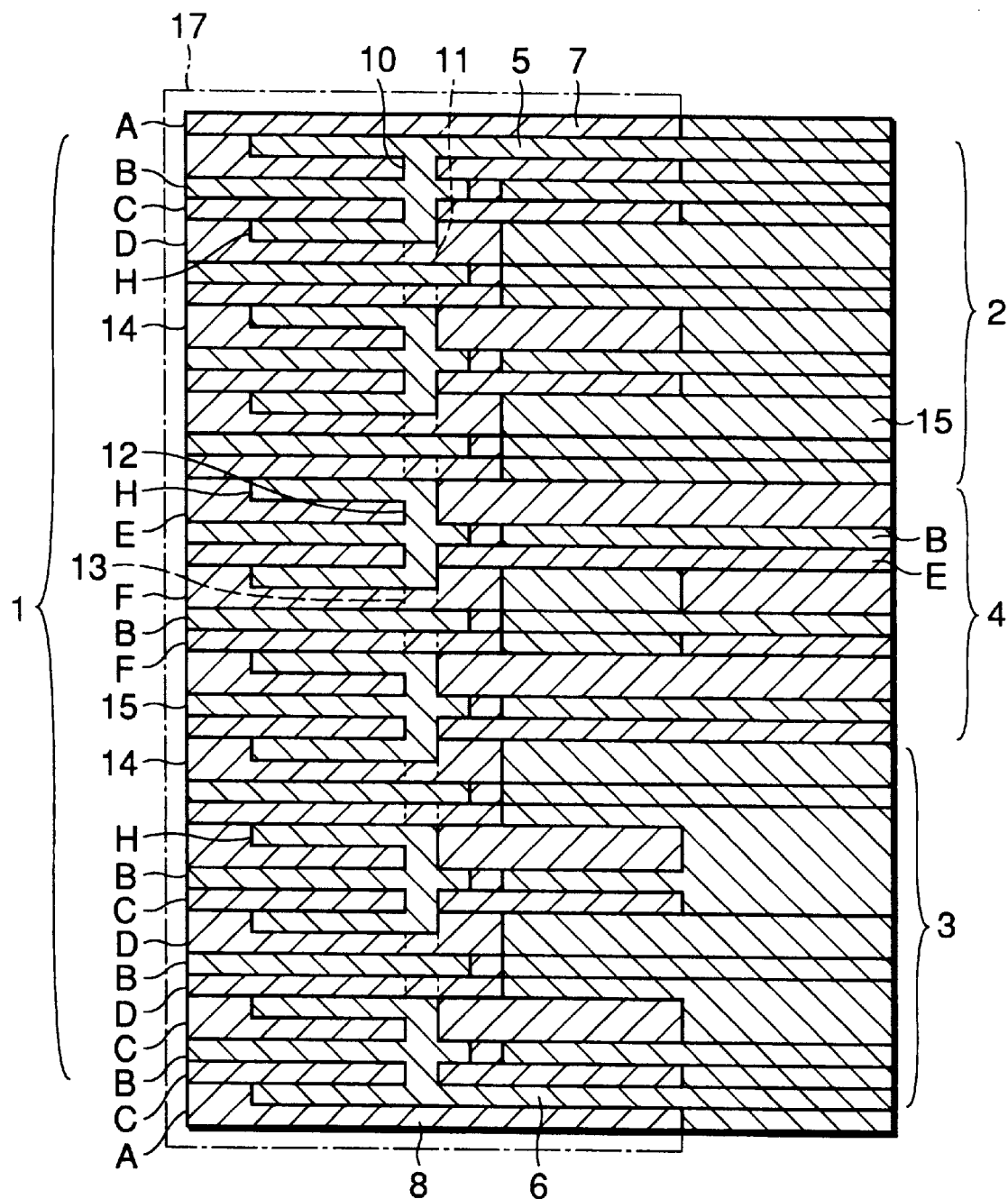
FIG. 2 is a sectional view to show the lamination structure of the first example.

FIG. 1 is a perspective view to show a lamination structure of an element body of a first example of a resistive temperature sensor according to the invention. FIG. 2 is a sectional view to show the lamination structure. FIG. 3 shows thick film patterns used for laminate formation; resistor pattern G or H shown in FIGS. 4A to 4D is formed on patterns C–F of A–F. As shown in FIG. 2, the resistive temperature sensor element body is provided by laminating a total of 35 layers like patterns A-C-B-C-D- . . . D-E-B-E-F-E- . . . C-B-C-A shown in FIG. 3. A temperature sensing resistance circuit is made up of temperature sensing resistance sections (each pattern G or H) formed on the patterns C, D, F and conductors 15 of the patterns B. The patterns B each having the conductive 15 as the main body are each placed between the resistors G, H, thereby making up a temperature sensing section 1.0073.

Figure 5:
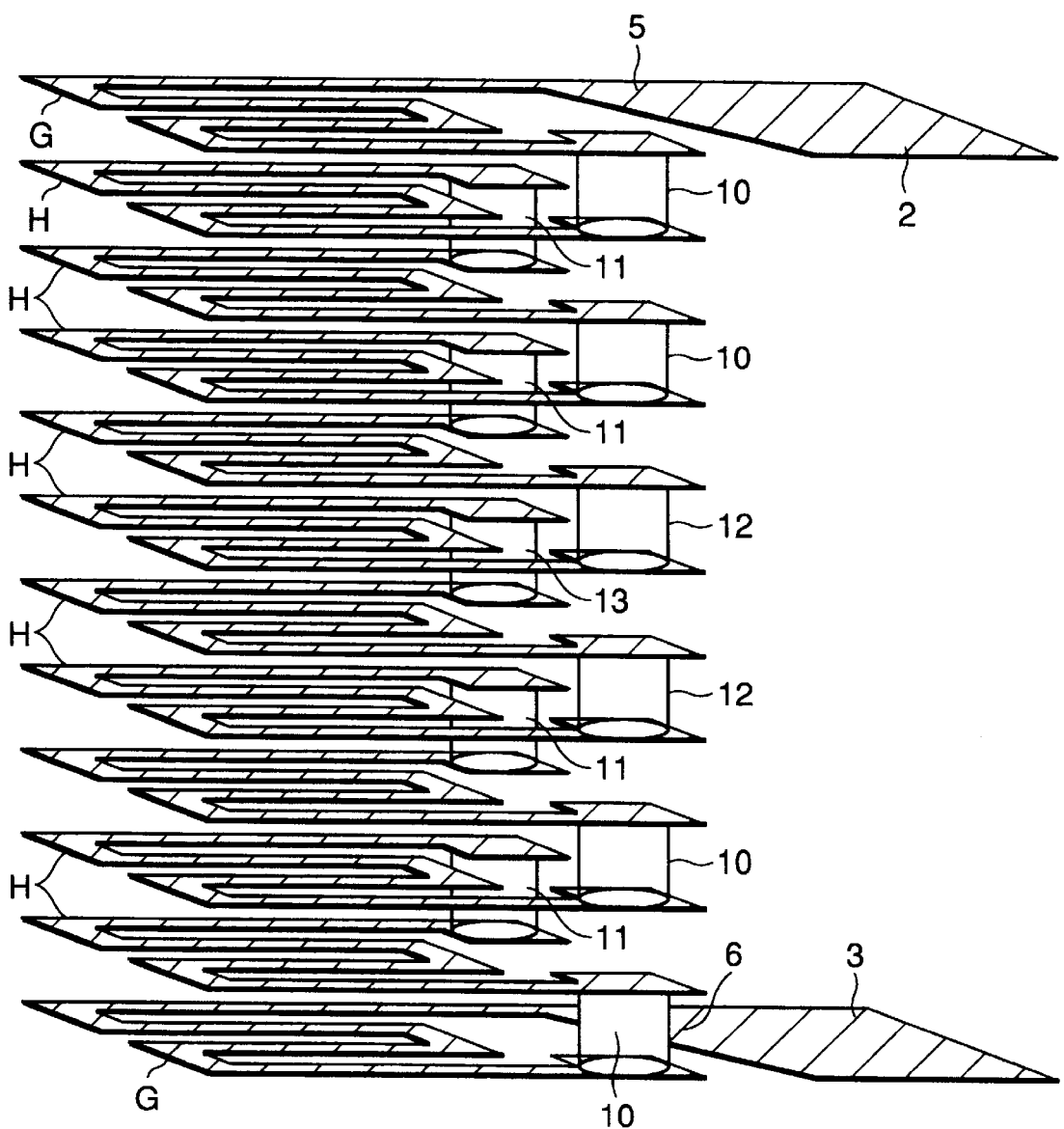
FIG. 5 is a perspective view of a resistor circuit of the first example of the invention.

As shown in FIGS. 1 and 2, the resistive temperature sensor having such a laminated structure is formed with electrode sections 2 and 3 including conductive material layers laminated on each other with an insulating section 4 having one or more insulating material layers laminated on each other between. Both ends of the temperature sensing section 1 are connected to the electrode sections 2 and 3 in upper and lower layer portions via connection parts 5 and 6. The temperature sensing section 1 is provided on upper and lower faces with protective layers 7 and 8. FIG. 5 is a perspective view to show the connection relationship.

Next, the patterns A–F will be discussed in more detail. Insulators 14 of the thick film patterns C–F shown in FIGS. 3 are formed with through holes 10–13 and a conductor made of the same material as the resistor of the pattern G, H, the conductor of the connection part 5, 6 or the conductor of the electrode section 2, 3 is embedded in each of the through holes 10–13.

Of each thick film shown in FIG. 3, the insulator 14 indicated by a white background has basic composition of 90% alumina by volume and 10% mullite by volume to which 3% magnesia by weight and 0.3% silica by weight are added. The conductor 15 indicated by dots has basic composition of 90% molybdenum silicide by volume and 10% of alumina by volume. The insulator 14 and the conductor 15 are combined in a rectangle.

As shown in FIGS. 4A to 4D, the resistor pattern indicated by G or H is formed on the patterns C–E. The connection part 5 or 6 for connecting the resistor pattern G to the conductors 15 making up the electrode section 2, 3 is provided on the thick film of the pattern C at both ends of the lamination direction. One end of the resistor G or both ends of the resistor H are connected to the conductor filled in one of the through holes 10–13 made in the thick films.

The thick films are laminated on each other with conductors of the pattern B, etc., placed via an insulator between the patterns G, H and as shown in FIG. 5, the patterns G and H are connected by the through holes 10–13 in series for making up the resistive temperature sensor element body. Each of the conductor 15 layers making up the electrode section 2, 3 and the insulator 14 layer consisting essentially of alumina are formed side by side as the same layer by thick film lamination; the electrode section 2, 3 substantially having a plurality of conductive layers laminated in one piece without intervention of insulators.

Next, a manufacturing process of such a resistive temperature sensor will be discussed.

(1) Manufacturing of Material

Temperature sensing resistance materials are provided having composition of 40% molybdenum silicide of 2 $\mu$m in average particle diameter by volume, 60% alumina of 0.4 $\mu$m in average particle diameter by volume, and no titanium boride, composition of 40% molybdenum silicide of 2 $\mu$m in average particle diameter by volume, 60% alumina of 0.4 $\mu$m in average particle diameter by volume, and 1% titanium boride of 1 $\mu$m in average particle diameter by volume, composition of 40% molybdenum silicide of 2 $\mu$m in average particle diameter by volume, 60% alumina of 0.4 $\mu$m in average particle diameter by volume, and 2% titanium boride of 1 $\mu$m in average particle diameter by weight, and composition of 40% molybdenum silicide of 2 $\mu$m in average particle diameter by volume, 60% alumina 0.4 $\mu$m in average particle diameter by volume, and 3% titanium boride 1 $\mu$m in average particle diameter by weight. The materials are entered in a ceramic pot made of alumina with toluene as a solvent, and are dispersed in an alumina bowl as a dispersion medium for 15 hours. After the dispersion, a toluene solution of an ethyl cellulose resin is added as a binder and they are mixed by a stirrer, thereby providing four types of resistor paint different in titanium boride content.

Print connection part materials are provided having composition of 90% molybdenum silicide 2 $\mu$m in average particle diameter by volume, 10% alumina 0.4 $\mu$m in average particle diameter by volume, and no titanium boride, composition of 90% molybdenum silicide 2 $\mu$m in average particle diameter by volume, 10% alumina 0.4 $\mu$m in average particle diameter by volume, and 1% titanium boride 1 $\mu$m in average particle diameter by weight, composition of 90% molybdenum silicide 2 $\mu$m in average particle diameter by volume, 10% alumina 0.4 $\mu$m in average particle diameter by volume, and 2% titanium boride 1 $\mu$m in average particle diameter by weight, and composition of 90% molybdenum silicide 2 $\mu$m in average particle diameter by volume, 10% alumina 0.4 $\mu$m in average particle diameter by volume, and 3% titanium boride 1 $\mu$m in average particle diameter by weight. The materials are entered in a ceramic pot made of alumina with toluene as a solvent, and are dispersed in an alumina bowl as a dispersion medium for 15 hours. After the dispersion, a toluene solution of an ethyl cellulose resin is added as a binder and they are mixed by a stirrer, thereby providing four types of conductor paint different in titanium boride content.

Materials of the conductors 15 of the thick films are provided having composition of 90% molybdenum silicide 2 $\mu$m in average particle diameter by volume, 10% alumina 0.4 $\mu$m in average particle diameter by volume, and no titanium boride, composition of 90% molybdenum silicide 2 $\mu$m in average particle diameter by volume, 10% alumina 0.4 $\mu$m in average particle diameter by volume, and 1% titanium boride 1 $\mu$m in average particle diameter by weight, composition of 90% molybdenum silicide 2 $\mu$m in average particle diameter by volume, 10% alumina 0.4 $\mu$m in average particle diameter by volume, and 2% titanium boride 1 $\mu$m in average particle diameter by weight, and composition of 90% molybdenum silicide 2 $\mu$m in average particle diameter by volume, 10% alumina 0.4 $\mu$m in average particle diameter by volume, and 3% titanium boride 1 $\mu$m in average particle diameter by weight. A methacrylate resin is used as a binder, toluene and ethanol are used as solvents, and n-butyl phthalyl butyl glycolate (BPBG) is used as a plasticizer. The materials are entered in a ceramic pot made of alumina and are dispersed in an alumina bowl as a dispersion medium for 15 hours, thereby providing four types of conductor paint different in titanium boride content.

Insulator 14 material is provided having basic composition of 90% alumina 0.4 $\mu$m in average particle diameter by volume and 10% mullite 0.4 $\mu$m in average particle diameter by volume to which 0.3% magnesia 0.4 $\mu$m in average particle diameter by weight and 0.3% silica 0.4 $\mu$m in average particle diameter by weight are added. As with the thick film conductor materials, a methacrylate resin is used as a binder, toluene and ethanol are used as solvents, and BPBG is used as a plasticizer. The materials are entered in a ceramic pot made of alumina and are dispersed in an alumina bowl as a dispersion medium for 15 hours, thereby providing insulator paint.

(2) Manufacturing of Sheets

The doctor blade height is adjusted so that the thickness after drying the thick film conductor paint and insulator paint manufactured in the process in (1) becomes 35 $\mu$m, and application film of each of the thick film conductor paint and insulator paint is formed 80 mm in width on a polyethylene film by a sheet coater, providing a conductor sheet and an insulator sheet. Each of the conductor sheet and the insulator sheet is cut 100 mm in length to the stack dimension when a laminate is manufactured.

(3) Manufacturing of Thick Films

Each of the thick films making up the temperature sensor consists of the insulator 14 and the conductor 15 shown in FIG. 3. Formation of the thick film of the pattern B shown in FIG. 3 is taken as an example for describing a manufacturing method of thick films used in the invention with reference to FIGS. 6 and 7. Shown in FIG. 6A is a conductor sheet manufactured by the sheet manufacturing process in (2); a conductor thick film 22 is applied and formed on a polyethylene film 21.

Cuts 23 and 24 indicated by dashed lines are made in the conductor thick film 22. Conductor thick films 25 and 26 are left and the conductor thick film therebetween is removed along the cuts 23 and 24, thereby providing a material shown in FIG. 6B.

On the other hand, shown in FIG. 6C is an insulator sheet provided by executing the sheet manufacturing process in (2) above; an insulator thick film 28 is applied and formed on a polyethylene film 27. Cuts 29 and 30 indicated by dashed lines are made in the insulator thick film 28. An insulator thick film 31 is left and the insulator thick films on both sides of the insulator thick film 31 are removed along the cuts 29 and 30, thereby providing a material shown in FIG. 6D.

Figure 3A:
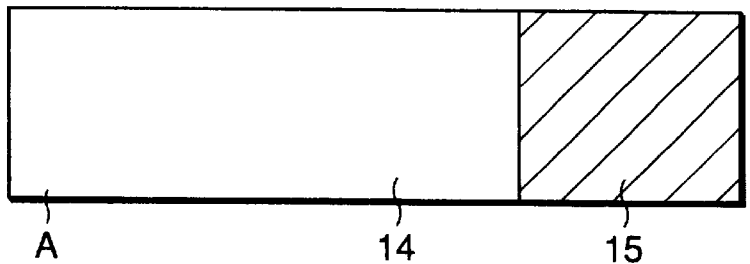
FIGS. 3A to 3F are patterns of thick films used with the first example of the invention.
Figure 3B:
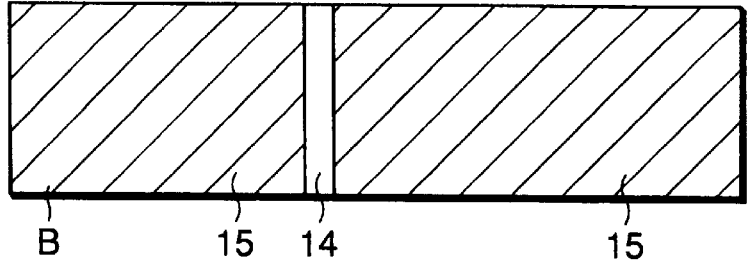
Figure 3C:
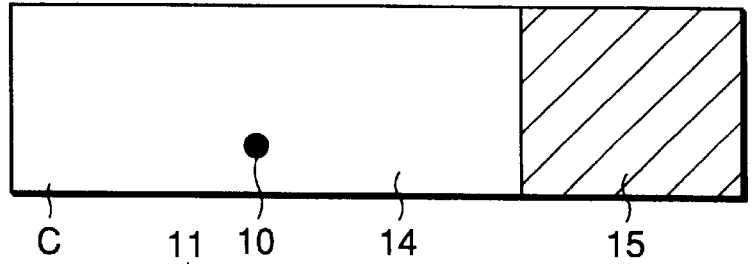
Figure 3D:
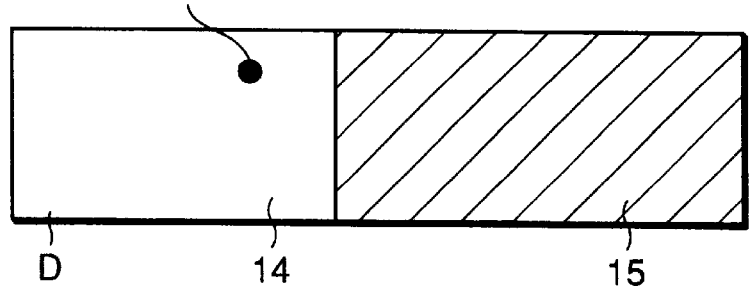
Figure 3E:
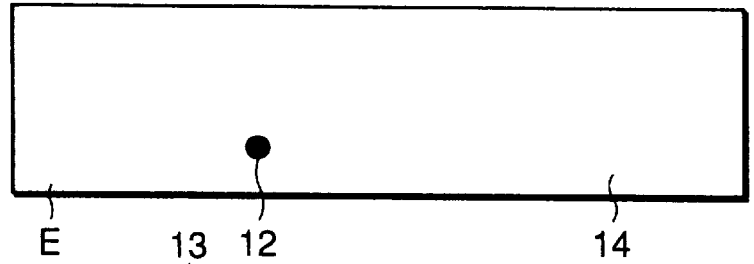
Figure 3F:
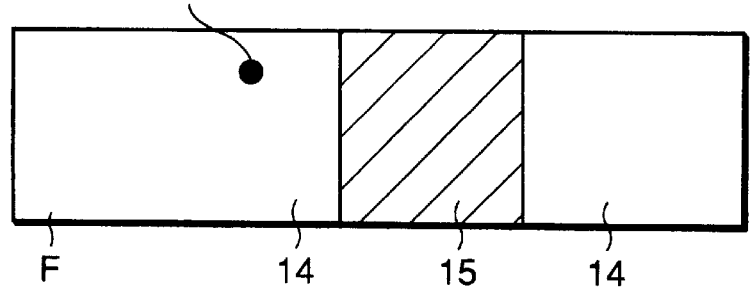

Next, the insulator material shown in FIG. 6D is placed upside down as shown in FIG. 7A and is laminated on the conductor material shown in FIG. 6B so that the insulator thick film 31 is inserted between the conductor thick films 25 and 26 as shown in FIG. 7B, and pressure of 0.1 kg/cm$^2$ is applied for 10 seconds, then the polyethylene film 27 is removed, thereby providing the thick film shown in FIG. 3B. In addition, likewise, six types of thick films each 100 mm long, 80 mm wide, and 35 μm thick having patterns shown as A and C–F are provided.

Next, through holes 10–13 are punched in the thick films of the four patterns C–F in FIG. 3 at predetermined positions, then print conductor paint containing the same amount of titanium boride as the conductor 15 is printed in the through holes 10–13 by screen printing and dried, providing thick films of four patterns in which connection part material is embedded.

Next, resistor paint containing the same amount of titanium boride as the conductor 15 of the pattern C is printed by screen printing, whereby the resistor of the pattern H is printed and dried. Further, print conductor paint containing the same amount of titanium boride as the conductor 15 is printed for the connection part 5 or 6 of the resistor pattern G by screen printing and dried, thereby providing a thick film formed of the resistor pattern G formed on the thick film of the pattern C, as shown in FIG. 4A.

Likewise, resistor paint containing the same amount of titanium boride as the conductor 15 is printed on the patterns D–F by screen printing and dried, thereby providing thick films formed with the resistor pattern H shown in FIGS. 4B to 4D.

(4) Manufacturing of Laminate

To laminate the thick films as the structure shown in FIGS. 1 and 2, sheets corresponding to the layers are provided by combining the thick films containing the same amount of titanium boride. Next, the sheet types are changed so as to put the layers into the structure shown in FIG. 1 and pressure of 0.1 kg/cm$^2$ is applied for 10 seconds in a predetermined order, then the polyethylene film is removed for lamination. After the predetermined lamination is complete, the laminate is removed from the stack board and is entered in a pressurization metal mold and pressure of 1.5 kg/cm$^2$ is applied for 300 seconds.

(5) Cutting of Laminate

Next, the laminate is stuck on a cutting board with double-sided tape and is cut at 2.4-mm wide pitches by means of a diamond cutter, providing 30 laminate specimens each 50 mm long and 1 mm thick.

(6) Manufacturing of Sintered Body

The cut laminates are mounted on a boron nitride board and binders are removed from the laminates at 600° C. for two hours in a nitrogen gas, then the laminates are sintered for two hours in an argon gas at 1700° C. Further, they are sintered for two hours in an argon gas at 1650° C. and 2000 atmospheres, then undergo surface treatment for one hour in air at 1400° C. The specimens each containing 3% titanium boride by weight are sintered for two hours in an argon gas at 1600° C. and further sintered for two hours in an argon gas at 1550° C. and 2000 atmospheres, then undergo surface treatment for one hour in air at 1400° C.

(7) Working of Connection Terminals

Figure 8A:
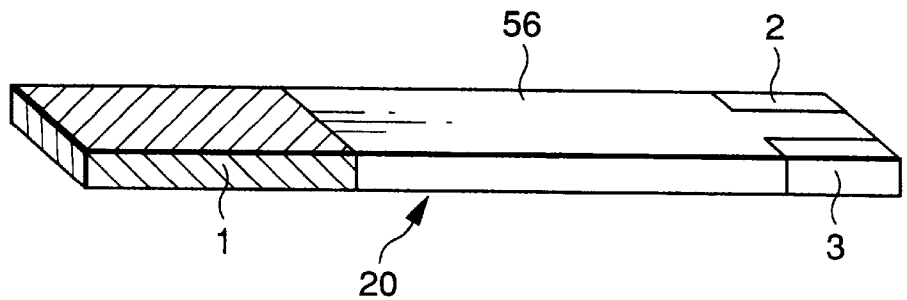
FIGS. 8A to 8D are perspective views to show an assembling process of the temperature sensor of the first example of the invention.

After the surface treatment, the lamination end faces and tops of the electrode sections 2 and 3 shown in FIGS. 1 and 2 are sandblasted. A palladium catalyst for nickel plating is printed on the sandblasted electrode sections 2 and 3 and dried, then heat treatment is executed. Then, nickel electroless plating is applied. FIG. 8A shows the appearance of a resistive temperature sensor element body 20 thus provided. Numeral 1 in FIG. 8A is the temperature sensing section 1, numerals 5 and 6 are the connection parts, and numerals 2 and 3 are the electrode sections connected to the outside.

(8) Assembling and Working of Elements

Figure 8B:
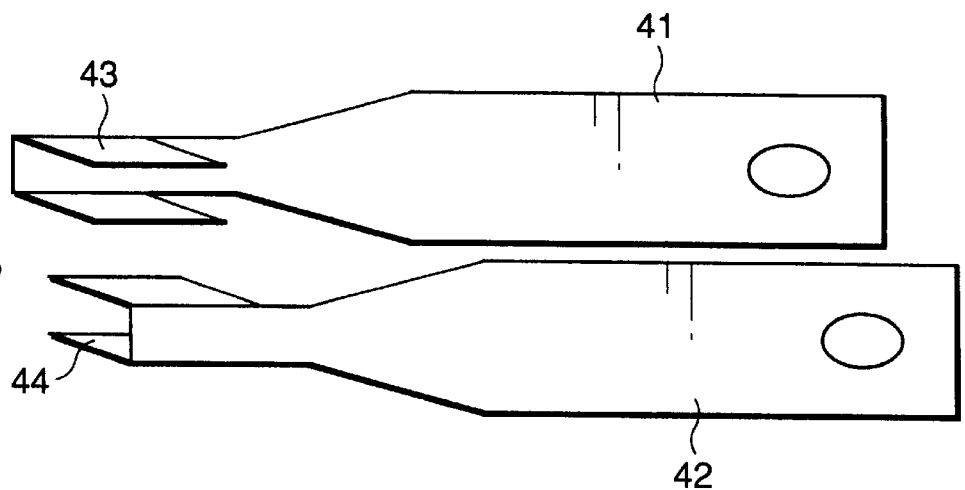

The electrode sections 2 and 3 to which the nickel electroless plating is applied as described above are cleaned and dried, then the electrode sections 2 and 3 of the element body 20 are caught in connection parts 43 and 44 of lead members 41 and 42 shown in FIG. 8B and the connection parts 43 and 44 are joined to the nickel plating portions of the electrode sections 2 and 3 by silver brazing.

Figure 8C:
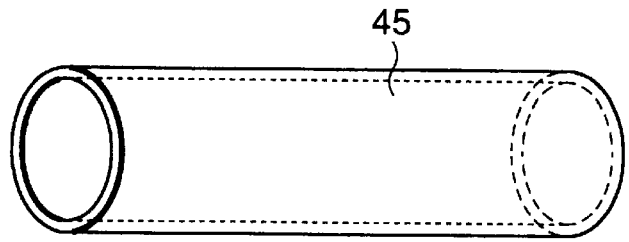
Figure 8D:
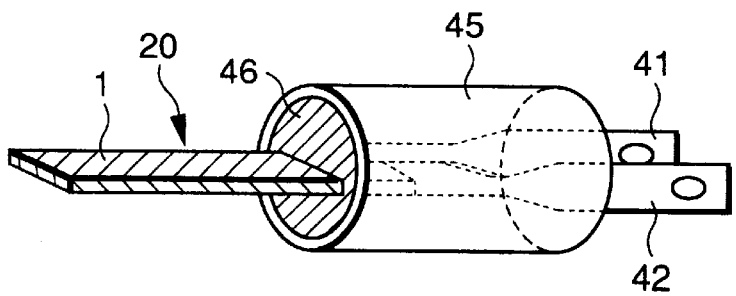

The resistive temperature sensor element body 20 to which the lead members 41 and 42 are thus joined is inserted into an alumina tube 45 shown in FIG. 8C, is filled with ceramic cement 46 shown in FIG. 8D, and is dried for 30 minutes at 90° C., then undergoes heat treatment for two hours at 120° C. and is hardened.

Second Example

Figure 9A:
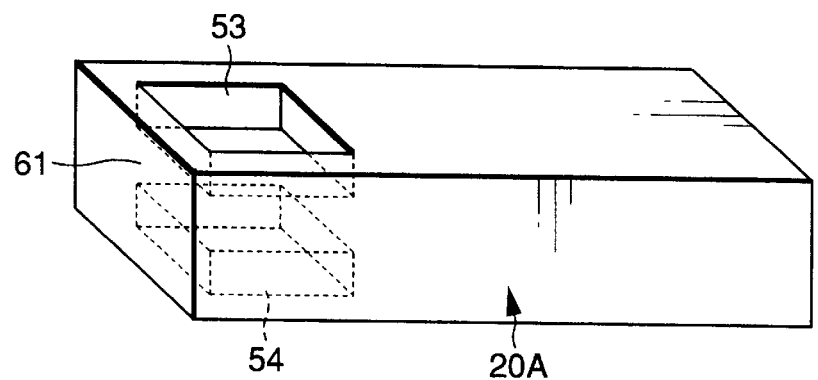
FIG. 9A is an external view of second to fourth examples of the invention.
Figure 9B:
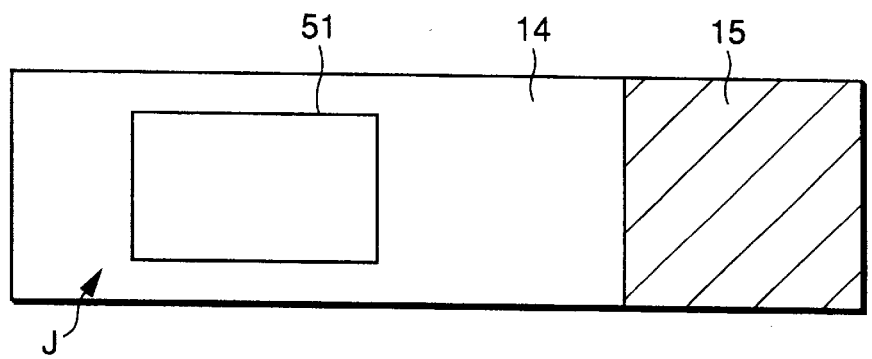
FIGS. 9B and 9C are new used thick film patterns.
Figure 9C:
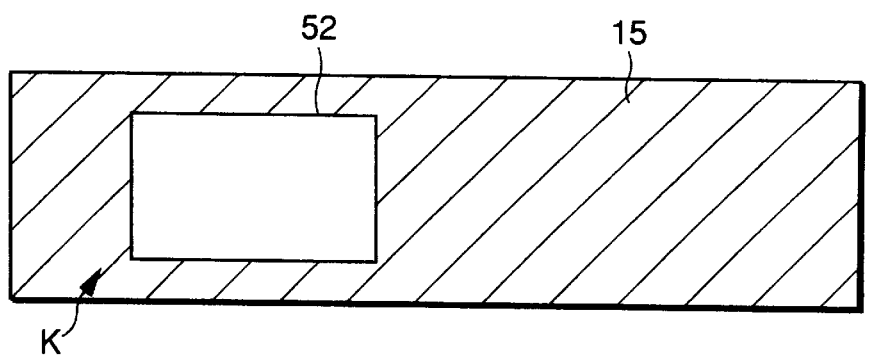

FIG. 9A is a perspective view to show a second example of a resistive temperature sensor according to the invention in an element body state. The resistive temperature sensor of the second example is formed so that both end faces of a temperature sensing section 61 in the lamination direction become bottoms of recesses 53 and 54 of an element body 20A to make the temperature sensing section 61 thinner than the element body 20A. FIG. 9B and 9C show patterns added to the patterns A–F shown in FIG. 3 to form the recesses 53 and 54 by lamination. Pattern J in FIG. 9B is formed with a punch part 51 as wide as the recess 53, 54 in the pattern C. Pattern K in FIG. 9C is formed with a punch part 52 as wide as the punch part 51 at a position corresponding thereto in a pattern of a conductor 15.

Figure 10:
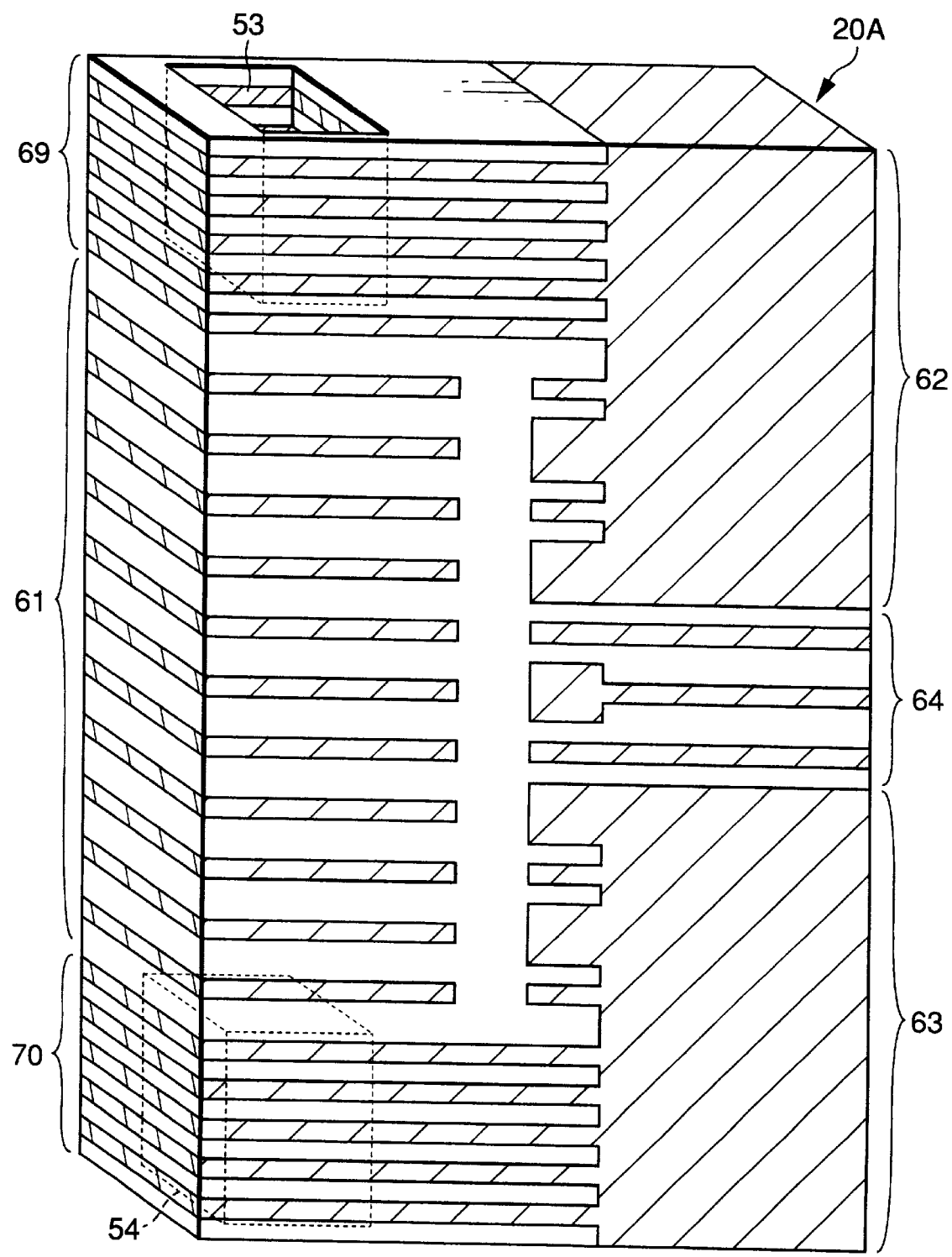
FIG. 10 is a perspective view to show the lamination structure of the second to fourth examples of the resistive temperature sensor according to the invention.
Figure 11:
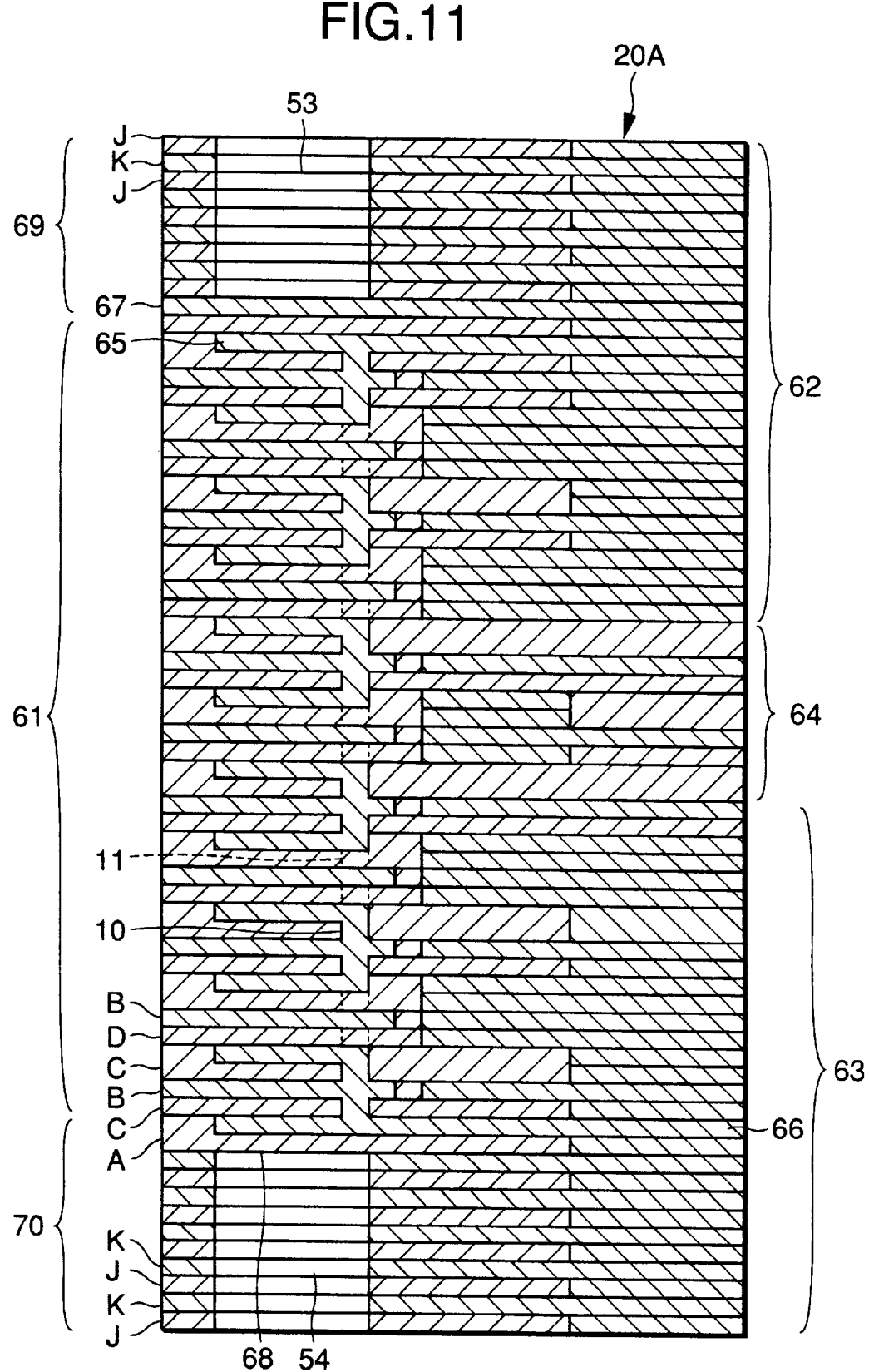
FIG. 11 is a sectional view to show the lamination structure of the second to fourth examples of the resistive temperature sensor according to the invention.
Figure 12:
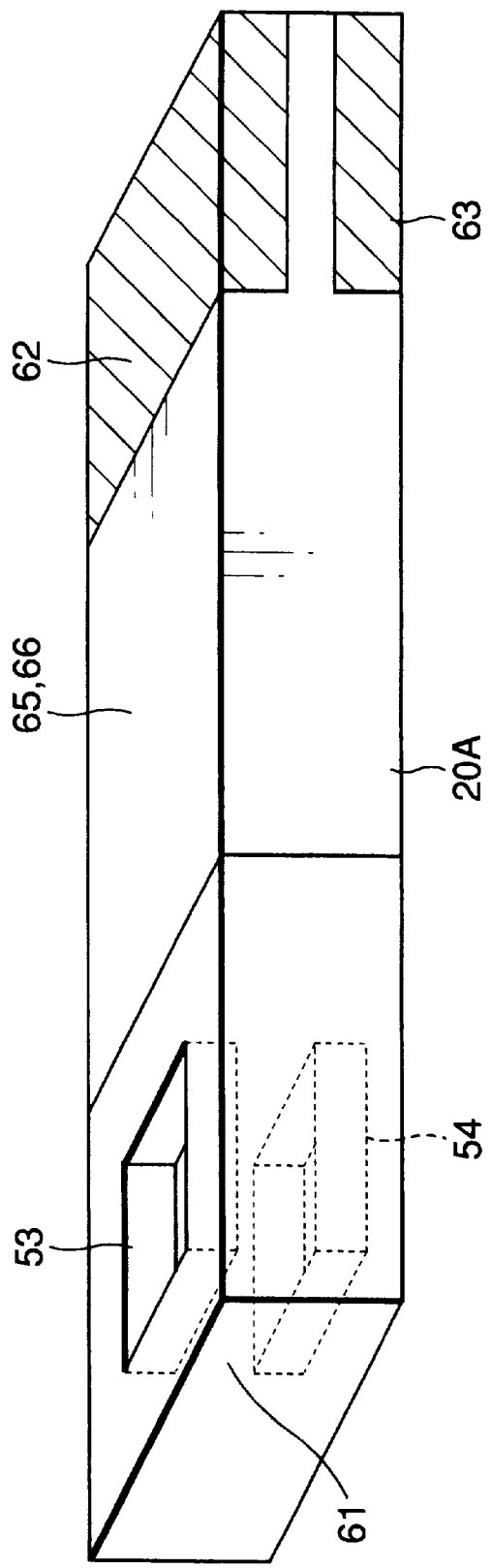
FIG. 12 is an external view of the second to fourth examples of the invention.

FIG. 10 is an external view of the element body 20A of the example. FIG. 11 is a sectional view to show the lamination structure of the element body 20A. FIG. 12 is an external view to show a state in which the element body 20A is formed with electrode sections 62 and 63.

As shown in FIG. 11, the element body 20A of the example is provided by laminating the patterns J and K shown in FIG. 9B and 9C on both end faces of the laminate shown in FIG. 2 as lamination parts 69 and 70. More particularly, a temperature sensor layer is formed by 33 layers of thick films except patterns A of protective layers at both ends of the temperature sensing section 61. Resistor patterns G and H are formed on patterns C–F, as described above.

As shown in FIGS. 11 and 12, in the example, connection terminals 62 and 63 having conductive material layers laminated on each other are formed with an insulating section 64 having insulating material layers laminated on each other between, and the temperature sensing section 61 is connected between connection parts 65 and 66. It is formed on the top and bottom faces with protective layers 67 and 68. Further, the recesses 53 and 54 are made above and below the temperature sensing section 61 by the punch parts 51 and 52 formed in the thick film patterns J and K.

For the structure of the resistive temperature sensor of the example, insulating and conductor layers formed of the thick film patterns J and K are laminated alternately, whereby the lamination parts 69 and 70 containing the recesses 53 and 54 are formed in one piece above and below the first example.

Such a structure is adopted, whereby if the protective layers of the lamination parts 69 and 70 are thickened to provide strength, the temperature sensing section 61 can be thinned and blunting the sensitivity of the temperature sensing section 61 can be avoided.

A manufacturing method of the second example and the measurement results of various characteristics, etc., will be discussed. Parts of the second example similar to those of the first example will not be discussed again.

In the second example, as in the first example, to provide each thick film, conductor 15 having basic composition of 90% molybdenum suicide by volume and 10% alumina by volume (see FIG. 3) and insulator 14 having basic composition of 90% alumina by volume and 10% mullite by volume to which 0.3% magnesia by weight and 0.3% silica by weight are added (see FIG. 3) are combined as pattern A–F, J, K like a rectangle, as described above.

The relationships among resistor patterns G and H and thick film resistor patterns A–F, J, and K and a temperature sensing resistance circuit formed of the resistor patterns G and H and through holes 10–13 are similar to those of the first example. That is, the temperature sensing section is made of a series connection circuit of resistors drawn in the perspective view of FIG. 5. The manufacturing method of the second example is as follows:

(1) Manufacturing of Material

Resistor (pattern G, H) materials, print connection part (65, 66, through holes 10–13) materials, thick film conductor (15) materials, and insulator (14) materials are manufactured and resistor paint, conductor paint, and insulator paint are provided, as in the first example. However, unlike the first example, five types of resistor materials, print connection part materials, and thick film conductor materials different in titanium boride and titanium carbide contents are provided (containing 1% 3%, or 5% titanium carbide 2 μm in average particle diameter by weight in place of titanium boride, containing 1% titanium boride 1 μm in average particle diameter by weight and 3% titanium carbide by weight, or containing 2% titanium boride by weight and 1% titanium carbide by weight).

(2) Manufacturing of Sheets

As in the first example, application film of each of the thick film conductor paint and insulator paint is formed 80 mm in width on a polyethylene film by a sheet coater so that the thickness after drying the thick film conductor paint and insulator paint manufactured in the process in (1) becomes 35 μm, providing a conductor sheet and an insulator sheet. Then, the conductor sheet and the insulator sheet are cut 100 mm in length.

(3) Manufacturing of Thick Films

For the thick film layers making up the temperature sensor, patterns A and B (FIG. 3), four thick films of patterns C–F (FIG. 3) with connection part material containing the same amounts of titanium boride and titanium carbide as the conductor 15 layer embedded in the through holes 10–13, and eight thick films of patterns J and K shown in FIG. 9B and 9C 100 mm long, 80 mm wide, and 35 μm thick are provided by executing a process similar to that of the first example. Next, punch parts 51 and 52 are punched in the thick film patterns J and K.

(4) Manufacturing of Laminate

As in the first example, to laminate the thick films as the structure shown in FIG. 11, sheets corresponding to the layers are provided by combining the thick films containing the same amounts of titanium boride and titanium carbide. Next, as in the first example, pressure of 0.1 kg/cm² is applied for 10 seconds for lamination. After the lamination is complete, the laminate is entered in a pressurization metal mold and pressure of 1.5 kg/cm² is applied for 300 seconds.

(5) Cutting of Laminate

Next, as in the first example, the laminate is stuck on a cutting board with double-sided tape and is cut at 2.4-mm wide pitches by means of a diamond cutter, providing 30 laminate specimens each 50 mm long and 1.5 mm thick.

(6) Manufacturing of Sintered Body

The cut laminates are mounted on a boron nitride board and binders are removed from the laminates at 600° C. for two hours in a nitrogen gas, then the specimens each containing 1% titanium carbide by weight are sintered for two hours in an argon gas at 1700° C., then sintered for two hours in an argon gas at 1650° C. and 2000 atmospheres, then undergo surface oxidation treatment for one hour in air at 1400° C. The specimens each containing 3% by total weight of titanium boride and titanium carbide are sintered for two hours in an argon gas at 1650° C. and further sintered for two hours in an argon gas at 1600° C. and 2000 atmospheres, then undergo surface oxidation treatment for one hour in air at 1400° C. The specimens each containing more than 3% by total weight of titanium boride and titanium carbide are sintered for two hours in an argon gas at 1600° C. and further sintered for two hours in an argon gas at 1550° C. and 2000 atmospheres, then undergo surface oxidation treatment for one hour in air at 1400° C.

(7) Working of Connection Terminals

After the surface oxidation treatment, the lamination end faces and tops of the electrode sections 62 and 63 shown in FIG. 11 are sandblasted. A palladium catalyst for nickel plating is printed on the sandblasted electrode sections 62 and 63 and dried, then heat treatment is executed. Then, nickel electroless plating is applied. As shown in FIG. 12, each resistive temperature sensor element body thus provided is formed on one end side with the electrode sections 62 and 63 and on the opposite end side with the temperature sensing section 61 having the bottom faces of the recesses 53 and 54 as both end faces. The connection parts 65 and 66 are formed between the electrode sections 62 and 63 and the temperature sensing section 61.

(8) Assembling and Working of Elements

The electrode sections 62 and 63 to which the nickel electroless plating is applied are cleaned and dried, then lead members 41 and 42 shown in FIG. 8B, alumina tube 45, and ceramic cement 46 are used to assemble the resistive temperature sensor as in the first example.

Evaluation of First and Second Examples

The electrical characteristics of assemblies of the temperature sensors of the first and second examples are measured. Specimens A0–A3 shown on graphs are provided using the materials in the first example and specimens B1–B5 are provided using the materials in the second example as follows:

A0: Resistor material, print connection part material, and thick film conductor material containing no titanium boride.

A1: Resistor material, print connection part material, and thick film conductor material containing 1% titanium boride by weight.

A2: Resistor material, print connection part material, and thick film conductor material containing 2% titanium boride by weight.

A3: Resistor material, print connection part material, and thick film conductor material containing 3% titanium boride by weight.

B1: Resistor material, print connection part material, and thick film conductor material containing 1% titanium carbide by weight.

B2: Resistor material, print connection part material, and thick film conductor material containing 3% titanium carbide by weight.

B3: Resistor material, print connection part material, and thick film conductor material containing 5% titanium carbide by weight.

B4: Resistor material, print connection part material, and thick film conductor material containing 1% titanium carbide by weight and 3% titanium carbide by weight.

B5: Resistor material, print connection part material, and thick film conductor material containing 2% titanium carbide by weight and 1% titanium carbide by weight.

Tables 1 and 3 list resistance values at temperatures when the temperature is changed in the range of 25° C. to 1300° C. and resistance value change rates at the temperatures relative to the resistance value at 25° C. for the specimens A0–A3 and B1–B5.

Tables 2 and 4 list resistance value changes with the passage of time by immersion in a niter solution at 400° C. and resistance value change rates at temperatures relative to the resistance value at 25° C. for the specimens A0–A3 and B1–B5.

FIGS. 13 to 16 are provided by graphing Tables 1 to 4.

Figure 13:
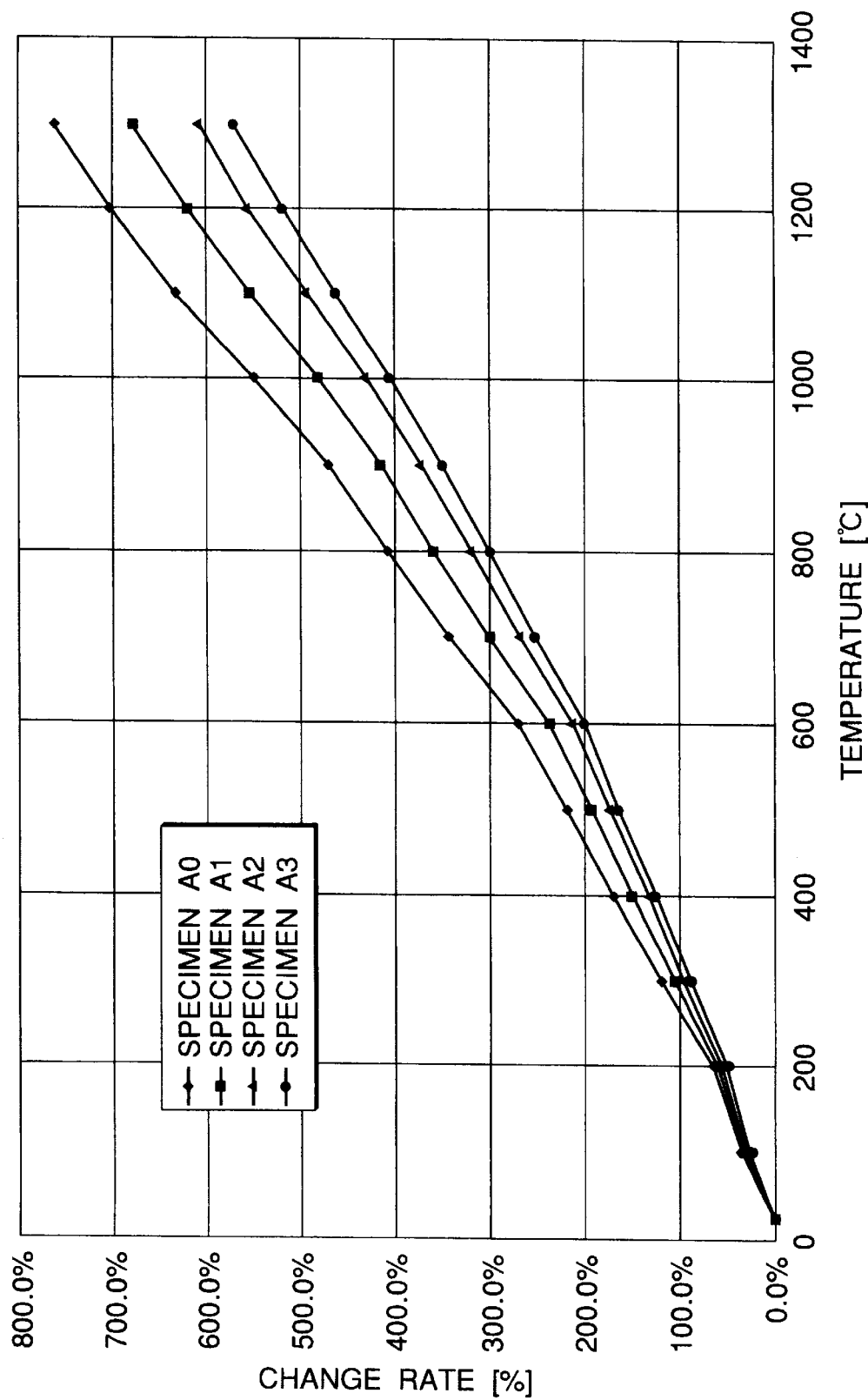
FIG. 13 is a graph to show resistance value change rate in response to temperature in the first example of the invention.
Figure 15:
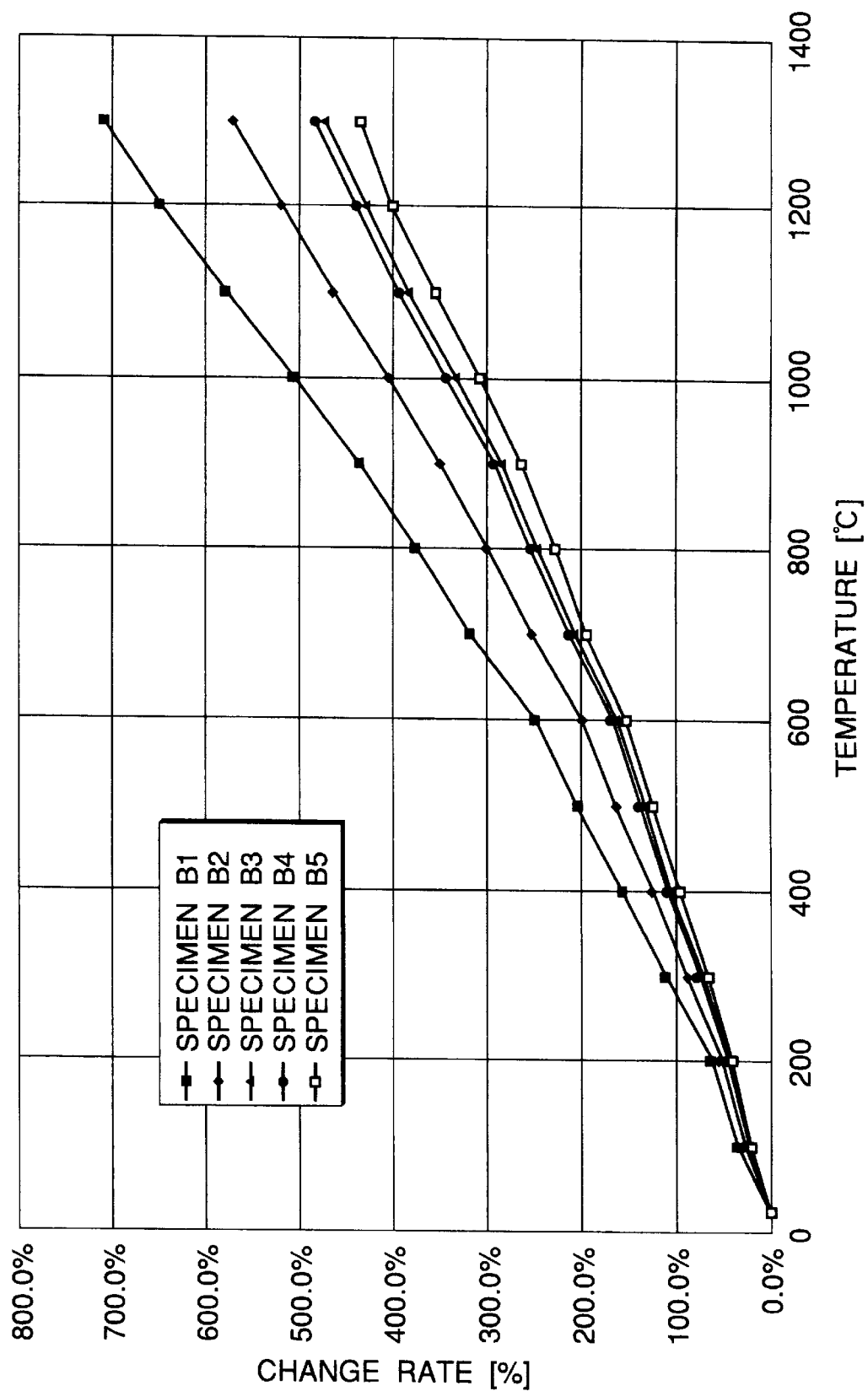
FIG. 15 is a graph to show resistance value change rate in response to temperature in the second example of the invention.

According to Table 1 and the graph of FIG. 13 corresponding thereto and Table 3 and the graph of FIG. 15 corresponding thereto, it is clear that the temperature sensors of the first and second examples have resistance values largely changed in response to temperature change.

Figure 14:
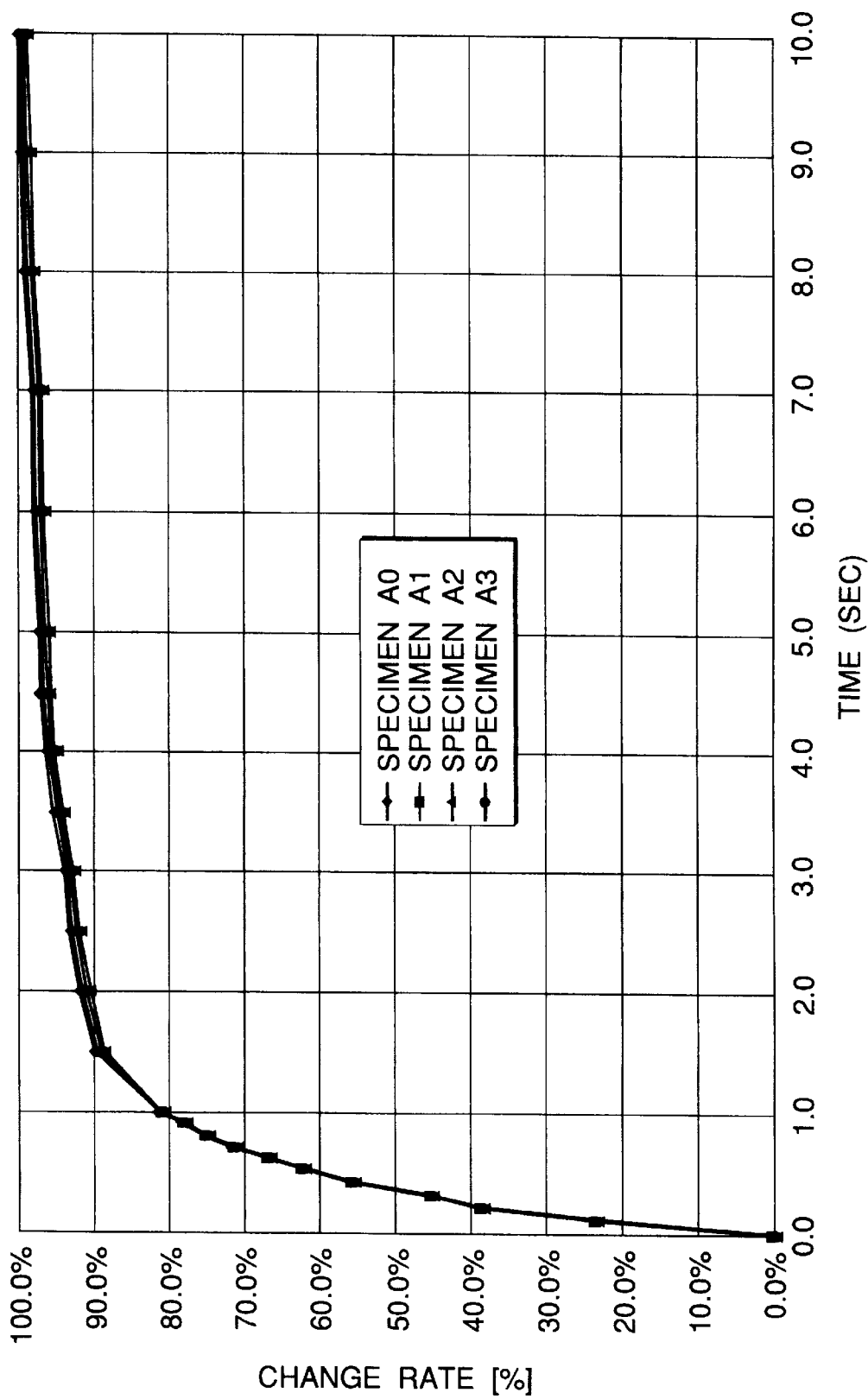
FIG. 14 is a graph to show response speed to resistance value change in the first example of the invention.
Figure 16:
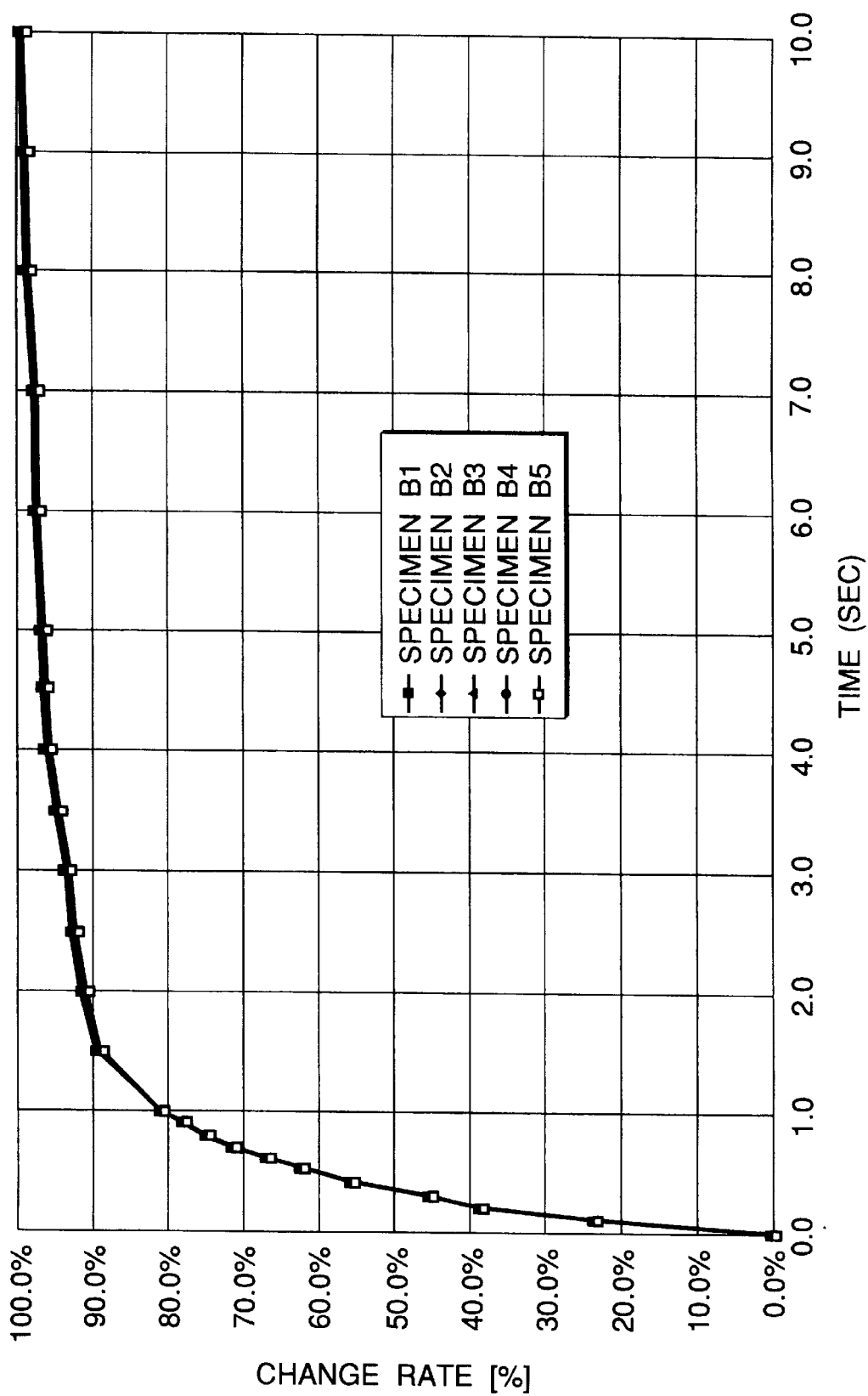
FIG. 16 is a graph to show response speed to resistance value change in the second example of the invention.
Figure 17:
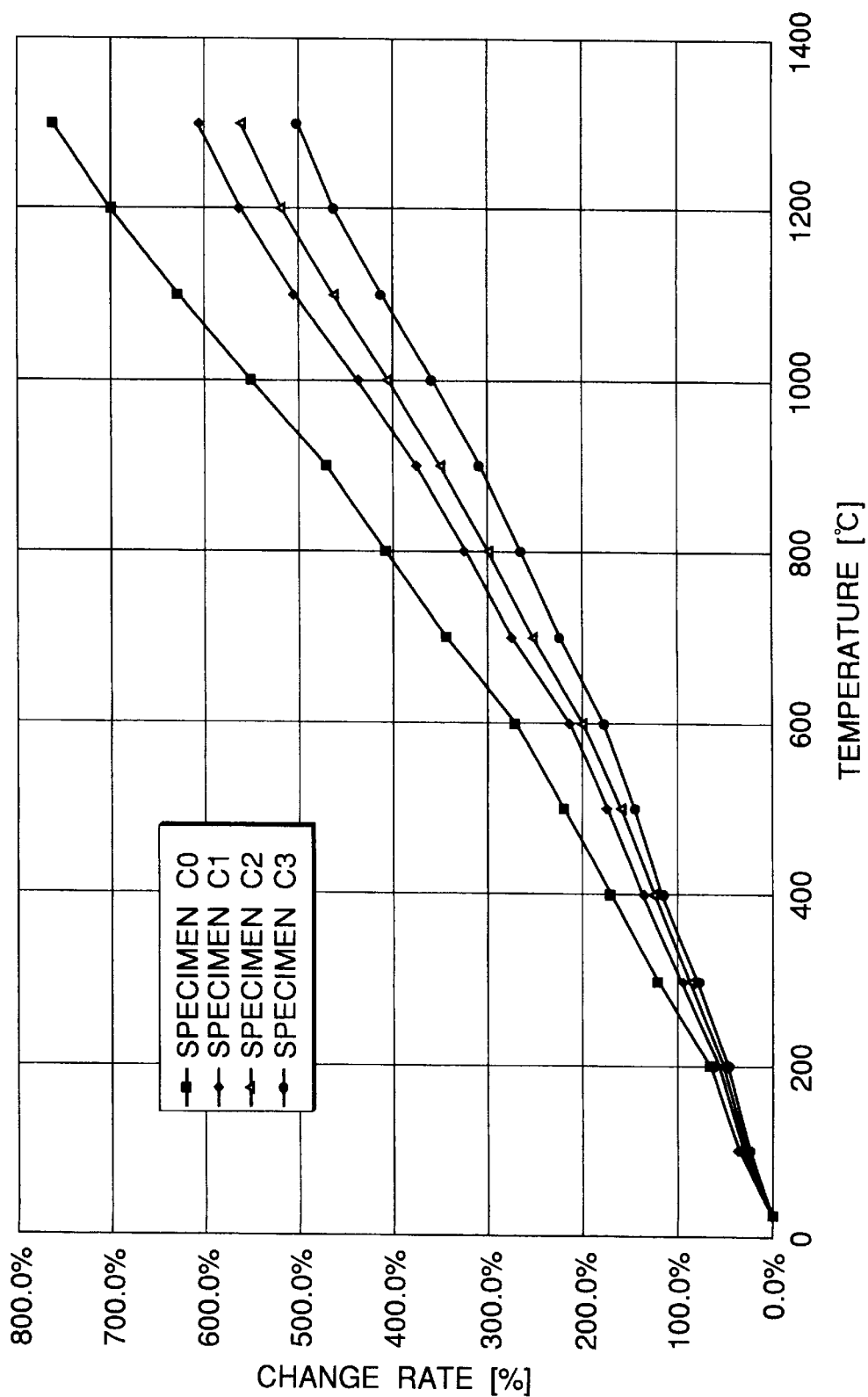
FIG. 17 is a graph to show resistance value change rate in response to temperature in the third example of the invention.
Figure 18:
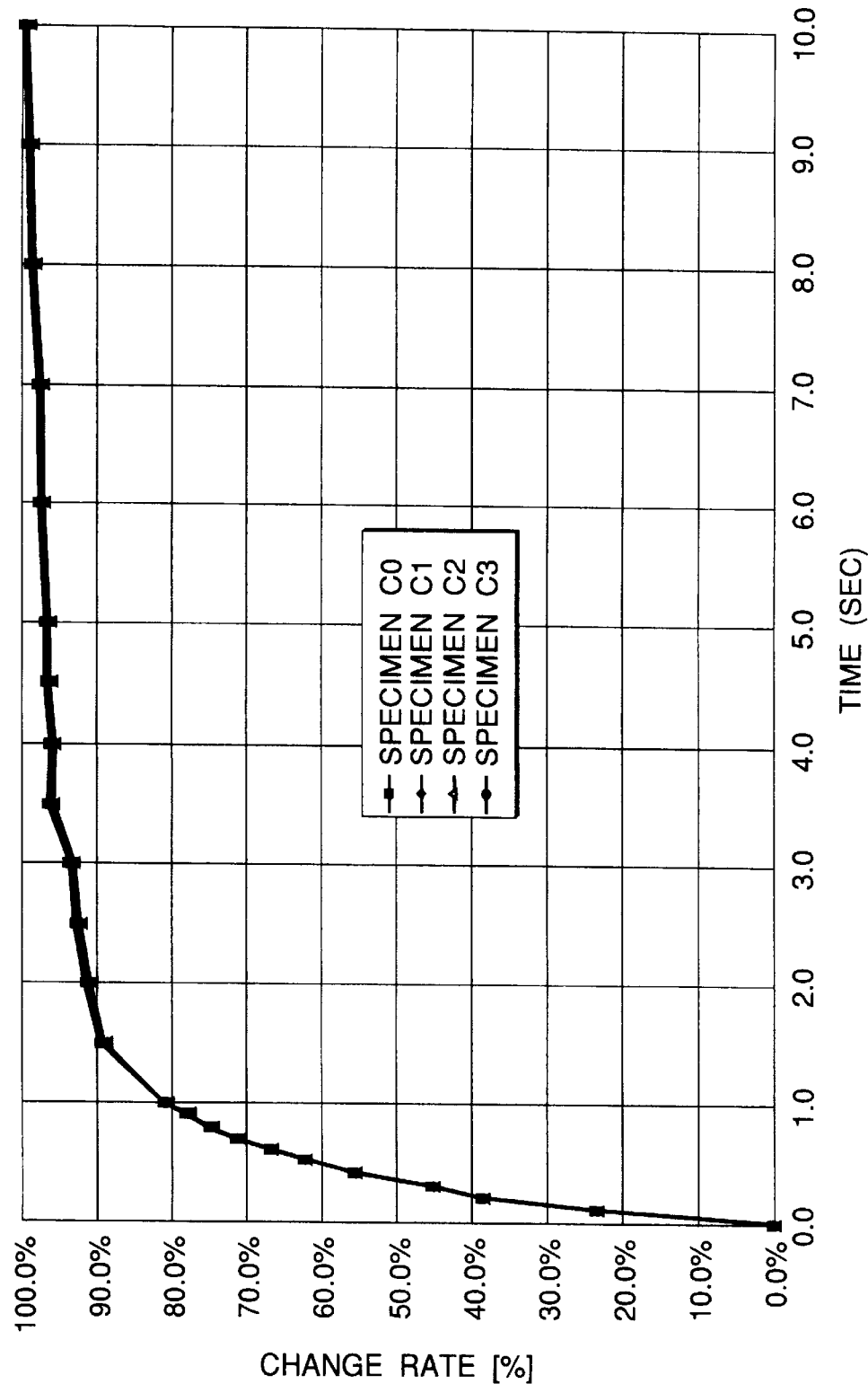
FIG. 18 is a graph to show response speed to resistance value change in the third example of the invention.
Figure 19:
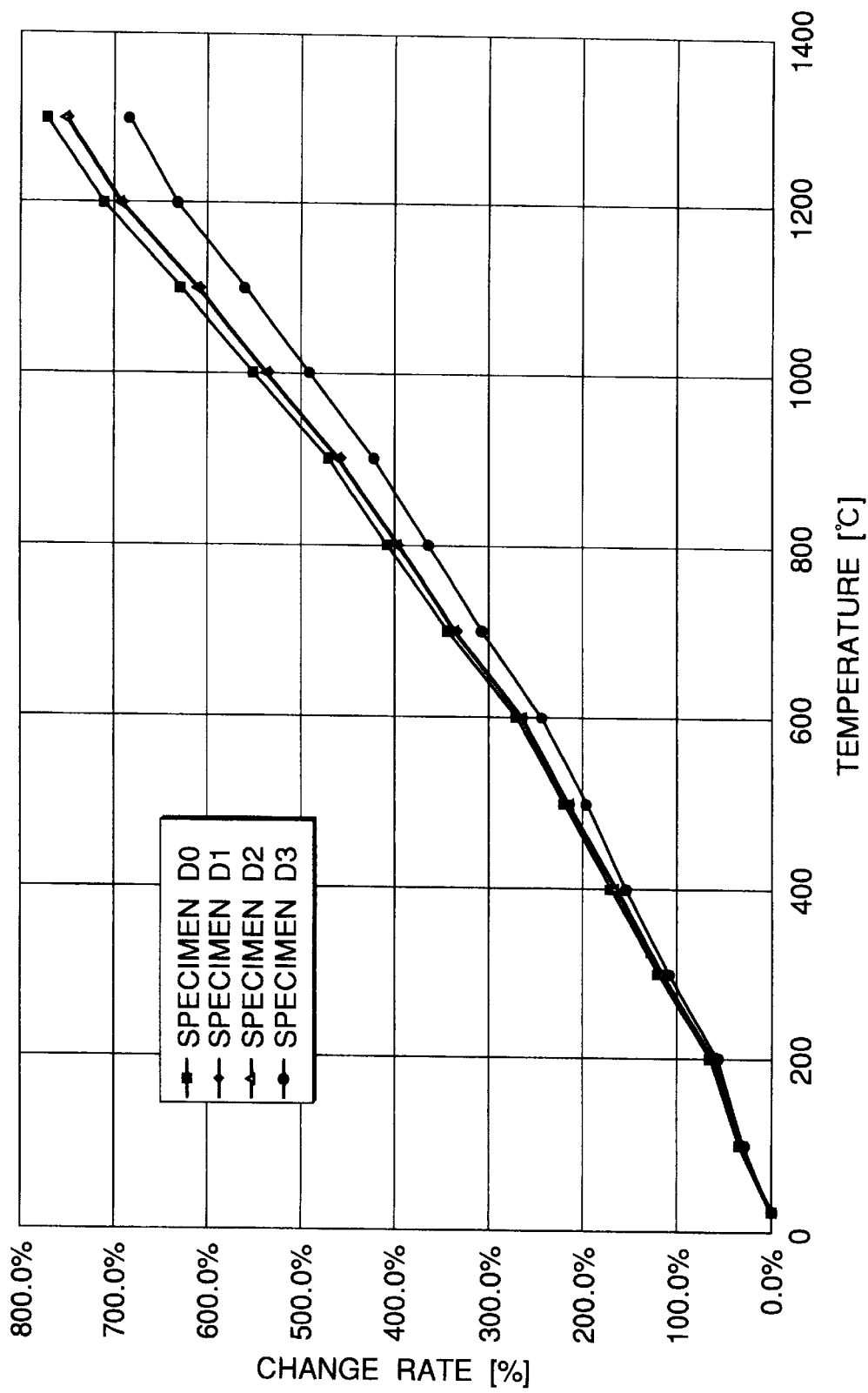
FIG. 19 is a graph to show resistance value change rate in response to temperature in the fourth example of the invention.
Figure 20:
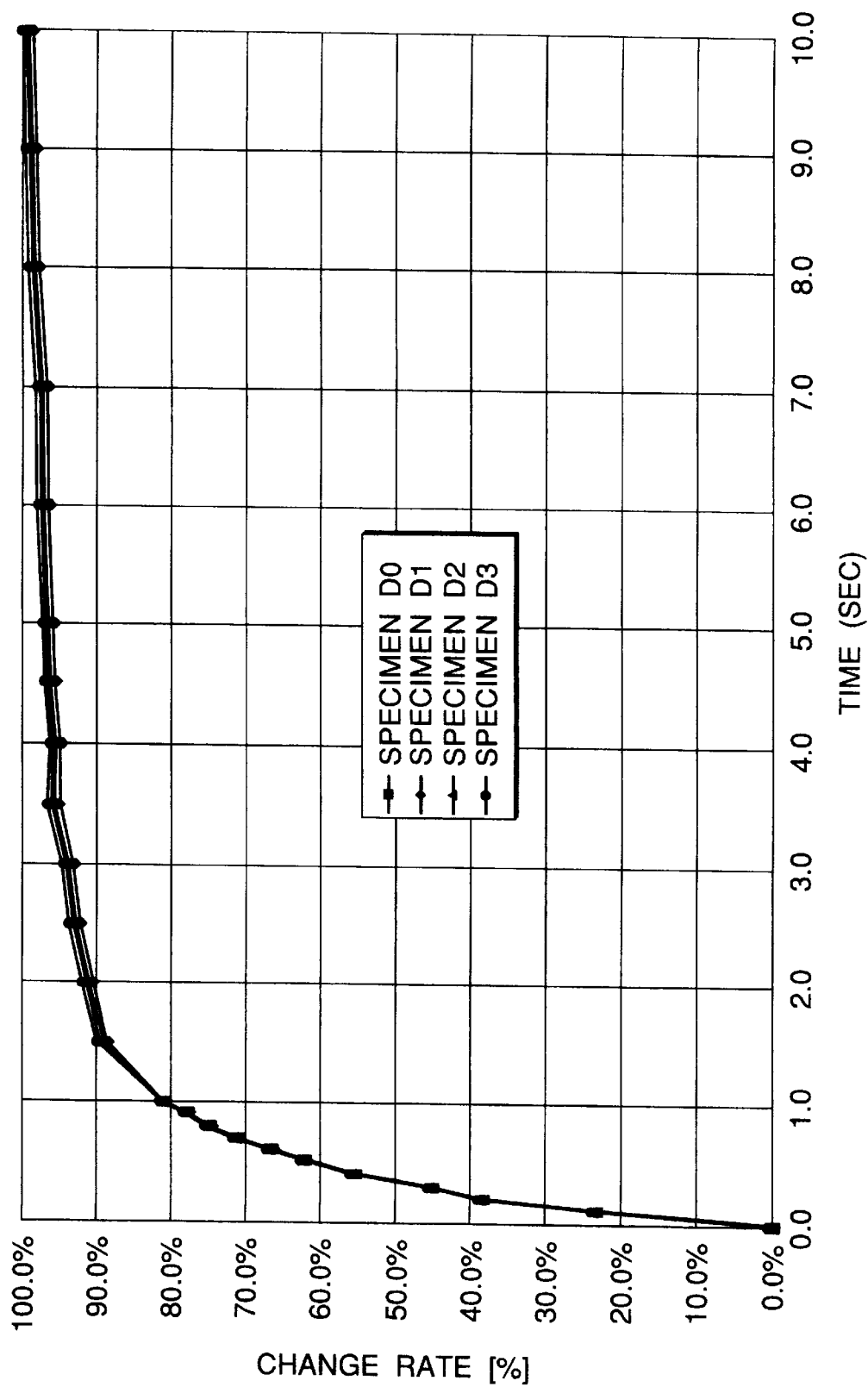
FIG. 20 is a graph to show response speed to resistance value change in the fourth example of the invention.
Figure 21:
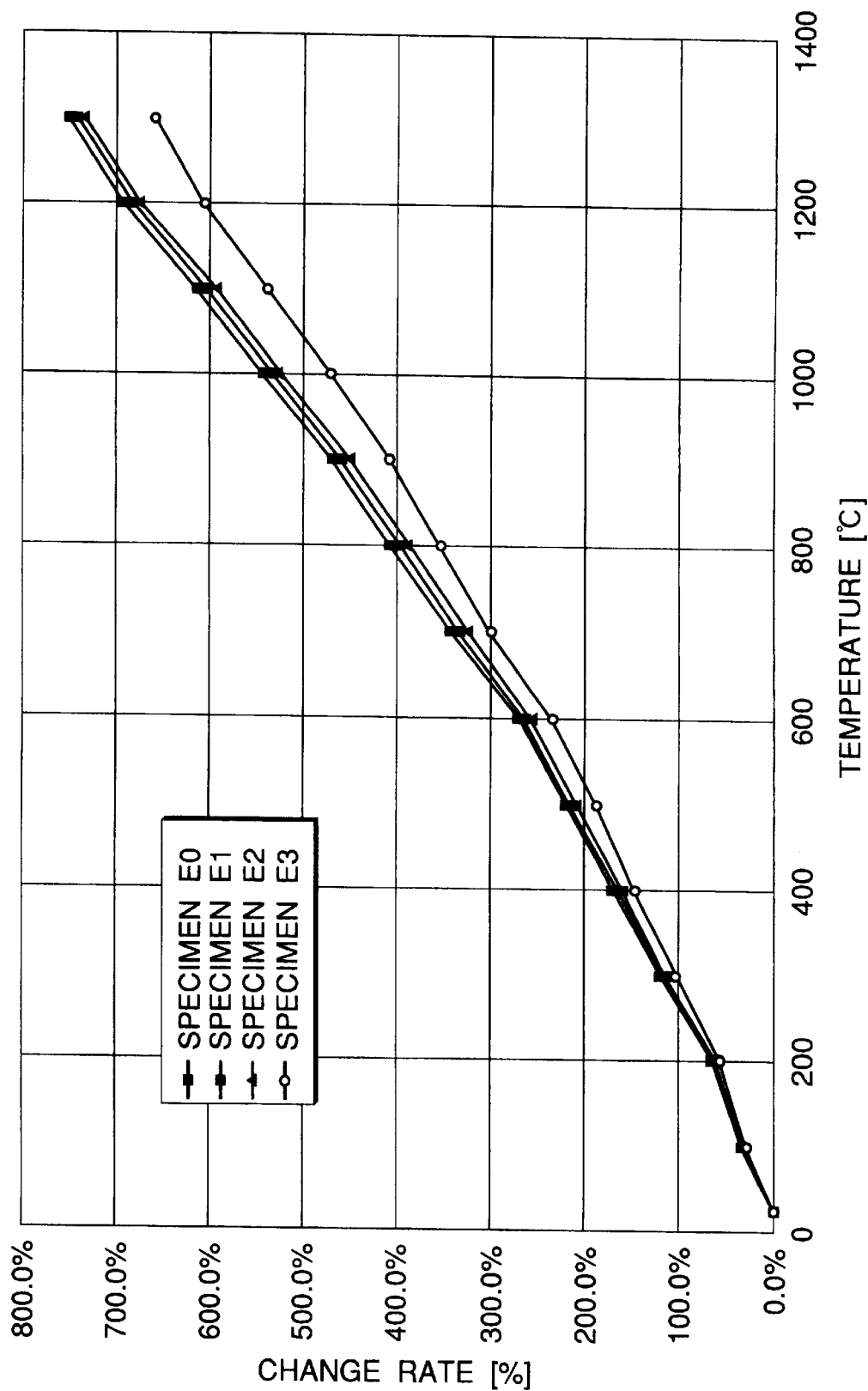
FIG. 21 is a graph to show resistance value change rate in response to temperature in the fourth example of the invention.
Figure 22:
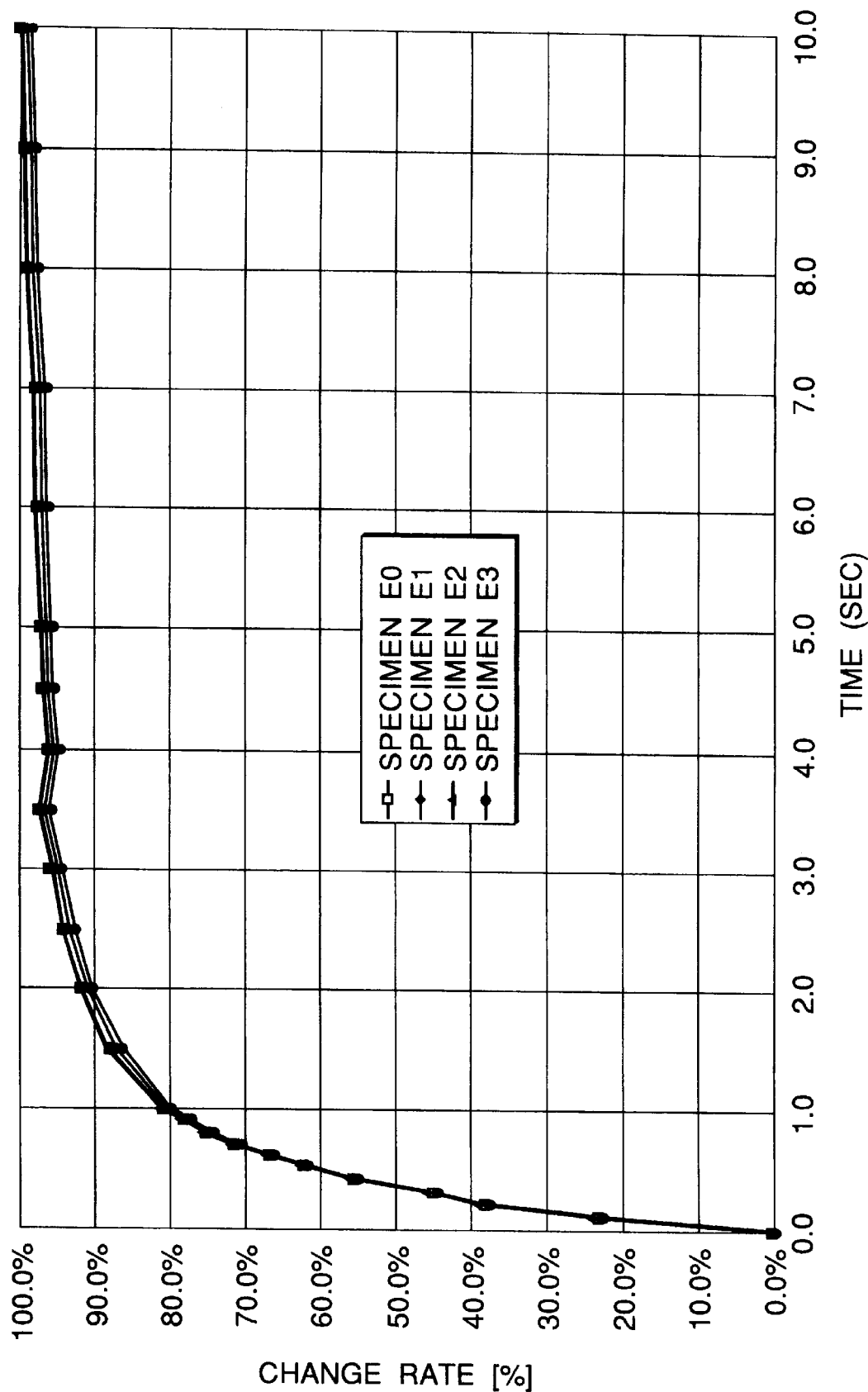
FIG. 22 is a graph to show response speed to resistance value change in the fourth example of the invention.
Figure 23:
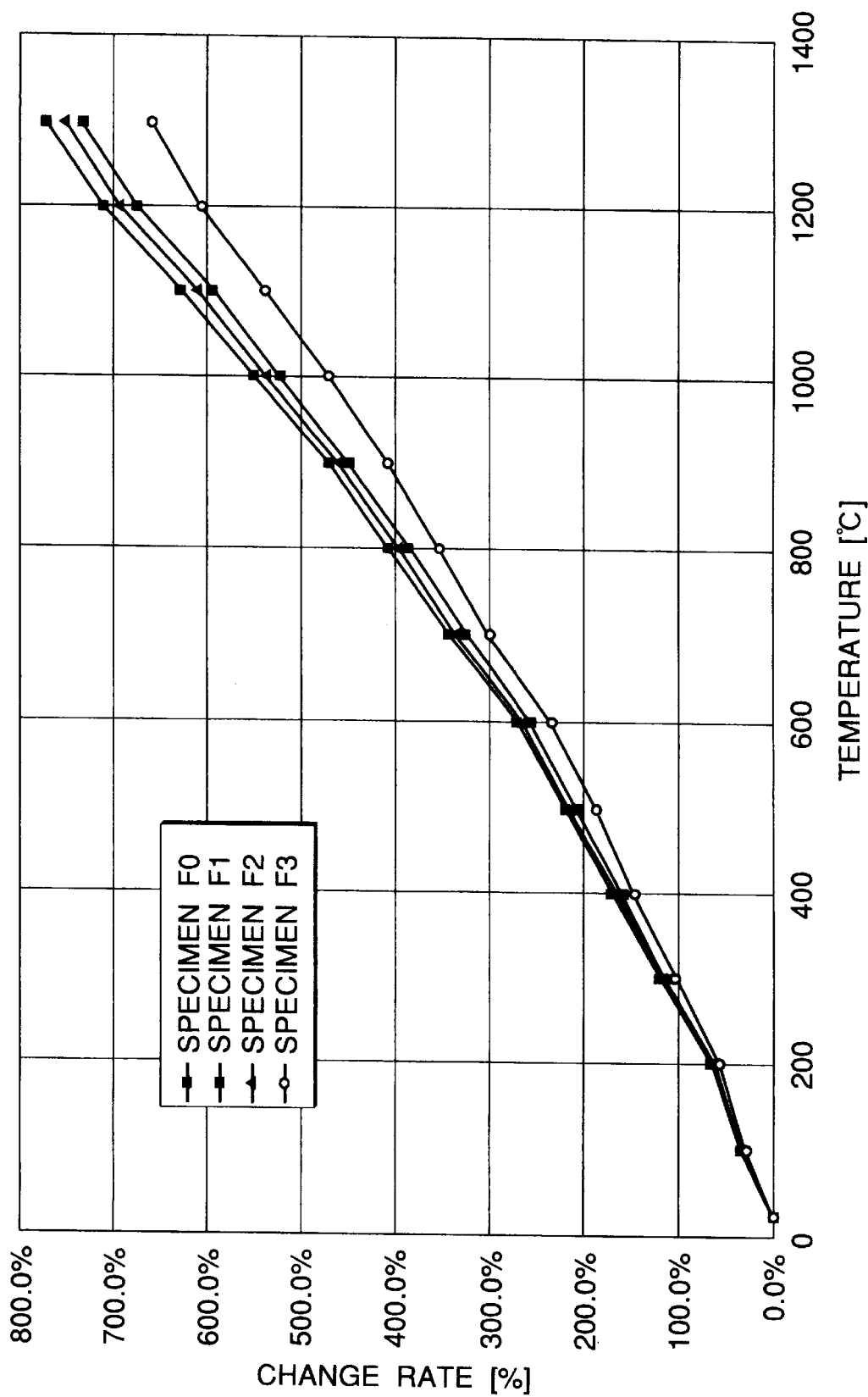
FIG. 23 is a graph to show resistance value change rate in response to temperature in the fourth example of the invention.
Figure 24:
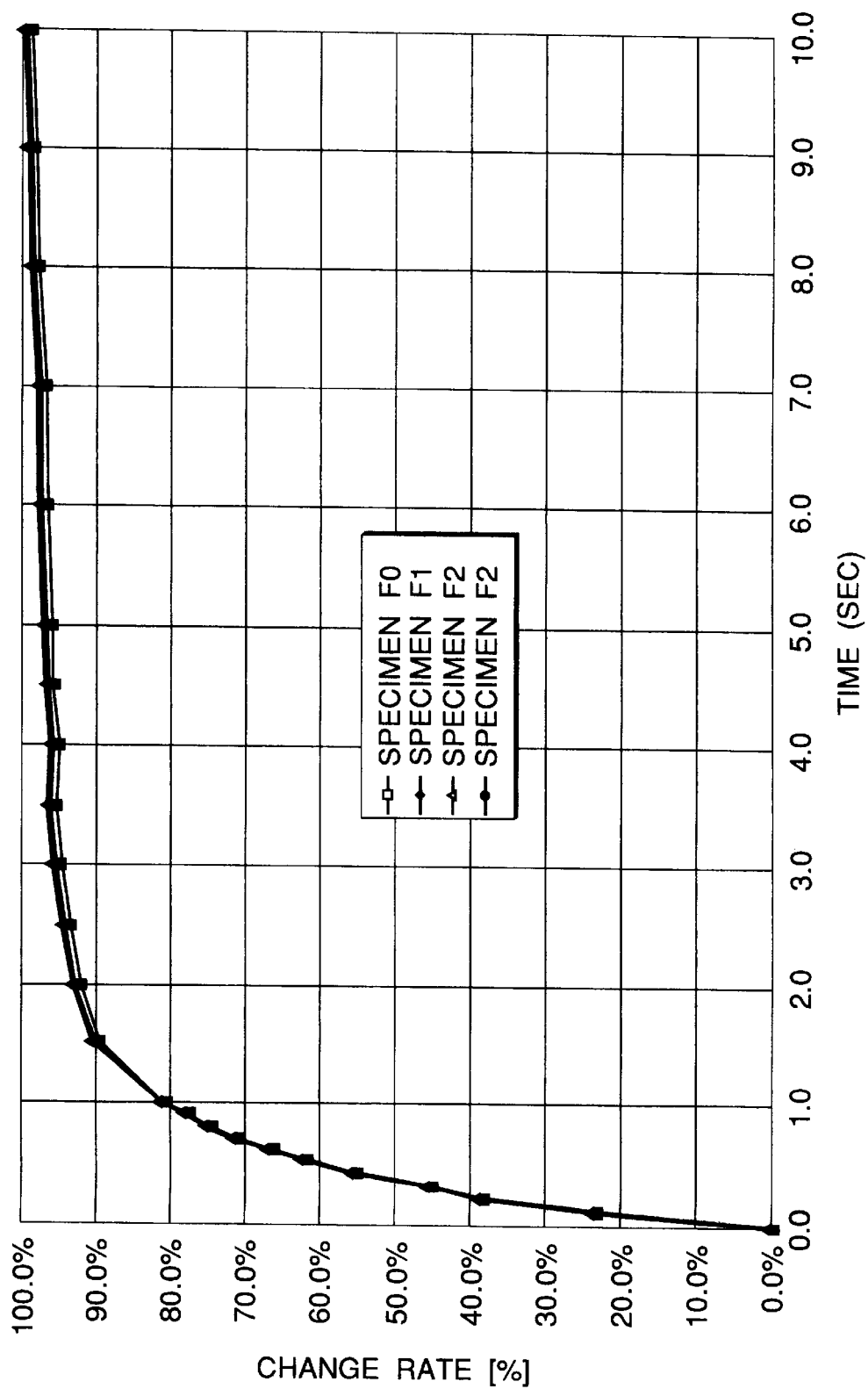
FIG. 24 is a graph to show response speed to resistance value change in the fourth example of the invention.

According to Table 2 and the graph of FIG. 14 corresponding thereto and Table 4 and the graph of FIG. 16 corresponding thereto, it is clear that the temperature sensors of the first and second examples have resistance values changed to predetermined values at sufficient response speed.

Examination of Addition Amounts of Titanium Boride and Titanium Carbide

In the first example, the contents of titanium boride and titanium carbide in resistor material, print electrode section material, and thick film conductor material are as listed in Tables 5–8. The cut laminates are mounted on the boron nitride board and binders are removed from the laminates for two hours in a nitrogen gas at 600° C., then are sintered for two hours in an argon gas in the temperature range of 1400° C.–1700° C., further sintered for two hours in an argon gas at 1400° C.–1650° C. and 2000 atmospheres, then undergo surface oxidation treatment for one hour in air at 1400° C.

Tables 9–12 list sintered body densities of properties according to the addition amounts of titanium boride and titanium carbide, resistance value ratios at room temperature 25° C. and 1500° C., and heat resistance impact test results. In the tables, the values of each specimen are the specimen results indicating the most excellent properties among those sintered in the temperature range among the specimens for each addition amount. The sintered body density is a percentage to the theoretical density. The heat resistance impact performance is evaluated by changing 1500° C. and room temperature 25° C. environments alternately. In the tables, the specimens having specimen numbers marked * mean specimens with the total content of titanium boride and titanium carbide outside the range of 0.1%–5.5% by weight.

Examination of Protective Films

The temperature sensing section and the electrode sections are covered with closely packed ceramic and can hold stability for environments. Further, after the temperature sensor element is formed, it is formed on the surface with a protective film 17 consisting essentially of alumina or silica by sintering, whereby environmental resistance can be improved. The protective films can be formed by CVD or can be immersed in slurry of alumina or silica, then sintered for formation. Table 13 lists temperature sensor performance when the protective film consisting essentially of alumina or silica is formed on the surface. It can be seen from Table 13 that heat resistance can be improved without impairing response by forming the protective film 17. The temperature sensing section 1 is covered with the protective film 17, whereby environmental resistance can also be improved.

The specimens are specimens A0 in the first example each formed on the surface with a protective film. Specimen 1 in Table 13 is a specimen subjected only to oxidation treatment and formed on the surface with no protective film; specimen 2 is a specimen formed on the surface with a protective film 20 μm thick consisting essentially of silica; specimen 3 is a specimen formed on the surface with a protective film 20 μm thick consisting essentially of alumina; and specimen 4 is a specimen formed on the surface with a film 10 μm thick consisting essentially of silica, then a film 20 μm thick consisting essentially of alumina.

Third Example

The metal silicide used in the first and second examples is molybdenum silicide; other metal silicides can also be used as ceramic materials forming a part of a resistive temperature sensor. An example of using metal silicide other than molybdenum silicide will be discussed.

(1) Manufacturing of Materials

Resistor paint, conductor paint, and insulator paint are provided by executing a process similar to that of the first, second example. The following four types of resistor paint and conductor paint different in titanium carbide and titanium boride contents are provided as in the first and second examples: (C0) containing 40% tungsten silicide 3 μm in average particle diameter by volume, 60% alumina 0.4 μm in average particle diameter by volume, no titanium boride, and no titanium carbide, (C1) containing 2% titanium boride 1 μm in average particle diameter by weight, (C2) containing 3% titanium carbide 2 μm in average particle diameter by weight, and (C3) containing 2% titanium boride by weight and 2% titanium carbide by weight as composition of resistor material, print connection part material, thick film conductor material.

(2) Manufacturing of Sheets

As in the first and second examples, application film of each of the thick film conductor paint and insulator paint is formed 80 mm in width on a polyethylene film by a sheet coater so that the thickness after drying the thick film conductor paint and insulator paint manufactured in the process in (1) becomes 35 μm, providing a conductor sheet and an insulator sheet. Then, the conductor sheet and the insulator sheet are cut 100 mm in length, as in the first and second examples.

(3) Manufacturing of Thick Films

Two thick films of patterns A and B (FIG. 3), four thick films of patterns C–F (FIG. 3) with connection part material containing the same amounts of titanium boride and titanium carbide as the conductor embedded in the through holes, and eight thick films of patterns J and K formed with punch parts 51 and 52 (FIG. 9A) 100 mm long, 80 mm wide, and 35 μm thick are provided by executing a process similar to that of the first, second example.

(4) Manufacturing of Laminate

As in the second example, to laminate the thick films as the structure shown in FIGS. 10 and 11, pressure of 0.1 kg/cm² is applied for 10 seconds for lamination. After the predetermined lamination is complete, the laminate is removed from the stack board and is entered in a pressurization metal mold and pressure of 1.5 kg/cm² is applied for 300 seconds.

(5) Cutting of Laminate

Next, as in the first and second examples, the laminate is cut at 2.4-mm wide pitches by means of a diamond cutter, providing 30 laminate specimens each 50 mm long and 1.5 mm thick.

(6) Manufacturing of Sintered Body

The cut laminates are mounted on a boron nitride board and binders are removed from the laminates at 600° C. for two hours in a nitrogen gas, then the specimens containing no titanium boride and no titanium carbide and the specimens containing 2% titanium boride by weight are sintered for two hours in an argon gas at 1700° C., then sintered for two hours in an argon gas at 1650° C. and 2000 atmospheres, then undergo surface oxidation treatment for one hour in air at 1400° C. The specimens each containing 3% titanium carbide by weight are sintered for two hours in an argon gas at 1650° C. and further sintered for two hours in an argon gas at 1600° C. and 2000 atmospheres, then undergo surface oxidation treatment for one hour in air at 1400° C. The specimens each containing 2% titanium boride by weight and 2% titanium carbide by weight are sintered for two hours in an argon gas at 1600° C. and further sintered for two hours in an argon gas at 1550° C. and 2000 atmospheres, then undergo surface oxidation treatment for one hour in air at 1400° C.

(7) Working of Connection Terminals

After the surface oxidation treatment as described above, the lamination end faces and tops of the terminal electrode sections are sandblasted as in the first and second examples. After the sandblasting, a palladium catalyst for nickel plating is printed and dried, and heat treatment is executed. Then, nickel electroless plating is applied, providing a resistive temperature sensor having the appearance shown in FIG. 12.

(8) Assembling and Working of Elements

As in the first and second examples, nickel electroless plating is applied and is cleaned and dried, then as shown in FIG. 8D, the electrode sections of the resistive temperature sensor are caught in lead members 41 and 42 and the lead members 41 and 42 are joined to the nickel plating portions of the electrode sections by silver brazing. The element body caught in the lead members 41 and 42 is inserted into an alumina tube 45, is filled with ceramic cement 46, and is dried for 30 minutes at 900° C., then undergoes heat treatment for two hours at 120° C. and is hardened.

Fourth Example (1) Manufacturing of Material

Resistor materials, print connection part materials, thick film conductor materials, and insulator materials are manufactured and resistor paint, conductor paint, and insulator paint are provided, as in the first to third examples. Four types of resistor paint and conductor paint different in titanium boride and titanium carbide contents are provided for specimen D group, specimen E group, and specimen F group different in metal silicide as composition of the resistor materials, print connection part materials, and thick film conductor materials, as described below:

Specimen D group: (D0) containing 40% chromium silicide 2.5 μm in average particle diameter by volume, 60% alumina 0.4 μm in average particle diameter by volume, no titanium boride, and no titanium carbide, (D1) containing 0.5% titanium boride 1 μm in average particle diameter by weight, (D2) containing 0.5% titanium carbide 2 μm in average particle diameter by weight, and (D3) containing 0.5% titanium boride by weight and 0.5% titanium carbide by weight.

Specimen E group: (E0) containing 40% iron silicide 3.4 μm in average particle diameter by volume, 60% alumina 0.4 μm in average particle diameter by volume, no titanium boride, and no titanium carbide, (E1) containing 0.5% titanium boride 1 μm in average particle diameter by weight, (E2) containing 0.5% titanium carbide 2 μm in average particle diameter by weight, and (E3) containing 0.5% titanium boride by weight and 0.5% titanium carbide by weight.

Specimen F group: (F0) containing 40% chromium silicide 2 μm in average particle diameter by volume, 60% alumina 0.4 μm in average particle diameter by volume, no titanium boride, and no titanium carbide, (F1) containing 0.5% titanium boride 1 μm in average particle diameter by weight, (F2) containing 0.5% titanium carbide 2 μm in average particle diameter by weight, and (F3) containing 0.5% titanium boride by weight and 0.5% titanium carbide by weight.

Insulator materials are manufactured and insulator paint is provided, as in the first to third examples.

(2) Manufacturing of Sheets

As in the first to third examples, application film of each of the thick film conductor paint and insulator paint is formed 80 mm in width on a polyethylene film by a sheet coater so that the thickness after drying the thick film conductor paint and insulator paint manufactured in the process in (1) becomes 35 μm, providing a conductor sheet and an insulator sheet. Then, the conductor sheet and the insulator sheet are cut 100 mm in length, as in the first to third examples.

(3) Manufacturing of Thick Films

Two thick films of patterns A and B (FIG. 3), four thick films of patterns C–F (FIG. 3) with connection part material containing the same amounts of titanium boride and titanium carbide as conductor 15 material embedded in through holes, and eight thick films of patterns J and K formed with punch parts 51 and 52 (FIG. 9A) 100 mm long, 80 mm wide, and 35 μm thick are provided by executing a process similar to that of the first, second, third example.

(4) Manufacturing of Laminate

As in the second and third examples, to laminate the thick films as the structure shown in FIGS. 10 and 11, pressure of 0.1 kg/cm² is applied for 10 seconds for lamination. After the predetermined lamination is complete, the laminate is removed from the stack board and is entered in a pressurization metal mold and pressure of 1.5 kg/cm² is applied for 300 seconds.

(5) Cutting of Laminate

Next, as in the first to third examples, the laminate is cut at 2.4-mm wide pitches by means of a diamond cutter, providing 30 laminate specimens each 50 mm long and 1.5 mm thick.

(6) Manufacturing of Sintered Body

The cut laminates are mounted on a boron nitride board and binders are removed from the laminates at 600° C. for two hours in a nitrogen gas, then the specimens are sintered for two hours in an argon gas at 1250° C., then further sintered for two hours in an argon gas at 1200° C. and 1500 atmospheres by a HIP method, then undergo surface oxidation treatment for one hour in air at 1400° C.

(7) Working of Connection Terminals

After the surface oxidation treatment as described above, the lamination end faces and tops of the terminal electrode sections are sandblasted as in the first to third examples. After the sandblasting, a palladium catalyst for nickel plating is printed and dried, and heat treatment is executed. Then, nickel electroless plating is applied, providing a resistive temperature sensor having the appearance shown in FIG. 12.

(8) Assembling and Working of Elements

As in the first to third examples, nickel electroless plating is applied and is cleaned and dried, then as shown in FIG. 8D, the electrode sections of the resistive temperature sensor are caught in lead members 41 and 42 and the lead members 41 and 42 are joined to the nickel plating portions of the electrode sections by silver brazing. The element body caught in the lead members 41 and 42 is inserted into an alumina tube 45, is filled with ceramic cement 46, and is dried for 30 minutes at 90° C., then undergoes heat treatment for two hours at 120° C. and is hardened.

Evaluation of Third and Fourth Examples

Tables 14 to 21 list the measurement results of the electrical characteristics of the temperature sensor assemblies of the third and fourth examples thus provided, for C0–C3, D0–D3, E0–E3, and F0–F3 using the materials having the composition shown in (1) above in the third and fourth examples.

Tables 14, 16, 18 and 20 list resistance values at temperatures when the temperature is changed in the range of 25° C. to 1300° C. and change rates to the resistance value at 25° C. for the specimens C0–C3, D0–D3, E0–E3, and F0–F3.

Tables 15, 18, 19, and 21 list resistance value changes with the passage of time by immersion in a niter solution at 400° C. and change rates to the resistance value at 25° C. for the specimens C0–C3, D0–D3, E0–E3, and F0–F3. FIGS. 17 to 24 are provided by graphing Tables 14 to 21.

According to Tables 14, 16, 18 and 20 and the graphs of FIGS. 17, 19, 21, and 23 corresponding thereto, it is clear that the temperature sensors of the third and fourth examples have resistance values largely changed in response to temperature change.

According to Tables 15, 17, 19 and 21 and the graphs of FIGS. 18, 20, 22, and 24 corresponding thereto, it is clear that the temperature sensors of the third and fourth examples have resistance values changed to predetermined values at sufficient response speed.

According to the present invention, metal silicide having the same degree of small heat expansion coefficient as alumina of an insulator is used as a resistor and a temperature sensor is formed of a laminate provided by laminating them alternately, thus providing an element body having an excellent thermal shock characteristic with little loss of the thermal shock characteristic of conductor material consisting essentially of metal silicide having a thermal shock characteristic superior to that of insulating ceramic material consisting essentially of alumina.

Since thermal shock characteristic is excellent, a sufficient mechanical strength is provided if the heat capacity of the temperature sensing section is small; the heat capacity of the temperature sensing section can be lessened and a temperature sensor responding at high speed can be provided.

The insulating ceramic material consisting essentially of alumina has sufficient heat resistance and environmental resistance. The conductor material consisting essentially of metal silicide such as molybdenum silicide undergoes heat treatment in air, whereby a silica film is formed on the surface. The conductor material consisting essentially of metal silicide such as molybdenum silicide formed with the silica film has sufficient heat resistance and environmental resistance. Thus, a temperature sensor having sufficient heat resistance and environmental resistance can be provided.

According to the present invention, the connection electrode section to the outside and the connection section between the electrode section and the resistor are also made of conductor material containing metal silicide and the laminate sintered body of them and the insulator consisting essentially of alumina is formed. Thus, improvement in heat resistance, environmental resistance, thermal shock characteristic, and strength and miniaturization of the whole temperature sensor element body can be accomplished.

According to the present invention, in the temperature sensor, the resistors adjoining each other in the lamination direction are connected by conductors each having a through hole filled with the same material as the resistor, the electrode section, or the connection section. Thus, the adhesion strength in the through hole formation portion between the resistors is provided.

According to the present invention, each of conductor layers making up the electrode section and the insulator layer consisting essentially of alumina are formed side by side as the same layer by thick film lamination and the electrode section substantially having a plurality of conductive layers laminated, sintered, and formed in one piece without intervention of insulators. Thus, electric resistance of the electrode section lessens, contributing to miniaturization.

According to the present invention, a conductor layer made of the same material as the electrode section, the connection section, or the temperature sensing section is placed between the resistors of the layers of the temperature sensing section containing the resistors via the insulator layer. Thus, metal silicide layers that can contribute to improvement in strength, thermal shock characteristic, etc., can be increased and the thermal shock characteristic can be improved as compared with a structure wherein the resistors of the layers are simply connected by the through holes.

According to the present invention, the temperature sensing section containing the resistors is made thinner than laminated temperature sensor element body. Thus, the heat capacity of the temperature sensing section can be furthermore lessened and an element body presenting a sufficient mechanical strength can be provided.

According to the present invention, the lamination section made of the same conductor material and insulator material as the temperature sensing section, the connection section, or the electrode section is formed surrounding the temperature sensing section at at least one of both ends of the temperature sensor element body in the lamination direction, thereby making the temperature sensing section thinner than the temperature sensor element body. Thus, an element body having the temperature sensing section only thinned can be provided by executing a lamination process of a sheet method or print method.

According to the present invention, at least the temperature sensing section except the electrode section is covered with a thin protective film consisting essentially of alumina or silica. Thus, far excellent heat resistance and environment resistance are provided.

According to the present invention, the metal silicides of the resistor and the electrode section and connection section conductors are set to 30% by volume and 50% by volume, thus a desired resistance value and conductivity are provided. Mullite and magnesia can be mixed for adjusting to a desired resistance value. At least silica is mixed in the insulator, thereby improving adhesion to the temperature sensing section and the connection section or the electrode section.

According to the present invention, at least either titanium boride or titanium carbide can be added to the resistor or the conductor material, thereby furthermore improving the thermal shock characteristic of the temperature sensor in addition the effect of claim 9.

TABLE 1

| Temperature [° C.] | Specimen A0 | | Specimen A1 | | Specimen A2 | | Specimen A3 | |
|---|---|---|---|---|---|---|---|---|
| | Resistance Value [Ω] | Change Rate [%] | Resistance Value [Ω] | Change Rate [%] | Resistance Value [Ω] | Change Rate [%] | Resistance Value [Ω] | Change Rate [%] |
| 25 | 67.02 | 0.0 | 68.19 | 0.0 | 65.85 | 0.0 | 67.15 | 0.0 |
| 100 | 90.95 | 35.7 | 89.68 | 31.5 | 84.52 | 28.4 | 84.78 | 26.3 |
| 200 | 112.08 | 67.2 | 108.64 | 59.3 | 101.01 | 53.4 | 100.34 | 49.4 |
| 300 | 146.56 | 118.7 | 139.59 | 104.7 | 127.91 | 94.3 | 125.75 | 87.3 |
| 400 | 180.12 | 168.8 | 169.72 | 148.9 | 154.09 | 134.0 | 150.47 | 124.1 |
| 500 | 214.24 | 219.7 | 200.36 | 193.8 | 180.72 | 174.4 | 175.61 | 161.5 |
| 600 | 247.01 | 268.6 | 229.78 | 237.0 | 206.29 | 213.3 | 199.75 | 197.5 |
| 700 | 296.56 | 342.5 | 274.26 | 302.2 | 244.95 | 272.0 | 236.25 | 251.8 |
| 800 | 339.10 | 406.0 | 312.46 | 358.2 | 278.14 | 322.4 | 267.60 | 298.5 |
| 900 | 381.42 | 469.1 | 350.44 | 413.9 | 311.16 | 372.5 | 298.77 | 345.0 |
| 1000 | 430.53 | 542.4 | 394.53 | 478.6 | 349.48 | 430.7 | 334.95 | 398.8 |
| 1100 | 484.08 | 622.3 | 442.61 | 549.1 | 391.26 | 494.2 | 374.41 | 457.6 |
| 1200 | 534.00 | 696.8 | 487.43 | 614.8 | 430.21 | 553.4 | 411.18 | 512.4 |
| 1300 | 577.41 | 761.6 | 526.39 | 672.0 | 464.08 | 604.8 | 443.16 | 560.0 |

TABLE 2

| Time [sec] | Specimen A0 | | Specimen A1 | | Specimen A2 | | Specimen A3 | |
|---|---|---|---|---|---|---|---|---|
| | Resistance Value [Ω] | Change Rate [%] | Resistance Value [Ω] | Change Rate [%] | Resistance Value [Ω] | Change Rate [%] | Resistance Value [Ω] | Change Rate [%] |
| 0.0 | 67.02 | 0.0 | 68.19 | 0.0 | 65.85 | 0.0 | 67.15 | 0.0 |
| 0.1 | 94.04 | 23.9 | 92.35 | 23.8 | 86.68 | 23.6 | 86.91 | 23.7 |
| 0.2 | 110.47 | 38.4 | 107.04 | 38.3 | 99.35 | 38.0 | 98.94 | 38.2 |
| 0.3 | 118.31 | 45.4 | 114.06 | 45.2 | 105.40 | 44.8 | 104.68 | 45.0 |
| 0.4 | 130.55 | 56.2 | 125.00 | 55.9 | 114.83 | 55.5 | 113.63 | 55.8 |
| 0.5 | 137.57 | 62.4 | 131.28 | 62.1 | 120.25 | 61.6 | 118.77 | 62.0 |
| 0.6 | 143.16 | 67.3 | 136.27 | 67.1 | 124.55 | 66.5 | 122.85 | 66.9 |
| 0.7 | 149.13 | 72.6 | 141.61 | 72.3 | 129.16 | 71.7 | 127.22 | 72.1 |
| 0.8 | 153.02 | 76.0 | 145.09 | 75.7 | 132.15 | 75.1 | 130.06 | 75.5 |
| 0.9 | 156.05 | 78.7 | 147.80 | 78.4 | 134.49 | 77.8 | 132.28 | 78.2 |
| 1.0 | 159.13 | 81.4 | 150.56 | 81.1 | 136.87 | 80.5 | 134.54 | 80.9 |
| 1.5 | 168.64 | 89.9 | 159.06 | 89.5 | 144.19 | 88.8 | 141.49 | 89.2 |
| 2.0 | 170.84 | 91.8 | 151.03 | 91.4 | 145.89 | 90.7 | 143.11 | 91.2 |
| 2.5 | 172.23 | 98.0 | 162.27 | 92.7 | 146.97 | 91.9 | 144.13 | 92.4 |
| 3.0 | 173.03 | 93.7 | 162.99 | 93.4 | 147.58 | 92.6 | 144.71 | 93.1 |
| 3.5 | 174.78 | 95.3 | 164.55 | 94.9 | 148.93 | 94.2 | 145.99 | 94.6 |
| 4.0 | 175.99 | 96.4 | 165.63 | 96.0 | 149.86 | 95.2 | 146.87 | 95.7 |
| 4.5 | 176.96 | 97.2 | 166.50 | 96.8 | 150.61 | 96.1 | 147.58 | 96.5 |
| 5.0 | 177.21 | 97.4 | 166.72 | 97.0 | 150.80 | 96.3 | 147.76 | 96.8 |
| 6.0 | 177.83 | 98.0 | 167.27 | 97.6 | 151.28 | 96.8 | 148.22 | 97.3 |
| 7.0 | 178.00 | 98.1 | 167.43 | 97.7 | 151.41 | 97.0 | 148.34 | 97.4 |
| 8.0 | 179.07 | 99.1 | 168.39 | 98.7 | 152.24 | 97.9 | 149.13 | 98.4 |
| 9.0 | 179.34 | 99.3 | 168.62 | 98.9 | 152.44 | 98.1 | 149.32 | 98.6 |
| 10.0 | 179.69 | 99.6 | 168.94 | 99.2 | 152.72 | 98.4 | 149.58 | 98.9 |

TABLE 3

| Temperature [° C.] | Specimen B1 | | Specimen B2 | | Specimen B3 | | Specimen B4 | | Specimen B5 | |
|---|---|---|---|---|---|---|---|---|---|---|
| | Resistance Value [Ω] | Change Rate [%] | Resistance Value [Ω] | Change Rate [%] | Resistance Value [Ω] | Change Rate [%] | Resistance Value [Ω] | Change Rate [%] | Resistance Value [Ω] | Change Rate [%] |
| 25 | 67.22 | 0.0 | 67.49 | 0.0 | 68.12 | 0.0 | 68.25 | 0.0 | 67.85 | 0.0 |
| 100 | 89.55 | 33.2 | 85.43 | 26.6 | 83.12 | 22.0 | 83.59 | 22.5 | 81.64 | 20.3 |
| 200 | 109.26 | 62.5 | 101.25 | 50.0 | 96.37 | 41.5 | 97.12 | 42.3 | 93.80 | 38.3 |
| 300 | 141.42 | 110.4 | 127.09 | 88.3 | 117.98 | 73.2 | 119.21 | 74.7 | 113.66 | 67.5 |
| 400 | 172.73 | 156.9 | 152.23 | 125.6 | 139.02 | 104.1 | 140.72 | 106.2 | 132.99 | 96.0 |
| 500 | 204.55 | 204.3 | 177.80 | 163.4 | 160.40 | 135.5 | 162.58 | 138.2 | 152.65 | 125.0 |
| 600 | 235.13 | 249.8 | 202.35 | 199.8 | 180.95 | 165.5 | 183.58 | 169.0 | 171.53 | 152.8 |
| 700 | 281.34 | 318.5 | 239.48 | 254.8 | 212.01 | 211.2 | 215.32 | 215.5 | 200.06 | 194.9 |
| 800 | 321.03 | 377.5 | 271.35 | 302.1 | 238.68 | 250.4 | 242.58 | 255.4 | 224.57 | 231.0 |
| 900 | 360.50 | 436.3 | 303.06 | 349.0 | 265.20 | 289.3 | 269.69 | 295.1 | 248.94 | 266.9 |
| 1000 | 406.32 | 504.4 | 339.86 | 403.6 | 295.99 | 334.5 | 301.16 | 341.2 | 277.23 | 308.6 |
| 1100 | 456.28 | 578.8 | 379.98 | 463.0 | 329.56 | 383.8 | 335.47 | 391.5 | 308.08 | 354.1 |
| 1200 | 502.84 | 648.0 | 417.38 | 518.4 | 360.85 | 429.7 | 367.45 | 438.4 | 336.83 | 396.4 |
| 1300 | 543.33 | 708.3 | 449.90 | 566.6 | 388.06 | 459.7 | 395.26 | 479.1 | 351.83 | 433.3 |

TABLE 4

| Time [sec] | Specimen B1 | | Specimen B2 | | Specimen B3 | | Specimen B4 | | Specimen B5 | |
|---|---|---|---|---|---|---|---|---|---|---|
| | Resistance Value [Ω] | Change Rate [%] | Resistance Value [Ω] | Change Rate [%] | Resistance Value [Ω] | Change Rate [%] | Resistance Value [Ω] | Change Rate [%] | Resistance Value [Ω] | Change Rate [%] |
| 0.0 | 67.22 | 0.0 | 67.49 | 0.0 | 68.12 | 0.0 | 68.25 | 0.0 | 67.85 | 0.0 |
| 0.1 | 92.11 | 23.6 | 87.15 | 23.2 | 85.21 | 24.1 | 85.08 | 23.2 | 83.01 | 23.3 |
| 0.2 | 107.44 | 38.1 | 99.41 | 37.7 | 95.39 | 38.5 | 95.54 | 37.7 | 92.40 | 37.7 |
| 0.3 | 114.76 | 45.1 | 105.27 | 44.6 | 100.25 | 45.3 | 100.53 | 44.5 | 95.87 | 44.6 |
| 0.4 | 125.17 | 55.9 | 114.39 | 55.3 | 107.82 | 56.0 | 108.31 | 55.3 | 103.86 | 55.3 |
| 0.5 | 132.72 | 62.1 | 119.64 | 61.5 | 112.18 | 62.1 | 112.78 | 61.5 | 107.87 | 61.4 |
| 0.6 | 137.93 | 67.0 | 123.81 | 65.5 | 115.63 | 67.0 | 116.34 | 66.4 | 111.05 | 66.3 |
| 0.7 | 143.50 | 72.3 | 128.26 | 71.7 | 119.34 | 72.2 | 120.14 | 71.6 | 114.46 | 71.6 |
| 0.8 | 147.13 | 75.7 | 131.15 | 75.1 | 121.74 | 75.6 | 122.61 | 75.0 | 116.68 | 75.0 |
| 0.9 | 149.96 | 78.4 | 133.43 | 77.8 | 123.62 | 78.3 | 124.54 | 77.7 | 118.41 | 77.6 |
| 1.0 | 152.83 | 81.1 | 135.73 | 80.5 | 125.53 | 81.0 | 126.50 | 80.4 | 120.17 | 80.3 |
| 1.5 | 161.70 | 89.6 | 142.82 | 88.9 | 131.42 | 89.3 | 132.55 | 88.7 | 125.60 | 88.6 |
| 2.0 | 163.76 | 91.5 | 144.47 | 90.8 | 132.78 | 91.2 | 133.95 | 90.7 | 126.86 | 90.6 |
| 2.5 | 165.06 | 92.7 | 145.51 | 92.1 | 133.65 | 92.4 | 134.84 | 91.9 | 127.65 | 91.8 |
| 3.0 | 165.80 | 93.4 | 146.10 | 92.8 | 134.14 | 93.1 | 135.35 | 92.6 | 128.11 | 92.5 |
| 3.5 | 167.43 | 95.0 | 147.41 | 94.3 | 135.22 | 94.7 | 135.46 | 94.1 | 129.11 | 94.0 |
| 4.0 | 168.56 | 96.1 | 148.31 | 95.4 | 135.97 | 95.7 | 137.23 | 95.2 | 129.80 | 95.1 |
| 4.5 | 169.46 | 96.9 | 149.03 | 96.2 | 136.57 | 96.6 | 137.84 | 96.0 | 130.35 | 95.9 |
| 5.0 | 169.69 | 97.1 | 149.22 | 96.4 | 136.73 | 96.8 | 138.00 | 96.3 | 130.49 | 96.2 |
| 6.0 | 170.27 | 97.7 | 149.68 | 97.0 | 137.11 | 97.3 | 138.40 | 96.8 | 130.85 | 96.7 |
| 7.0 | 170.44 | 97.8 | 149.81 | 97.1 | 137.22 | 97.5 | 138.51 | 96.9 | 130.95 | 96.9 |
| 8.0 | 171.43 | 98.8 | 150.61 | 98.1 | 137.88 | 98.4 | 139.19 | 97.9 | 131.56 | 97.8 |
| 9.0 | 171.68 | 99.0 | 150.81 | 98.3 | 138.05 | 98.6 | 139.36 | 98.1 | 131.71 | 98.0 |
| 10.0 | 172.01 | 99.3 | 151.07 | 98.6 | 138.27 | 98.9 | 139.58 | 98.4 | 131.91 | 98.3 |

TABLE 5

| Specimen | Addition Amount [wt %] | | |
|---|---|---|---|
| | Titanium Carbide | Titanium Boride | Total |
| 1* | 0.05 | 0.0 | 0.05 |
| 2 | 0.05 | 0.05 | 0.1 |
| 3 | 0.05 | 0.1 | 0.15 |
| 4 | 0.05 | 0.5 | 0.55 |
| 5 | 0.05 | 1.0 | 1.05 |
| 6 | 0.05 | 2.0 | 2.05 |
| 7 | 0.05 | 3.0 | 3.05 |
| 8 | 0.05 | 4.0 | 4.05 |
| 9 | 0.05 | 5.0 | 5.05 |
| 10 | 0.1 | 0.0 | 0.1 |
| 11 | 0.1 | 0.05 | 0.15 |
| 12 | 0.1 | 0.1 | 0.2 |
| 13 | 0.1 | 0.5 | 0.6 |
| 14 | 0.1 | 1.0 | 1.1 |
| 15 | 0.1 | 2.0 | 2.1 |
| 16 | 0.1 | 3.0 | 3.1 |
| 17 | 0.1 | 4.0 | 4.1 |

TABLE 6

| Specimen | Addition Amount [wt %] | | |
|---|---|---|---|
| | Titanium Carbide | Titanium Boride | Total |
| 18 | 0.1 | 5.0 | 5.1 |
| 19 | 0.5 | 0.0 | 0.5 |
| 20 | 0.5 | 0.05 | 0.55 |
| 21 | 0.5 | 0.1 | 0.6 |
| 22 | 0.5 | 0.5 | 1.0 |
| 23 | 0.5 | 1.0 | 1.5 |
| 24 | 0.5 | 2.0 | 2.5 |
| 25 | 0.5 | 3.0 | 3.5 |
| 26 | 0.5 | 4.0 | 4.5 |
| 27 | 0.5 | 5.0 | 5.5 |
| 28 | 1.0 | 0.0 | 1.0 |
| 29 | 1.0 | 0.05 | 1.05 |
| 30 | 1.0 | 0.1 | 1.1 |
| 31 | 1.0 | 0.5 | 1.5 |
| 32 | 1.0 | 1.0 | 2.0 |
| 33 | 1.0 | 2.0 | 3.0 |
| 34 | 1.0 | 3.0 | 4.0 |

TABLE 7

| Specimen | Addition Amount [wt %] | | |
|---|---|---|---|
| | Titanium Carbide | Titanium Boride | Total |
| 35 | 1.0 | 4.0 | 5.0 |
| 36* | 1.0 | 5.0 | 6.0 |
| 37 | 2.0 | 0.0 | 2.0 |
| 38 | 2.0 | 0.05 | 2.05 |
| 39 | 2.0 | 0.1 | 2.1 |
| 40 | 2.0 | 0.5 | 2.5 |
| 41 | 2.0 | 1.0 | 3.0 |
| 42 | 2.0 | 2.0 | 4.0 |
| 43 | 2.0 | 3.0 | 5.0 |
| 44* | 2.0 | 4.0 | 6.0 |
| 45* | 2.0 | 5.0 | 7.0 |
| 46 | 3.0 | 0.0 | 3.05 |
| 47 | 3.0 | 0.05 | 3.05 |
| 48 | 3.0 | 0.1 | 3.1 |
| 49 | 3.0 | 0.5 | 3.5 |
| 50 | 3.0 | 1.0 | 4.0 |
| 51 | 3.0 | 2.0 | 5.0 |

TABLE 8

| Specimen | Addition Amount [wt %] | | |
|---|---|---|---|
| | Titanium Carbide | Titanium Boride | Total |
| 52* | 3.0 | 3.0 | 6.0 |
| 53* | 3.0 | 4.0 | 7.0 |
| 54* | 3.0 | 5.0 | 8.0 |
| 55 | 4.0 | 0.0 | 4.0 |
| 56 | 4.0 | 0.05 | 4.05 |
| 57 | 4.0 | 0.1 | 4.1 |
| 58 | 4.0 | 0.5 | 4.5 |
| 59 | 4.0 | 1.0 | 5.0 |
| 60* | 4.0 | 2.0 | 6.0 |
| 61* | 4.0 | 3.0 | 7.0 |
| 62* | 4.0 | 4.0 | 8.0 |
| 63* | 4.0 | 5.0 | 9.0 |
| 64 | 5.0 | 0.0 | 5.0 |
| 65 | 5.0 | 0.05 | 5.05 |
| 66 | 5.0 | 0.1 | 5.1 |
| 67 | 5.0 | 0.5 | 5.5 |
| 68* | 5.0 | 1.0 | 6.0 |

TABLE 9

| Specimen | Sintered Body Density to Theoretical Density (%) | Resistance Charge Rate (R1500/R25) | Heat Resistance Impact Performance 10 sec IN, 10 sec OUT Number of Breakage Cycles |
|---|---|---|---|
| 1* | 92.5 | 10.3 | 255,000 |
| 2 | 97.4 | 10.2 | 238,000 |
| 3 | 97.3 | 10.5 | 274,000 |
| 4 | 97.6 | 10.1 | 310,000 |
| 5 | 97.8 | 9.5 | 345,000 |
| 6 | 98.6 | 8.4 | 362,000 |
| 7 | 98.4 | 7.6 | 260,000 |
| 8 | 98.9 | 6.3 | 183,000 |
| 9 | 99.4 | 5.8 | 56,000 |
| 10 | 97.2 | 10.1 | 223,000 |
| 11 | 97.3 | 10.3 | 252,000 |
| 12 | 97.6 | 10.1 | 275,000 |
| 13 | 97.2 | 10.2 | 245,000 |
| 14 | 97.1 | 9.8 | 241,000 |
| 15 | 98.8 | 8.6 | 263,000 |
| 16 | 98.5 | 7.6 | 289,000 |
| 17 | 98.7 | 6.6 | 210,000 |

TABLE 10

| Specimen | Sintered Body Density to Theoretical Density (%) | Resistance Charge Rate (R1500/R25) | Heat Resistance Impact Performance 10 sec IN, 10 sec OUT Number of Breakage Cycles |
|---|---|---|---|
| 18 | 99.1 | 6.1 | 168,000 |
| 19 | 97.3 | 10.5 | 285,000 |
| 20 | 97.1 | 10.3 | 261,000 |
| 21 | 97.3 | 9.1 | 237,000 |
| 22 | 97.8 | 9.0 | 296,000 |
| 23 | 98.5 | 8.9 | 223,000 |
| 24 | 98.4 | 8.2 | 215,000 |
| 25 | 98.9 | 7.3 | 195,000 |
| 26 | 99.3 | 6.6 | 169,000 |
| 27 | 99.5 | 6.4 | 146,000 |
| 28 | 97.1 | 9.2 | 289,000 |
| 29 | 97.1 | 8.7 | 362,000 |
| 30 | 97.3 | 8.3 | 321,000 |
| 31 | 98.6 | 8.1 | 264,000 |
| 32 | 98.2 | 7.2 | 237,000 |
| 33 | 98.6 | 6.8 | 205,000 |
| 34 | 98.2 | 6.1 | 199,000 |

TABLE 11

| Specimen | Sintered Body Density to Theoretical Density (%) | Resistance Charge Rate (R1500/R25) | Heat Resistance Impact Performance 10 sec IN, 10 sec OUT Number of Breakage Cycles |
|---|---|---|---|
| 35 | 99.1 | 6.2 | 116,000 |
| 36* | 99.3 | 5.0 | 35,000 |
| 37 | 98.9 | 8.6 | 265,000 |
| 38 | 98.9 | 8.1 | 224,000 |
| 39 | 98.8 | 7.7 | 251,000 |
| 40 | 98.8 | 7.2 | 218,000 |
| 41 | 98.7 | 7.0 | 203,000 |
| 42 | 98.8 | 6.5 | 177,000 |
| 43 | 99.2 | 6.3 | 127,000 |
| 44* | 99.1 | 5.1 | 67,000 |
| 45* | 98.9 | 4.1 | 42,000 |
| 46 | 98.8 | 8.7 | 187,000 |
| 47 | 98.4 | 8.1 | 165,000 |
| 48 | 98.2 | 7.6 | 203,000 |
| 49 | 98.3 | 7.1 | 146,000 |
| 50 | 98.1 | 6.6 | 122,000 |
| 51 | 98.9 | 5.6 | 119,000 |

TABLE 12

| Specimen | Sintered Body Density to Theoretical Density (%) | Resistance Charge Rate (R1500/R25) | Heat Resistance Impact Performance 10 sec IN, 10 sec OUT Number of Breakage Cycles |
|---|---|---|---|
| 52* | 99.2 | 4.9 | 65,000 |
| 53* | 99.6 | 4.1 | 42,000 |
| 54* | 99.1 | 3.1 | 12,000 |
| 55 | 98.9 | 7.2 | 196,000 |
| 56 | 99.0 | 7.1 | 165,000 |
| 57 | 99.0 | 7.1 | 195,000 |
| 58 | 98.9 | 7.0 | 201,000 |
| 59 | 99.2 | 6.2 | 146,000 |
| 60* | 99.3 | 5.1 | 75,000 |

TABLE 12-continued

| Specimen | Sintered Body Density to Theoretical Density (%) | Resistance Charge Rate (R1500/R25) | Heat Resistance Impact Performance 10 sec IN, 10 sec OUT Number of Breakage Cycles |
|---|---|---|---|
| 61* | 99.0 | 4.2 | 45,000 |
| 62* | 98.9 | 3.6 | 36,000 |
| 63* | 98.8 | 2.1 | 11,000 |
| 64 | 98.8 | 6.8 | 185,000 |
| 65 | 98.9 | 6.7 | 205,000 |
| 66 | 98.7 | 6.5 | 196,000 |
| 67 | 98.7 | 5.7 | 152,000 |
| 68* | 98.6 | 4.9 | 52,000 |

TABLE 14

| | Specimen C0 | | Specimen C1 | | Specimen C2 | | Specimen C3 | |
|---|---|---|---|---|---|---|---|---|
| Temperature [°C.] | Resistance Value [Ω] | Change Rate [%] | Resistance Value [Ω] | Change Rate [%] | Resistance Value [Ω] | Change Rate [%] | Resistance Value [Ω] | Change Rate [%] |
| 25 | 52.11 | 0.0 | 53.13 | 0.0 | 51.09 | 0.0 | 52.39 | 0.0 |
| 100 | 69.67 | 33.7 | 67.62 | 27.3 | 63.92 | 25.1 | 64.07 | 22.3 |
| 200 | 87.15 | 67.3 | 82.03 | 54.4 | 76.69 | 50.1 | 75.70 | 44.5 |
| 300 | 112.92 | 116.7 | 103.28 | 94.4 | 95.51 | 87.0 | 92.85 | 77.2 |
| 400 | 141.12 | 170.8 | 126.53 | 138.2 | 116.11 | 127.3 | 111.61 | 113.0 |
| 500 | 166.09 | 218.7 | 147.13 | 176.9 | 134.35 | 163.0 | 128.22 | 144.8 |
| 600 | 192.62 | 269.7 | 169.01 | 218.1 | 153.73 | 200.9 | 145.87 | 178.5 |
| 700 | 230.64 | 342.6 | 200.36 | 277.1 | 181.50 | 255.3 | 171.16 | 226.7 |
| 800 | 262.68 | 404.1 | 226.78 | 320.9 | 204.91 | 301.1 | 192.48 | 267.4 |
| 900 | 296.64 | 469.3 | 254.79 | 379.6 | 229.72 | 349.7 | 215.07 | 310.6 |
| 1000 | 335.88 | 544.6 | 287.15 | 440.5 | 258.38 | 405.8 | 241.18 | 360.4 |
| 1100 | 377.54 | 624.6 | 321.50 | 505.2 | 288.81 | 465.4 | 268.90 | 413.3 |
| 1200 | 417.41 | 701.1 | 354.38 | 567.0 | 317.94 | 522.4 | 295.42 | 463.9 |
| 1300 | 447.52 | 758.9 | 379.21 | 613.8 | 339.93 | 565.4 | 315.46 | 502.2 |

TABLE 15

| | Specimen C0 | | Specimen C1 | | Specimen C2 | | Specimen C3 | |
|---|---|---|---|---|---|---|---|---|
| Time [sec] | Resistance Value [Ω] | Change Rate [%] | Resistance Value [Ω] | Change Rate [%] | Resistance Value [Ω] | Change Rate [%] | Resistance Value [Ω] | Change Rate [%] |
| 0.0 | 52.11 | 0.0 | 53.13 | 0.0 | 51.09 | 0.0 | 52.39 | 0.0 |
| 0.1 | 72.70 | 23.1 | 70.23 | 23.5 | 66.37 | 23.5 | 65.96 | 22.9 |
| 0.2 | 85.67 | 37.7 | 80.86 | 37.8 | 75.71 | 37.9 | 74.51 | 37.4 |
| 0.3 | 91.85 | 44.7 | 85.93 | 44.7 | 80.17 | 44.7 | 78.59 | 44.2 |
| 0.4 | 101.50 | 55.5 | 93.83 | 55.5 | 87.11 | 55.4 | 84.95 | 55.0 |
| 0.5 | 107.04 | 61.7 | 98.38 | 61.6 | 91.11 | 61.6 | 88.61 | 61.2 |
| 0.6 | 111.45 | 66.7 | 101.99 | 66.6 | 94.28 | 66.4 | 91.51 | 66.1 |
| 0.7 | 116.16 | 72.0 | 105.85 | 71.8 | 97.67 | 71.7 | 94.62 | 71.3 |
| 0.8 | 119.22 | 75.4 | 108.36 | 75.2 | 99.88 | 75.0 | 96.63 | 74.7 |
| 0.9 | 121.62 | 78.1 | 110.33 | 77.9 | 101.61 | 77.7 | 98.22 | 77.4 |
| 1.0 | 214.05 | 80.8 | 112.32 | 80.6 | 103.36 | 80.4 | 99.82 | 80.1 |
| 1.5 | 131.54 | 89.2 | 118.46 | 89.0 | 108.76 | 88.7 | 104.76 | 88.4 |
| 2.0 | 133.28 | 91.2 | 119.89 | 90.9 | 110.01 | 90.6 | 105.91 | 90.4 |
| 2.5 | 135.31 | 93.5 | 121.55 | 93.2 | 111.47 | 92.9 | 107.25 | 92.6 |
| 3.0 | 135.82 | 94.0 | 121.97 | 93.8 | 111.84 | 93.4 | 107.58 | 93.2 |
| 3.5 | 137.86 | 96.3 | 123.65 | 96.1 | 113.31 | 95.7 | 108.93 | 95.5 |
| 4.0 | 137.35 | 95.8 | 123.22 | 95.5 | 112.94 | 95.1 | 108.59 | 94.9 |

TABLE 15-continued

|  | Specimen C0 | | Specimen C1 | | Specimen C2 | | Specimen C3 | |
| --- | --- | --- | --- | --- | --- | --- | --- | --- |
| Time [sec] | Resistance Value [Ω] | Change Rate [%] | Resistance Value [Ω] | Change Rate [%] | Resistance Value [Ω] | Change Rate [%] | Resistance Value [Ω] | Change Rate [%] |
| 4.5 | 138.11 | 96.6 | 123.85 | 96.3 | 113.49 | 96.0 | 109.09 | 95.7 |
| 5.0 | 136.30 | 96.8 | 124.01 | 96.6 | 113.63 | 96.2 | 109.22 | 96.0 |
| 6.0 | 138.79 | 97.4 | 124.41 | 97.1 | 113.98 | 96.7 | 109.54 | 96.5 |
| 7.0 | 138.93 | 97.5 | 124.52 | 97.3 | 114.08 | 96.9 | 109.63 | 96.7 |
| 8.0 | 139.77 | 98.5 | 125.21 | 98.2 | 114.69 | 97.8 | 110.19 | 97.6 |
| 9.0 | 139.98 | 98.7 | 125.38 | 98.4 | 114.84 | 98.0 | 110.32 | 97.8 |
| 10.0 | 140.26 | 99.0 | 125.61 | 98.7 | 115.04 | 98.4 | 110.51 | 98.1 |

15

TABLE 16

|  | Specimen D0 | | Specimen D1 | | Specimen D2 | | Specimen D3 | |
| --- | --- | --- | --- | --- | --- | --- | --- | --- |
| Temperature [° C.] | Resistance Value [Ω] | Change Rate [%] | Resistance Value [Ω] | Change Rate [%] | Resistance Value [Ω] | Change Rate [%] | Resistance Value [Ω] | Change Rate [%] |
| 25 | 450.38 | 0.0 | 455.88 | 0.0 | 444.38 | 0.0 | 449.68 | 0.0 |
| 100 | 616.42 | 36.9 | 619.01 | 35.8 | 604.19 | 36.0 | 597.58 | 32.9 |
| 200 | 758.90 | 68.5 | 758.99 | 66.5 | 741.33 | 66.8 | 724.50 | 61.1 |
| 300 | 1000.62 | 122.2 | 996.47 | 118.6 | 973.98 | 119.2 | 939.81 | 109.0 |
| 400 | 1240.65 | 175.5 | 1232.28 | 170.3 | 1205.00 | 171.2 | 1153.62 | 156.5 |
| 500 | 1439.09 | 219.5 | 1427.24 | 213.1 | 1396.00 | 214.1 | 1330.38 | 195.9 |
| 600 | 1682.82 | 273.6 | 1666.69 | 265.6 | 1630.58 | 266.9 | 1547.49 | 244.1 |
| 700 | 2003.55 | 344.9 | 1981.79 | 334.7 | 1939.28 | 336.4 | 1833.18 | 307.7 |
| 800 | 2290.61 | 408.6 | 2263.82 | 396.6 | 2215.57 | 398.6 | 2088.89 | 364.5 |
| 900 | 2580.55 | 473.0 | 2548.67 | 459.1 | 2494.64 | 461.4 | 2347.16 | 422.0 |
| 1000 | 2925.40 | 549.5 | 2887.47 | 533.4 | 2826.55 | 536.1 | 2654.34 | 490.3 |
| 1100 | 3282.39 | 628.8 | 3238.19 | 610.3 | 3170.15 | 613.4 | 2972.32 | 561.0 |
| 1200 | 3637.27 | 707.6 | 3586.84 | 686.8 | 3511.71 | 690.3 | 3288.44 | 631.3 |
| 1300 | 3893.80 | 764.6 | 3838.87 | 742.1 | 3758.62 | 745.8 | 3516.95 | 682.1 |

TABLE 17

|  | Specimen D0 | | Specimen D1 | | Specimen D2 | | Specimen D3 | |
| --- | --- | --- | --- | --- | --- | --- | --- | --- |
| Time [sec] | Resistance Value [Ω] | Change Rate [%] | Resistance Value [Ω] | Change Rate [%] | Resistance Value [Ω] | Change Rate [%] | Resistance Value [Ω] | Change Rate [%] |
| 0.0 | 450.38 | 0.0 | 455.88 | 0.0 | 444.38 | 0.0 | 449.68 | 0.0 |
| 0.1 | 633.90 | 23.2 | 636.51 | 23.3 | 854.27 | 53.9 | 623.61 | 24.7 |
| 0.2 | 748.44 | 37.7 | 1135.58 | 87.5 | 734.80 | 38.2 | 724.73 | 39.1 |
| 0.3 | 803.62 | 44.7 | 800.78 | 44.4 | 787.17 | 45.1 | 773.44 | 46.0 |
| 0.4 | 731.15 | 35.5 | 883.61 | 55.1 | 868.40 | 55.7 | 848.99 | 56.7 |
| 0.5 | 938.42 | 61.8 | 931.25 | 61.2 | 915.12 | 61.9 | 892.45 | 62.9 |
| 0.6 | 977.80 | 66.7 | 969.37 | 66.1 | 952.50 | 66.8 | 927.22 | 67.8 |
| 0.7 | 1018.90 | 71.9 | 1009.15 | 71.3 | 991.51 | 71.9 | 963.50 | 73.0 |
| 0.8 | 1046.45 | 75.4 | 1035.82 | 74.7 | 1017.66 | 75.4 | 987.82 | 76.4 |
| 0.9 | 1068.04 | 78.2 | 1056.71 | 77.4 | 1038.15 | 78.1 | 1006.88 | 79.2 |
| 1.0 | 1089.02 | 80.8 | 1077.01 | 80.0 | 1058.06 | 80.7 | 1025.40 | 81.8 |
| 1.5 | 1155.79 | 89.3 | 1141.65 | 88.3 | 1121.45 | 89.0 | 1084.35 | 90.2 |
| 2.0 | 1171.50 | 91.3 | 1156.85 | 90.3 | 1136.36 | 91.0 | 1098.23 | 92.1 |
| 2.5 | 1181.20 | 92.5 | 1166.24 | 91.5 | 1145.56 | 92.2 | 1106.79 | 93.3 |
| 3.0 | 1186.25 | 93.1 | 1171.12 | 92.1 | 1150.35 | 92.8 | 1111.24 | 94.0 |
| 3.5 | 1198.79 | 94.7 | 1183.27 | 93.7 | 1162.26 | 94.4 | 1122.32 | 95.6 |
| 4.0 | 1207.63 | 95.8 | 1191.82 | 94.8 | 1170.65 | 95.5 | 1130.12 | 96.7 |
| 4.5 | 1213.73 | 96.6 | 1197.72 | 95.5 | 1176.44 | 96.2 | 1135.50 | 97.4 |
| 5.0 | 1215.91 | 96.9 | 1199.83 | 95.8 | 1178.51 | 96.5 | 1137.43 | 97.7 |
| 6.0 | 1220.46 | 97.4 | 1204.24 | 96.4 | 1182.83 | 97.1 | 1141.45 | 98.3 |
| 7.0 | 1221.04 | 97.5 | 1204.80 | 96.5 | 1183.38 | 97.2 | 1141.96 | 98.3 |
| 8.0 | 1229.10 | 98.5 | 1212.60 | 97.5 | 1191.03 | 98.2 | 1149.08 | 99.4 |
| 9.0 | 1230.31 | 98.7 | 1213.77 | 97.6 | 1192.18 | 98.3 | 1150.14 | 99.5 |
| 10.0 | 1233.42 | 99.1 | 1216.78 | 98.0 | 1195.13 | 98.7 | 1152.89 | 99.9 |

TABLE 18

| Temperature [° C.] | Specimen E0 Resistance Value [Ω] | Change Rate [%] | Specimen E1 Resistance Value [Ω] | Change Rate [%] | Specimen E2 Resistance Value [Ω] | Change Rate [%] | Specimen E3 Resistance Value [Ω] | Change Rate [%] |
|---|---|---|---|---|---|---|---|---|
| 25 | 752 | 0.0 | 761 | 0.0 | 743 | 0.0 | 746 | 0.0 |
| 100 | 991 | 31.8 | 995 | 30.8 | 973 | 31.0 | 960 | 28.3 |
| 200 | 1,229 | 63.4 | 1,229 | 61.5 | 1,203 | 61.8 | 1,172 | 56.5 |
| 300 | 1,601 | 112.9 | 1,594 | 109.6 | 1,561 | 110.1 | 1,502 | 100.7 |
| 400 | 1,986 | 164.1 | 1,972 | 159.2 | 1,932 | 160.0 | 1,844 | 146.4 |
| 500 | 2,347 | 212.1 | 2,326 | 205.8 | 2,280 | 206.9 | 2,164 | 189.2 |
| 600 | 2,754 | 266.1 | 2,725 | 258.3 | 2,672 | 259.6 | 2,525 | 237.4 |
| 700 | 3,318 | 341.1 | 3,279 | 331.1 | 3,216 | 332.8 | 3,026 | 304.3 |
| 800 | 3,774 | 401.7 | 3,727 | 389.9 | 3,655 | 391.9 | 3,431 | 358.4 |
| 900 | 4,265 | 467.0 | 4,209 | 453.3 | 4,129 | 455.6 | 3,867 | 416.6 |
| 1000 | 4,817 | 540.4 | 4,751 | 524.5 | 4,661 | 527.2 | 4,357 | 482.2 |
| 1100 | 5,351 | 611.4 | 5,275 | 593.4 | 5,175 | 596.4 | 4,831 | 545.5 |
| 1200 | 5,988 | 696.1 | 5,900 | 675.6 | 5,789 | 679.0 | 5,397 | 621.0 |
| 1300 | 6,439 | 756.0 | 6,342 | 733.8 | 6,224 | 737.5 | 5,797 | 674.5 |

TABLE 19

| Time [sec] | Specimen E0 Resistance Value [Ω] | Change Rate [%] | Specimen E1 Resistance Value [Ω] | Change Rate [%] | Specimen E2 Resistance Value [Ω] | Change Rate [%] | Specimen E3 Resistance Value [Ω] | Change Rate [%] |
|---|---|---|---|---|---|---|---|---|
| 0.0 | 752 | 0.0 | 761 | 0.0 | 743 | 0.0 | 748 | 0.0 |
| 0.1 | 1,033 | 22.7 | 1,060 | 24.5 | 1,023 | 23.7 | 984 | 22.3 |
| 0.2 | 1,213 | 37.3 | 1,235 | 38.8 | 1,190 | 38.0 | 1,135 | 36.7 |
| 0.3 | 1,300 | 44.4 | 1,319 | 45.6 | 1,271 | 44.9 | 1,208 | 43.6 |
| 0.4 | 1,434 | 55.3 | 1,449 | 56.3 | 1,396 | 55.5 | 1,321 | 54.3 |
| 0.5 | 1,512 | 61.6 | 1,525 | 62.5 | 1,469 | 61.6 | 1,386 | 60.5 |
| 0.6 | 1,573 | 66.5 | 1,584 | 67.3 | 1,526 | 66.5 | 1,437 | 65.4 |
| 0.7 | 1,639 | 71.9 | 1,648 | 72.6 | 1,587 | 71.7 | 1,493 | 70.7 |
| 0.8 | 1,682 | 75.4 | 1,690 | 75.9 | 1,627 | 75.1 | 1,529 | 74.1 |
| 0.9 | 1,715 | 78.0 | 1,722 | 78.5 | 1,658 | 77.7 | 1,556 | 76.7 |
| 1.0 | 1,749 | 80.8 | 1,755 | 81.3 | 1,690 | 80.4 | 1,585 | 79.4 |
| 1.5 | 1,836 | 87.9 | 1,839 | 88.1 | 1,770 | 87.3 | 1,658 | 86.4 |
| 2.0 | 1,887 | 91.9 | 1,888 | 92.1 | 1,818 | 91.3 | 1,701 | 90.4 |
| 2.5 | 1,912 | 94.0 | 1,912 | 94.1 | 1,841 | 93.2 | 1,721 | 92.4 |
| 3.0 | 1,933 | 95.7 | 1,933 | 95.8 | 1,860 | 94.9 | 1,739 | 94.1 |
| 3.5 | 1,952 | 97.3 | 1,952 | 97.3 | 1,879 | 96.4 | 1,756 | 95.6 |
| 4.0 | 1,937 | 96.0 | 1,937 | 96.1 | 1,864 | 95.2 | 1,743 | 94.4 |
| 4.5 | 1,946 | 95.7 | 1,945 | 96.8 | 1,872 | 95.9 | 1,750 | 95.1 |
| 5.5 | 1,948 | 96.9 | 1,947 | 97.0 | 1,875 | 96.1 | 1,752 | 95.3 |
| 6.0 | 1,955 | 97.5 | 1,955 | 97.6 | 1,881 | 96.7 | 1,758 | 95.9 |
| 7.0 | 1,958 | 97.7 | 1,957 | 97.8 | 1,884 | 96.9 | 1,761 | 96.1 |
| 8.0 | 1,969 | 98.6 | 1,968 | 98.7 | 1,894 | 97.8 | 1,770 | 97.0 |
| 9.0 | 1,973 | 98.9 | 1,972 | 99.0 | 1,898 | 98.1 | 1,773 | 97.3 |
| 10.0 | 1,976 | 99.1 | 1,974 | 99.2 | 1,900 | 98.3 | 1,775 | 97.5 |

TABLE 20

| Temperature [° C.] | Specimen F0 Resistance Value [Ω] | Change Rate [%] | Specimen F1 Resistance Value [Ω] | Change Rate [%] | Specimen F2 Resistance Value [Ω] | Change Rate [%] | Specimen F3 Resistance Value [Ω] | Change Rate [%] |
|---|---|---|---|---|---|---|---|---|
| 25 | 14.86 | 0.0 | 15.11 | 0.0 | 14.56 | 0.0 | 15.09 | 0.0 |
| 100 | 20.01 | 34.7 | 20.10 | 33.0 | 19.52 | 34.0 | 19.60 | 29.9 |
| 200 | 24.77 | 66.7 | 24.70 | 63.5 | 24.08 | 65.4 | 23.75 | 57.4 |
| 300 | 32.52 | 118.9 | 32.20 | 113.1 | 31.53 | 116.6 | 30.53 | 102.3 |
| 400 | 40.37 | 171.7 | 39.80 | 163.4 | 39.08 | 168.4 | 37.39 | 147.7 |

TABLE 20-continued

|  | Specimen F0 | | Specimen F1 | | Specimen F2 | | Specimen F3 | |
| --- | --- | --- | --- | --- | --- | --- | --- | --- |
| Temperature [° C.] | Resistance Value [Ω] | Change Rate [%] | Resistance Value [Ω] | Change Rate [%] | Resistance Value [Ω] | Change Rate [%] | Resistance Value [Ω] | Change Rate [%] |
| 500 | 47.29 | 218.2 | 45.49 | 207.7 | 45.73 | 214.0 | 43.43 | 187.8 |
| 600 | 55.41 | 272.9 | 54.36 | 259.8 | 53.54 | 267.7 | 50.53 | 234.9 |
| 700 | 66.40 | 346.9 | 65.00 | 330.2 | 64.10 | 340.2 | 60.14 | 298.5 |
| 800 | 75.75 | 409.8 | 74.04 | 390.1 | 73.08 | 401.9 | 68.30 | 352.6 |
| 900 | 85.49 | 475.3 | 83.47 | 452.5 | 82.44 | 466.2 | 76.82 | 409.1 |
| 1000 | 96.76 | 551.2 | 94.37 | 524.7 | 93.27 | 540.6 | 86.67 | 474.3 |
| 1100 | 108.05 | 627.1 | 105.30 | 597.0 | 104.12 | 515.1 | 96.53 | 539.7 |
| 1200 | 120.33 | 709.8 | 117.19 | 675.7 | 115.93 | 696.2 | 107.27 | 610.8 |
| 1300 | 129.11 | 768.9 | 125.69 | 731.9 | 124.37 | 754.1 | 114.95 | 661.7 |

TABLE 21

|  | Specimen F0 | | Specimen F1 | | Specimen F2 | | Specimen F3 | |
| --- | --- | --- | --- | --- | --- | --- | --- | --- |
| Time [sec] | Resistance Value [Ω] | Change Rate [%] | Resistance Value [Ω] | Change Rate [%] | Resistance Value [Ω] | Change Rate [%] | Resistance Value [Ω] | Change Rate [%] |
| 0.0 | 14.86 | 0.0 | 15.11 | 0.0 | 14.56 | 0.0 | 15.09 | 0.0 |
| 0.1 | 20.62 | 22.6 | 21.09 | 24.2 | 20.31 | 23.4 | 20.00 | 22.0 |
| 0.2 | 24.29 | 37.0 | 24.62 | 38.5 | 23.80 | 37.7 | 23.27 | 36.7 |
| 0.3 | 26.07 | 43.9 | 26.32 | 45.4 | 25.49 | 44.6 | 24.85 | 43.8 |
| 0.4 | 28.84 | 54.8 | 28.99 | 56.2 | 28.13 | 55.4 | 27.31 | 54.8 |
| 0.5 | 30.40 | 60.9 | 30.48 | 62.3 | 29.61 | 61.4 | 28.70 | 61.0 |
| 0.6 | 31.66 | 65.9 | 31.70 | 67.2 | 30.82 | 66.3 | 29.82 | 66.1 |
| 0.7 | 33.03 | 71.2 | 33.01 | 72.5 | 32.11 | 71.6 | 31.04 | 71.5 |
| 0.8 | 33.87 | 74.5 | 33.82 | 75.8 | 32.92 | 74.9 | 31.79 | 74.9 |
| 0.9 | 34.57 | 77.2 | 34.49 | 78.5 | 33.53 | 77.6 | 32.41 | 77.7 |
| 1.0 | 35.28 | 80.0 | 35.17 | 81.3 | 34.26 | 80.3 | 33.04 | 80.5 |
| 1.5 | 37.74 | 89.7 | 35.54 | 90.9 | 36.60 | 89.9 | 35.23 | 90.3 |
| 2.0 | 38.37 | 92.1 | 37.14 | 93.3 | 37.19 | 92.3 | 35.79 | 92.8 |
| 2.5 | 38.68 | 93.4 | 38.45 | 94.5 | 37.49 | 93.5 | 36.07 | 94.1 |
| 3.0 | 38.99 | 94.6 | 38.74 | 95.7 | 37.78 | 94.7 | 36.34 | 95.3 |
| 3.5 | 39.13 | 95.1 | 38.87 | 96.3 | 37.92 | 95.3 | 36.46 | 95.9 |
| 4.0 | 39.07 | 94.9 | 38.82 | 96.0 | 37.87 | 95.1 | 36.42 | 95.6 |
| 4.5 | 39.27 | 95.7 | 39.01 | 96.8 | 38.06 | 95.8 | 36.59 | 96.4 |
| 5.0 | 39.33 | 95.9 | 39.07 | 97.0 | 38.11 | 96.1 | 36.64 | 96.7 |
| 6.0 | 39.47 | 96.5 | 39.20 | 97.6 | 38.24 | 96.6 | 36.77 | 97.2 |
| 7.0 | 39.53 | 96.7 | 39.26 | 97.8 | 38.30 | 96.8 | 36.82 | 97.5 |
| 8.0 | 39.75 | 97.6 | 39.47 | 98.7 | 38.51 | 97.7 | 37.02 | 98.3 |
| 9.0 | 39.83 | 97.9 | 39.55 | 99.0 | 38.58 | 98.0 | 37.09 | 98.7 |
| 10.0 | 39.89 | 98.1 | 39.61 | 99.2 | 38.64 | 98.2 | 37.14 | 98.9 |

Fifth Example

Next, the configuration of a temperature sensor of a fifth example of the invention will be discussed with reference to the accompanying drawings.

Figure 25:
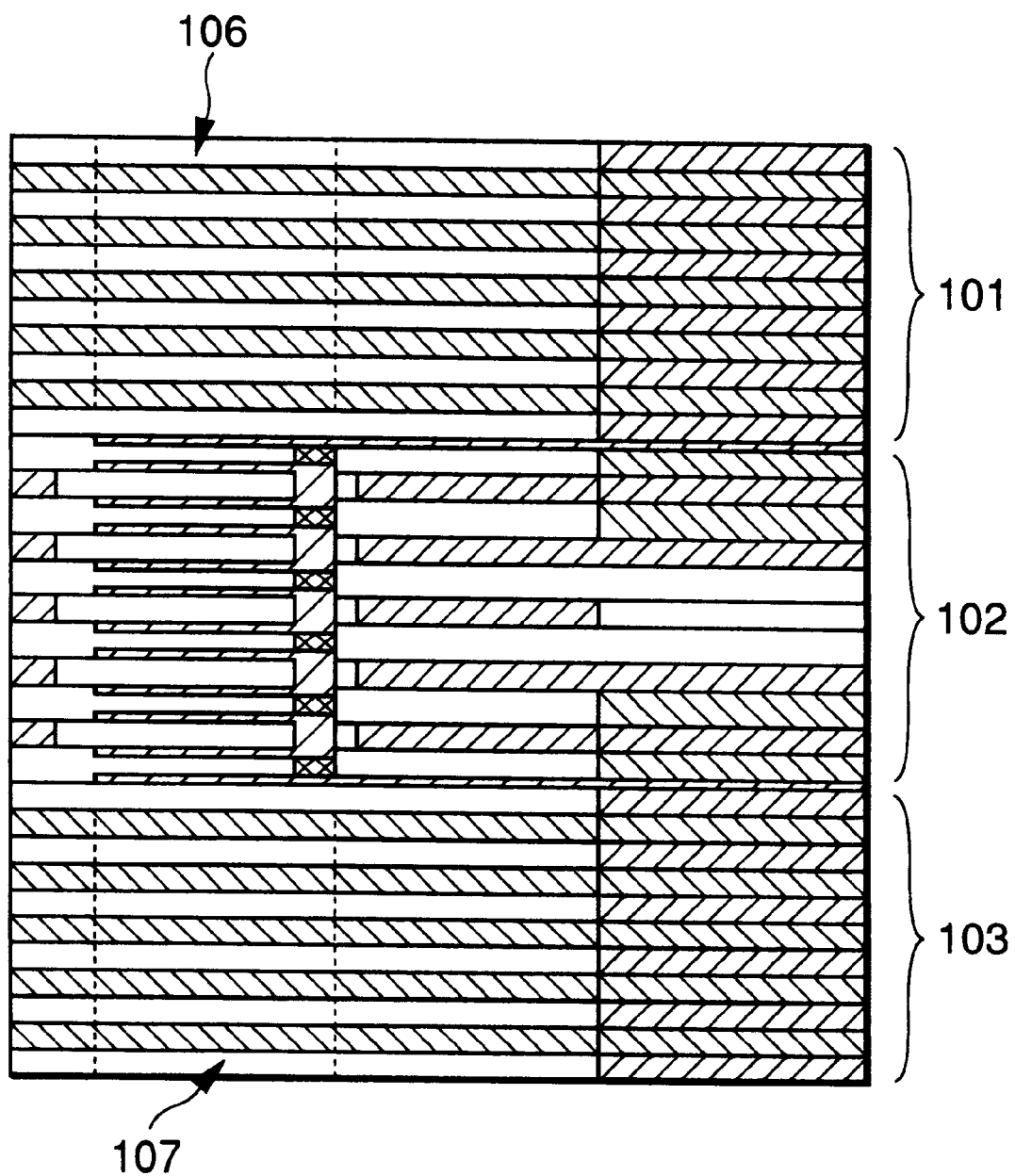
FIG. 25 is a lamination structure diagram of a resistive temperature sensor element of examples of the invention.
Figure 26:
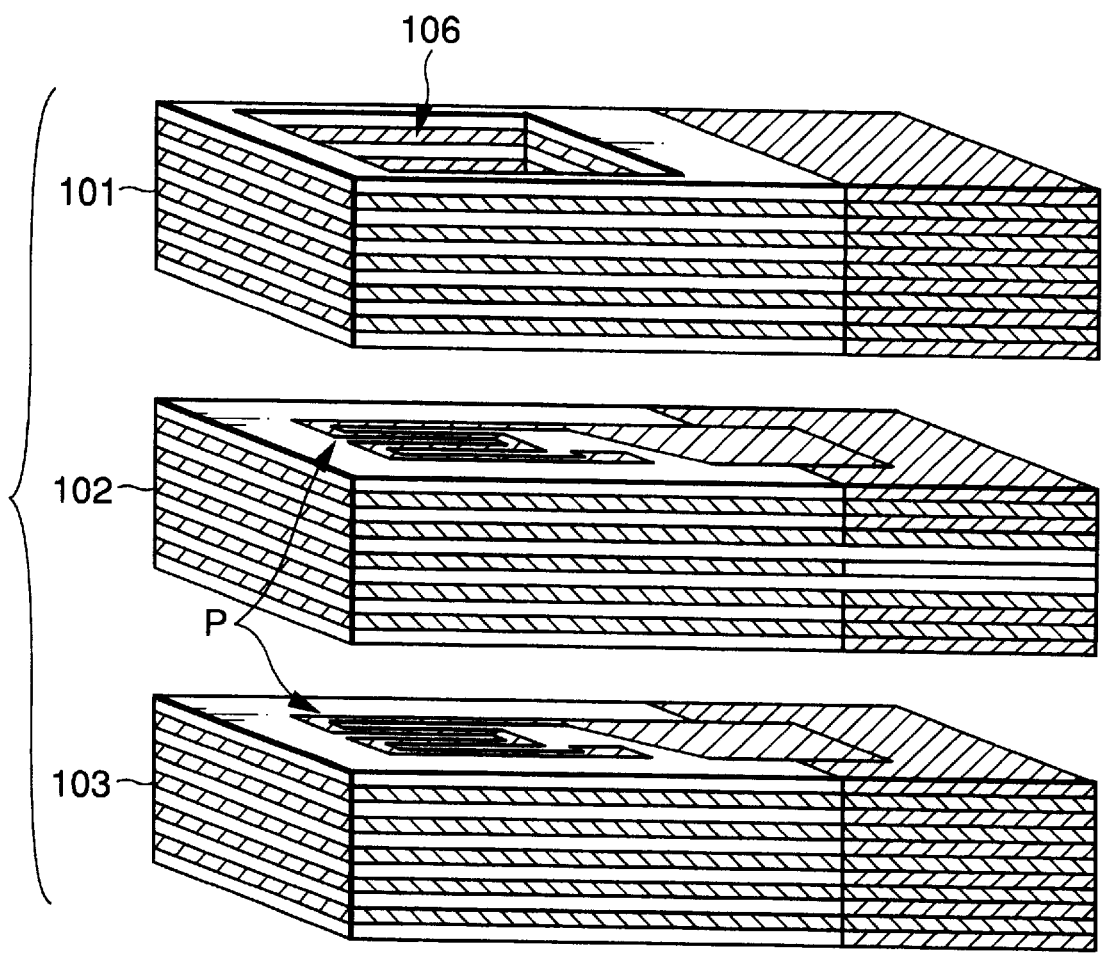
FIG. 26 is an exploded view of the resistive temperature sensor element of fifth to seventh examples of the invention.
Figure 27:
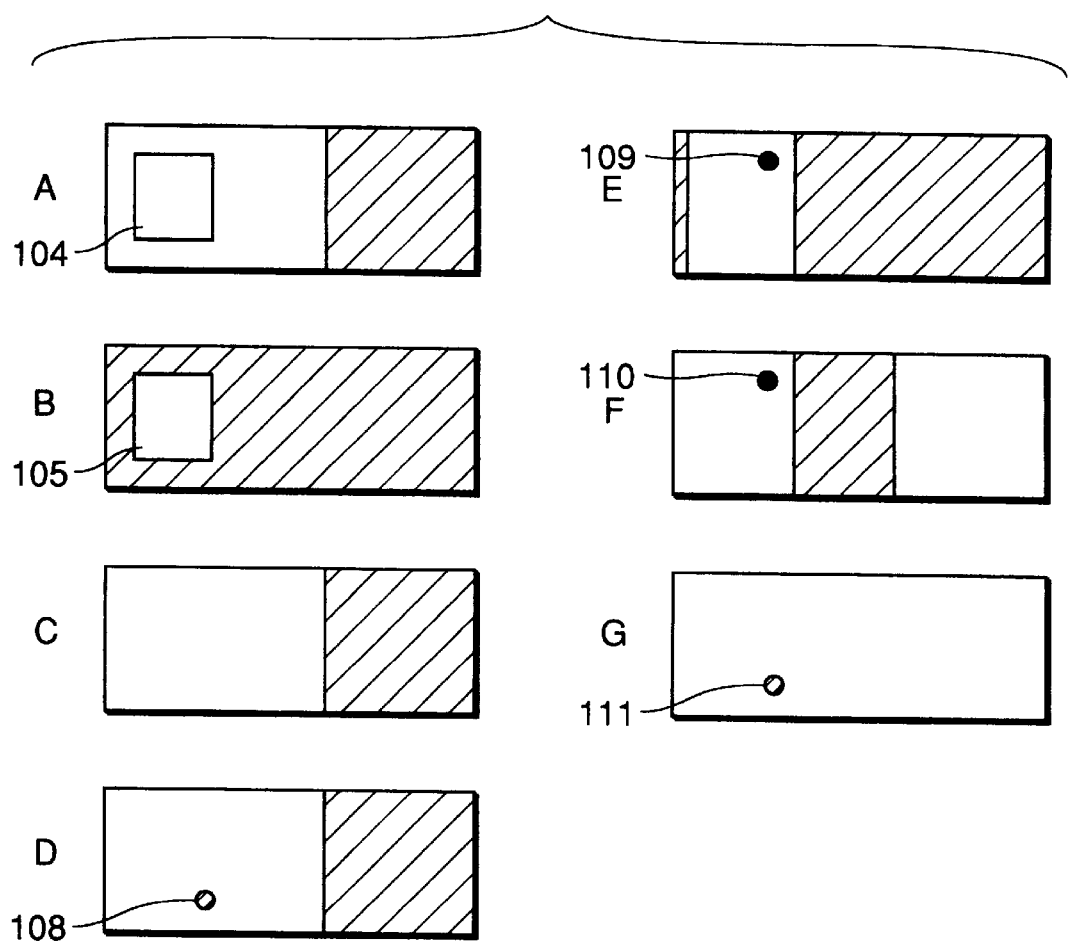
FIG. 27 shows patterns of thick films used with the resistive temperature sensors of the fifth to seventh examples of the invention.

FIG. 25 is a lamination structure diagram of a resistive temperature sensor element of the fifth example of the invention. FIG. 26 is an exploded view of the resistive temperature sensor element. FIG. 27 shows patterns of thick films used.

The laminate shown in FIG. 25 having six types of thick film layers each 100 mm long, 80 mm wide, and 35 μm thick shown as patterns A–G in FIG. 27 laminated in the order of A-B-A-B-A-B-A-B-A-B (C-D-E-D-E-G-F-G-E-D-E-D-C) -B-A-B-A-B-A-B-A-B-A from top to bottom. A temperature sensing resistance section is formed by printing on the thick film patterns enclosed in parentheses.

The separation between the same layers shown in FIG. 25 is lost after the termination of sintering.

Figure 28A:
FIGS. 28A to 28E are illustrations of the relationship between resistor patterns and thick film patterns.

The resistive temperature sensor element body has an upper protective section 101, a temperature sensing section 102, and a lower protective section 103 superposed on each other, as shown in FIG. 26; a resistor of pattern P shown in FIG. 28A is printed on the thick film of pattern D placed on the top of the thick films making up the temperature sensing section 102 and the thick film of pattern C placed on the top of the thick films making up the lower protective section 103.

Each of the upper protective section 101 and the lower protective section 103 have 10 alternating thick film layers of patterns A and B laminated on each other and the thick film layer of pattern A at upper and lower ends.

Each of the upper protective section 101 and the lower protective section 103 is formed in a part with an opening part (106, 107) made by openings 104 formed in the thick film layers of patterns A and openings 105 formed in the thick film layers of patterns B. The resistor of the temperature sensing section 102 is placed between the opening parts 106 an 107.

Some thick film patterns shown in FIG. 27 have a through hole made in an insulator and a conductor embedded in the through hole. That is, through holes 108, 109, 110, and 111 are made in patterns D, E, F, and G respectively, and a conductor is embedded in each through hole.

In the example, a temperature sensing resistance pattern is printed on thick films of patterns D, E, F, G, and C. The relationship between the resistor patterns and the thick film patterns will be discussed with reference to FIGS. 28A to 28E.

Pattern P shown in FIG. 26, similar pattern Q, and patterns R and S, which are not resistor patterns, are used for the printed resistor patterns. The through holes are below the resistor patterns and are hidden in FIGS. 28A to 28E and therefore are not considered for the description that follows.

Figure 28B:
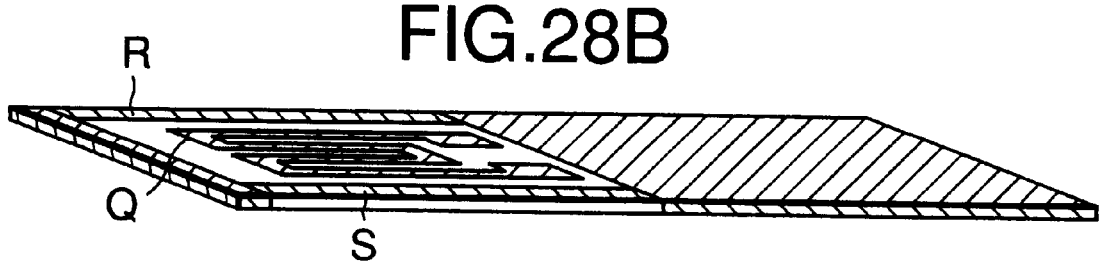
Figure 28C:
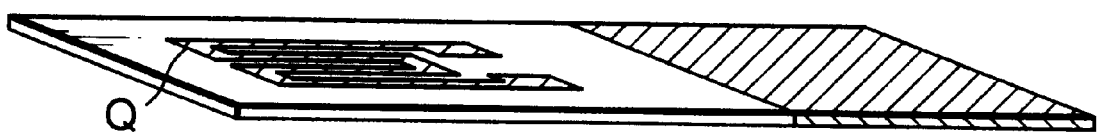
Figure 28D:
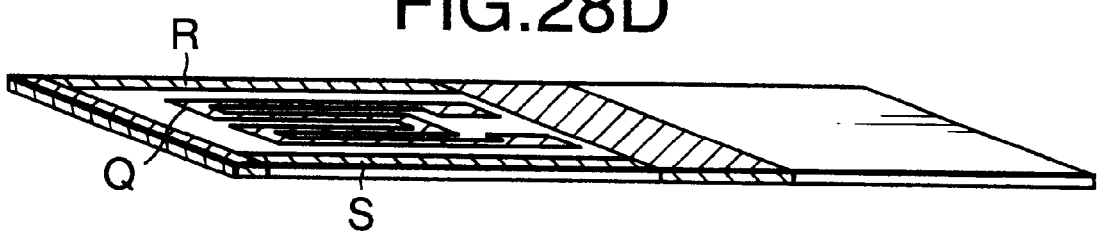
Figure 28E:
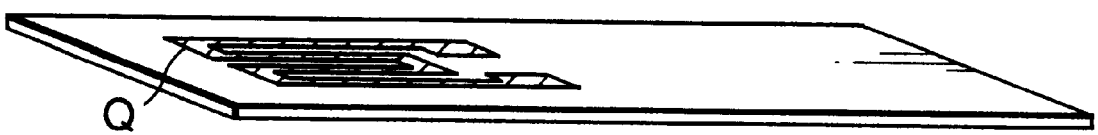

In FIG. 28A, resistor pattern P is printed on thick film pattern C, D; in FIG. 28B, resistor pattern Q and patterns R and S are printed on thick film pattern E; in FIG. 28C, resistor pattern Q is printed on thick film pattern D; in FIG. 28D, resistor pattern Q and patterns R and S are printed on thick film pattern F; and in FIG. 28E, resistor pattern. Q is printed on thick film pattern G. They are laminated in the order described above.

Figure 29:
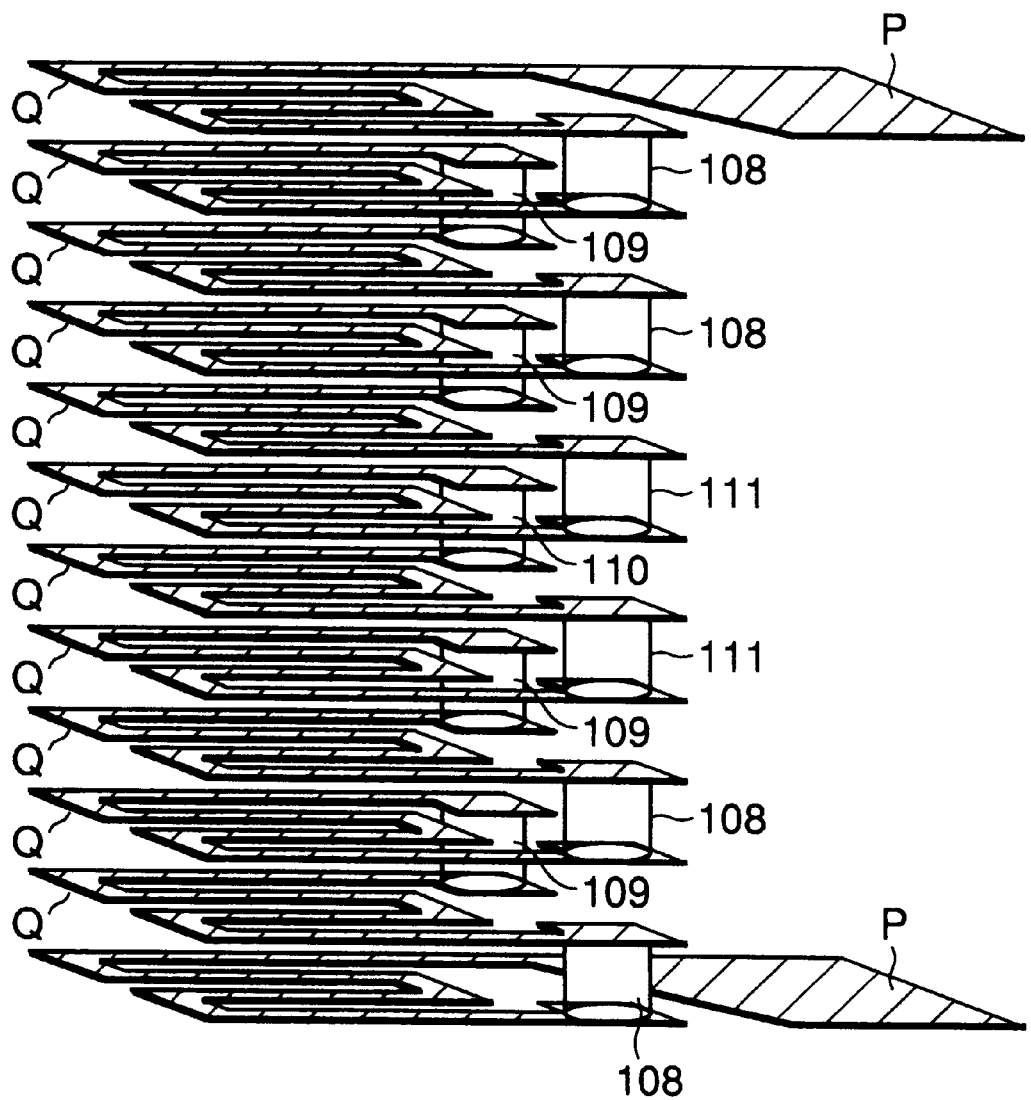
FIG. 29 shows a resistor circuit made up of resistor patterns and through holes.

FIG. 29 shows a resistor circuit made up of the resistor patterns and the through holes. In the figure, only the resistor patterns and the through holes are shown and the thick films are not shown.

The resistor circuit shown in FIG. 29 has 10 resistors of patterns Q placed between two resistors of patterns P. The resistors patterns P and Q are connected by the through holes 8–11 in series in the order of pattern P-through hole 8-pattern Q-through hole 9-pattern Q-through hole 8-pattern Q-through hole 9-pattern Q-through hole 11-pattern Q-through hole 10-pattern Q-through hole 11-pattern Q-through hole 9-pattern Q-through hole 8-pattern Q-through hole 9-pattern Q-through hole 8-pattern P.

Materials used for the resistive temperature sensor of the example will be discussed.

(1) Preparing of Material

Resistor material having composition of 40% molybdenum silicide 2 μm in particle diameter by volume and 60% alumina 0.4 μm in particle diameter by volume and toluene as a solvent are entered in an alumina ceramic pot and are dispersed for 15 hours with an alumina bowl as a dispersion medium. After the dispersion, a toluene 40% solution of an ethyl cellulose resin is added as a binder and they are mixed by a stirrer, thereby providing resistor paint.

Conductor material having composition of 90% molybdenum silicide 2 μm in particle diameter by volume and 10% alumina 0.4 μm in particle diameter by volume and toluene as a solvent are entered in an alumina ceramic pot and are dispersed for 15 hours with an alumina bowl as a dispersion medium. After the dispersion, a toluene 40% solution of an ethyl cellulose resin is added as a binder and they are mixed by a stirrer.

Structure conductor material having composition of 90% molybdenum silicide 2 μm in particle diameter by volume and 10% alumina 0.4 μm in particle diameter by volume, a methacrylate resin as a binder, toluene and ethanol as solvents, and BPBG as a plasticizer are entered in an alumina ceramic pot and are dispersed for 15 hours with an alumina bowl as a dispersion medium.

Insulator material having basic composition of 90% alumina 0.4 μm in particle diameter by volume, 10% mullite 0.4 μm in particle diameter by volume, 3% magnesia 0.4 μm in particle diameter by weight, and 0.3% silica 0.4 μm in particle diameter by weight, a methacrylate resin as a binder, toluene and ethanol as solvents, and BPBG as a plasticizer are entered in an alumina ceramic pot and are dispersed for 15 hours with an alumina bowl as a dispersion medium, as with the structure conductor material, providing insulator paint.

(2) Manufacturing of Sheets

The doctor blade height is adjusted so that the thickness after drying the conductor paint and insulator paint manufactured in the process in (1) by a sheet coater becomes 35 μm, and application film of each of the conductor paint and insulator paint is formed 80 mm in width on a polyethylene film, providing a conductor sheet and an insulator sheet.

Each of the conductor sheet and the insulator sheet is cut 100 mm in length to the stack dimension when a laminate is manufactured.

(3) Manufacturing of Thick Films

Each of the thick films making up the temperature sensor consists of an insulator and a conductor.

FIGS. 30A to 30F show a method of manufacturing thick films of pattern C shown in FIG. 27.

Figure 30A:
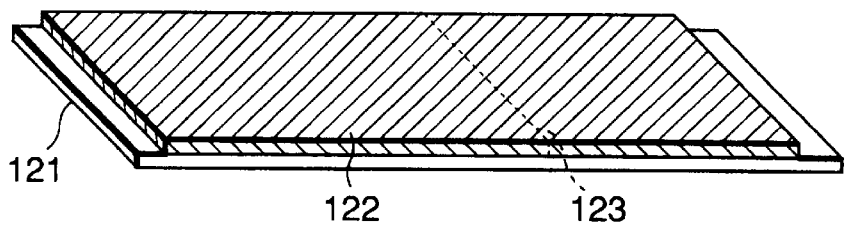
FIGS. 30A to 30E are illustrations of a thick film manufacturing method.

FIG. 30A shows the resistor sheet manufactured in (2) above having a structure conductor thick film 22 applied on a polyethylene film 21.

A cut 23 indicated by a dashed line is made in the structure conductor thick film 22. A structure conductor thick film 24 is left and the remaining conductor thick film is removed along the cut 23, thereby providing a material shown in FIG. 30B.

Figure 30B:
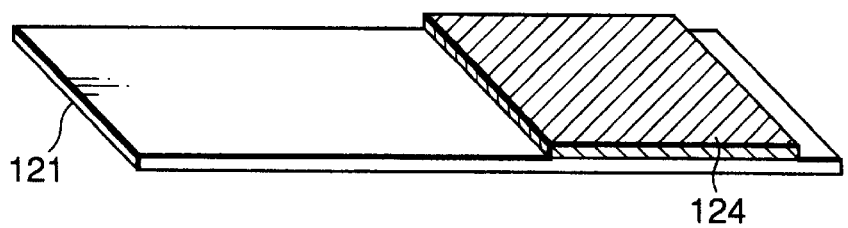
Figure 30C:
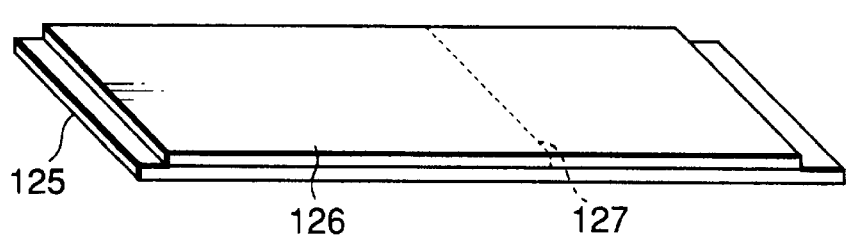

On the other hand, shown in FIG. 30C is an insulator sheet provided by executing the sheet manufacturing process in (2) above; an insulator thick film 26 is applied on a polyethylene film 25.

A cut 27 indicated by a dashed line is made in the insulator thick film 26. An insulator thick film 28 is left and the insulator thick film on the outside of the insulator thick film 28 is removed along the cuts 29 and 30, thereby providing a material shown in FIG. 30D.

Figure 30D:
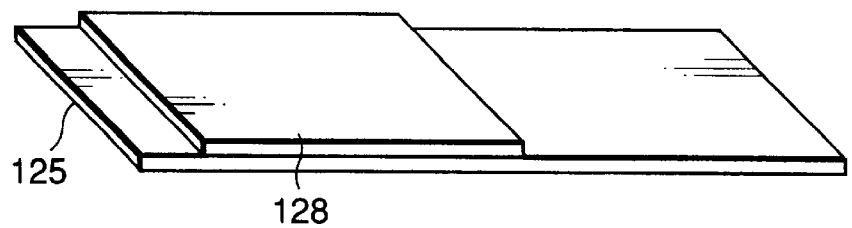
Figure 30E:
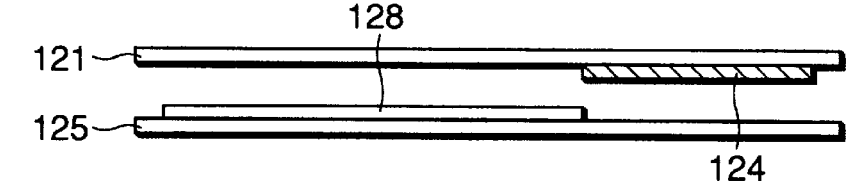
Figure 30F:

Next, the conductor sheet shown in FIG. 30B is placed upside down as shown in FIG. 30E and is laminated on the insulator sheet shown in FIG. 30D, and pressure of 0.1 kg/cm² is applied for 10 seconds, then the polyethylene film 21 is removed, thereby providing a thick film shown in FIG. 30F.

Figure 31A:
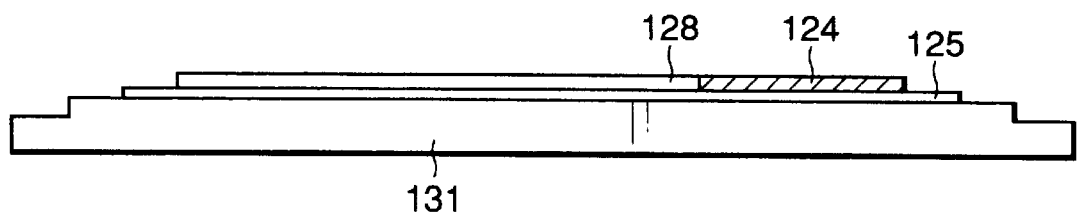
FIGS. 31A to 31C are illustrations to show a process of printing a resistor pattern on a thick film.
Figure 31B:
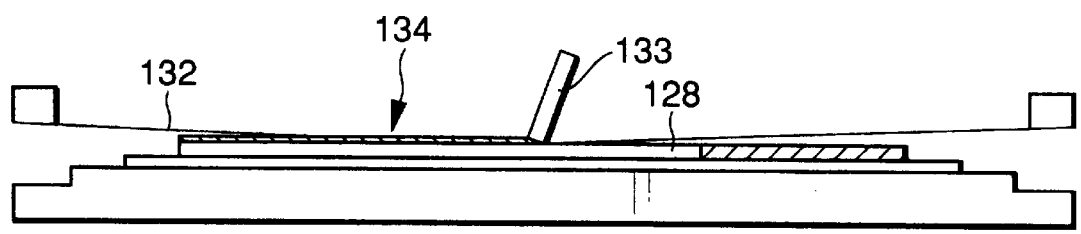
Figure 31C:
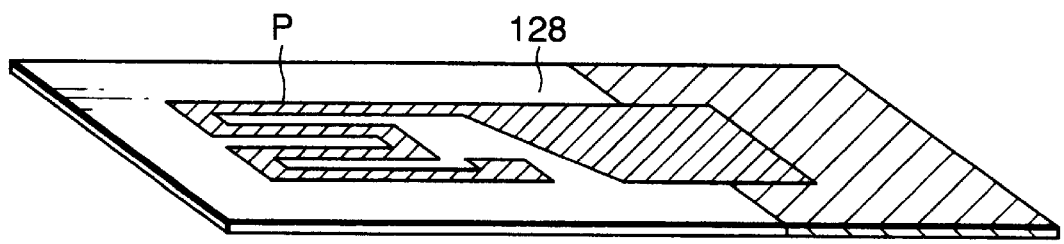

FIGS. 31A to 31C show a process of printing a resistor pattern on the thick film provided by executing the process shown in FIGS. 30A to 30F.

In the printing process, the thick film element sheet consisting of the conductor thick film 24 and the insulator thick film 28 placed on the polyethylene film 25 is placed on a print substrate 31 shown in FIG. 31A and resistor material is printed on the insulator thick film 28 with a squeegee 33 via a screen by a screen print method as shown in FIG. 31B, thereby forming a resistor thin film 34, providing a resistor thick film formed with resistor pattern P as shown in FIG. 31C.

To laminate the sheets thus formed as the structure shown in FIG. 25, sheets corresponding to the layers are provided and the sheet types are changed and the sheets are laminated in a predetermined order so as to put the layers into the structure shown in FIG. 25. Specifically, first the sheet corresponding to the protective section 103 is provided and laminated, next the sheet forming the temperature sensing section 102 is provided and laminated, and last the sheet corresponding to the protective section 101 is provided and laminated.

(4) Manufacturing of Laminate

After the predetermined lamination is complete, the laminate is removed from the stack board and is entered in a pressurization metal mold and pressure of 1.5 kg/cm² is applied for 300 seconds.

(5) Cutting of Laminate

Next, the laminate is stuck on a cutting board with double-sided tape and is cut at 2.4-mm wide pitches by means of a diamond cutter, providing laminate specimens each 50 mm long and 1 mm thick.

(6) Manufacturing of Sintered Body

The element laminate of the invention contains metal silicide hard to be sintered as a component, thus needs to be sintered at least at 1200° C., preferably at 14° C. or more.

Since the metal silicide is easily oxidized in air in a low temperature range of about 200 degrees and lowers stability of performance, oxidation needs to be suppressed. The metal silicide needs to be sintered in a non-oxidation atmosphere. Preferably, the non-oxidation atmosphere is an argon atmosphere; a nitrogen atmosphere tends to nitride metal silicide, consequently the temperature characteristic of resistance is changed.

Figure 32A:
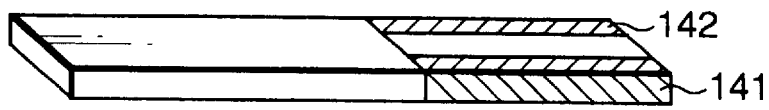
FIGS. 32A to 32F are illustrations of a resistive temperature sensor assembly.
Figure 32B:
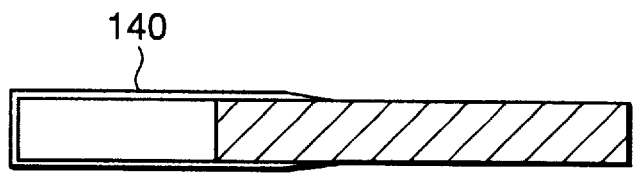
Figure 32C:
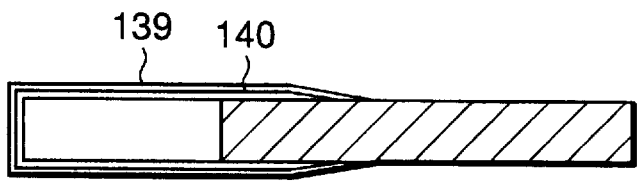

FIG. 32A shows the resistive temperature sensing element body thus provided.

In application wherein automobile exhaust gas temperature is measured, remaining carbon in the exhaust gases is deposited on the element surface and it is feared that the deposited remaining carbon may cause the conductor layers to be electrically short-circuited. Thus, preferably an insulating layer is formed on the element surface as a surface protective layer.

Preferably, a material having a thermal expansion coefficient similar to that of the element body consisting essentially of alumina is used as the surface protective layer. Since the thickness of the layer affects the response speed of the element, the layer should be thin as much as possible; specifically, it is formed 20 $\mu$m or less thick, preferably 10 $\mu$m or less thick.

A film consisting essentially of silica has a higher oxidation suppression effect than a film consisting essentially of alumina, but differs from the element body slightly in thermal expansion coefficient, thus cracks, etc., easily occur on the film consisting essentially of silica because of heat impact and the film should be thin as much as possible. Therefore, it needs to be formed 20 $\mu$m or less thick, preferably 10 $\mu$m or less thick. The film consisting essentially of silica can also be formed on exposure to air at 500° C. or more, preferably in the temperature range of 1000° C. to 1400° C. It is not practical to expose the film to air at less than 500° C. because film oxide formation requires a long time. A film consisting essentially of alumina is furthermore formed after the film consisting essentially of silica is formed, whereby reliability of the element can be furthermore improved.

To form the films, materials are deposited by a CVD method or slurry application, immersion, print, transfer, etc., then drying and thermal treatment are executed.

From the viewpoints, the cut laminates are mounted on a boron nitride board and binders are removed from the laminates at 600° C. for two hours in a nitrogen gas, then the laminates are sintered for one hour in an argon gas at 1750° C. Further, they are sintered for two hours in an argon gas at 1650° C. and 2000 atmospheres by HIP, then undergo surface oxidation treatment for one hour in air at 1400° C.

FIG. 8B and 8C are schematic sectional views of the element thus formed with the surface layer; FIG. 8B is an example of forming a protective film 40 consisting essentially of silica and FIG. 8C is an example of forming a protective film 39 consisting essentially of alumina on the protective film 40.

(7) Working of Connection Terminals

After the surface oxidation treatment, the conductor portions of the lamination end faces shown in FIG. 32A are sandblasted, thereby forming connection terminals 41 and 42. FIG. 32A is a perspective view when FIG. 1 is brought down.

Next, a palladium (Pd) catalyst for nickel (Ni) plating is printed on the connection terminals 41 and 42 and dried, then heat treatment is executed and nickel electroless plating is applied.

(8) Assembling and Working

Figure 32D:
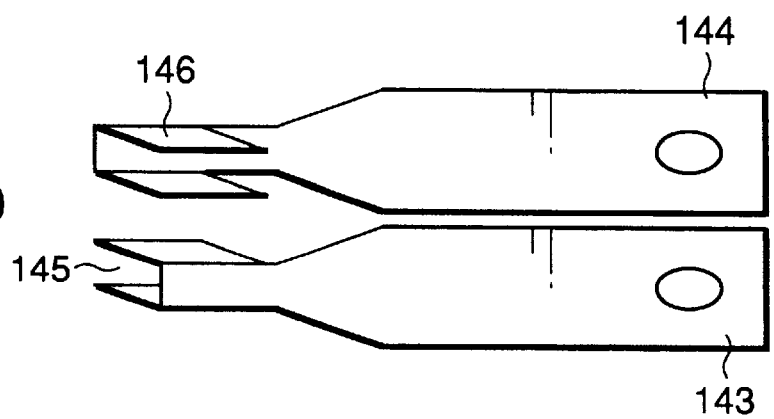

The connection terminals 41 and 42 to which the nickel electroless plating is applied are cleaned and dried, then the connection terminals 41 and 42 of the resistive temperature sensing element body are caught in connection parts 45 and 46 of lead members 43 and 44 shown in FIG. 32D and the connection parts 45 and 46 are joined to the nickel plating portions of the connection terminals 41 and 42 by silver brazing.

Figure 32E:
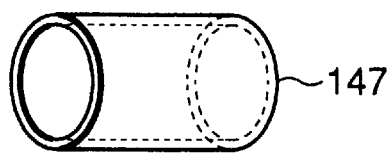
Figure 32F:
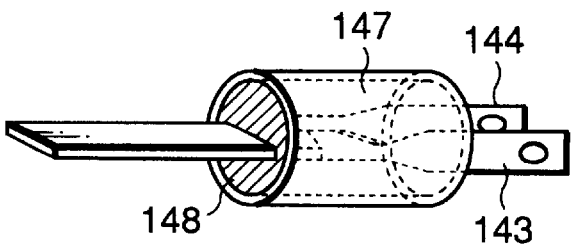

The resistive temperature sensing element body to which the lead members 43 and 44 are connected is inserted into an alumina tube 47 shown in FIG. 32E, is filled with ceramic cement 48 as shown in FIG. 32F, and is dried for 30 minutes at 90° C., then undergoes heat treatment for two hours at 120° C. and is hardened.

Tables 22 and 23 list the measurement results of the electrical characteristics of the temperature sensor assemblies of the fifth example thus provided.

Table 22 lists change rates of resistance values at temperatures when the temperature is changed in the range of room temperature (25° C.) to 1300° C.

Table 23 lists the response speed measurement results by immersion in a niter solution at 400° C.

Figure 33:
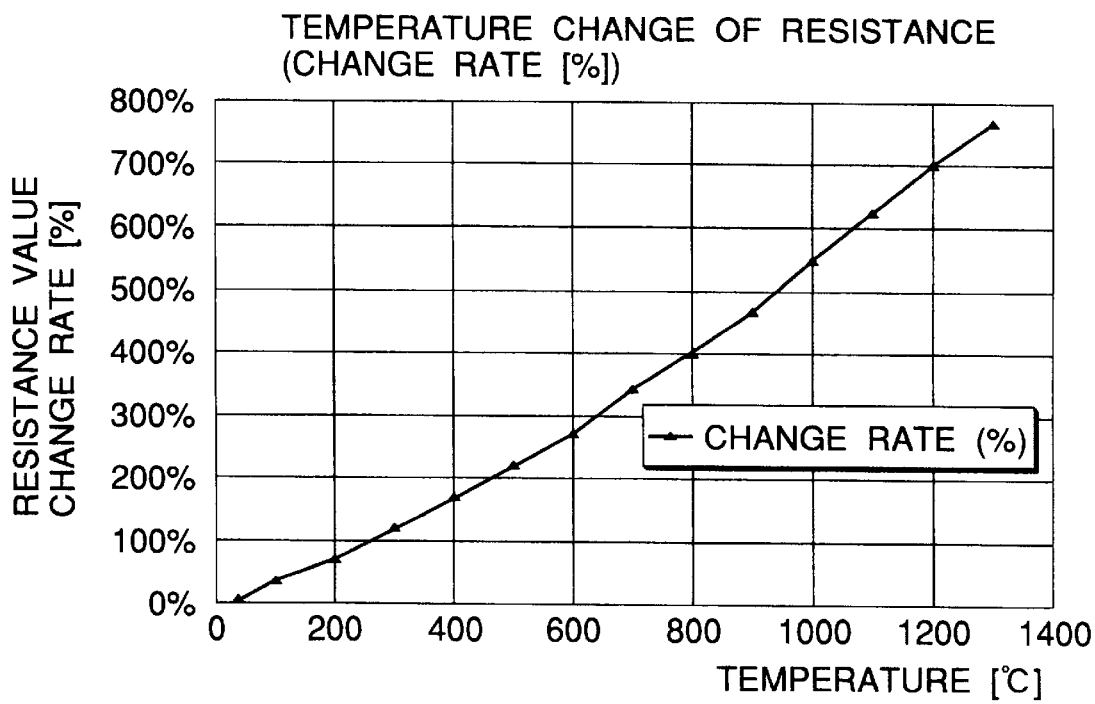
FIG. 33 is a graph to show resistance value change rate in response to temperature in Table 28.
Figure 34:
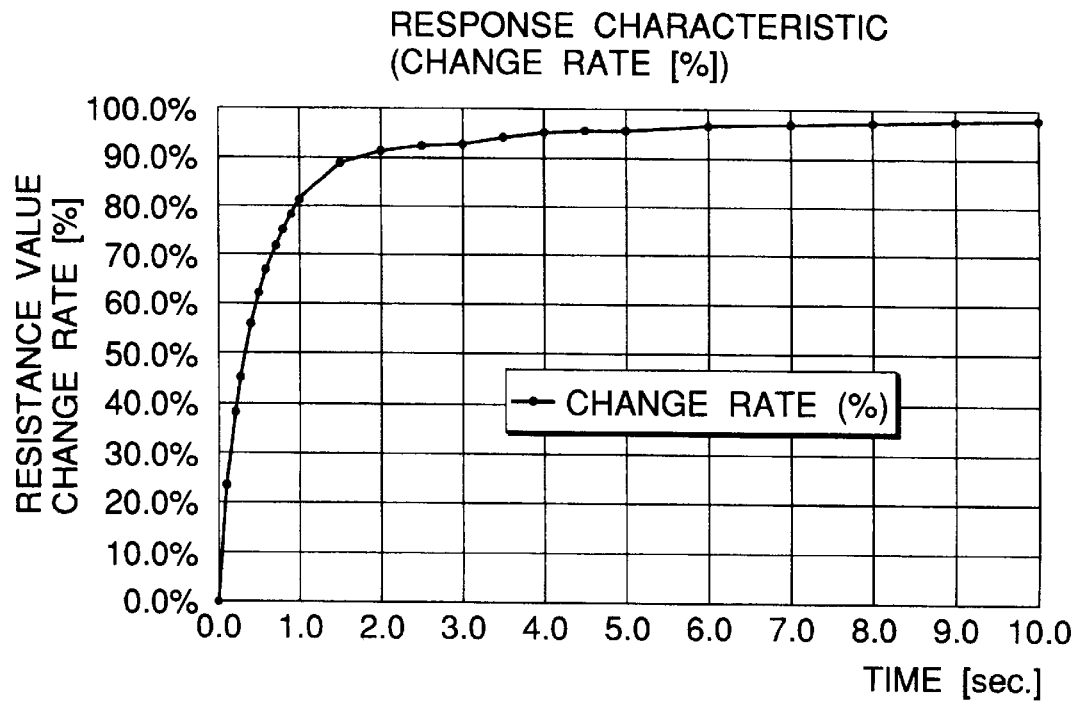
FIG. 34 is a graph to show response speed to resistance value change rate in Table 29.

Further, FIGS. 33 and 34 are provided by graphing Tables 22 and 23.

According to Table 22 and the graph of FIG. 33 corresponding thereto, it is clear that the temperature sensors of the fifth example of the invention have resistance values largely changed in response to temperature change.

According to Table 23 and the graph of FIG. 34 corresponding thereto, it is clear that the temperature sensors of the fifth example of the invention have resistance values changed to predetermined values at sufficient response speed.

Sixth Example

The metal silicides used in the first to fifth examples we have discussed are only molybdenum silicide, but other various metal silicides are known. Metal suicides other than molybdenum silicide can also be used as ceramic material forming a resistive temperature sensing element.

Use of metal silicide other than molybdenum silicide as ceramic material forming a resistive temperature sensing element will be discussed.

Various metal silicides are known; they differ in electrical, physical, and chemical characteristics depending on metals making up the silicide. In temperature detection application in a high temperature atmosphere, silicides excellent in heat resistance and oxidation resistance in addition to resistance temperature characteristic required for temperature detection are most desirable. When the highest operating temperature is near 1300° C. as in the invention, silicides of molybdenum (Mo), tungsten (W), titanium (Ti), and tantalum (Ta) are proper, among which molybdenum silicide is desirable from total determination of material cost, the degree of difficulty in manufacturing, etc.

However, if any other metal silicide such as tungsten silicide ($WSi_2$) is used, a resistive temperature sensor sufficiently enduring use can be provided.

A resistive temperature sensor example using tungsten silicide as resistance material will be discussed.

The resistive temperature sensor has the same configuration as the resistive temperature sensor of the fifth example shown in FIG. 25 except for material and therefore common parts will not be discussed again.

(1) Preparing of Material

Resistor material having composition of 40% tungsten silicide 3 μm in particle diameter by volume and 60% alumina 0.4 μm in particle diameter by volume, a methacrylate resin as a binder, toluene and ethanol as solvents, and BPBG as a plasticizer are entered in an alumina ceramic pot and are dispersed for 15 hours with an alumina bowl as a dispersion medium, providing resistor paint.

Insulator material having basic composition of 90% alumina 0.4 μm in particle diameter by volume, 10% mullite 0.4 μm in particle diameter by volume, 3% magnesia 0.4 μm in particle diameter by weight, and 0.3% silica 0.4 μm in particle diameter by weight, a methacrylate resin as a binder, toluene and ethanol as solvents, and BPBG as a plasticizer are entered in an alumina ceramic pot and are dispersed for 15 hours with an alumina bowl as a dispersion medium, as with the resistor material, providing insulator paint.

(2) Manufacturing of Sheets

The doctor blade height is adjusted so that the thickness after drying the resistor paint and insulator paint manufactured in the process in (1) by a sheet coater becomes 35 μm, and application film of each of the resistor paint and insulator paint is formed 80 mm in width on a polyethylene film, providing a resistor sheet and an insulator sheet.

Each of the resistor sheet and the insulator sheet is cut 100 mm in length to the stack dimension when a laminate is manufactured.

(3) Manufacturing of Laminate

After thick film layers are formed and predetermined lamination is complete as in the fifth example, the laminate is entered in a pressurization metal mold and pressure of 1.5 kg/cm$^2$ is applied for 300 seconds. Next, the laminate is cut at 4.8-mm wide pitches, providing laminates each 50 mm long and 1 mm thick.

(4) Manufacturing of Sintered Body

Binders are removed from the cut laminates at 600° C. for two hours in a nitrogen gas, then the laminates are sintered for two hours in an argon gas at 1650° C.

Further, they are sintered for two hours in an argon gas at 1650° C. and 2000 atmospheres by HIP, then undergo surface oxidation treatment for one hour in air at 1400° C.

After the surface oxidation treatment, terminal connection parts are sandblasted.

(5) Assembling and Working

A palladium catalyst is printed on the terminal connection parts and dried, then heat treatment is executed, then nickel electroless plating is applied. After cleaning and drying, the element to which lead members are joined by silver brazing is inserted into an alumina tube, is filled with ceramic cement, and is dried, then undergoes heat treatment and is hardened.

Tables 24 and 25 list the measurement results of the electrical characteristics of the temperature sensor element specimens thus provided. Table 24 lists resistance value change of the specimens of the example in response to temperatures. Table 25 lists the resistance value response speed measured in a niter solution at 400° C.

Figure 35:
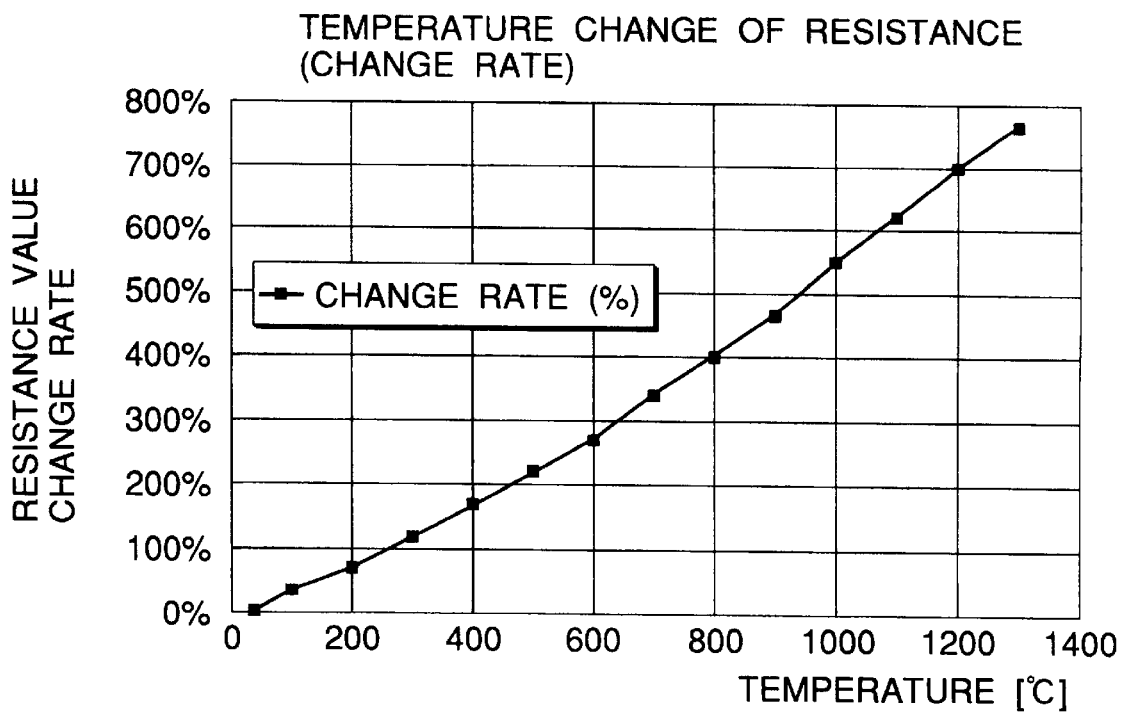
FIG. 35 is a graph to show resistance value change rate in response to temperature in Table 30.
Figure 36:
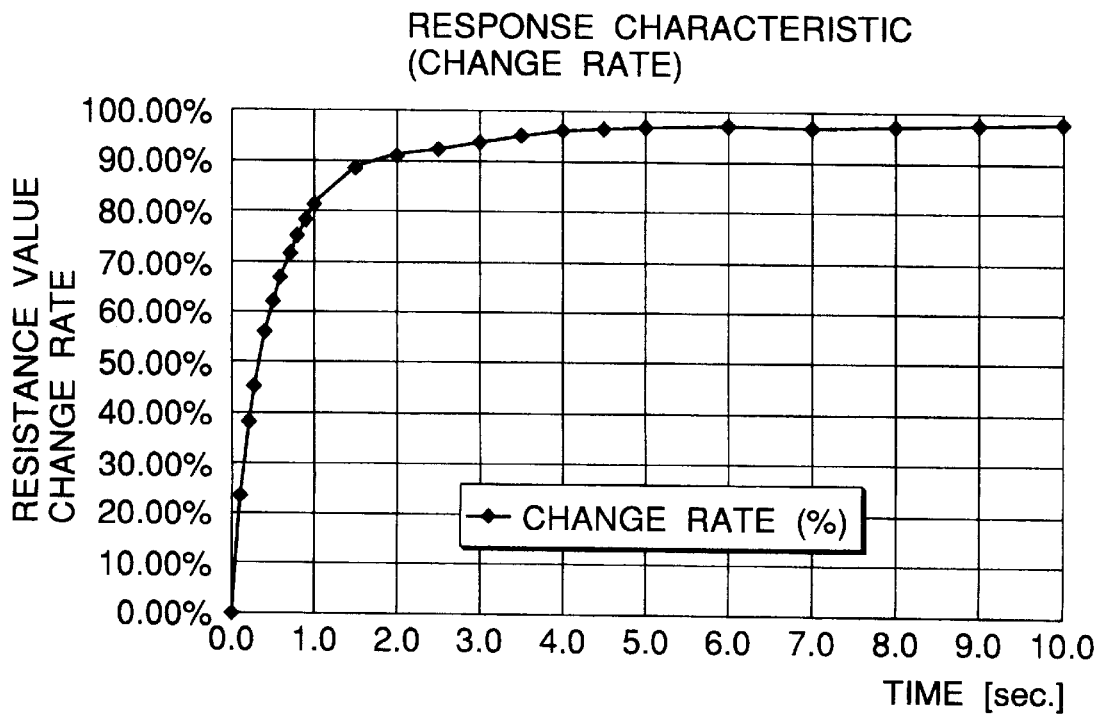
FIG. 36 is a graph to show response speed to resistance value change rate in Table 31.

FIG. 35 is provided by graphing the resistance value change rates depending on temperatures in Table 24. FIG. 36 is provided by graphing the response speed to resistance value change rates in Table 25.

According to Table 24 and the graph of FIG. 35 corresponding thereto, it is clear that the resistive temperature sensors of the sixth example using tungsten silicide as the resistor material have resistance values largely changed in response to temperature change.

According to Table 25 and the graph of FIG. 36 corresponding thereto, it is clear that the temperature sensors of the sixth example using tungsten silicide as the resistor material have resistance values changed to predetermined values at sufficient response speed.

Seventh Example

As we have discussed, the resistive temperature sensors using suicides of molybdenum, tungsten, titanium, and tantalum as resistance materials can be used even at high temperatures near 1300° C. In application in a comparatively low temperature range in which the highest operating temperature is near 1000° C., most metal silicides in addition to the above-mentioned metal silicides can be used; particularly, metal silicides of group IVA, VA, VIA, and VIII elements in the periodic law are highly possible in availability.

Above all, silicides of chromium (Cr), iron (Fe), and cobalt (Co) are desirable materials from total determination of material cost and facility in manufacturing.

Chromium silicide (CrSi2), iron silicide (FeSi2), and cobalt silicide (CoSi2) of metal suicides are inferior to high-melting-point metal suicides such as molybdenum silicide and tungsten silicide in heat resistance. However, if chromium silicide (CrSi2), iron silicide (FeSi2), and cobalt silicide (CoSi2) are used in a comparatively low temperature range of about 1000° C., they are sufficiently available.

Then, resistive temperature sensors having the same structure as those of the fifth example using more inexpensive chromium silicide, iron silicide, and cobalt silicide as resistor materials in place of molybdenum silicide, tungsten silicide, titanium silicide, and tantalum silicide which have high heat resistance, but are more expensive will be discussed.

(1) Preparing of Material

Resistor material compositions for specimens AX, BX, and CX are as follows:

Specimen AX: 40% chromium silicide 2.5 μm in particle diameter by volume and 60% alumina 0.4 μm in particle diameter by volume.

Specimen BX: 40% iron silicide 3.4 μm in particle diameter by volume and 60% alumina 0.4 μm in particle diameter by volume.

Specimen CX: 40% cobalt silicide 2 μm in particle diameter by volume and 60% alumina 0.4 μm in particle diameter by volume.

Insulator material has composition similar to that of the fifth example.

(2) Manufacturing of Laminate

After thick film layers are formed and predetermined lamination is complete as in the fifth example, the laminate is entered in a pressurization metal mold and pressure of 1.5 kg/cm$^2$ is applied for 300 seconds. Next, the laminate is cut at 2.4-mm wide pitches, providing laminate specimens each 50 mm long and 1 mm thick.

(3) Manufacturing of Sintered Body

Binders are removed from the cut laminates at 600° C. for two hours in a nitrogen gas, then the laminates are sintered for two hours in an argon gas at 1250° C. Further, they are sintered for two hours in an argon gas at 1200° C. and 1500 atmospheres by HIP, then undergo surface oxidation treatment for one hour in air at 1100° C.

After the surface oxidation treatment, terminal connection parts are sandblasted.

(4) Assembling and Working of Element

A palladium catalyst is printed on the terminal connection parts and dried, then heat treatment is executed, then nickel electroless plating is applied. After cleaning and drying, the element to which lead members are joined by silver brazing is inserted into an alumina tube, is filled with ceramic cement, and is dried, then undergoes heat treatment and is hardened.

Tables 26 and 27 list the measurement results of the electrical characteristics of the temperature sensor elements thus manufactured.

Table 26 lists resistance value change in response to temperatures. Table 27 lists the resistance value response speed measured in a niter solution at 400° C.

Figure 37:
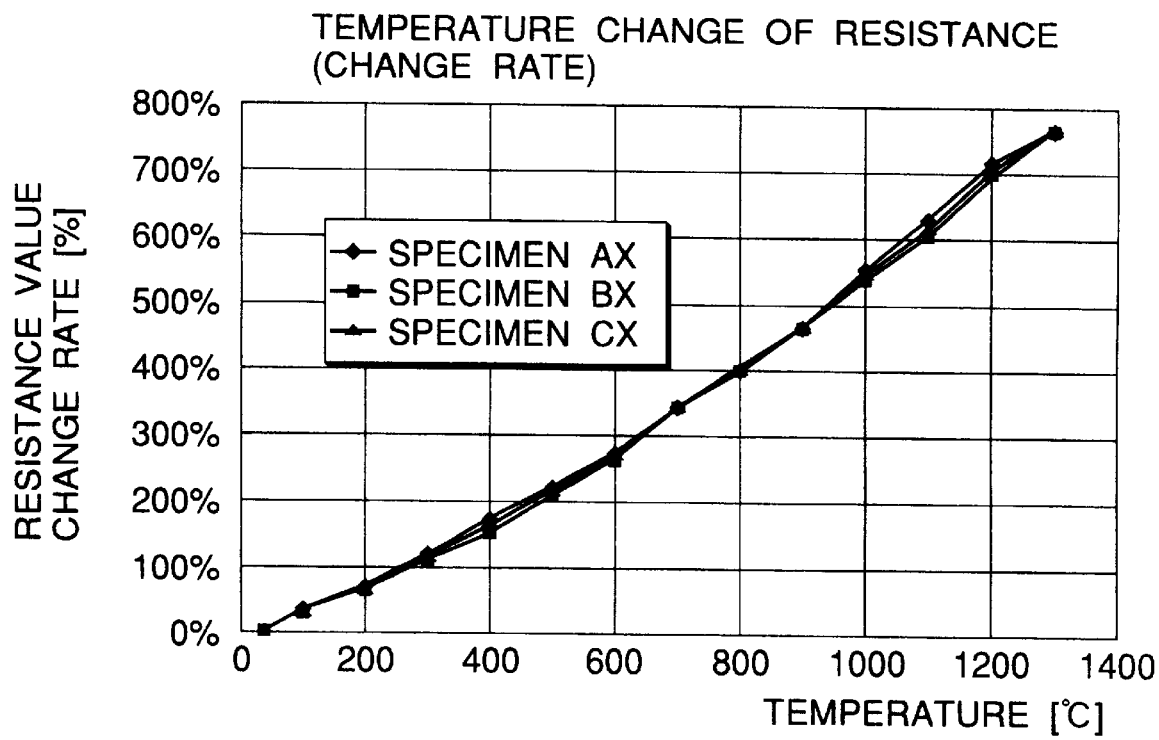
FIG. 37 is a graph to show resistance value change rate in response to temperature in Table 32.
Figure 38:
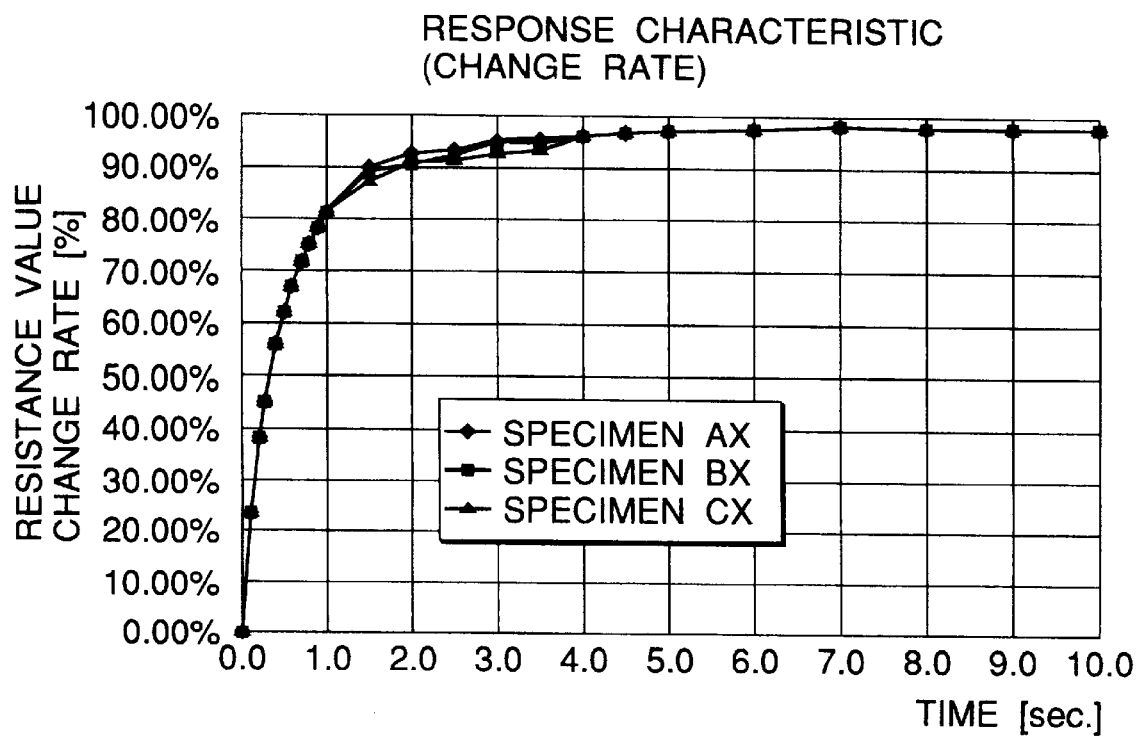
FIG. 38 is a graph to show response speed to resistance value change rate in Table 33.

FIG. 37 is provided by graphing the resistance value change rates depending on temperatures in Table 26. FIG. 38 is provided by graphing the response speed to resistance value change rates in Table 27.

According to Table 26 and the graph of FIG. 37 corresponding thereto, it is clear that the resistive temperature sensors using the resistance materials have resistance values largely changed in response to temperature change.

According to Table 27 and the graph of FIG. 38 corresponding thereto, it is clear that the resistive temperature sensors using the resistance materials have resistance values changed to predetermined values at sufficient response speed.

TABLE 22

| Temperature (° C.) | Resistance Value (Ω) | Change Rate (%) |
|---|---|---|
| 25 | 67.10 | 0.0 |
| 100 | 91.03 | 35.7 |
| 200 | 112.16 | 67.2 |
| 300 | 146.64 | 118.5 |
| 400 | 180.20 | 168.6 |
| 500 | 214.32 | 219.4 |
| 600 | 247.09 | 268.3 |
| 700 | 296.64 | 342.1 |
| 800 | 339.18 | 405.5 |
| 900 | 381.50 | 468.6 |
| 1000 | 430.61 | 541.8 |
| 1100 | 484.16 | 621.6 |
| 1200 | 534.08 | 696.0 |
| 1300 | 577.49 | 760.7 |

TABLE 23

| Time (sec) | Resistance Value (Ω) | Change Rate (%) |
|---|---|---|
| 0.0 | 67.10 | 0.0 |
| 0.1 | 93.85 | 23.7 |
| 0.2 | 110.12 | 38.0 |
| 0.3 | 117.89 | 44.9 |
| 0.4 | 130.00 | 55.6 |
| 0.5 | 136.96 | 61.8 |
| 0.6 | 142.48 | 66.7 |
| 0.7 | 148.40 | 71.9 |
| 0.8 | 152.24 | 75.3 |
| 0.9 | 155.25 | 77.9 |
| 1.0 | 158.30 | 80.6 |
| 1.5 | 167.71 | 89.0 |
| 2.0 | 169.89 | 90.9 |
| 2.5 | 171.27 | 92.1 |
| 3.0 | 172.07 | 92.8 |
| 3.5 | 173.79 | 94.3 |
| 4.0 | 174.99 | 95.4 |
| 4.5 | 175.95 | 96.2 |
| 5.0 | 176.19 | 96.5 |
| 6.0 | 176.81 | 97.0 |
| 7.0 | 176.98 | 97.2 |
| 8.0 | 178.04 | 98.1 |
| 9.0 | 178.31 | 98.3 |
| 10.0 | 178.66 | 98.6 |

TABLE 24

| Temperature (° C.) | Resistance Value (Ω) | Change Rate (%) |
|---|---|---|
| 25 | 52.19 | 0 |
| 100 | 69.75 | 33.7 |
| 200 | 87.23 | 67.2 |
| 300 | 113.00 | 116.5 |
| 400 | 141.20 | 170.6 |
| 500 | 166.17 | 218.4 |
| 600 | 192.70 | 269.3 |
| 700 | 230.72 | 342.1 |
| 800 | 262.76 | 403.5 |
| 900 | 296.72 | 468.6 |
| 1000 | 335.96 | 543.8 |
| 1100 | 377.62 | 623.6 |
| 1200 | 417.49 | 700.0 |
| 1300 | 447.60 | 757.7 |

TABLE 25

| Time (sec) | Resistance Value (Ω) | Change Rate (%) |
|---|---|---|
| 0.0 | 52.19 | 0.0 |
| 0.1 | 73.24 | 23.7 |
| 0.2 | 86.06 | 38.1 |
| 0.3 | 92.16 | 44.9 |
| 0.4 | 101.70 | 55.6 |
| 0.5 | 107.17 | 61.8 |
| 0.6 | 111.53 | 66.7 |
| 0.7 | 116.18 | 71.9 |
| 0.8 | 119.21 | 75.3 |
| 0.9 | 121.58 | 78.0 |
| 1.0 | 123.98 | 80.7 |
| 1.5 | 131.38 | 89.0 |
| 2.0 | 133.10 | 90.9 |
| 2.5 | 135.11 | 93.2 |
| 3.0 | 135.61 | 93.7 |
| 3.5 | 137.63 | 96.0 |
| 4.0 | 137.12 | 95.4 |
| 4.5 | 137.87 | 96.3 |
| 5.0 | 138.07 | 96.5 |
| 6.0 | 138.55 | 97.0 |
| 7.0 | 138.68 | 97.2 |
| 8.0 | 159.52 | 98.1 |
| 9.0 | 139.72 | 98.3 |
| 10.0 | 140.00 | 98.7 |

TABLE 26

| | Resistance Value (Ω) | | | | Change Rate (%) | | |
|---|---|---|---|---|---|---|---|
| Temperature (° C.) | Specimen AX | Specimen BX | Specimen CX | Temperature (° C.) | Specimen AX | Specimen BX | Specimen CX |
| 25 | 447.31 | 745.52 | 14.91 | 25 | 0 | 0 | 0 |
| 100 | 611.39 | 981.51 | 20.00 | 100 | 37 | 32 | 34 |
| 200 | 752.18 | 1,216.54 | 24.70 | 200 | 68 | 63 | 66 |
| 300 | 991.03 | 1,584.45 | 32.36 | 300 | 122 | 113 | 117 |
| 400 | 1,228.21 | 1,964.83 | 40.12 | 400 | 175 | 164 | 169 |
| 500 | 1,424.30 | 2,321.58 | 46.95 | 500 | 218 | 211 | 215 |
| 600 | 1,665.14 | 2,723.14 | 54.98 | 600 | 272 | 265 | 269 |
| 700 | 1,982.06 | 3,281.01 | 65.84 | 700 | 343 | 340 | 342 |
| 800 | 2,265.72 | 3,731.25 | 75.07 | 800 | 407 | 400 | 404 |
| 900 | 2,552.23 | 4,216.53 | 84.70 | 900 | 471 | 466 | 468 |
| 1000 | 2,892.99 | 4,762.31 | 95.84 | 1000 | 547 | 539 | 543 |
| 1100 | 3,245.74 | 5,289.69 | 106.99 | 1100 | 626 | 610 | 618 |
| 1200 | 3,596.51 | 5,919.28 | 119.13 | 1200 | 704 | 694 | 699 |
| 1300 | 3,849.90 | 6,364.58 | 127.81 | 1300 | 761 | 754 | 757 |

TABLE 27

| | Resistance Value (Ω) | | | | Change Rate (%) | | |
|---|---|---|---|---|---|---|---|
| Time (sec) | Specimen AX | Specimen BX | Specimen CX | Time (sec) | Specimen AX | Specimen BX | Specimen CX |
| 0.0 | 447.31 | 745.52 | 14.91 | 0.0 | 0.0 | 0.0 | 0.0 |
| 0.1 | 633.45 | 1,035.17 | 20.95 | 0.1 | 23.8 | 23.8 | 24.0 |
| 0.2 | 745.29 | 1,209.83 | 24.56 | 0.2 | 38.2 | 38.1 | 38.3 |
| 0.3 | 799.17 | 1,293.99 | 26.31 | 0.3 | 45.1 | 45.0 | 45.2 |
| 0.4 | 882.73 | 1,424.28 | 29.03 | 0.4 | 55.8 | 55.7 | 56.0 |
| 0.5 | 930.79 | 1,499.70 | 30.56 | 0.5 | 61.9 | 61.9 | 62.1 |
| 0.6 | 969.25 | 1,558.66 | 31.81 | 0.6 | 66.8 | 66.7 | 67.0 |
| 0.7 | 1,009.38 | 1,623.01 | 33.15 | 0.7 | 72.0 | 72.0 | 72.4 |
| 0.8 | 1,036.28 | 1,664.34 | 33.98 | 0.8 | 75.4 | 75.4 | 75.7 |
| 0.9 | 1,057.35 | 1,696.23 | 34.66 | 0.9 | 78.1 | 78.0 | 78.4 |
| 1.0 | 1,077.84 | 1,729.55 | 35.36 | 1.0 | 80.7 | 80.7 | 81.1 |
| 1.5 | 1,143.04 | 1,854.43 | 37.79 | 1.5 | 89.1 | 90.9 | 90.7 |
| 2.0 | 1,158.38 | 1,862.61 | 38.40 | 2.0 | 91.1 | 91.6 | 93.2 |
| 2.5 | 1,167.85 | 1,886.72 | 38.71 | 2.5 | 92.3 | 93.6 | 94.4 |
| 3.0 | 1,172.77 | 1,907.19 | 39.01 | 3.0 | 92.9 | 95.3 | 95.6 |
| 3.5 | 1,185.03 | 1,926.09 | 39.15 | 3.5 | 94.5 | 96.8 | 96.1 |
| 4.0 | 1,193.66 | 1,911.25 | 39.09 | 4.0 | 95.6 | 95.6 | 95.9 |
| 4.5 | 1,199.61 | 1,919.81 | 39.29 | 4.5 | 96.3 | 96.3 | 96.7 |
| 5.0 | 1,201.74 | 1,921.93 | 39.35 | 5.0 | 96.6 | 96.5 | 96.9 |
| 6.0 | 1,206.18 | 1,929.10 | 39.48 | 6.0 | 97.2 | 97.1 | 97.5 |
| 7.0 | 1,206.75 | 1,931.83 | 39.54 | 7.0 | 97.3 | 97.3 | 97.7 |
| 8.0 | 1,214.62 | 1,942.51 | 39.76 | 8.0 | 98.3 | 98.2 | 98.6 |
| 9.0 | 1,215.80 | 1,946.22 | 39.84 | 9.0 | 98.4 | 98.5 | 98.9 |
| 10.0 | 1,218.84 | 1,948.67 | 39.90 | 10.0 | 98.8 | 98.7 | 99.1 |

Eighth Example

Figure 39:
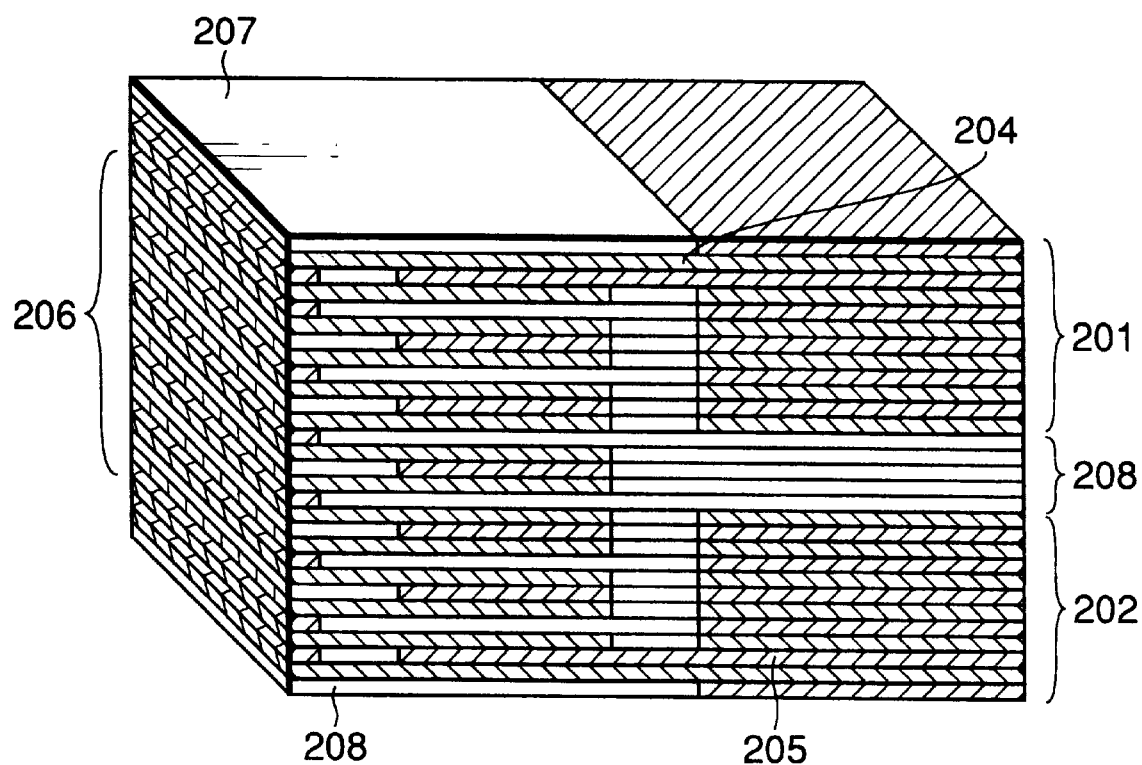
FIG. 39 is a lamination structure diagram of a resistive temperature sensor element of an eighth example of the invention.

FIG. 39 is a lamination structure diagram of a resistive temperature sensor element of an eighth example of the invention.

Figure 40:
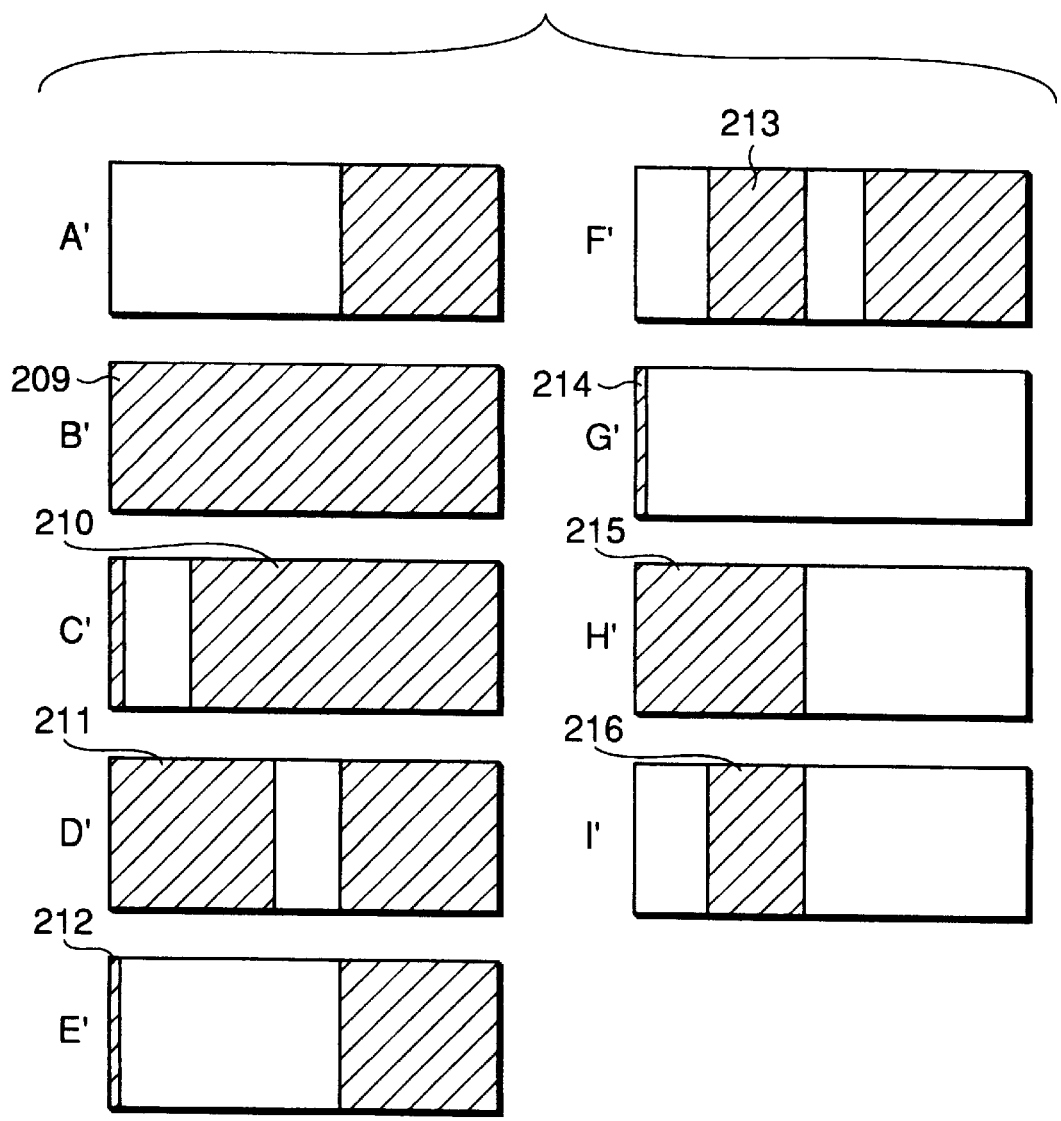
FIG. 40 is patterns of thick films used with the eighth example of the invention.

The laminate shown in FIG. 39 has nine types of thick film layers each 100 mm long, 80 mm wide, and 35 μm thick shown as patterns A'–I' in FIG. 40 laminated in the order of A'-B'-C'-(D'-E'-D'-F'-D'-E'-D'-F'-D'-G'-H'-I'-H'-G'-D'-F'-D'-E'-D'-F'-D'-E'-D')-C'-B'-A' (29 layers in total). A temperature sensor layer is made up of 21 thick films enclosed in parentheses except the thick films of patterns A', B', and C' at both ends.

The separation between the same layers shown in FIG. 39 is lost after the termination of sintering.

Figure 42:
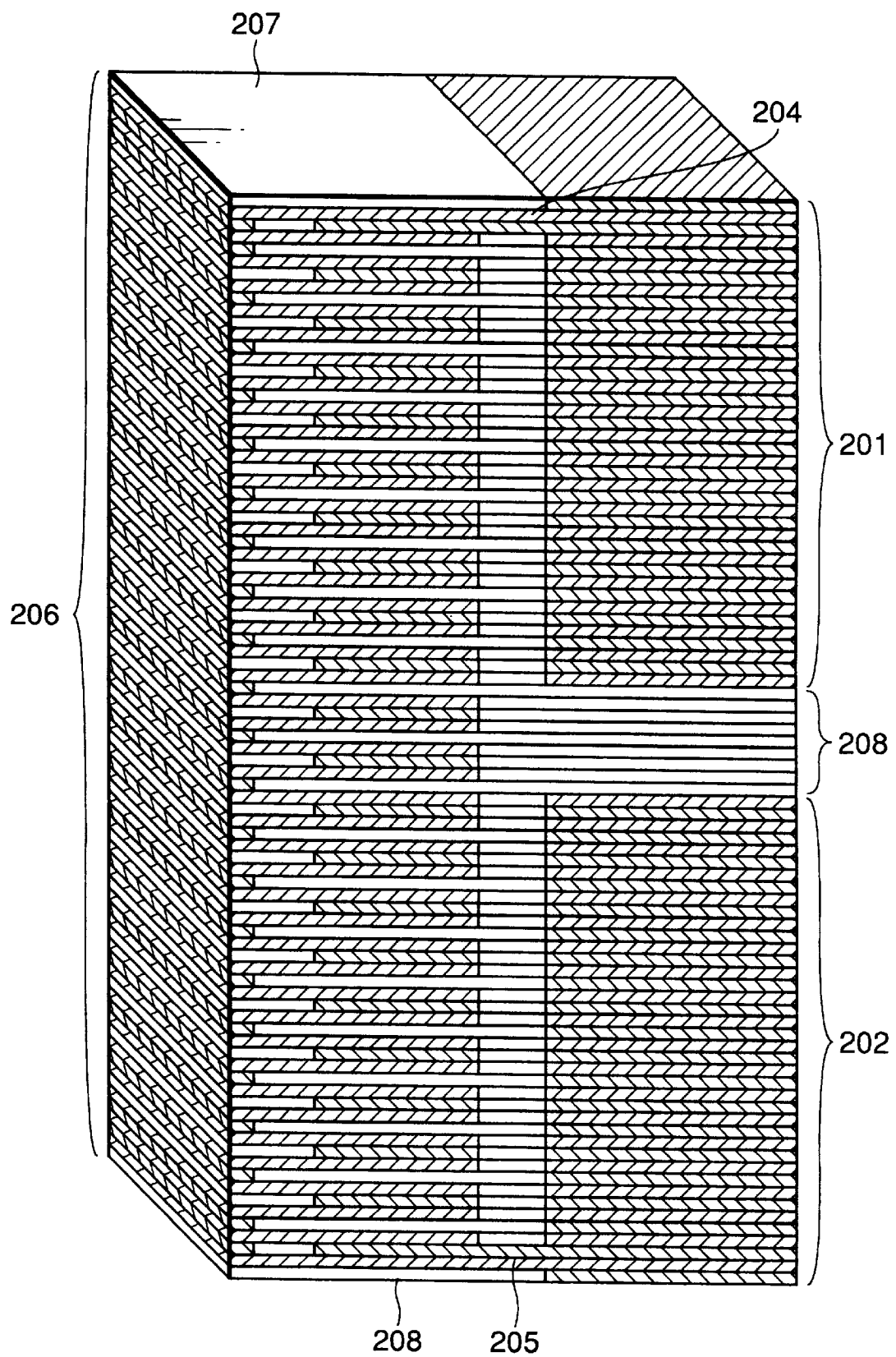
FIG. 42 is a lamination structure diagram of another resistive temperature sensor element of the eighth example of the invention.

For easy understanding of the description of the invention, the number of laminated layers is lessened in the example shown in FIG. 39; in fact, a resistive temperature sensor element having 89 laminated layers shown in FIG. 42 is used.

The resistive temperature sensor having such a lamination structure including connection terminals 201 and 202 having laminated resistance material layers with an insulating section 203 having laminated insulating material layers between. Conduction sections 204 and 205 are connected to the connection terminals 201 and 202 and a temperature sensing section 206 is connected between the conduction sections 204 and 205.

Protective layers 207 and 208 are provided on the upper and lower faces of the temperature sensing section 206.

The conduction section 204 is formed by a resistor 209 of pattern B' and a resistor 210 of pattern C'. The conduction section 205 is formed by a resistor 210 of pattern C' and a resistor 209 of pattern B'. The temperature sensing section 206 is formed by a resistor 211 of pattern D', a resistor 212 of pattern E', a resistor 211 of pattern D', a resistor 213 of pattern F', a resistor 211 of pattern D', a resistor 212 of pattern E', a resistor 211 of pattern D', a resistor 213 of pattern F', a resistor 211 of pattern D', a resistor 214 of pattern G', a resistor 215 of pattern H', a resistor 216 of pattern I', a resistor 215 of pattern H', a resistor 214 of pattern G', a resistor 211 of pattern D', a resistor 213 of pattern F', a resistor 211 of pattern D', a resistor 212 of pattern E', a resistor 211 of pattern D', a resistor 213 of pattern F', a resistor 211 of pattern D', a resistor 212 of pattern E', and a resistor 211 of pattern D'.

For thick film layers shown in FIG. 40, resistance material (hatched in the figure) consisting of 90% molybdenum silicide by volume and 10% alumina by volume and insulting material (indicated by a white background) having basic composition of 90% alumina by volume and 10% mullite by volume to which 3% magnesia by weight and 0.3% silica by weight are added are combined in rectangles as patterns A'–I'.

A manufacturing method of the temperature sensor of the eighth example will be discussed.

(1) Preparing of Material

Resistor material having composition of 90% molybdenum silicide 2 μm in particle diameter by volume and 10% alumina 0.4 μm in particle diameter by volume; a methacrylate resin as a binder, toluene and ethanol as solvents, and BPBG as a plasticizer are entered in an alumina ceramic pot and are dispersed for 15 hours with an alumina bowl as a dispersion medium, providing resistor paint.

Insulator material having basic composition of 90% alumina 0.4 μm in particle diameter by volume, 10% mullite 0.4 μm in particle diameter by volume, 3% magnesia 0.4 μm in particle diameter by weight, and 0.3% silica 0.4 μm in particle diameter by weight, a methacrylate resin as a binder, toluene and ethanol as solvents, and BPBG as a plasticizer are entered in an alumina ceramic pot and are dispersed for 15 hours with an alumina bowl as a dispersion medium, as with the resistor material, providing insulator paint.

(2) Manufacturing of Sheets

The doctor blade height is adjusted so that the thickness after drying the resistor paint and insulator paint manufactured in the process in (1) by a sheet coater becomes 35 μm, and application film of each of the resistor paint and insulator paint is formed 80 mm in width on a polyethylene film, providing a resistor sheet and an insulator sheet.

Each of the resistor sheet and the insulator sheet is cut 100 mm in length to the stack dimension when a laminate is manufactured.

(3) Manufacturing of Thick Film Layers

Each of the thick film layers making up the temperature sensor is made up of a resistor and an insulator.

FIGS. 41A to 41G show a laminate manufacturing method by forming the thick film layer C' in FIG. 40 on the thick film layer D'.

Figure 41A:
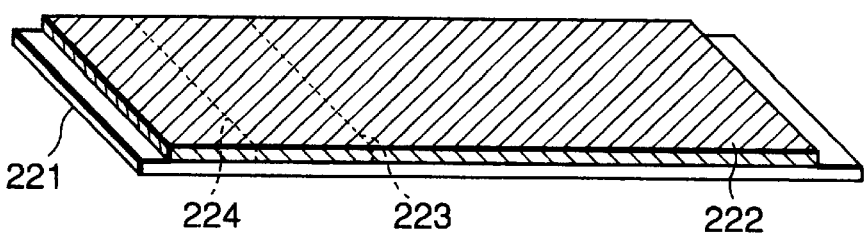
FIGS. 41A to 41G are illustrations of a manufacturing process of thick film layers and laminator.
Figure 41B:
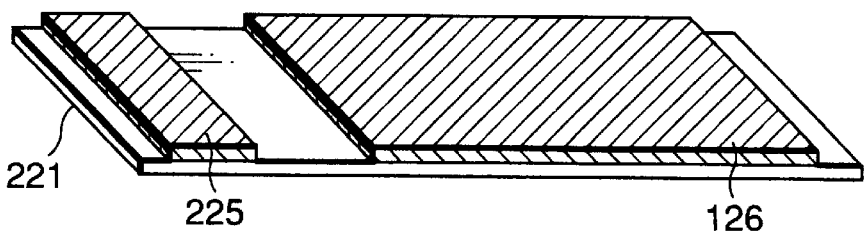

FIG. 41A shows the resistor sheet manufactured in (2) above having a resistor thick film 222 applied on a polyethylene film 221.

Cuts 223 and 224 indicated by dashed lines are made in the resistor thick film 222. Resistor thick films 225 and 226 are left and the resistor thick film therebetween is removed along the cuts 223 and 224, thereby providing a material shown in FIG. 41B.

Figure 41C:
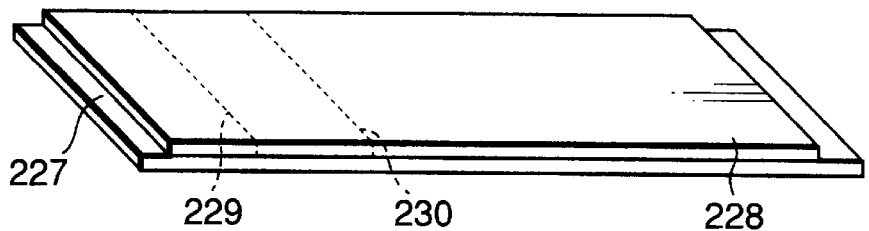

On the other hand, FIG. 41C shows the insulator sheet manufactured in (2) above having an insulator thick film 228 applied on a polyethylene film 227.

Cuts 29 and 30 indicated by dashed lines are made in the insulator thick film 28. An insulator thick film 31 is left and the insulator thick films on both sides of the insulator thick film 31 are removed along the cuts 29 and 30, thereby providing a material shown in FIG. 41D.

Figure 41D:
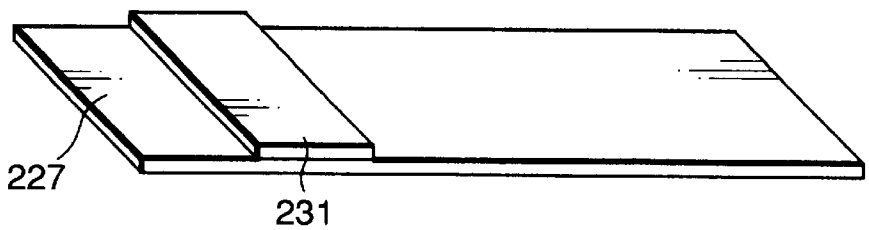
Figure 41E:
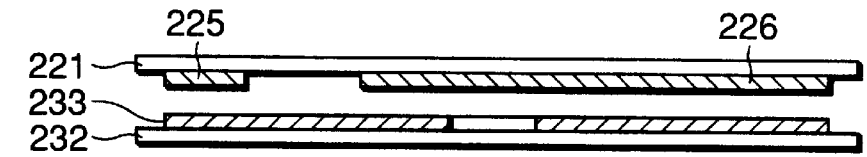

Next, as shown in FIG. 41E, the resistor sheet shown in FIG. 41C is placed upside down and is laminated on a thick film layer 233 already formed as pattern D' on a polyethylene film 232, and pressure of 0.1 kg/cm$^2$ is applied for 10 seconds, then the polyethylene film 221 is removed.

Figure 41F:
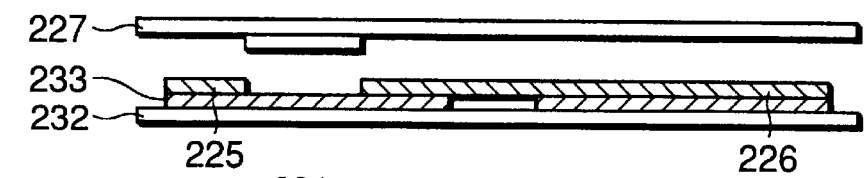
Figure 41G:
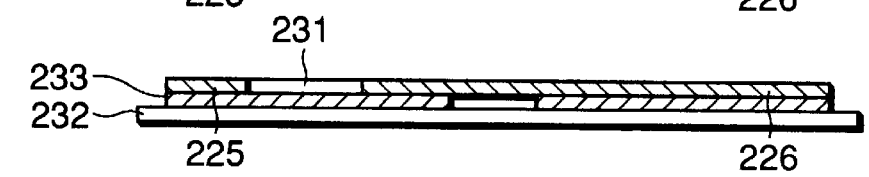

Further, as shown in FIG. 41F, the insulator material shown in FIG. 41D is placed upside down and is laminated in alignment so that the insulator material 231 is inserted between the resistor materials 225 and 226 laminated on thick film layer D', and pressure of 0.1 kg/cm$^2$ is applied for 10 seconds, then the polyethylene film 227 is removed, thereby providing a laminate shown in FIG. 41G. Subsequently, the laminate shown in FIG. 39 is provided by executing predetermined lamination.

(4) Manufacturing of Laminate

After the predetermined lamination is complete, the laminate is removed from the stack board and is entered in a pressurization metal mold and pressure of 1.5 kg/cm$^2$ is applied for 300 seconds.

(5) Cutting of Laminate

Next, the laminate is stuck on a cutting board with double-sided tape and is cut at 2.4-mm wide pitches by means of a diamond cutter, providing laminates each 50 mm long and 3 mm thick.

(6) Manufacturing of Sintered Body

The cut laminates are mounted on a boron nitride board and binders are removed from the laminates at 600° C. for two hours in a nitrogen gas, then the specimens are sintered for one hour in an argon gas at 1750° C. and further sintered for two hours in an argon gas at 1650° C. and 2000 atmospheres by HIP.

After the sintering, surface oxidation treatment is executed for two hours in air at 1430° C.

(7) Working of Connection Terminals

After the surface oxidation treatment, the lamination end faces and upper end members of the connection terminal section 201 shown in FIG. 39 and the lamination end faces and lower end members of the connection terminal section 202 are sandblasted.

Next, a palladium catalyst for nickel plating is printed on the connection terminal sections 201 and 202 and dried, and heat treatment is executed. Then, nickel electroless plating is applied.

Figure 43A:
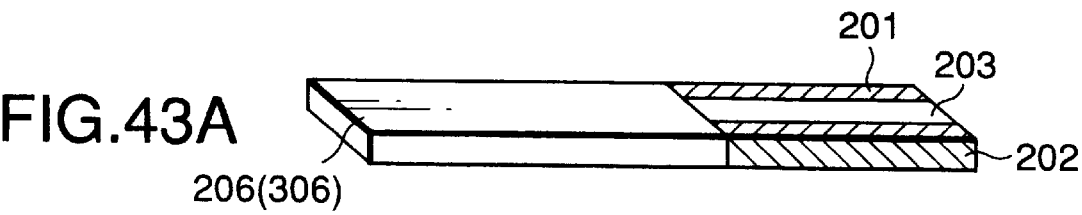
FIGS. 43A to 43D are illustrations of assembling and working the resistive temperature sensor element of the eighth example of the invention.

FIG. 43A shows a resistive temperature sensing element body thus provided.

The resistive temperature sensing element body is the resistive temperature sensing element shown in FIG. 42 having 89 thick films of the patterns shown in FIG. 40 laminated in the order of A'-B'-C'-(D'-E'-D'-F'-D'-E'-D'-F'-D'-E'-D'-F'-D'-E'-D'-F'-D'-E'-D'-F'-D'-E'-D'-F'-D'-E'-D'-F'-D'-E'-D'-F'-D'-G'-H'-I'-H'-G'-H'-I'-H'-G'-D'-F'-D'-E'-D'-F'-D'-E'-D'-F'-D'-E'-D'-F'-D'-E'-D'-F'-D'-E'-D'-F'-D'-E'-D'-F'-D'-E'-D'-F'-D'-E'-D')-C'-B'-A' from top to bottom.

(8) Assembling and Working

Figure 43B:
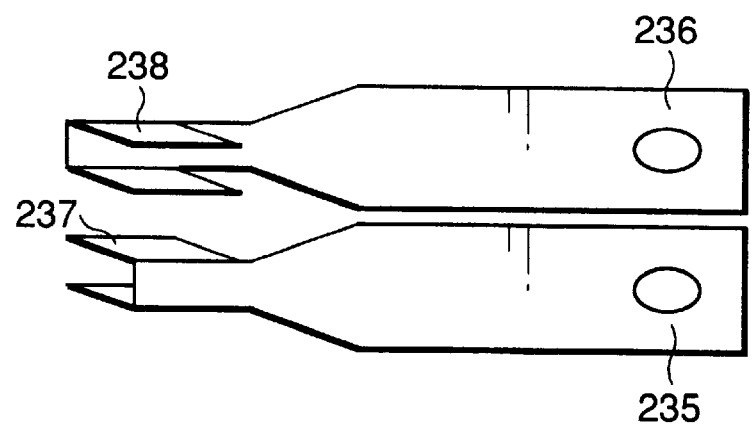

The connection terminals 201 and 202 to which nickel electroless plating is applied are cleaned and dried. Then, the connection terminals 201 and 202 of the resistive temperature sensing element body are caught in connection parts 237 and 238 of lead members 235 and 236 shown in FIG. 43B and the lead members 235 and 236 are joined to the nickel plating portions of the connection terminals 201 and 202 by silver brazing.

Figure 43C:
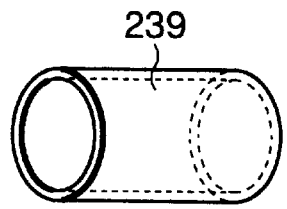
Figure 43D:
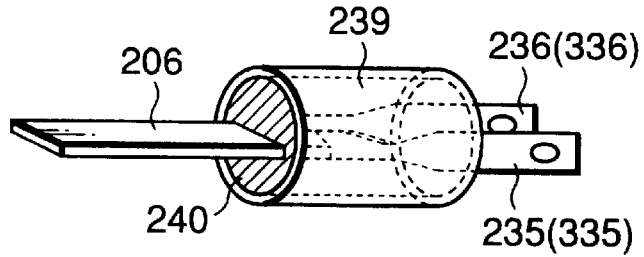

The resistive temperature sensing element body to which the lead members 235 and 236 are connected is inserted into an alumina tube 239 shown in FIG. 43C, is filled with ceramic cement 240 as shown in FIG. 43D, and is dried for 30 minutes at 90° C., then undergoes heat treatment for two hours at 120° C. and is hardened.

Tables 28 and 29 list the measurement results of the electrical characteristics of the temperature sensor assemblies of the eighth example thus provided.

Table 28 lists change rates of resistance values at temperatures when the temperature is changed in the range of room temperature (25° C.) to 1300° C.

Table 29 lists the response speed measurement results by immersion in a niter solution at 400° C.

Specimen AY is provided by cutting at 2.4-mm wide pitches; specimen BY is provided by cutting at 1.2-mm wide pitches; and specimen CY is provided by cutting at 4.8-mm wide pitches.

Figure 44:
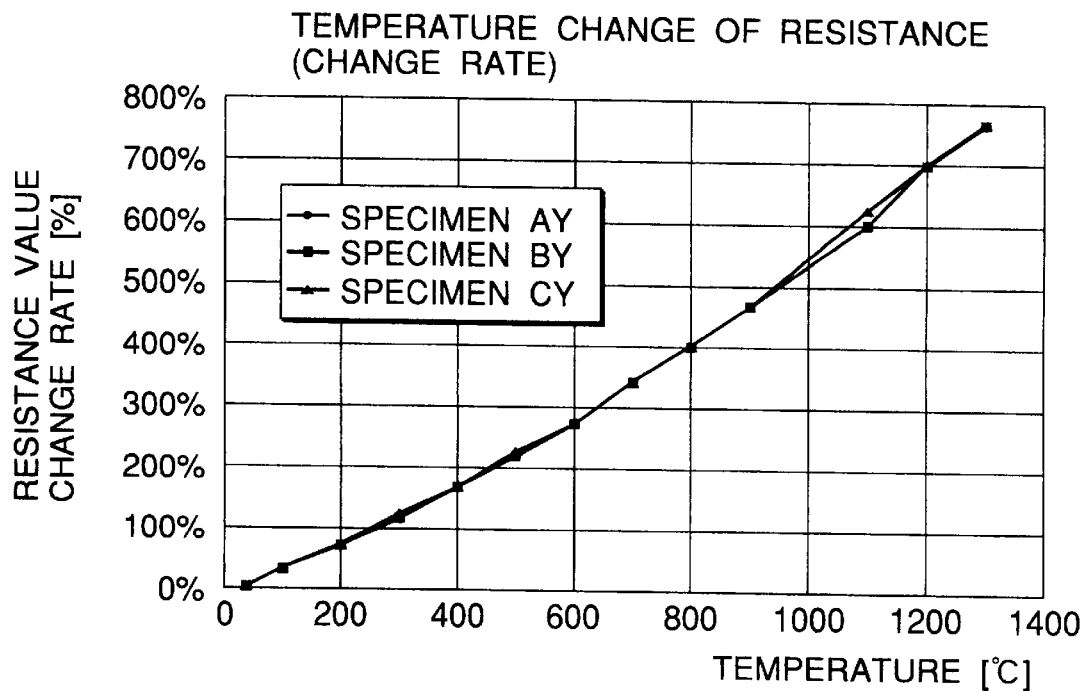
FIG. 44 is a graph to show resistance value change rate in response to temperature in the eighth example of the invention.
Figure 45:
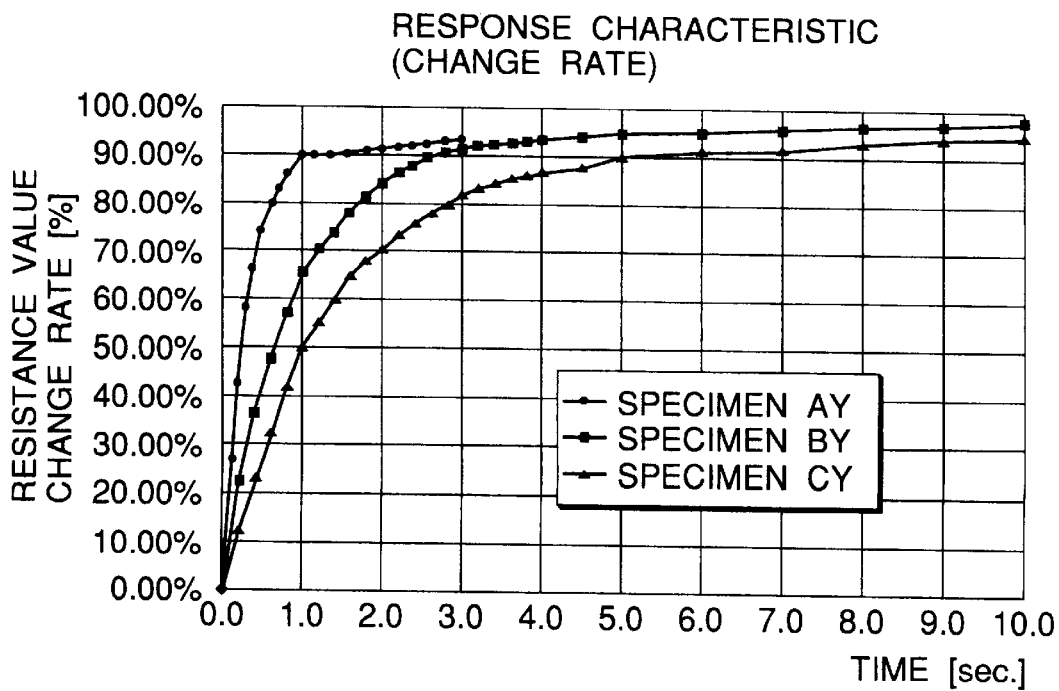
FIG. 45 is a graph to show response speed to resistance value change rate in the eighth example of the invention.

FIGS. 44 and 45 are provided by graphing Tables 28 and 29 respectively.

According to Table 28 and the graph of FIG. 44 corresponding thereto, it is clear that the temperature sensors of the eighth example of the invention have resistance values largely changed in response to temperature change.

According to Table 29 and the graph of FIG. 45 corresponding thereto, it is clear that the temperature sensors of the eighth example of the invention have resistance values changed to predetermined values at sufficient response speed.

Ninth Example

FIG. 46A is a schematic structure diagram of a resistive temperature sensor element body of a ninth example of the invention, FIG. 46B shows a lamination structure similar to that shown in FIG. 39, and FIG. 46C shows new adopted thick film patterns J' and K'. These thick film patterns J' and K' are provided by making openings 241 and 242 in the thick film patterns A' and B' shown in FIG. 40.

The resistive temperature sensor element body shown in FIG. 8B has 11 types of thick film layers laminated in the order of J'-K'-J'-K'-J'-K'-J'-K'-J'-K'-(A'-B'-E'-D'-F'-D'-E'-D'-I'-H'-G'-H'-I'-D'-E'-D'-F'-D'-E'-B'-A')-K'-J'-K'-J'-K'-J'-K'-J'-K'-J' (41 layers in total). A temperature sensing section 243 is made up of 21 thick films enclosed in parentheses except the 10 thick films of each of patterns J' and K' at both ends. The temperature sensing section 243 is formed in the outermost portions with protective films of pattern A' and is formed on the top and bottom with openings 244 and 245 provided by the openings 241 and 242 made in the thick film patterns J' and K'.

Such a structure is adopted, whereby if the protective layers are thickened to provide strength, the temperature sensing section can be thinned and blunting the sensitivity of the temperature sensing section can be avoided.

A manufacturing method and the measurement results are shown below. Parts of the ninth example similar to those of the eighth example will not be discussed again.

Resistance material and insulator material are prepared in the same composition as and by the same method as in the eighth example except that the resistance material has composition of 40% molybdenum silicide by volume and 60% alumina by volume.

To manufacture a laminate, holes making the holes 241 and 242 are previously punched in the thick film layers shown as patterns A' and B' in FIG. 40. A' to K' thick film layers thus formed are laminated in a predetermined order according to the method described with reference to FIGS. 41A to 41G, providing a laminate.

The laminate is entered in a pressurization metal mold and pressure of 1.5 kg/cm$^2$ is applied for 300 seconds, then is cut at 2.4-mm wide pitches, providing laminates each 50 mm long and 1.5 mm thick (41-layer laminate), 2.3 mm thick (65-layer laminate), or 3 mm thick (89-layer laminate).

Binders are removed from the cut laminates at 600° C. for two hours in a nitrogen gas, then the specimens are sintered for two hours in an argon gas at 1700° C. and further sintered for two hours in an argon gas at 1650° C. and 2000 atmospheres by a HIP method. Then, surface oxidation treatment is executed for one hour in air at 1400° C.

Tables 30 and 31 list the measurement results of the electrical characteristics of the temperature sensor assemblies of the ninth example thus provided.

Table 30 lists change rates of resistance values at temperatures when the temperature is changed in the range of room temperature (25° C.) to 1300° C.

Table 31 lists the response speed measurement results by immersion in a niter solution at 400° C.

Specimen DY has a 21-layer temperature sensing section; specimen EY has a 45-layer temperature sensing section, a 10-layer top portion having an opening, and a 10-layer bottom portion having an opening (65 layers in total); and specimen FY has a 65-layer temperature sensing section, a 10-layer top portion having an opening, and a 10-layer bottom portion having an opening (85 layers in total). The specimens are provided by cutting at 2.4-mm wide pitches.

Figure 47:
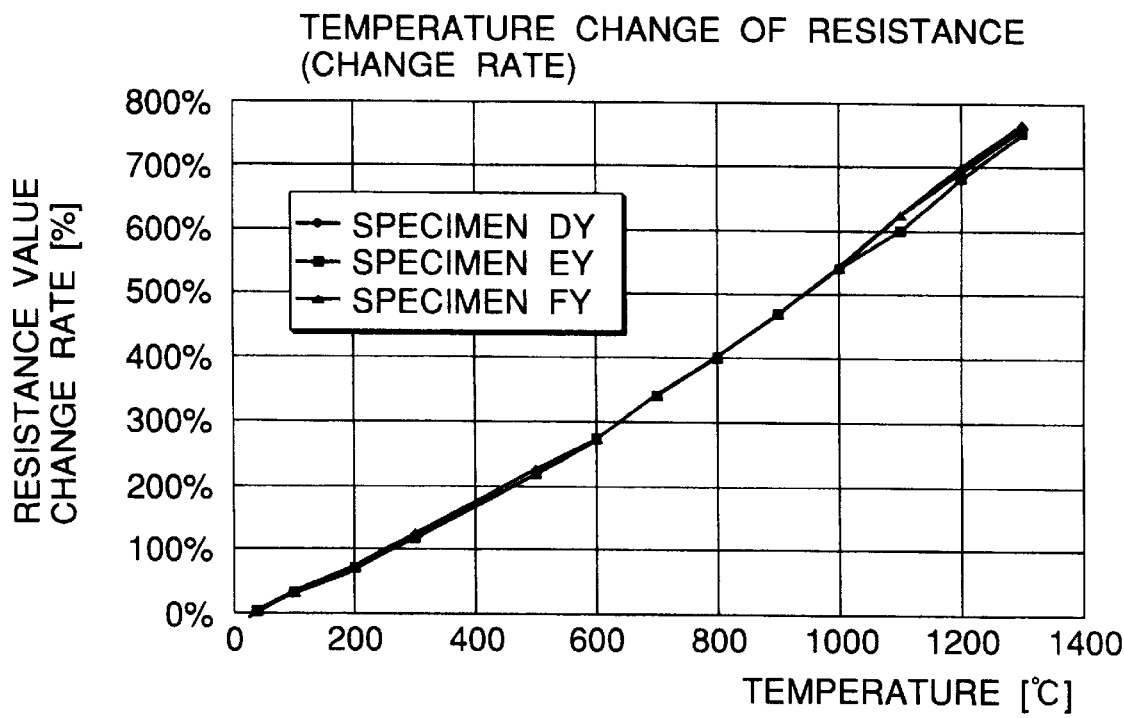
FIG. 47 is a graph to show resistance value change rate in response to temperature in the ninth example of the invention.
Figure 48:
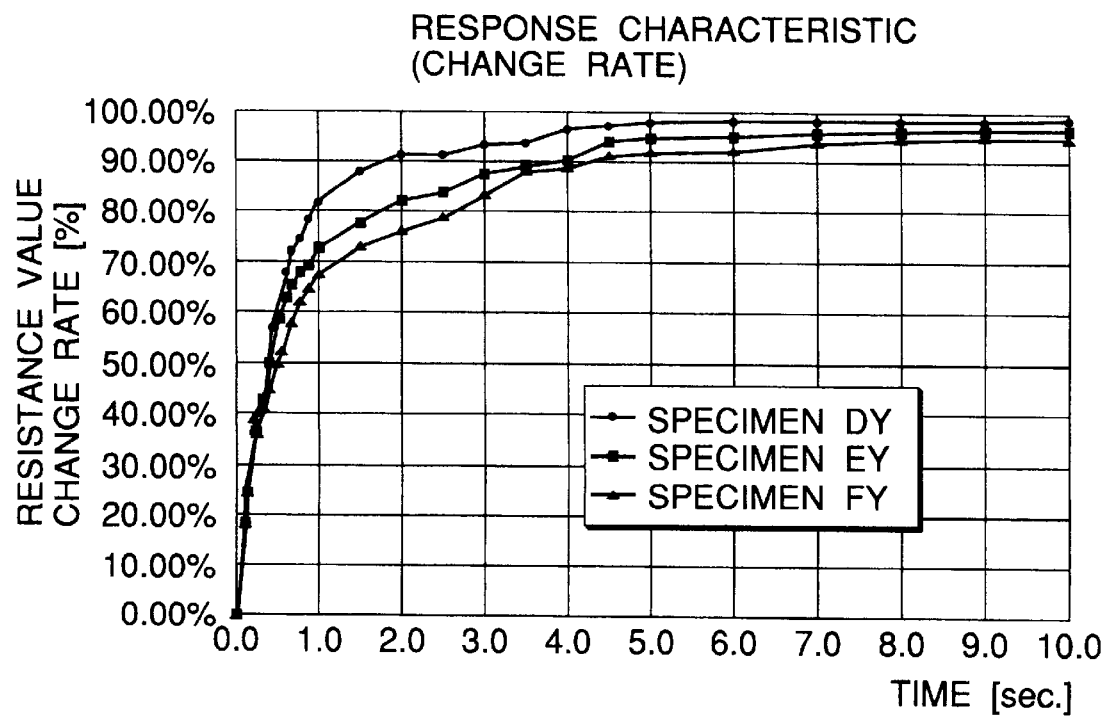
FIG. 48 is a graph to show response speed to resistance value change rate in the ninth example of the invention.

FIGS. 47 and 48 are provided by graphing Tables 30 and 31 respectively.

According to Table 30 and the graph of FIG. 47 corresponding thereto, it is clear that the temperature sensors of the ninth example of the invention have resistance values largely changed in response to temperature change.

According to Table 31 and the graph of FIG. 48 corresponding thereto, it is clear that the temperature sensors of the ninth example of the invention have resistance values changed to predetermined values at sufficient response speed.

Tenth Example

The metal silicides used in the examples we have discussed are only molybdenum silicide, but other various metal silicides are known. Metal silicides other than molybdenum silicide can also be used as ceramic material forming a resistive temperature sensing element.

Use of metal silicide other than molybdenum silicide as ceramic material forming a resistive temperature sensing element will be discussed.

Various metal suicides are known; they differ in electrical, physical, and chemical characteristics depending on metals making up the silicide. In temperature detection application in a high temperature atmosphere, silicides excellent in heat resistance and oxidation resistance in addition to resistance temperature characteristic required for temperature detection are most desirable. When the highest operating temperature is about 1300° C. as in the invention, silicides of molybdenum (Mo), tungsten (W), titanium (Ti), and tantalum (Ta) are proper, among which molybdenum silicide is desirable from total determination of material cost, the degree of difficulty in manufacturing, etc.

However, if any other metal silicide such as tungsten silicide ($WSi_2$) is used, a resistive temperature sensor sufficiently enduring use can be provided.

A resistive temperature sensor example using tungsten silicide as resistance material will be discussed.

The resistive temperature sensor has the same configuration as the resistive temperature sensor of the ninth example shown in FIGS. 46A to 46C except for material and therefore common parts will not be discussed again.

(1) Preparing of Material

Resistor material having composition of 40% tungsten silicide 3 μm in particle diameter by volume and 60% alumina 0.4 μm in particle diameter by volume, a methacrylate resin as a binder, toluene and ethanol as solvents, and BPBG as a plasticizer are entered in an alumina ceramic pot and are dispersed for 15 hours with an alumina bowl as a dispersion medium, providing resistor paint.

Insulator material having basic composition of 90% alumina 0.4 μm in particle diameter by volume, 10% mullite 0.4 μm in particle diameter by volume, 3% magnesia 0.4 μm in particle diameter by weight, and 0.3% silica 0.4 μm in particle diameter by weight, a methacrylate resin as a binder, toluene and ethanol as solvents, and BPBG as a plasticizer are entered in an alumina ceramic pot and are dispersed for 15 hours with an alumina bowl as a dispersion medium, as with the resistor material, providing insulator paint.

(2) Manufacturing of Sheets

The doctor blade height is adjusted so that the thickness after drying the resistor paint and insulator paint manufactured in the process in (1) by a sheet coater becomes 35 μm, and application film of each of the resistor paint and insulator paint is formed 80 mm in width on a polyethylene film, providing a resistor sheet and an insulator sheet.

Each of the resistor sheet and the insulator sheet is cut 100 mm in length to the stack dimension when a laminate is manufactured.

(3) Manufacturing of Laminate

After thick film layers are formed and predetermined lamination is complete as with the 41-layer specimen of the ninth example, the laminate is entered in a pressurization metal mold and pressure of 1.5 kg/cm$^2$ is applied for 300 seconds. Next, the laminate is cut at 2.4-mm wide pitches, providing laminates each 50 mm long and 1.5 mm thick.

(4) Manufacturing of Sintered Body

Binders are removed from the cut laminates at 600° C. for two hours in a nitrogen gas, then the laminates are sintered for two hours in an argon gas at 1650° C.

Further, they are sintered for two hours in an argon gas at 1650° C. and 2000 atmospheres by HIP, then undergo surface oxidation treatment for one hour in air at 1400° C.

After the surface oxidation treatment, terminal connection parts are sandblasted.

(5) Assembling and Working

A palladium catalyst is printed on the terminal connection parts and dried, then heat treatment is executed, then nickel electroless plating is applied. After cleaning and drying, the element to which lead members are joined by silver brazing is inserted into an alumina tube, is filled with ceramic cement, and is dried, then undergoes heat treatment and is hardened.

Tables 32 and 33 list the measurement results of the electrical characteristics of the temperature sensor element specimens thus provided. Table 32 lists resistance value change of specimen GY of the example in response to temperatures. Table 33 lists the resistance value response speed measured in a niter solution at 400° C.

Figure 49:
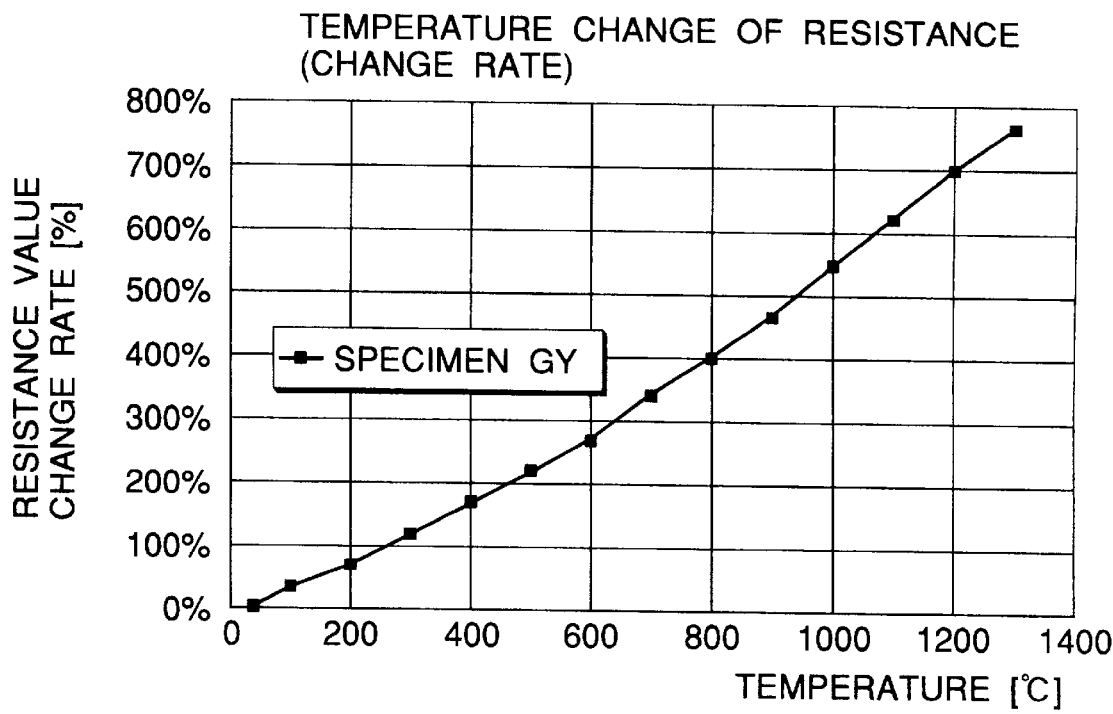
FIG. 49 is a graph to show resistance value change rate in response to temperature in a tenth example of the invention.
Figure 50:
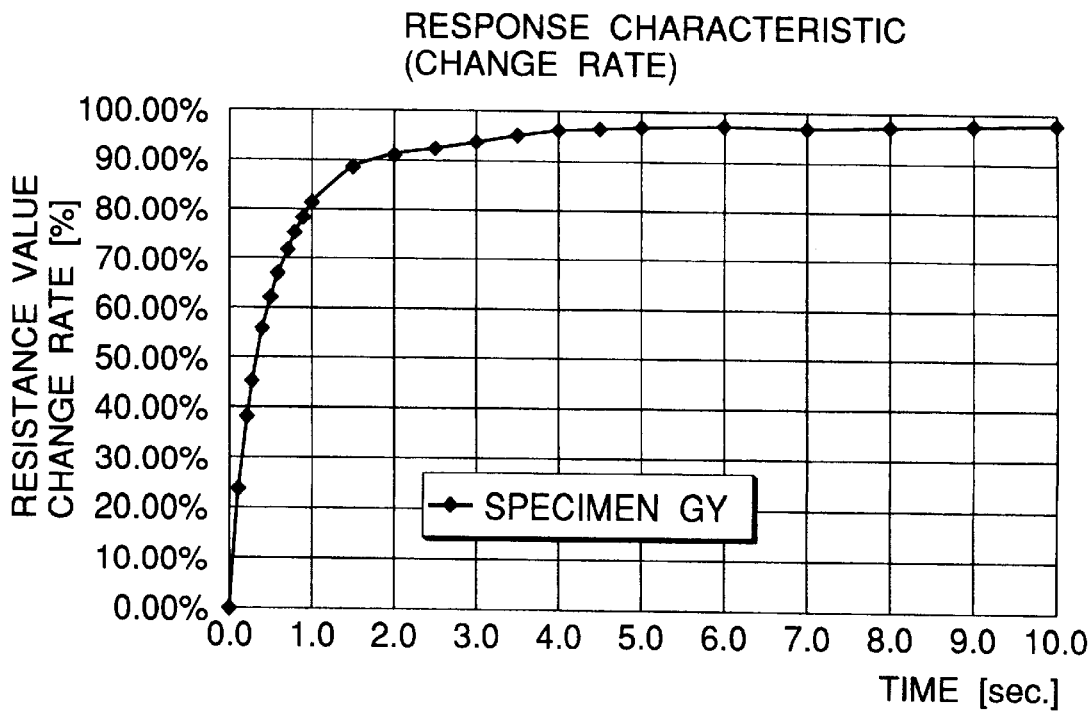
FIG. 50 is a graph to show response speed to resistance value change rate in the tenth example of the invention.

FIG. 49 is provided by graphing the resistance value change rates depending on temperatures in Table 32. FIG. 50 is provided by graphing the response speed to resistance value change rates in Table 33.

According to Table 32 and the graph of FIG. 49 corresponding thereto, it is clear that the resistive temperature sensors of the tenth example using tungsten silicide as the resistor material have resistance values largely changed in response to temperature change.

According to Table 32 and the graph of FIG. 50 corresponding thereto, it is clear that the temperature sensors of the tenth example using tungsten silicide as the resistor material have resistance values changed to predetermined values at sufficient response speed.

Eleventh Example

As we have discussed, the resistive temperature sensors using suicides of molybdenum, tungsten, titanium, and tantalum as resistance materials can be used even at high temperatures near 1300° C. In application in a comparatively low temperature range in which the highest operating temperature is near 1000° C., most metal silicides in addition to the above-mentioned metal suicides can be used; particularly, metal silicides of group IVA, VA, VIA, and VIII elements in the periodic law are highly possible in availability.

Above all, silicides of chromium (Cr), iron (Fe), and cobalt (Co) are desirable materials from total determination of material cost and facility in manufacturing.

Chromium silicide (CrSi2), iron silicide (FeSi2), and cobalt silicide (CoSi2) of metal silicides are inferior to high-melting-point metal silicides such as molybdenum silicide and tungsten silicide in heat resistance. However, if chromium silicide (CrSi2), iron silicide (FeSi2), and cobalt silicide (CoSi2) are used in a comparatively low temperature range of about 1000° C., they are sufficiently available.

Then, resistive temperature sensors having the same structure as those of the ninth example using more inexpensive chromium silicide, iron silicide, and cobalt silicide as resistor materials in place of molybdenum silicide, tungsten silicide, titanium silicide, and tantalum silicide which have high heat resistance, but are more expensive will be discussed.

(1) Preparing of Material

Resistor material compositions for specimens HY, IY, and JY are as follows:

Specimen HY: 40% chromium silicide 2.5 μm in particle diameter by volume and 60% alumina 0.4 μm in particle diameter by volume.

Specimen IY: 40% iron silicide 3.4 μm in particle diameter by volume and 60% alumina 0.4 μm in particle diameter by volume.

Specimen JY: 40% cobalt silicide 2 μm in particle diameter by volume and 60% alumina 0.4 μm in particle diameter by volume.

Insulator material has composition similar to that of the eighth example.

(2) Manufacturing of Laminate

After thick film layers are formed and predetermined lamination is complete as in the tenth example, the laminate is entered in a pressurization metal mold and pressure of 1.5 kg/cm$^2$ is applied for 300 seconds. Next, the laminate is cut at 2.4-mm wide pitches, providing laminate specimens each 50 mm long and 1.5 mm thick.

(3) Manufacturing of Sintered Body

Binders are removed from the cut laminates at 600° C. for two hours in a nitrogen gas, then the laminates are sintered for two hours in an argon gas at 1250° C. Further, they are sintered for two hours in an argon gas at 1200° C. and 1500 atmospheres by HIP, then undergo surface oxidation treatment for one hour in air at 1100° C.

After the surface oxidation treatment, terminal connection parts are sandblasted.

(4) Assembling and Working of Element

A palladium catalyst is printed on the terminal connection parts and dried, then heat treatment is executed, then nickel electroless plating is applied. After cleaning and drying, the element to which lead members are joined by silver brazing is inserted into an alumina tube, is filled with ceramic cement, and is dried, then undergoes heat treatment and is hardened.

Tables 34 and 35 list the measurement results of the electrical characteristics of the temperature sensor elements thus manufactured, wherein the specimen consisting essentially of chromium silicide is specimen HY, the specimen consisting essentially of iron silicide is specimen IY, and the specimen consisting essentially of cobalt silicide is specimen JY.

Table 34 lists resistance value change of the specimens of the example in response to temperatures. Table 35 lists the resistance value response speed measured in a niter solution at 400° C.

Figure 51:
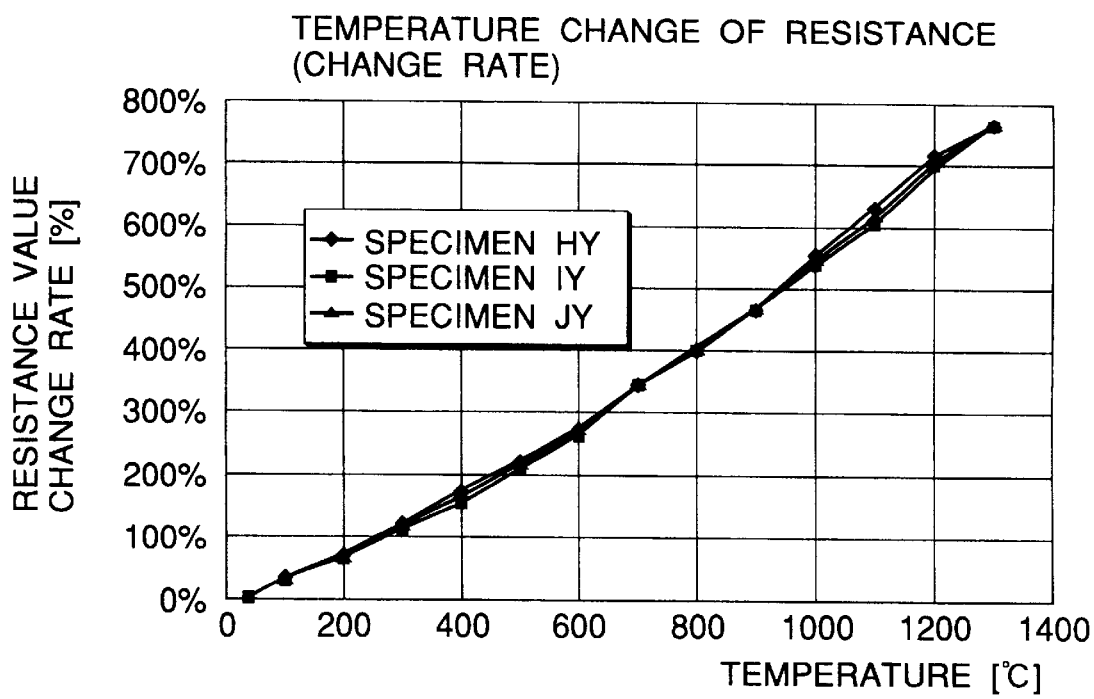
FIG. 51 is a graph to show resistance value change rate in response to temperature in an eleventh example of the invention.
Figure 52:
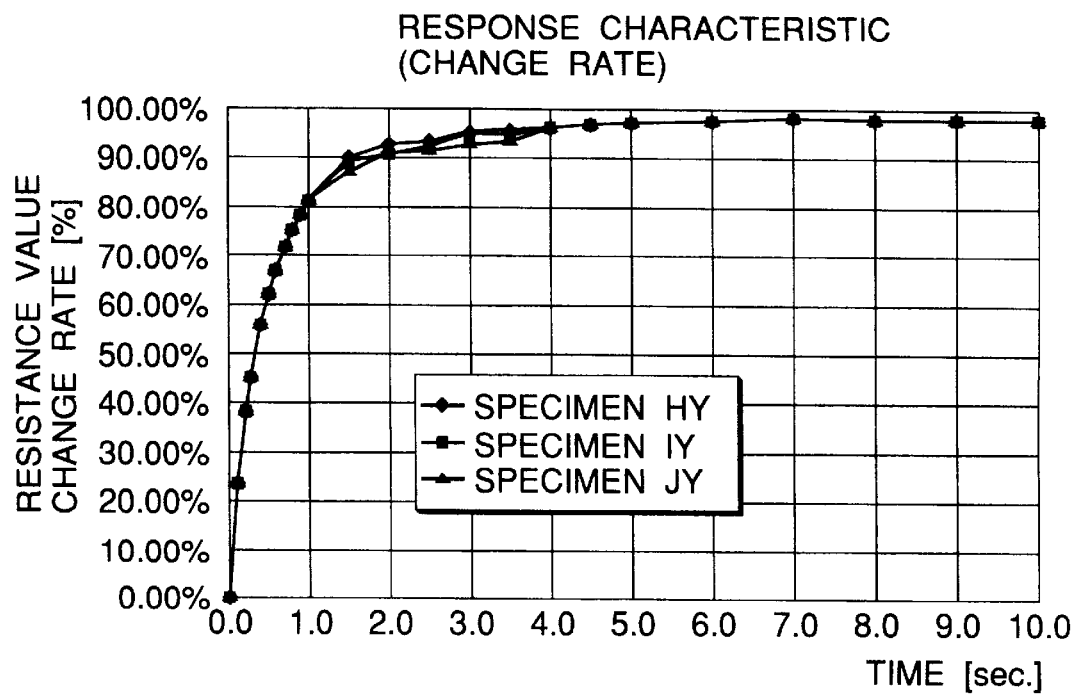
FIG. 52 is a graph to show response speed to resistance value change rate in the eleventh example of the invention.

FIG. 51 is provided by graphing the resistance value change rates depending on temperatures in Table 34. FIG. 52 is provided by graphing the response speed to resistance value change rates in Table 35.

According to Table 34 and the graph of FIG. 51 corresponding thereto, it is clear that the resistive temperature sensors using the resistance materials have resistance values largely changed in response to temperature change.

According to Table 35 and the graph of FIG. 52 corresponding thereto, it is clear that the resistive temperature sensors using the resistance materials have resistance values changed to predetermined values at sufficient response speed.

TABLE 28

| | Resistance Value (Ω) | | | | Change Rate (%) | | |
|---|---|---|---|---|---|---|---|
| Temperature (° C.) | Specimen AY | Specimen BY | Specimen CY | Temperature (° C.) | Specimen AY | Specimen BY | Specimen CY |
| 25 | 1.36 | 3.24 | 0.69 | 25 | 0 | 0 | 0 |
| 100 | 1.80 | 4.37 | 0.96 | 100 | 32 | 35 | 39 |
| 200 | 2.24 | 5.44 | 1.17 | 200 | 65 | 68 | 70 |
| 300 | 2.90 | 7.06 | 1.52 | 300 | 113 | 118 | 120 |
| 400 | 3.54 | 8.52 | 1.80 | 400 | 160 | 163 | 161 |
| 500 | 4.23 | 10.34 | 2.19 | 500 | 211 | 219 | 217 |
| 600 | 4.99 | 11.96 | 2.57 | 600 | 267 | 269 | 272 |
| 700 | 5.96 | 14.29 | 3.06 | 700 | 338 | 341 | 343 |
| 800 | 6.79 | 16.30 | 3.45 | 800 | 399 | 403 | 400 |
| 900 | 7.71 | 18.47 | 3.92 | 900 | 467 | 470 | 468 |
| 1000 | 8.72 | 20.90 | 4.48 | 1000 | 541 | 545 | 549 |
| 1100 | 9.59 | 23.26 | 4.99 | 1100 | 605 | 618 | 623 |
| 1200 | 10.76 | 25.73 | 5.54 | 1200 | 691 | 694 | 703 |
| 1300 | 11.68 | 28.03 | 5.98 | 1300 | 759 | 765 | 766 |

TABLE 29

| | Resistance Value (Ω) | | | | Change Rate (%) | | |
|---|---|---|---|---|---|---|---|
| Time (sec) | Specimen AY | Specimen BY | Specimen CY | Time (sec) | Specimen AY | Specimen BY | Specimen CY |
| 0.0 | 1.36 | 3.24 | 0.69 | 0.0 | 0.0 | 0.0 | 0.0 |
| 0.1 | | 4.87 | | 0.1 | | 26.5 | |
| 0.2 | 2.06 | 5.84 | 0.93 | 0.2 | 22.6 | 42.3 | 12.7 |
| 0.3 | | 6.82 | | 0.3 | | 58.2 | |
| 0.4 | 2.47 | 7.31 | 1.13 | 0.4 | 35.8 | 66.2 | 23.3 |
| 0.5 | | 7.80 | | 0.5 | | 74.1 | |
| 0.6 | 2.82 | 8.12 | 1.30 | 0.6 | 47.1 | 79.3 | 32.3 |
| 0.7 | | 8.38 | | 0.7 | | 83.6 | |
| 0.8 | 3.11 | 8.51 | 1.47 | 0.8 | 56.5 | 85.7 | 41.3 |
| 1.0 | 3.36 | 8.71 | 1.62 | 1.0 | 64.5 | 88.9 | 49.2 |
| 1.2 | 3.51 | 8.77 | 1.73 | 1.2 | 69.4 | 89.9 | 55.0 |
| 1.4 | 3.63 | 8.77 | 1.82 | 1.4 | 73.2 | 89.9 | 59.8 |
| 1.6 | 3.76 | 8.80 | 1.90 | 1.6 | 77.4 | 90.4 | 64.0 |
| 1.8 | 3.87 | 8.84 | 1.97 | 1.8 | 81.0 | 91.1 | 67.7 |
| 2.0 | 3.95 | 8.84 | 2.02 | 2.0 | 83.5 | 91.1 | 70.4 |
| 2.2 | 4.03 | 8.87 | 2.08 | 2.2 | 86.1 | 91.5 | 73.5 |
| 2.4 | 4.08 | 8.87 | 2.12 | 2.4 | 87.7 | 91.5 | 75.7 |
| 2.6 | 4.11 | 8.90 | 2.17 | 2.6 | 88.7 | 92.0 | 78.3 |
| 2.8 | 4.15 | 8.93 | 2.20 | 2.8 | 90.0 | 92.5 | 79.9 |
| 3.0 | 4.17 | 8.97 | 2.24 | 3.0 | 90.6 | 93.2 | 82.0 |
| 3.2 | 4.19 | | 2.26 | 3.2 | 91.3 | | 83.1 |
| 3.4 | 4.21 | | 2.29 | 3.4 | 91.9 | | 84.7 |
| 3.6 | 4.22 | | 2.31 | 3.6 | 92.3 | | 85.7 |
| 3.8 | 4.23 | | 2.32 | 3.8 | 92.6 | | 86.2 |
| 4.0 | 4.24 | 9.03 | 2.33 | 4.0 | 92.9 | 94.1 | 86.8 |

TABLE 29-continued

| | Resistance Value (Ω) | | | | Change Rate (%) | | |
|---|---|---|---|---|---|---|---|
| Time (sec) | Specimen AY | Specimen BY | Specimen CY | Time (sec) | Specimen AY | Specimen BY | Specimen CY |
| 4.5 | 4.26 | | 2.35 | 4.5 | 93.5 | | 87.8 |
| 5.0 | 4.28 | 9.06 | 2.38 | 5.0 | 94.2 | 94.6 | 89.4 |
| 6.0 | 4.31 | | 2.41 | 6.0 | 95.2 | | 91.0 |
| 7.0 | 4.33 | | 2.43 | 7.0 | 95.8 | | 92.1 |
| 8.0 | 4.34 | | 2.46 | 8.0 | 96.1 | | 93.7 |
| 9.0 | 4.36 | | 2.48 | 9.0 | 96.8 | | 94.7 |
| 10.0 | 4.38 | 9.23 | 2.49 | 10.0 | 97.4 | 97.4 | 95.2 |

TABLE 30

| | Resistance Value (Ω) | | | | Change Rate (%) | | |
|---|---|---|---|---|---|---|---|
| Temperature (° C.) | Specimen DY | Specimen EY | Specimen FY | Temperature (° C.) | Specimen DY | Specimen EY | Specimen FY |
| 25 | 3.88 | 4.84 | 7.38 | 25 | 0 | 0 | 0 |
| 100 | 5.24 | 6.39 | 10.26 | 100 | 35 | 32 | 39 |
| 200 | 6.52 | 7.99 | 12.55 | 200 | 68 | 65 | 70 |
| 300 | 8.46 | 10.31 | 16.24 | 300 | 118 | 113 | 120 |
| 400 | 10.40 | 12.75 | 20.40 | 400 | 168 | 164 | 176 |
| 500 | 12.38 | 15.05 | 23.39 | 500 | 219 | 211 | 217 |
| 600 | 14.32 | 17.76 | 27.45 | 600 | 269 | 267 | 272 |
| 700 | 17.11 | 21.20 | 32.69 | 700 | 341 | 338 | 343 |
| 800 | 19.52 | 24.15 | 36.90 | 800 | 403 | 399 | 400 |
| 900 | 22.12 | 27.44 | 41.92 | 900 | 470 | 467 | 468 |
| 1000 | 25.03 | 31.02 | 47.90 | 1000 | 545 | 541 | 549 |
| 1100 | 27.86 | 34.12 | 53.36 | 1100 | 618 | 605 | 623 |
| 1200 | 30.81 | 38.28 | 59.26 | 1200 | 694 | 691 | 703 |
| 1300 | 33.56 | 41.59 | 63.91 | 1300 | 765 | 759 | 766 |

TABLE 31

| | Resistance Value (Ω) | | | | Change Rate (%) | | |
|---|---|---|---|---|---|---|---|
| Time (sec) | Specimen DY | Specimen EY | Specimen FY | Time (sec) | Specimen DY | Specimen EY | Specimen FY |
| 0.0 | 3.88 | 4.84 | 7.38 | 0.0 | 0.0 | 0.0 | 0.0 |
| 0.1 | 5.40 | 6.24 | 9.38 | 0.1 | 23.3 | 17.7 | 15.4 |
| 0.2 | 6.40 | 7.58 | 11.32 | 0.2 | 38.7 | 34.6 | 30.3 |
| 0.3 | 6.80 | 8.26 | 12.75 | 0.3 | 44.8 | 43.2 | 41.2 |
| 0.4 | 7.48 | 8.78 | 13.18 | 0.4 | 55.2 | 49.8 | 44.5 |
| 0.5 | 7.90 | 9.38 | 13.83 | 0.5 | 61.7 | 57.4 | 49.5 |
| 0.6 | 8.26 | 9.74 | 14.25 | 0.6 | 67.2 | 61.9 | 52.8 |
| 0.7 | 8.56 | 9.98 | 14.96 | 0.7 | 71.8 | 65.0 | 58.2 |
| 0.8 | 8.76 | 10.20 | 15.36 | 0.8 | 74.8 | 67.8 | 61.3 |
| 0.9 | 9.00 | 10.35 | 15.88 | 0.9 | 78.5 | 69.7 | 65.3 |
| 1.0 | 9.20 | 10.54 | 16.07 | 1.0 | 81.6 | 72.1 | 66.7 |
| 1.5 | 9.65 | 11.00 | 16.83 | 1.5 | 88.5 | 77.9 | 72.6 |
| 2.0 | 9.80 | 11.35 | 17.27 | 2.0 | 90.8 | 82.3 | 76.0 |
| 2.5 | 9.85 | 11.45 | 17.68 | 2.5 | 91.6 | 83.6 | 79.1 |
| 3.0 | 9.95 | 11.86 | 18.32 | 3.0 | 93.1 | 88.7 | 84.0 |
| 3.5 | 10.00 | 11.95 | 18.96 | 3.5 | 93.9 | 89.9 | 88.9 |
| 4.0 | 10.17 | 11.99 | 19.00 | 4.0 | 96.5 | 90.4 | 89.2 |
| 4.5 | 10.20 | 12.30 | 19.25 | 4.5 | 96.9 | 94.3 | 91.2 |
| 5.0 | 10.24 | 12.40 | 19.36 | 5.0 | 97.5 | 95.6 | 92.0 |
| 6.0 | 10.25 | 12.41 | 19.39 | 6.0 | 97.7 | 95.7 | 92.2 |
| 7.0 | 10.26 | 12.42 | 19.68 | 7.0 | 97.9 | 95.8 | 94.5 |
| 8.0 | 10.27 | 12.42 | 19.70 | 8.0 | 98.0 | 95.8 | 94.6 |
| 9.0 | 10.28 | 12.43 | 19.72 | 9.0 | 98.2 | 96.0 | 94.8 |
| 10.0 | 10.29 | 12.56 | 19.75 | 10.0 | 98.3 | 97.6 | 95.0 |

TABLE 32

| | Specimen GY | |
|---|---|---|
| Temperature (° C.) | Resistance Value (Ω) | Change Rate (%) |
| 25 | 3.02 | 0 |
| 100 | 4.01 | 33 |
| 200 | 5.07 | 68 |
| 300 | 6.52 | 116 |
| 400 | 8.15 | 170 |
| 500 | 9.60 | 218 |
| 600 | 11.17 | 270 |
| 700 | 13.31 | 341 |
| 800 | 15.12 | 401 |
| 900 | 17.20 | 470 |
| 1000 | 19.53 | 547 |
| 1100 | 21.73 | 620 |
| 1200 | 24.08 | 698 |
| 1300 | 26.01 | 762 |

TABLE 33

| | Specimen GY | |
|---|---|---|
| Time (sec) | Resistance Value (Ω) | Change Rate (%) |
| 0.0 | 3.02 | 0.0 |
| 0.1 | 4.21 | 23.3 |
| 0.2 | 5.00 | 38.7 |
| 0.3 | 5.32 | 44.8 |
| 0.4 | 5.85 | 55.2 |
| 0.5 | 6.18 | 61.7 |
| 0.6 | 6.47 | 67.2 |
| 0.7 | 6.70 | 71.8 |
| 0.8 | 6.86 | 74.8 |
| 0.9 | 7.05 | 78.5 |
| 1.0 | 7.21 | 81.6 |
| 1.5 | 7.56 | 88.5 |
| 2.0 | 7.68 | 90.8 |
| 2.5 | 7.77 | 92.6 |
| 3.0 | 7.84 | 94.0 |
| 3.5 | 7.92 | 95.5 |
| 4.0 | 7.97 | 96.5 |
| 4.5 | 7.99 | 96.9 |
| 5.0 | 8.02 | 97.5 |
| 6.0 | 7.03 | 97.7 |
| 7.0 | 8.04 | 97.9 |
| 8.0 | 8.05 | 98.0 |
| 9.0 | 8.06 | 98.2 |
| 10.0 | 8.06 | 98.3 |

TABLE 34

| | Resistance Value (Ω) | | | | Change Rate (%) | | |
|---|---|---|---|---|---|---|---|
| Temperature (° C.) | Specimen HY | Specimen IY | Specimen JY | Temperature (° C.) | Specimen HY | Specimen IY | Specimen JY |
| 25 | 25.87 | 43.11 | 0.86 | 25 | 0 | 0 | 0 |
| 100 | 35.18 | 56.48 | 1.15 | 100 | 36 | 31 | 34 |
| 200 | 43.71 | 70.70 | 1.44 | 200 | 69 | 64 | 67 |
| 300 | 57.17 | 91.40 | 1.87 | 300 | 121 | 112 | 117 |
| 400 | 70.87 | 113.38 | 2.32 | 400 | 174 | 163 | 169 |
| 500 | 82.26 | 134.08 | 2.71 | 500 | 218 | 211 | 215 |
| 600 | 96.48 | 157.79 | 3.19 | 600 | 273 | 266 | 270 |
| 700 | 114.33 | 189.26 | 3.80 | 700 | 342 | 339 | 341 |
| 800 | 130.37 | 214.69 | 4.32 | 800 | 404 | 398 | 401 |
| 900 | 147.96 | 244.44 | 4.91 | 900 | 472 | 467 | 470 |
| 1000 | 168.13 | 276.77 | 5.57 | 1000 | 550 | 542 | 546 |
| 1100 | 186.76 | 304.36 | 6.16 | 1100 | 622 | 606 | 614 |
| 1200 | 207.45 | 341.44 | 6.87 | 1200 | 702 | 692 | 697 |
| 1300 | 223.75 | 369.89 | 7.43 | 1300 | 765 | 758 | 762 |

TABLE 35

| | Resistance Value (Ω) | | | | Change Rate (%) | | |
|---|---|---|---|---|---|---|---|
| Time (sec) | Specimen HY | Specimen IY | Specimen JY | Time (sec) | Specimen HY | Specimen IY | Specimen JY |
| 0.0 | 25.87 | 43.11 | 0.86 | 0.0 | 0.0 | 0.0 | 0.0 |
| 0.1 | 36.45 | 56.56 | 1.21 | 0.1 | 23.5 | 23.4 | 23.6 |

TABLE 35-continued

| | Resistance Value (Ω) | | | | Change Rate (%) | | |
|---|---|---|---|---|---|---|---|
| Time (sec) | Specimen HY | Specimen IY | Specimen JY | Time (sec) | Specimen HY | Specimen IY | Specimen JY |
| 0.2 | 43.31 | 70.31 | 1.43 | 0.2 | 38.8 | 38.7 | 38.8 |
| 0.3 | 46.10 | 74.64 | 1.52 | 0.3 | 45.0 | 44.9 | 45.0 |
| 0.4 | 50.79 | 81.95 | 1.67 | 0.4 | 55.4 | 55.3 | 55.5 |
| 0.5 | 53.69 | 86.51 | 1.76 | 0.5 | 61.8 | 61.8 | 61.8 |
| 0.6 | 56.19 | 90.36 | 1.84 | 0.6 | 67.4 | 67.2 | 67.3 |
| 0.7 | 58.22 | 93.62 | 1.91 | 0.7 | 71.9 | 71.9 | 72.0 |
| 0.8 | 59.63 | 95.76 | 1.96 | 0.8 | 75.0 | 74.9 | 75.0 |
| 0.9 | 61.30 | 98.33 | 2.01 | 0.9 | 78.7 | 78.6 | 78.7 |
| 1.0 | 62.64 | 100.52 | 2.06 | 1.0 | 81.7 | 81.7 | 81.8 |
| 1.5 | 65.77 | 106.70 | 2.17 | 1.5 | 88.7 | 90.5 | 90.0 |
| 2.0 | 66.82 | 107.44 | 2.22 | 2.0 | 91.0 | 91.5 | 92.8 |
| 2.5 | 67.16 | 108.51 | 2.23 | 2.5 | 91.8 | 93.1 | 93.6 |
| 3.0 | 67.82 | 110.29 | 2.26 | 3.0 | 93.2 | 95.6 | 95.6 |
| 3.5 | 68.19 | 110.83 | 2.25 | 3.5 | 94.0 | 96.4 | 95.4 |
| 4.0 | 69.37 | 111.08 | 2.27 | 4.0 | 96.7 | 96.7 | 96.7 |
| 4.5 | 69.54 | 111.29 | 2.28 | 4.5 | 97.1 | 97.0 | 97.1 |
| 5.0 | 69.84 | 111.70 | 2.29 | 5.0 | 97.7 | 97.6 | 97.7 |
| 6.0 | 69.92 | 111.83 | 2.29 | 6.0 | 97.9 | 97.8 | 97.9 |
| 7.0 | 69.96 | 111.99 | 2.29 | 7.0 | 98.0 | 98.0 | 98.1 |
| 8.0 | 70.06 | 112.05 | 2.29 | 8.0 | 98.2 | 98.1 | 98.2 |
| 9.0 | 70.10 | 112.21 | 2.30 | 9.0 | 98.3 | 98.3 | 98.4 |
| 10.0 | 70.20 | 112.24 | 2.30 | 10.0 | 98.5 | 98.4 | 98.5 |

Twelfth Example

Figure 53A:
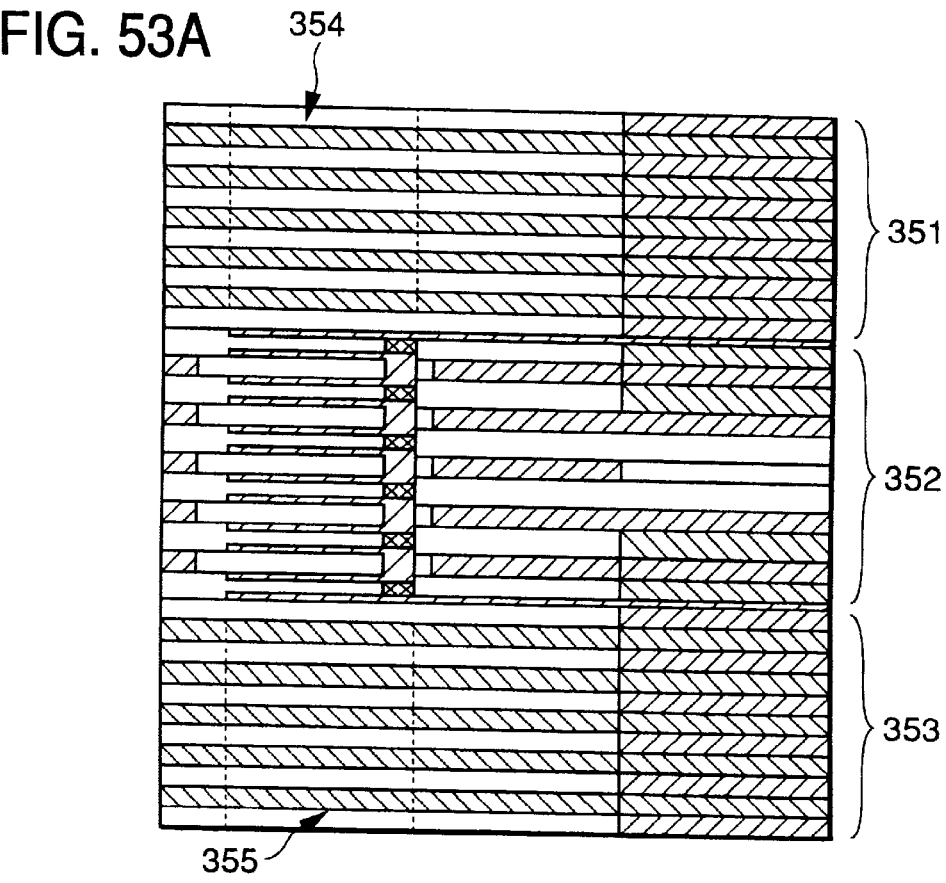
FIGS. 53A and 53B show lamination structure diagrams of a resistive temperature sensor element of a twelfth example of the invention.
Figure 53B:
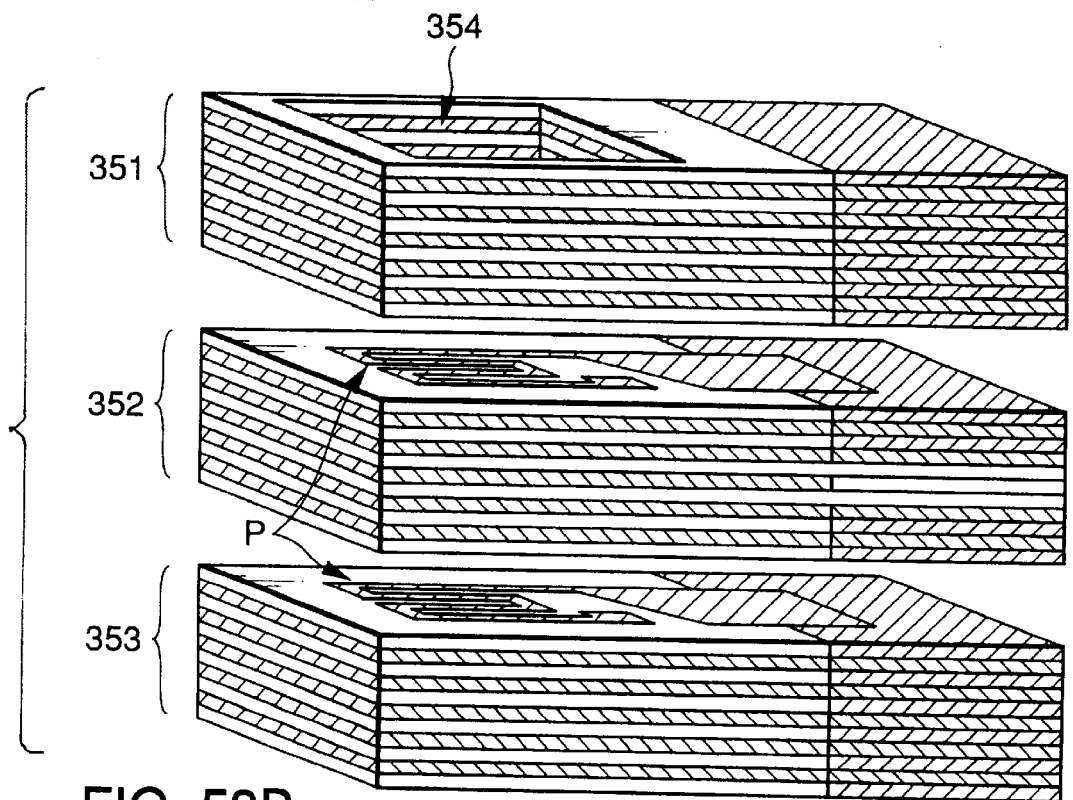

FIG. 53A shows a lamination sectional structure of a resistive temperature sensor element body of a twelfth example of the invention and FIG. 53B is an exploded view. FIG. 54 shows patterns of thick films used.

The laminate shown in FIG. 53A has six types of thick film layers each 100 mm long, 80 mm wide, and 35 $\mu$m thick shown as patterns in FIG. 54 laminated in the order of J"-K"-J"-K"-J"-K"-J"-K"-J"-K"-(A"-L"-M"-L"-M"-N"-O"-N"-M"-L"-M"-L"-A")-K"-J"-K"-J"-K"-J"-K"-J"-K"-J" from top to bottom. A temperature sensing resistance section is formed by printing on the thick film patterns enclosed in parentheses.

The separation between the same layers shown in FIG. 53A is lost after the termination of sintering.

The resistive temperature sensor element body has an upper protective section 351, a temperature sensing section 352, and a lower protective section 353 superposed on each other, as shown in FIG. 53B; a resistor of pattern P" is printed on the thick film of pattern L" placed on the top of the thick films making up the temperature sensing section 352 and the thick film of pattern A" placed on the top of the thick films making up the lower protective section 353.

Each of the upper protective section 351 and the lower protective section 353 has 10 alternating thick film layers of patterns J" and K" laminated on each other and the thick film layer of pattern J" at upper and lower ends.

Each of the upper protective section 351 and the lower protective section 353 is formed in a part with an opening part (354, 355) made by openings 341 formed in the thick film layers of patterns J" and openings 342 formed in the thick film layers of patterns K". The resistor of the temperature sensing section 352 is placed between the opening parts 354 and 355.

Some thick film patterns shown in FIG. 54 has a through hole made in an insulator and a conductor embedded in the through hole. That is, pattern L" has a through hole 356 made in pattern A" and pattern M" has a through hole 357 made in pattern C". In addition, pattern N" which has a through hole 358 in which a conductor is embedded and pattern O" which has a through hole 359 in which a conductor is embedded are used. Patterns A", J", and K" are exactly as shown in FIG. 54.

In the example, a temperature sensing resistance pattern is printed on thick films of patterns A", L", M", N", and O". The relationship between the resistor patterns and the thick film patterns will be discussed with reference to FIGS. 55A to 55E.

Pattern P" shown in FIG. 53B, similar pattern Q", and patterns R" and S", which are not resistor patterns, are used for the printed resistor patterns. The through holes are below the resistor patterns and are hidden in FIGS. 55A to 55E and therefore are not considered for the description that follows.

Figure 55A:
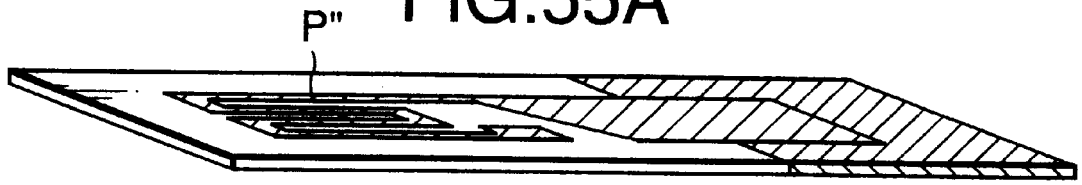
FIGS. 55A to 55E are illustrations of the relationship between resistor patterns and thick film patterns.
Figure 55B:
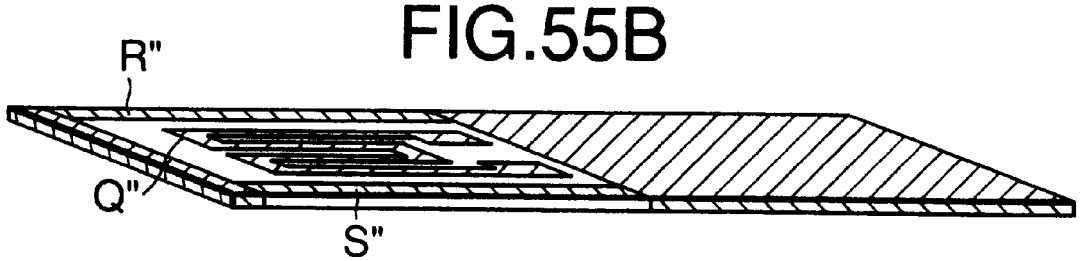
Figure 55C:
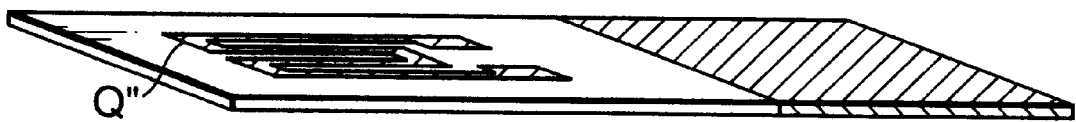
Figure 55D:
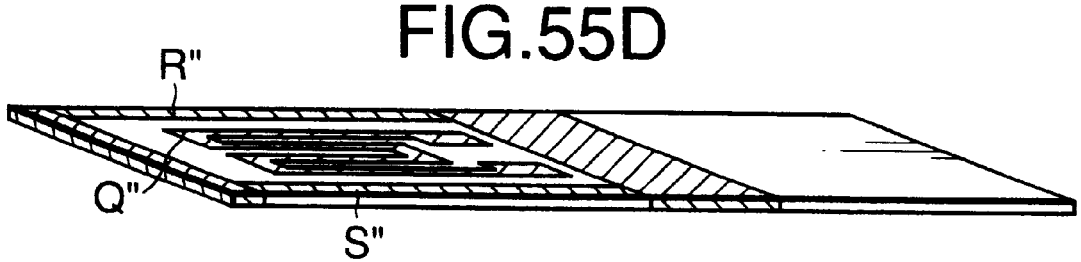
Figure 55E:
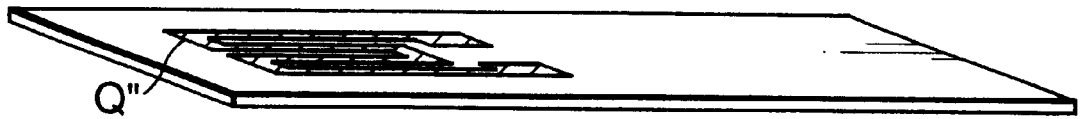

In FIG. 55A, resistor pattern P" is printed on thick film pattern A", L"; in FIG. 55B, resistor pattern Q" and patterns R" and S" are printed on thick film pattern M"; in FIG. 55C, resistor pattern Q" is printed on thick film pattern; in FIG. 55D, resistor pattern Q" and patterns R" and S" are printed on thick film pattern O"; and in FIG. 55E, resistor pattern Q" is printed on thick film pattern N". They are laminated in the order described above.

Figure 56:
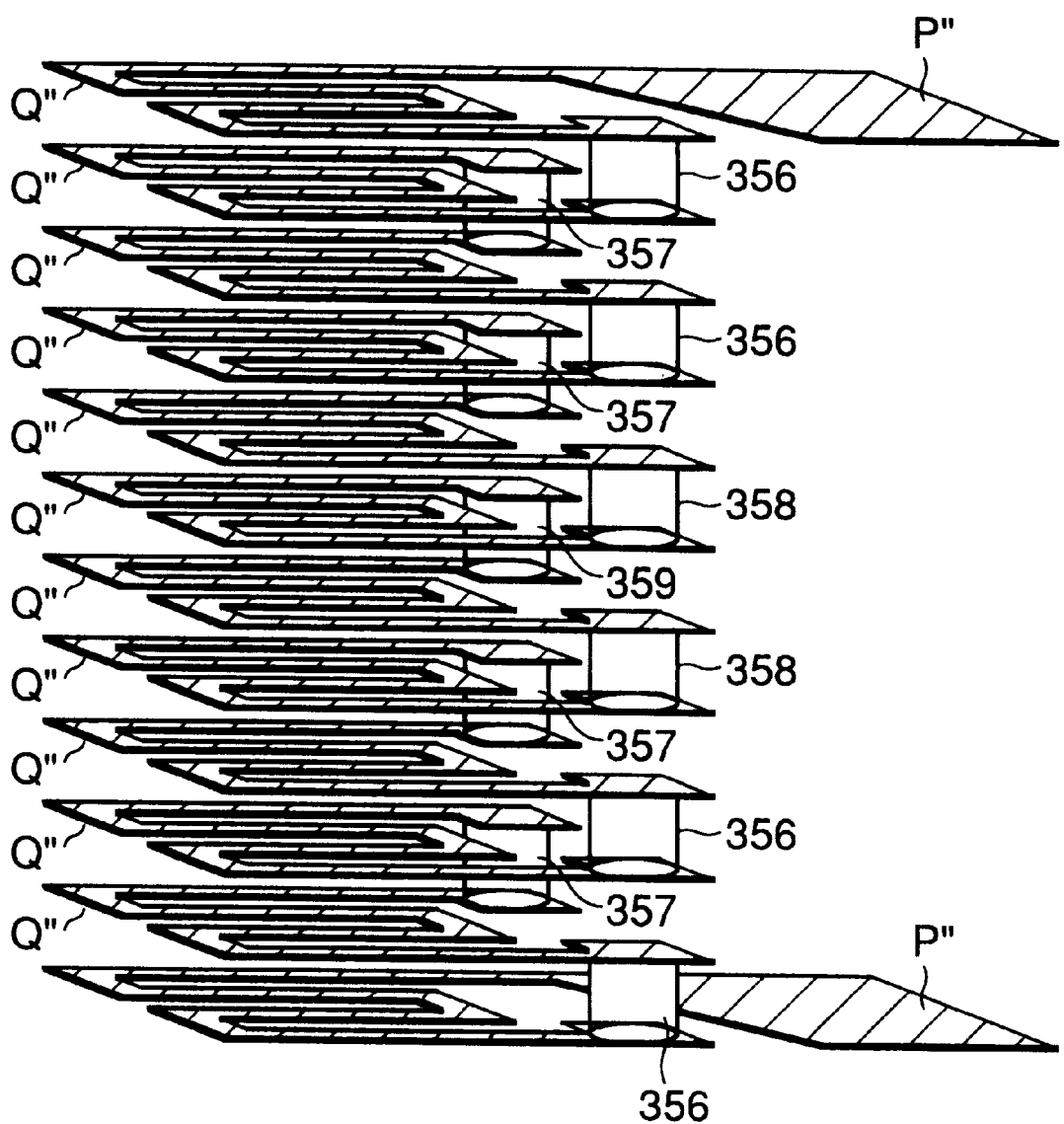
FIG. 56 is an illustration of a resistor circuit.

FIG. 56 shows a resistor circuit made up of the resistor patterns and the through holes. In the figure, only the resistor patterns and the through holes are shown and the thick films are not shown.

The resistor circuit shown in FIG. 56 has 10 resistors of patterns Q" placed between two resistors of patterns P". The resistors patterns P" and Q" are connected by the through holes 356–359 in series in the order of pattern P"-through hole 356-pattern Q"-through hole 357-pattern Q"-through hole 356-pattern Q"-through hole 357-pattern Q"-through hole 358-pattern Q"-through hole 359-pattern Q"-through hole 358-pattern Q"-through hole 357-pattern Q"-through hole 356-pattern Q"-through hole 357-pattern Q"-through hole 356-pattern P".

Materials used for the resistive temperature sensor of the example and a manufacturing method therefor will be discussed.

(1) Preparing of Materials

Conductor material having composition of 90% molybdenum silicide 2 μm in particle diameter by volume and 10% alumina 0.4 μm in particle diameter by volume and toluene as a solvent are entered in an alumina ceramic pot and are dispersed for 15 hours with an alumina bowl as a dispersion medium. After the dispersion, a toluene 40% solution of an ethyl cellulose resin is added as a binder and they are mixed by a stirrer.

Structure conductor material having composition of 90% molybdenum silicide 2 μm in particle diameter by volume and 10% alumina 0.4 μm in particle diameter by volume, a methacrylate resin as a binder, toluene and ethanol as solvents, and BPBG as a plasticizer are entered in an alumina ceramic pot and are dispersed for 15 hours with an alumina bowl as a dispersion medium.

Resistor material having composition of 40% molybdenum silicide 2 μm in particle diameter by volume and 60% alumina 0.4 μm in particle diameter by volume, a methacrylate resin as a binder, toluene and ethanol as solvents, and BPBG as a plasticizer are entered in an alumina ceramic pot and are dispersed for 15 hours with an alumina bowl as a dispersion medium.

Insulator material having basic composition of 90% alumina 0.4 μm in particle diameter by volume, 10% mullite 0.4 μm in particle diameter by volume, 3% magnesia 0.4 μm in particle diameter by weight, and 0.3% silica 0.4 μm in particle diameter by weight, a methacrylate resin as a binder, toluene and ethanol as solvents, and BPBG as a plasticizer are entered in an alumina ceramic pot and are dispersed for 15 hours with an alumina bowl as a dispersion medium, as with the structure conductor material, providing insulator paint.

(2) Manufacturing of Sheets

The doctor blade height is adjusted so that the thickness after drying the conductor paint and insulator paint manufactured in the process in (1) by a sheet coater becomes 35 μm, and application film of each of the conductor paint and insulator paint is formed 80 mm in width on a polyethylene film, providing a conductor sheet and an insulator sheet.

Each of the conductor sheet and the insulator sheet is cut 100 mm in length to the stack dimension when a laminate is manufactured.

(3) Manufacturing of Thick Films

The thick films can be manufactured by the following method described with reference to FIGS. 57A to 57G:

FIG. 57A shows the resistor sheet manufactured in (2) above having resistor paint film applied on a polyethylene film 365; unremoved portions of resistor paint 366 and 367 are formed a little wider than the necessary portions.

To set the resistor paint portions to a predetermined size, cuts indicated by dashed lines 368 and 369 are made in necessary parts and unnecessary resistor paint is removed along the cuts 368 and 369, thereby providing a material having resistor paint portions 370 and 371 shown in FIG. 57B.

Shown in FIG. 57C is an insulator sheet provided by executing the sheet manufacturing process in (2) above; an insulator paint film 373 is applied on a polyethylene film 372. The unremoved portion of insulator paint 373 is formed a little wider than the necessary portion.

To set the insulator paint portion to a predetermined size, cuts indicated by dashed lines 374 and 375 are made in necessary parts and unnecessary insulator paint is removed along the cuts 374 and 375, thereby providing a material having an insulator paint portion 376 shown in FIG. 57D.

Next, the resistor sheet shown in FIG. 57B is placed upside down as shown in FIG. 57E and is laminated on the material having the insulator paint film shown in FIG. 57D in alignment so that the insulator paint portion 376 is inserted between the resistor paint portions 370 and 371. Pressure of 0.1 kg/cm² is applied for 10 seconds, then the polyethylene film 365 is removed, thereby providing a material sheet shown in FIG. 57F.

In addition, as shown in FIG. 57F, a portion corresponding to the insulator paint portion 376 shown in FIG. 57D can also be applied, dried, and formed between the resistor paint portions 370 and 371 shown in FIG. 57B instead of forming the material having the insulator paint film 376 shown in FIG. 57D.

That is, after the sheet shown in FIG. 57B is prepared, the doctor blade height is adjusted so that the height after drying becomes 35 μm by a sheet coater, and insulator paint 398 shown in FIG. 57G is applied, then the specimen is cut to a predetermined length, thereby providing the material sheet shown in FIG. 57F.

The thick films of patterns J" and K" are prepared by punching openings 341 and 342 for making opening parts 344 and 345 in thick film layers as patterns A" and B" shown in FIG. 54.

The through holes are punched by a similar method to that of making openings. To form the conductors embedded in the holes, conductor material may be embedded following hole making; resistor paint can also be embedded in the holes at the printing time of resistor pattern described later, thereby forming the conductors.

Figure 58A:
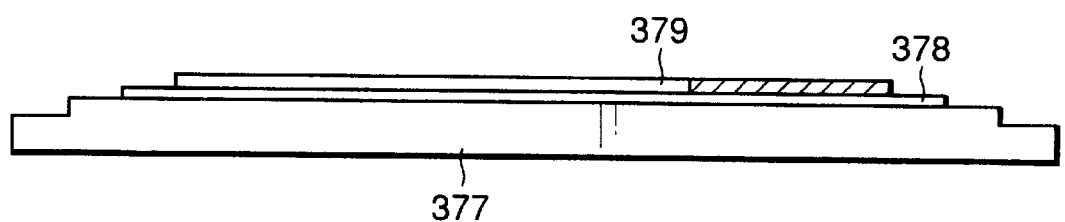
FIGS. 58A to 58C are illustrations to show a process of forming a resistor thin film by printing.
Figure 58B:
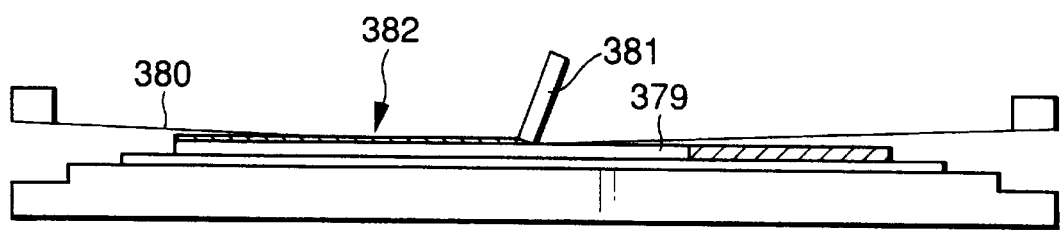
Figure 58C:
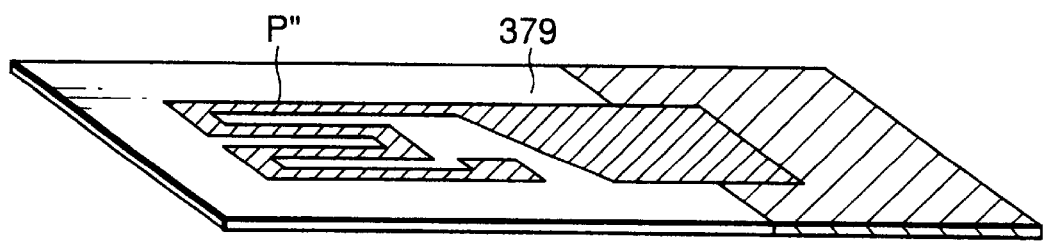

FIGS. 58A to 58C shows a process of forming a resistor thin film by printing.

In the process, unnecessary polyethylene film is removed, a thick film element sheet 379 placed on a necessary polyethylene film 378 (in the figure, element sheet of pattern A") is placed on a print substrate 377 shown in FIG. 58A, and resistor material is printed with a squeegee 381 via a screen 380 by a screen print method as shown in FIG. 58B, thereby forming a resistor thin film 382, providing a resistor thick film formed with resistor pattern P" as shown in FIG. 58C.

To laminate the sheets thus formed as the structure shown in FIG. 53, sheets corresponding to the layers are provided and the sheet types are changed and the sheets are laminated in a predetermined order so as to put the layers into the structure shown in FIG. 53. Specifically, first the sheet corresponding to the protective section 353 is provided and laminated, next the sheet forming the temperature sensing section 352 is provided and laminated, and last the sheet corresponding to the protective section 351 is provided and laminated.

(4) Manufacturing of Laminate

After the predetermined lamination is complete, the laminate is removed from the stack board and is entered in a pressurization metal mold and pressure of 1.5 kg/cm² is applied for 300 seconds.

(5) Cutting of Laminate

Next, the laminate is stuck on a cutting board with double-sided tape and is cut at 2.4-mm wide pitches by means of a diamond cutter, providing laminate specimens each 50 mm long and 1 mm thick.

(6) Manufacturing of Sintered Body

The element laminate of the invention contains metal silicide hard to be sintered as a component, thus needs to be sintered at least at 1200° C., preferably at 1400° C. or more.

Since the metal silicide is easily oxidized in air in a low temperature range of about 200 degrees and lowers stability of performance, oxidation needs to be suppressed. The metal silicide needs to be sintered in a non-oxidation atmosphere.

Preferably, the non-oxidation atmosphere is an argon atmosphere; a nitrogen atmosphere tends to nitride metal silicide, consequently the temperature characteristic of resistance is changed.

In application wherein automobile exhaust gas temperature is measured, remaining carbon in the exhaust gases is deposited on the element surface and it is feared that the deposited remaining carbon may cause the conductor layers to be electrically short-circuited. Thus, preferably an insulating layer is formed on the element surface as a surface protective layer.

Preferably, a material having a thermal expansion coefficient similar to that of the element body consisting essentially of alumina is used as the surface protective layer. Since the thickness of the layer affects the response speed of the element, the layer should be thin as much as possible; specifically, it is formed 20 μm or less thick, preferably 10 μm or less thick.

A film consisting essentially of silica has a higher oxidation suppression effect than a film consisting essentially of alumina, but differs from the element body slightly in thermal expansion coefficient, thus cracks, etc., easily occur on the film consisting essentially of silica because of heat impact and the film should be thin as much as possible. Therefore, it needs to be formed 20 μm or less thick, preferably 10 μm or less thick. The film consisting essentially of silica can also be formed on exposure to air at 500° C. or more, preferably in the temperature range of 1000° C. to 1400° C. It is not practical to expose the film to air at less than 500° C. because film oxide formation requires a long time. A film consisting essentially of alumina is furthermore formed after the film consisting essentially of silica is formed, whereby reliability of the element can be furthermore improved.

To form the films, materials are deposited by a CVD method or slurry application, immersion, print, transfer, etc., then drying and thermal treatment are executed.

From the viewpoints, The cut laminates are mounted on a boron nitride board and binders are removed from the laminates at 600° C. for two hours in a nitrogen gas, then the laminates are sintered for one hour in an argon gas at 1750° C. Further, they are sintered for two hours in an argon gas at 1650° C. and 2000 atmospheres by HIP, then undergo surface oxidation treatment for one hour in air at 1400° C.

Consequently, the resistive temperature sensing element 206 (306) of shape shown in FIG. 43A is provided.

(7) Working and Assembling of Connection Terminals

The conductor portions of the lamination end faces of the resistive temperature sensing element thus provided are sandblasted, thereby forming connection terminals. Next, a palladium catalyst for nickel plating is printed on the connection terminals and dried, then heat treatment is executed and nickel electroless plating is applied. Further, the connection terminals are cleaned and dried, then are caught in connection parts of lead members and the connection parts are joined to the nickel plating portions of the connection terminals by silver brazing.

The resistive temperature sensing element body to which the lead members are connected is inserted into an alumina tube, is filled with ceramic cement, and is dried for 30 minutes at 90° C., then undergoes heat treatment for two hours at 120° C. and is hardened.

Other forms of resistive temperature sensor assembly will be discussed with reference to FIGS. 59 and 60.

Figure 59A:
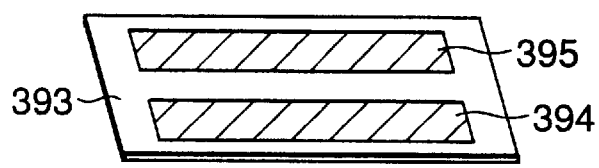
FIGS. 59A to 59C are illustrations to show another form of resistive temperature sensor assembly.
Figure 59B:
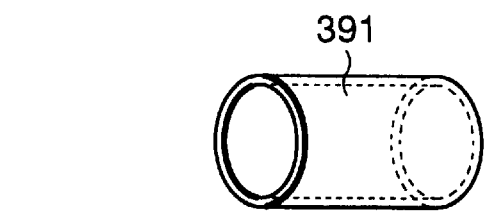
Figure 59C:
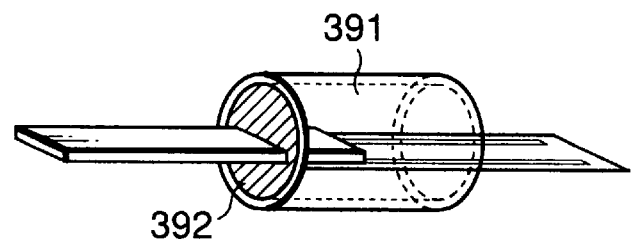

The resistive temperature sensor assembly has metal lead members 335 and 336. In addition, palladium films 394 and 395 are burned on a ceramic substrate 393 of alumina, etc., as shown in FIGS. 59A to 59C, thereby forming lead patterns 394 and 395. With palladium paste of the lead patterns 394 and 395 as lead members, nickel plating portions are brazed by silver brazing as with the lead members 335 and 336. A temperature sensing element body to which the lead members are attached is inserted into a ceramic tube 391 and fixed with ceramic cement 390, whereby resistive temperature sensor assembly can be formed.

Figure 60A:
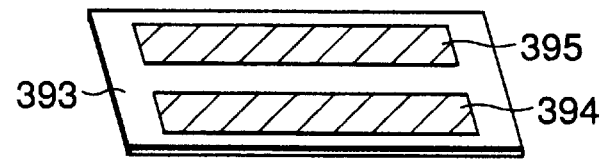
FIGS. 60A to 60C are illustrations to show still another form of resistive temperature sensor assembly.
Figure 60B:
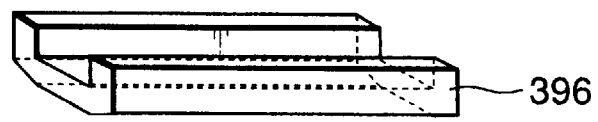
Figure 60C:
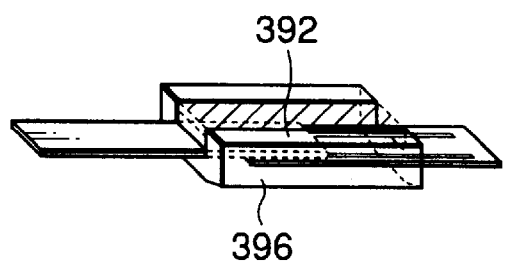

Further, a temperature sensing element body to which lead members shown in FIG. 60A are attached is mounted on a ceramic base 396 shown in FIG. 60B in place of the ceramic tube 391 and fixed with ceramic cement, whereby a resistive temperature sensor assembly shown in FIG. 60C can also be formed.

Tables 36 and 37 list the measurement results of the electrical characteristics of the temperature sensor assemblies of the twelfth example thus provided.

Table 36 lists change rates of resistance values at temperatures when the temperature is changed in the range of room temperature (25° C.) to 1300° C.

Table 37 lists the response speed measurement results by immersion in a niter solution at 400° C.

Figure 61:
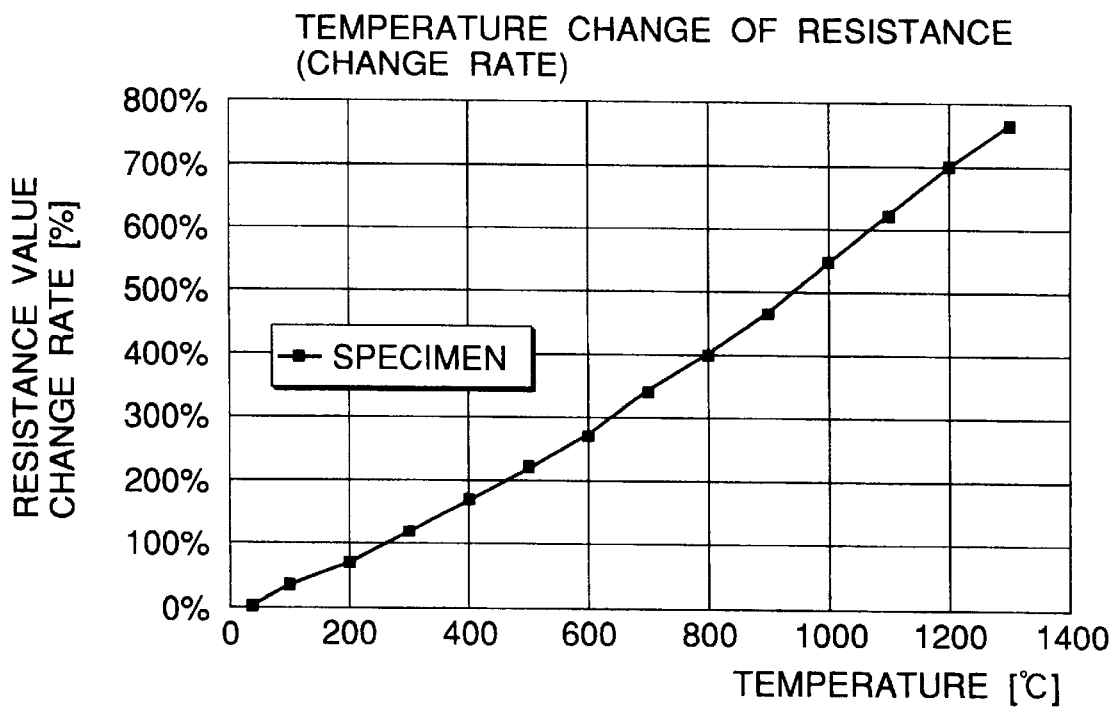
FIG. 61 is a graph to show resistance value change rate in response to temperature in the twelfth example of the invention.
Figure 62:
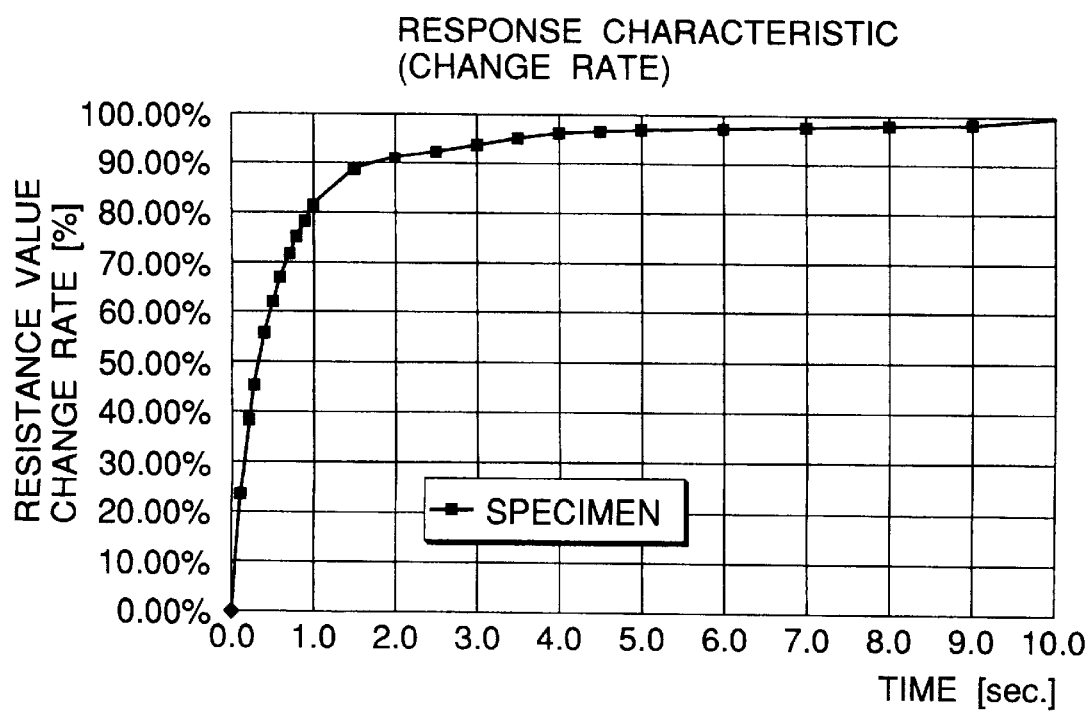
FIG. 62 is a graph to show response speed to resistance value change rate in the twelfth example of the invention.

Further, FIGS. 61 and 62 are provided by graphing Tables 36 and 37.

According to Table 36 and graph of FIG. 61 corresponding thereto, it is clear that the temperature sensors of the twelfth example of the invention have resistance values largely changed in response to temperature change.

According to Table 37 and the graph of FIG. 62 corresponding thereto, it is clear that the temperature sensors of the twelfth example of the invention have resistance values changed to predetermined values at sufficient response speed.

Thirteenth Example

The metal silicides used in the examples we have discussed are only molybdenum silicide, but other various metal silicides are known. Metal suicides other than molybdenum silicide can also be used as ceramic material forming a resistive temperature sensing element.

Use of metal silicide other than molybdenum silicide as ceramic material forming a resistive temperature sensing element will be discussed.

Various metal silicides are known; they differ in electrical, physical, and chemical characteristics depending on metals making up the silicide. In temperature detection application in a high temperature atmosphere, silicides excellent in heat resistance and oxidation resistance in addition to resistance temperature characteristic required for temperature detection are most desirable. When the highest operating temperature is about 1300° C. as in the invention, silicides of molybdenum (Mo), tungsten (W), titanium (Ti), and tantalum (Ta) are proper, among which molybdenum silicide is desirable from total determination of material cost, the degree of difficulty in manufacturing, etc.

However, if any other metal silicide such as tungsten silicide (WSi2) is used, a resistive temperature sensor sufficiently enduring use can be provided.

A resistive temperature sensor example using tungsten silicide as resistance material will be discussed.

The resistive temperature sensor has the same configuration as the resistive temperature sensor of the ninth example shown in FIGS. 46A to 46C except for material and therefore common parts will not be discussed again.

(1) Preparing of Material

Resistor material having composition of 40% tungsten silicide 3 μm in particle diameter by volume and 60% alumina 0.4 μm in particle diameter by volume, a methacrylate resin as a binder, toluene and ethanol as solvents, and BPBG as a plasticizer are entered in an alumina ceramic pot and are dispersed for 15 hours with an alumina bowl as a dispersion medium, providing resistor paint.

Insulator material having basic composition of 90% alumina 0.4 μm in particle diameter by volume, 10% mullite 0.4 μm in particle diameter by volume, 3% magnesia 0.4 μm in particle diameter by weight, and 0.3% silica 0.4 μm in particle diameter by weight, a methacrylate resin as a binder, toluene and ethanol as solvents, and BPBG as a plasticizer are entered in an alumina ceramic pot and are dispersed for 15 hours with an alumina bowl as a dispersion medium, as with the resistor material, providing insulator paint.

(2) Manufacturing of Sheets

The doctor blade height is adjusted so that the thickness after drying the resistor paint and insulator paint manufactured in the process in (1) by a sheet coater becomes 35 μm, and application film of each of the resistor paint and insulator paint is formed 80 mm in width on a polyethylene film, providing a resistor sheet and an insulator sheet.

Each of the resistor sheet and the insulator sheet is cut 100 mm in length to the stack dimension when a laminate is manufactured.

(3) Manufacturing of Laminate

After thick film layers are formed and predetermined lamination is complete as in the fifth example, the laminate is entered in a pressurization metal mold and pressure of 1.5 kg/cm² is applied for 300 seconds. Next, the laminate is cut at 2.4-mm wide pitches, providing laminates each 50 mm long and 1 mm thick.

(4) Manufacturing of Sintered Body

Binders are removed from the cut laminates at 600° C. for two hours in a nitrogen gas, then the laminates are sintered for two hours in an argon gas at 1650° C.

Further, they are sintered f or two hours in an argon gas at 1650° C. and 2000 atmospheres by HIP, then undergo surface oxidation treatment for one hour in air at 1400° C.

After the surface oxidation treatment, terminal connection parts are sandblasted.

(5) Assembling and Working

A palladium catalyst is printed on the terminal connection parts and dried, then heat treatment is executed, then nickel electroless plating is applied. After cleaning and drying, the element to which lead members are joined by silver brazing is inserted into an alumina tube, is filled with ceramic cement, and is dried, then undergoes heat treatment and is hardened.

Tables 38 and 39 list the measurement results of the electrical characteristics of the temperature sensor element specimens thus provided. Table 38 lists resistance value change in response to temperatures. Table 39 lists the resistance value response speed measured in a niter solution at 400° C.

Figure 63:
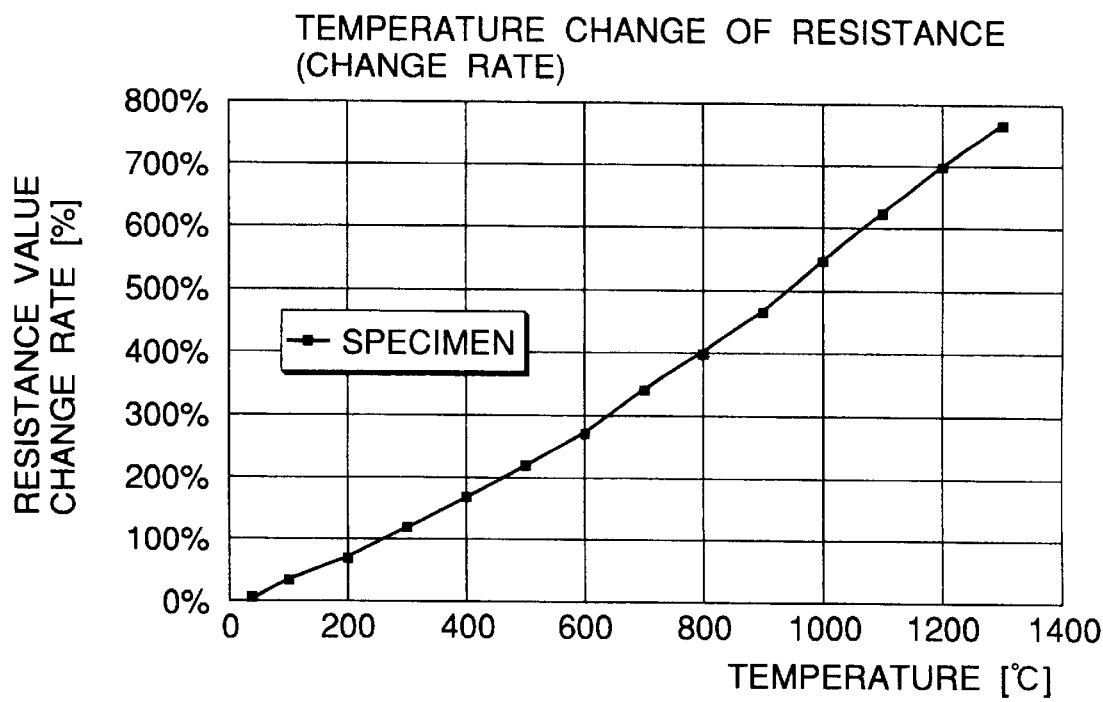
FIG. 63 is a graph to show resistance value change rate in response to temperature in a thirteenth example of the invention.
Figure 64:
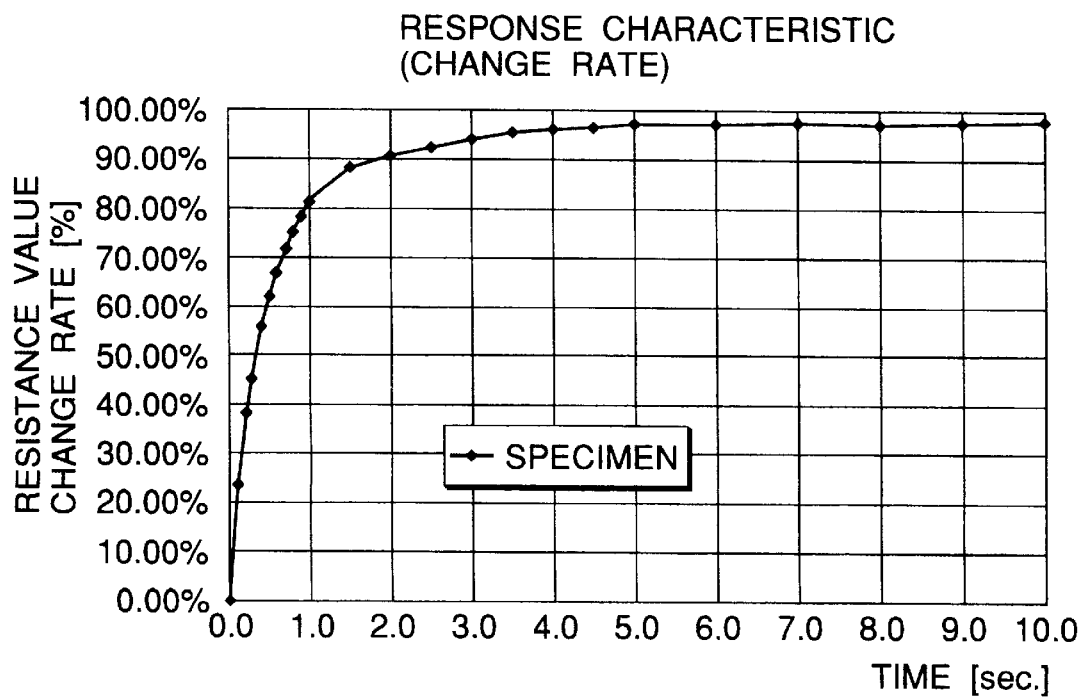
FIG. 64 is a graph to show response speed to resistance value change rate in the thirteenth example of the invention.

FIG. 63 is provided by graphing the resistance value change rates depending on temperatures in Table 38. FIG. 64 is provided by graphing the response speed to resistance value change rates in Table 39.

According to Table 38 and the graph of FIG. 63 corresponding thereto, it is clear that the resistive temperature sensors of the thirteenth example using tungsten silicide as the resistor material have resistance values largely changed in response to temperature change.

According to Table 39 and the graph of FIG. 64 corresponding thereto, it is clear that the temperature sensors of the thirteenth example using tungsten silicide as the resistor material have resistance values changed to predetermined values at sufficient response speed.

TABLE 36

| | Specimen | |
|---|---|---|
| Temperature (° C.) | Resistance Value (Ω) | Change Rate (%) |
| 25 | 67.10 | 0 |
| 100 | 91.03 | 36 |
| 200 | 112.16 | 67 |
| 300 | 146.64 | 119 |
| 400 | 180.20 | 169 |
| 500 | 214.32 | 219 |
| 600 | 247.09 | 268 |
| 700 | 296.64 | 342 |
| 800 | 339.18 | 406 |
| 900 | 381.50 | 469 |
| 1000 | 430.61 | 542 |
| 1100 | 484.16 | 622 |
| 1200 | 534.08 | 696 |
| 1300 | 577.49 | 761 |

TABLE 37

| | Specimen | |
|---|---|---|
| Time (sec) | Resistance Value (Ω) | Change Rate (%) |
| 0.0 | 67.10 | 0.0 |
| 0.1 | 93.85 | 23.7 |
| 0.2 | 110.12 | 38.0 |
| 0.3 | 117.89 | 44.9 |
| 0.4 | 130.00 | 55.6 |
| 0.5 | 136.96 | 61.8 |
| 0.6 | 142.48 | 66.7 |
| 0.7 | 148.40 | 71.9 |
| 0.8 | 152.24 | 75.3 |
| 0.9 | 155.25 | 77.9 |
| 1.0 | 158.30 | 80.6 |
| 1.2 | | |
| 1.4 | | |
| 1.5 | 167.71 | 89.0 |
| 1.6 | | |
| 1.8 | | |
| 2.0 | 169.89 | 90.9 |
| 2.2 | | |
| 2.4 | | |
| 2.5 | 171.27 | 92.1 |
| 2.6 | | |
| 2.8 | | |
| 3.0 | 172.07 | 92.8 |
| 3.2 | | |
| 3.4 | | |
| 3.5 | 173.79 | 94.3 |
| 3.6 | | |
| 3.8 | | |
| 4.0 | 174.99 | 95.4 |
| 4.5 | 175.95 | 96.2 |
| 5.0 | 176.19 | 96.5 |
| 6.0 | 176.81 | 97.0 |
| 7.0 | 176.98 | 97.2 |
| 8.0 | 178.04 | 98.1 |
| 9.0 | 178.31 | 98.3 |
| 10.0 | 178.66 | 98.6 |

TABLE 38

| | Specimen | |
|---|---|---|
| Temperature (° C.) | Resistance Value (Ω) | Change Rate (%) |
| 25 | 3.02 | 0 |
| 100 | 4.01 | 33 |

TABLE 38-continued

| Temperature (° C.) | Specimen | |
|---|---|---|
| | Resistance Value (Ω) | Change Rate (%) |
| 200 | 5.07 | 68 |
| 300 | 6.52 | 116 |
| 400 | 8.15 | 170 |
| 500 | 9.60 | 218 |
| 600 | 11.17 | 270 |
| 700 | 13.31 | 341 |
| 800 | 15.12 | 401 |
| 900 | 17.20 | 470 |
| 1000 | 19.53 | 547 |
| 1100 | 21.73 | 620 |
| 1200 | 24.08 | 698 |
| 1300 | 26.01 | 762 |

TABLE 39

| Time (sec) | Specimen | |
|---|---|---|
| | Resistance Value (Ω) | Change Rate (%) |
| 0.0 | 3.02 | 0.0 |
| 0.1 | 4.21 | 23.3 |
| 0.2 | 5.00 | 38.7 |
| 0.3 | 5.32 | 44.8 |
| 0.4 | 5.85 | 55.2 |
| 0.5 | 6.18 | 61.7 |
| 0.6 | 6.47 | 67.2 |
| 0.7 | 6.70 | 71.8 |
| 0.8 | 6.86 | 74.8 |
| 0.9 | 7.05 | 78.5 |
| 1.0 | 7.21 | 81.6 |
| 1.5 | 7.56 | 88.5 |
| 2.0 | 7.68 | 90.8 |
| 2.5 | 7.77 | 92.6 |
| 3.0 | 7.84 | 94.0 |
| 3.5 | 7.92 | 95.5 |
| 4.0 | 7.97 | 96.5 |
| 4.5 | 7.99 | 96.9 |
| 5.0 | 8.02 | 97.5 |
| 6.0 | 7.03 | 97.7 |
| 7.0 | 8.04 | 97.9 |
| 8.0 | 8.05 | 98.0 |
| 9.0 | 8.06 | 98.2 |
| 10.0 | 8.06 | 98.3 |

What is claimed is:

1. A resistive temperature sensor comprising:
an insulating body comprising alumina; and
a temperature sensing resistor comprising a conductive material containing a metal silicide;
wherein said insulating body and said temperature sensing resistor are laminated and sintered to form a lamination sintered body in which a resistance circuit is formed;
wherein said resistance circuit comprises the temperature sensing resistor, a connection electrode section to an outside, and a connection section between said electrode section and said temperature sensing resistor;
wherein said resistive temperature sensor further comprises a temperature sensing section and a lead portion;
wherein said temperature sensing section comprises 30% to 100% by volume of $MoSi_2$ based on a total volume of said temperature sensing section, and a balance being an insulating component (A) comprising alumina, 15% by weight or less of mullite and 5% by weight or less of MgO each based on a total weight of the insulating component (A);
wherein said lead portion comprises 50% to 100% by volume of $MoSi_2$ based on a total volume of said lead portion and a balance being an insulating component (B) comprising alumina, 15% by weight or less of mullite and 5% by weight or less of MgO each based on a total weight of the insulating component (B); and
wherein said insulating body comprises 85% to 100% by volume of alumina and 15% by volume or less of mullite based on a total volume of said insulating body, 5% by weight or less of MgO and 0.5% by weight of $SiO_2$ each based on a total weight of said insulating body.

2. A method of manufacturing the resistive temperature sensor according to claim 1, the method comprising:
laminating an insulation body comprising alumina and a conductive material containing metal silicide having a resistance body to form a lamination;
burning said lamination to form a burned lamination having at least one layer to form the resistance circuit therein; and
forming the resistive temperature sensor according to claim 1.

3. A resistive temperature sensor comprising:
an insulating body comprising alumina; and
a temperature sensing resistor comprising a conductive material containing a metal silicide;
wherein said insulating body and said temperature sensing resistor are laminated and sintered to form a lamination sintered body in which a resistance circuit is formed;
wherein said resistance circuit comprises the temperature sensing resistor, a connection electrode section to an outside, and a connection section between said electrode section and said temperature sensing resistor;
wherein said resistance circuit is formed of said conductive material containing the metal silicide;
wherein said temperature sensing resistor comprises a main component (A) comprising 30% to 100% by volume of metal silicide, 70% by volume or less of alumina and 15% by volume or less of mullite each based on a total volume of the main component (A), where magnesia is added in an amount of 5% by weight or less and silica is added in an amount of 0.5% by weight or less each based on a total weight of the temperature sensing resistor;
wherein a conductive material of said electrode section or said connection section comprises a main component (B) comprising 50% to 100% by volume of metal silicide, 50% by volume or less of alumina, and 15% by volume or less of mullite each based on a total volume of the main component (B), where magnesia is added in an amount of 5% by weight or less based on a total weight of the conductive material of said electrode section or said connection section; and
wherein said insulating body comprises a main component (C) comprising 85% to 100% by volume of alumina and 15% by volume or less of mullite each based on a total volume of the main component (C), where magnesia is added in an amount of 5% by weight or less and silica is added in an amount of 0.5% by weight or less each based on a total weight of the insulating body.

4. A resistive temperature sensor according to claim 3, wherein a conductive layer forming said electrode section and an insulating body layer comprising alumina are formed side by side in the same layer by thick film lamination; and
wherein said electrode section comprises a plurality of conductive layers laminated, sintered, and formed in one piece without intervention of insulating bodies.

5. A resistive temperature sensor according to claim 3, wherein
at least one of said temperature sensing resistor, said electrode section and said connection section contains at least one of titanium boride and titanium carbide in an amount of 0.1% to 0.5% by weight based on a total weight of at least one of a material of said temperature sensing resistor, said electrode section and said connection section.

6. A resistive temperature sensor according to claim 3, wherein said lamination sintered body contains said insulating body and said resistance circuit.

7. A resistive temperature sensor according to claim 6,
wherein said lamination sintered body has a plurality of layered said temperature sensing resistors therein; and
said temperature sensing resistors having a through-hole adjoining each other in a lamination direction are connected by a conductive body filled in the through-hole, said conductive body being the same material as at least one of said temperature sensing resistor, said electrode section and said connection section.

8. A resistive temperature sensor according to claim 3, wherein a conductive layer made of the same material as said electrode section, said connection section, or said temperature sensing resistor is placed between temperature sensing resistors of layers of a temperature sensing section and through an insulating body layer.

9. A resistive temperature sensor according to claim 8, wherein said temperature sensing section containing the temperature sensing resistors is made thinner than a laminated temperature sensor element body.

10. A resistive temperature sensor according to claim 9, wherein a lamination section made of the same conductive material and insulating body material as said temperature sensing section, said connection section, or said electrode section is formed surrounding said temperature sensing section at one or more ends of said temperature sensor element body in a lamination direction thereof to make said temperature sensing section thinner than said temperature sensor element body.

11. A resistive temperature sensor according to claim 8, wherein at least said temperature sensing section is covered with a protective film comprising at least one of alumina and silica.

12. A resistive temperature sensor comprising:
an insulating body comprising alumina; and
a temperature sensing resistor comprising a conductive material containing a metal silicide;
wherein said insulating body and said temperature sensing resistor are laminated and sintered to form a lamination sintered body in which a resistance circuit is formed;
wherein said resistance circuit comprises the temperature sensing resistor, a connection electrode section to an outside, and a connection section between said electrode section and said temperature sensing resistor;
wherein the resistive temperature sensor further comprises a temperature sensing section and a lead section;
wherein the resistive temperature sensor has a lamination structure;
wherein said temperature sensing section comprises a main component (G) comprising 30% to 100% by volume of $MoSi_2$ based on a total volume of the main component (G) and a balance being an insulating component (C) comprising 85% to 100% of alumina and 15% by volume or less of mullite based on a total volume of the insulating component (C) and 5% by weight or less of MgO based on a total weight of the insulating component (C);
wherein said lead section comprises a main component (H) comprising 50% to 100% by volume of $MoSi_2$ based on a total volume of the main component (H) and a balance being an insulating component (D) comprising alumina, 15% by volume or less of mullite based on a total volume of the insulating component (D) and 5% by weight or less of MgO based on a total weight of the insulating component (D); and
wherein said insulating body comprises alumina, 15% by weight or less of mullite, 5% by weight or less of MgO and 0.5% by weight or less of silica each based on a total weight of said insulating body.

13. A resistive temperature sensor according to claim 12, wherein the conductive material comprises $MoSi_2$; and
wherein the conductive material and the insulating body comprising alumina are laminated alternatively to form the lamination structure, and a least a part of the lamination structure forms the resistance circuit.

14. A resistive temperature sensor according to claim 13, wherein a portion in the neighborhood of said temperature sensing section of at least one of outer top and bottom portions of a lamination structure containing said temperature sensing section is cut out so that a portion surrounding said temperature sensing section is thinner than a temperature sensor element body.

15. A resistive temperature sensor according to claim 13, wherein at least one of outer top and bottom portions of a lamination structure containing said temperature sensing section is a lamination structure of the insulating body material and at least one layer of the same material as the lead section material or the temperature sensing section material.

16. A resistive temperature sensor according to claim 13, wherein an outside of an element body of said resistive temperature sensor containing at least said temperature sensing section except for an electric connection portion to an outside of said lead portion is coated with at least one layer film comprising at least one of alumina and $SiO_2$.

17. A resistive temperature sensor according to claim 12, wherein said resistance circuit comprising said conductive material is formed on said insulating body in a lamination structure of at least one layer, and said resistance circuit has a temperature sensing section and a lead section; and
wherein a portion surrounding said temperature sensing section is thinner than a temperature sensor element body, namely, at least one of outer top and bottom portions of a lamination structure containing said temperature sensing section is a lamination structure of at least one layer of the insulating body material and the same material as the lead section material or the temperature sensing section material or a portion in a neighborhood of said temperature sensing section of at least one of an outer top and bottom portions of the lamination structure containing said temperature sensing section is cut out so that a portion surrounding said temperature sensing section is thinner than a temperature sensing section.

18. A resistive temperature sensor according to claim 17, wherein at least one of outer top and bottom portions of a lamination structure containing said temperature sensing section is a lamination structure of the insulating body material and at least one layer of the same material as the lead section material and the temperature sensing section material.

19. A resistive temperature sensor according to claim 17, wherein an outer periphery of a lamination structure containing said temperature sensing section is a lamination structure of the insulating body material and at least one layer of the same material as the lead section material or the temperature sensing section material.

20. A resistive temperature sensor according to claim 17, wherein an outside of an element body containing at least said temperature sensing section except for an electric connection portion to an outside of said lead portion is coated with at least one layer film comprising at least one of alumina and $SiO_2$.

21. A resistive temperature sensor according to claim 13, wherein said resistance circuit has a temperature sensing section and a lead section, and if the resistance circuit has a lamination structure of a plurality of layers, said resistance circuit is connected by through-holes between the layers; and wherein a portion surrounding said temperature sensing section is thinner than a temperature sensor element body, namely, at least one of outer top and bottom portions of a lamination structure containing said temperature sensing section is a lamination structure of at least one layer of the insulating body material and the same material as the lead section material or the temperature sensing section material or a portion in a neighborhood of said temperature sensing section of at least one of an outer top and bottom portions of the lamination structure containing said temperature sensing section is cut out so that a portion surrounding said temperature sensing section is thinner than a temperature sensing section.

22. A resistive temperature sensor according to claim 17, wherein the resistance circuit has a lamination structure of a plurality of resistive layers, and said resistance circuit is connected by through-holes between the layers.

23. A resistive temperature sensor according to claim 21, wherein at least one of outer top and bottom portions of a lamination structure containing said temperature sensing section is a lamination structure of the insulating body material and at least one layer of the same material as the lead section material and the temperature sensing section material.

24. A resistive temperature sensor according to claim 21, wherein an outer periphery of a lamination structure containing said temperature sensing section is a lamination structure of the insulating body material and at least one layer of the same material as the lead section material or the temperature sensing section material.

25. A resistive temperature sensor according to claim 21, wherein an outside of an element body containing at least said temperature sensing section except for an electric connection portion to an outside of said lead portion is coated with at least one layer film comprising at least one of alumina and $SiO_2$.

* * * * *